US012425917B2

(12) United States Patent
Kim

(10) Patent No.: US 12,425,917 B2
(45) Date of Patent: Sep. 23, 2025

(54) METHOD AND APPARATUS FOR PERFORMING FEEDBACK-BASED ETHERNET HEADER COMPRESSION OR DECOMPRESSION IN WIRELESS COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 17/770,889

(22) PCT Filed: Nov. 2, 2020

(86) PCT No.: PCT/KR2020/015149
§ 371 (c)(1),
(2) Date: Apr. 21, 2022

(87) PCT Pub. No.: WO2021/091181
PCT Pub. Date: May 14, 2021

(65) Prior Publication Data
US 2022/0377602 A1    Nov. 24, 2022

(30) Foreign Application Priority Data

Nov. 6, 2019  (KR) .................. 10-2019-0141274
Dec. 16, 2019  (KR) .................. 10-2019-0167757
(Continued)

(51) Int. Cl.
*H04W 28/04*   (2009.01)
*H04L 1/00*    (2006.01)
(Continued)

(52) U.S. Cl.
CPC ........... *H04W 28/04* (2013.01); *H04L 1/0025* (2013.01); *H04W 28/06* (2013.01); *H04W 76/20* (2018.02)

(58) Field of Classification Search
CPC ..... H04W 28/04; H04W 28/06; H04W 76/20; H04W 76/22; H04W 24/10; H04W 28/12; H04L 1/0025; H04L 1/00; H04L 69/04
(Continued)

(56) References Cited

U.S. PATENT DOCUMENTS 10,257,747 B2    4/2019  Kim et al.
10,485,042 B2   11/2019  Hong et al.
(Continued)

FOREIGN PATENT DOCUMENTS

CN    107211475 A    9/2017
CN    109151903 A    1/2019
(Continued)

OTHER PUBLICATIONS

European Office Action dated Mar. 31, 2023, issued in European Application No. 20 885 313.5.
(Continued)

*Primary Examiner* — Mang Hang Yeung
(74) *Attorney, Agent, or Firm* — Jefferson IP Law, LLP

(57) ABSTRACT

The present disclosure relates to a communication technique for converging IoT technology with a 5G communication system for supporting a higher data transfer rate beyond the 4G system, and a system thereof. The present disclosure may be applied to intelligent services (for example, smart homes, smart buildings, smart cities, smart cars or connected cars, healthcare, digital education, retail businesses, security and safety-related services, etc.) on the basis of 5G communication technology and IoT-related technology. The present
(Continued)

disclosure provides a method and apparatus for configuring an out-of-order delivery function of a protocol layer device.

11 Claims, 23 Drawing Sheets

(30) Foreign Application Priority Data

| | | |
|---|---|---|
| Dec. 20, 2019 | (KR) | 10-2019-0172201 |
| Jul. 31, 2020 | (KR) | 10-2020-0095999 |
| Aug. 7, 2020 | (KR) | 10-2020-0099261 |
| Nov. 2, 2020 | (KR) | 10-2020-0144324 |

(51) Int. Cl.
  *H04W 28/06* (2009.01)
  *H04W 76/20* (2018.01)

(58) Field of Classification Search
  USPC .......................................................... 370/329
  See application file for complete search history.

(56) References Cited

U.S. PATENT DOCUMENTS

| | | | |
|---|---|---|---|
| 10,575,213 | B2 | 2/2020 | Jo et al. |
| 10,694,569 | B2 | 6/2020 | Jin et al. |
| 2009/0034476 | A1 | 2/2009 | Wang et al. |
| 2012/0155438 | A1 | 6/2012 | Shin et al. |
| 2016/0315868 | A1 | 10/2016 | Zhang et al. |
| 2018/0092146 | A1 | 3/2018 | Hong et al. |
| 2018/0139770 | A1 | 5/2018 | Ozturk et al. |
| 2018/0368018 | A1 | 12/2018 | Kim et al. |
| 2019/0053098 | A1 | 2/2019 | Jo et al. |
| 2019/0090156 | A1 | 3/2019 | Kim et al. |
| 2019/0150217 | A1 | 5/2019 | Kim |
| 2019/0223251 | A1* | 7/2019 | Jiang ............... H04W 76/11 |
| 2019/0253926 | A1 | 8/2019 | Kim et al. |
| 2020/0245400 | A1 | 7/2020 | Zheng et al. |
| 2021/0337619 | A1* | 10/2021 | Zhang ............ H04W 36/0069 |

FOREIGN PATENT DOCUMENTS

| | | |
|---|---|---|
| CN | 109983801 A | 7/2019 |
| KR | 10-2012-0070434 A | 6/2012 |
| KR | 10-2015-0126535 A | 11/2015 |
| KR | 10-2019-0017604 A | 2/2019 |
| KR | 10-2019-0017663 A | 2/2019 |
| KR | 10-2020-0076558 A | 6/2020 |
| KR | 10-2020-0076561 A | 6/2020 |
| KR | 10-2020-0076568 A | 6/2020 |
| KR | 10-2020-0076573 A | 6/2020 |
| KR | 10-2020-0076574 A | 6/2020 |
| WO | 2012/064772 A1 | 5/2012 |
| WO | 2019/029619 A1 | 2/2019 |
| WO | 2019/192014 A1 | 10/2019 |

OTHER PUBLICATIONS

European Search Report dated Jul. 29, 2022, issued in European application No. 20885313.5.
Huawei et al., Correction on oufOfOderDelivery, R2-1901229, 3GPP TSG A RAN WG2 Meeting #105, Feb. 15, 2019, Athens, Greece.
Oppo, Left issues on RLC, PDCP and SDAP for NR-V2X, R2-1912069, 3GPP TSG RAN WG2 Meeting #107bis, Oct. 3, 2019, Chongqing, China.
3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.7.0 (Sep. 2019), Sep. 27, 2019.
3rd Generation Partnership Project; Technical Specification Group Radio Access Network; Evolved Universal Terrestrial Radio Access (E-UTRA); Packet Data Convergence Protocol (PDCP) specification (Release 15), 3GPP TS 36.323 V15.4.0 (Jun. 2019), Jun. 27, 2019.
Chinese Office Action dated Oct. 30, 2024, issued in Chinese Patent Application No. 202080077020.2.
Chinese Notice of Allowance dated Apr. 28, 2025, issued in Chinese Patent Application No. 202080077020.2.

* cited by examiner

FIG. 1L
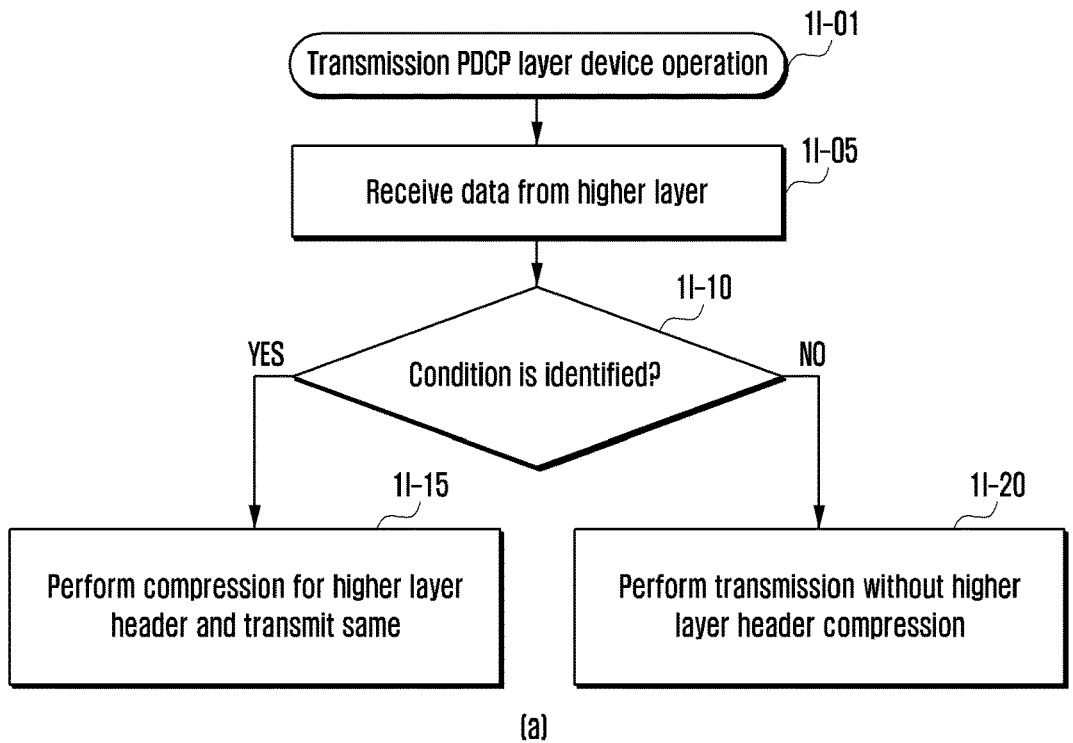
(a)
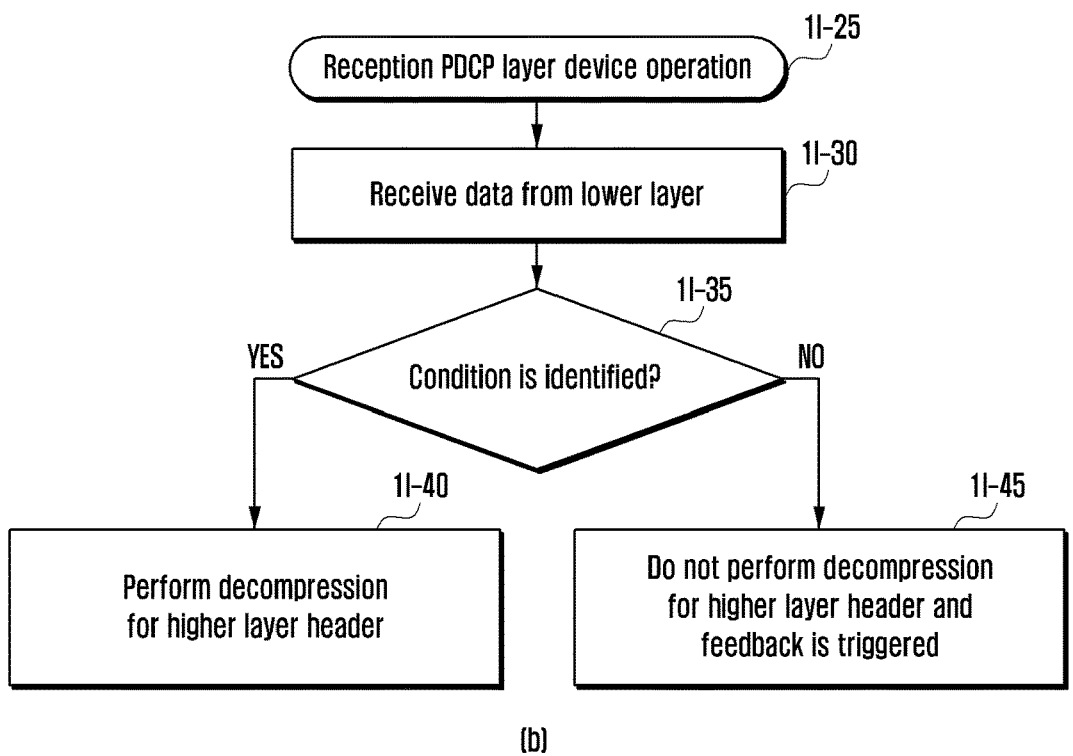
(b)

FIG. 2B
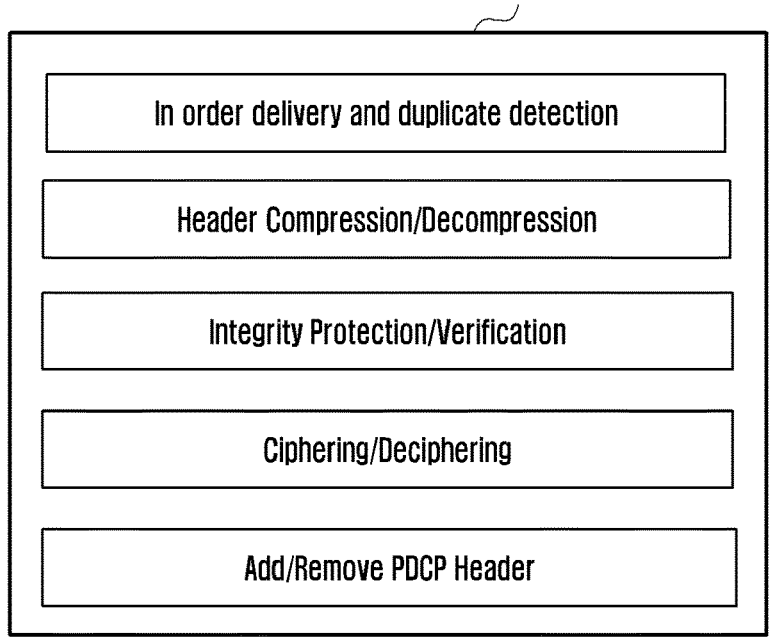
E-UTRA PDCP without reordering function
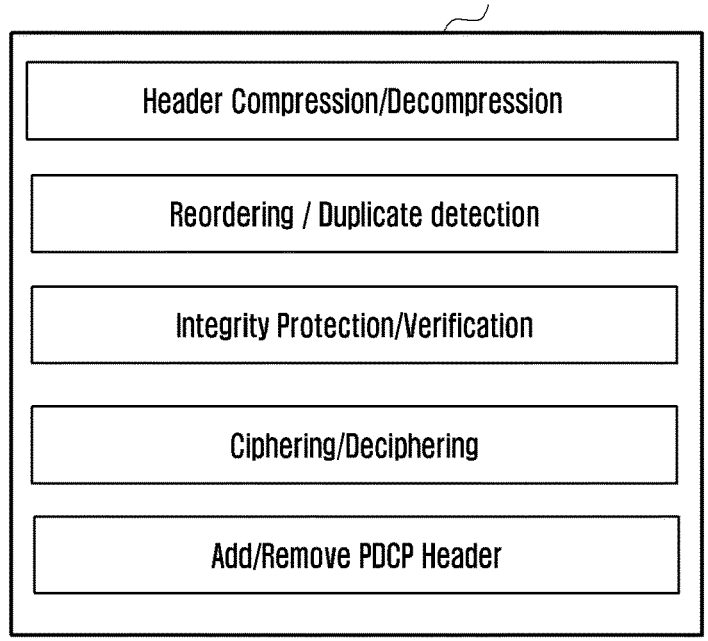
E-UTRA PDCP with reordering function
or NR PDCP

METHOD AND APPARATUS FOR PERFORMING FEEDBACK-BASED ETHERNET HEADER COMPRESSION OR DECOMPRESSION IN WIRELESS COMMUNICATION SYSTEM

TECHNICAL FIELD

The disclosure relates to a method or an apparatus for performing Ethernet header compression or decompression in a next-generation mobile communication system or wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system defined by 3GPP is called a "New Radio (NR) system".

The 5G communication system is considered to be implemented in ultra-higher frequency (mmWave) bands (e.g., 60 GHz bands) so as to accomplish higher data rates. To decrease propagation loss of the radio waves and increase the transmission distance in the ultra-higher frequency bands, beamforming, massive multiple-input multiple-output (MIMO), full dimensional MIMO (FD-MIMO), array antenna, analog beam forming, and large scale antenna techniques have been discussed in 5G communication systems, and applied to the NR system.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, diversified functions for satisfying various requests have been proposed in line with development of communication systems, and there is a need for improvement regarding operations of a radio link control (RLC) layer and a packet data convergence protocol (PDCP) layer in order perform such functions.

DISCLOSURE OF INVENTION

Technical Problem

In a next-generation mobile communication system, there is a need to efficiently use transmission resources in order to support a service requiring low transmission latency and high reliability (for example, ultra-reliable low latency communication (URLLC) or industrial IoT (IIoT) service).

In a wireless communication system, there is a need for an efficient data processing method or transfer method in a bearer-specific protocol layer device in order to support a service which has low transmission latency and which has no data interruption. Accordingly, the disclosure may propose a scheme for improving operations of a protocol layer device.

Solution to Problem

According to an embodiment for solving the above-mentioned technical problems, a method of a terminal includes: receiving, from a base station, first information for configuring out of order delivery for a radio link control (RLC) entity and second information indicating a reordering timer value for a packet data convergence protocol (PDCP) entity related to the RLC entity; delivering, based on the first information, data to the PDCP entity by the RLC entity, based on the out of order delivery; and performing, based on the second information, a reordering function for the data by the PDCP entity.

According to an embodiment for solving the above-mentioned technical problems, a method of a base station includes transmitting, to a terminal, first information for configuring out of order delivery for a radio link control (RLC) entity and second information indicating a reordering timer value for a packet data convergence protocol (PDCP) entity related to the RLC entity, wherein, based on the first information, data is delivered to the PDCP entity by the RLC entity, based on the out of order delivery, and wherein, based on the second information, a reordering function for the data is performed by the PDCP entity.

According to an embodiment for solving the above-mentioned technical problems, a terminal includes: a transceiver configured to transmit or receive a signal; and a controller, wherein the controller is configured to: receive, from a base station, first information for configuring out of order delivery for a radio link control (RLC) entity and second information indicating a reordering timer value for a packet data convergence protocol (PDCP) entity related to the RLC entity, deliver, based on the first information, data to the PDCP entity by the RLC entity, based on the out of order delivery, and perform, based on the second information, a reordering function for the data by the PDCP entity.

According to an embodiment for solving the above-mentioned technical problems, a base station includes: a transceiver configured to transmit or receive a signal; and a controller, wherein the controller is configured to: transmit, to a terminal, first information for configuring out of order delivery for a radio link control (RLC) entity and second information indicating a reordering timer value for a packet data convergence protocol (PDCP) entity related to the RLC entity, deliver, based on the first information, data to the PDCP entity by the RLC entity, based on the out of order delivery, and perform, based on the second information, a reordering function for the data by the PDCP entity.

Advantageous Effects of Invention

According to an embodiment of the disclosure, a method for compression or decompression of an Ethernet header in a next-generation mobile communication system using an Ethernet protocol is proposed, so as to enable efficient use of transmission resources. Therefore, a large amount of data may be transmitted via a small amount of transmission resources, and a more reliable modulation method may be used, thereby ensuring high reliability and low latency.

According to embodiments proposed through the disclosure, transmission latency may be reduced during an operation of a protocol layer device through a transmission/reception data processing method to which an out of order delivery scheme is applied in a wireless communication system. Accordingly, operations of the protocol layer device may be improved efficiently.

In addition, according to another embodiment of the disclosure, operations of various layers including an RLC layer may be efficiently performed to support an out of order delivery function of the RLC layer.

BRIEF DESCRIPTION OF DRAWINGS

FIG. 1L illustrates an operation of a transmission PDCP layer device or an operation of a reception PDCP layer device of a UE or a base station according to an embodiment of the disclosure;

FIG. 1O illustrates detailed stages of an efficient handover method (for example, dual active protocol stack (DAPS) handover method) for minimizing data interruption time due to handover in an embodiment of the disclosure;

FIG. 2B illustrates an efficient data processing method of PDCP layer devices proposed by the disclosure;

MODE FOR THE INVENTION

Figure 1A:
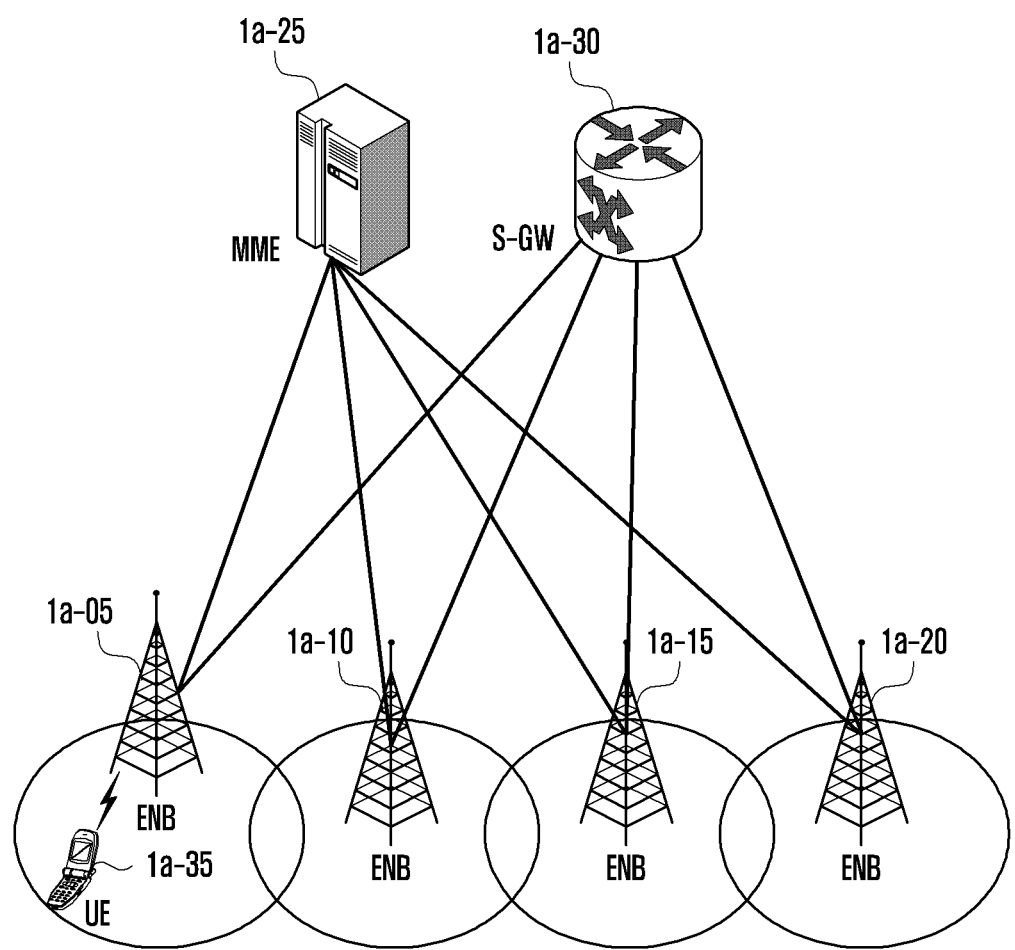
FIG. 1A illustrates the structure of an LTE system according to an embodiment of the disclosure.

Hereinafter, embodiments of the disclosure will be described in detail with reference to the accompanying drawings. In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description of the disclosure, terms or names defined in the 3rd generation partnership project long term evolution (3GPP LTE) standards will be used for the convenience of description. However, the disclosure is not limited by these terms and names, and may be applied in the same way to systems that conform other standards. In the disclosure, the term "eNB" may be interchangeably used with the term "gNB" for the convenience of description. That is, a base station described as "eNB" may indicate "gNB". In the disclosure, the term "terminal" may refer to mobile phones, NB-IoT devices, sensors, and various wireless communication devices.

In the next-generation mobile communication system, in order to support a service requiring low latency and high reliability (for example, an ultra-reliable low latency communication (URLLC) or an industrial IoT (IIoT) service), there is a need to efficiently use transmission resources.

According to an embodiment of the disclosure, a method for compression or decompression of an Ethernet header in a next-generation mobile communication system using an Ethernet protocol is proposed, so as to enable efficient use of transmission resources. Therefore, a great amount of data may be transmitted via a small amount of transmission resources and a more reliable modulation method may be used, so as to ensure high reliability and low latency.

Embodiment 1

FIG. 1A illustrates the structure of an LTE system according to an embodiment of the disclosure.

Referring to FIG. 1A, a radio access network of an LTE system may include next-generation base stations (referred to as evolved node Bs, hereinafter eNBs, node Bs, or base stations) 1a-05, 1a-10, 1a-15, and 1a-20, a mobility management entity (MME) 1a-25, or a serving gateway (S-GW) 1a-30. A user equipment (hereinafter UE or terminal) 1a-35 may access an external network through the eNBs 1a-05 to 1a-20 or S-GW 1a-30.

In FIG. 1A, the eNBs 1a-05 to 1a-20 may correspond to an existing node B of a universal mobile telecommunication system (UMTS). The eNBs are connected to the UE 1a-35 through a radio channel, and perform a more complicated role than the existing node B. In the LTE system, since all user traffic pertaining to real-time service, such as voice over IP (VoIP), via the Internet protocol, is serviced through a shared channel, a device that performs scheduling by collecting state information, such as buffer states, available transmit power states, and channel states of UEs, is required, and eNBs 1a-05 to 1a-20 may be in charge of this function of the device. In general, one eNB may control multiple cells. For example, in order to implement a transmission rate of 100 Mbps, the LTE system may use orthogonal frequency division multiplexing (OFDM) as a radio access technology in the bandwidth of 20 MHz. In addition, the LTE system adopts an adaptive modulation & coding (hereinafter referred to as AMC) scheme for determining a modulation scheme and a channel coding rate based on the channel state of the UE. The S-GW 1a-30 is a device for providing a data bearer, and may generate or remove a data bearer under the control of the MME 1a-25. The MME 1a-25 may in charge of various control functions in addition to a mobility management function for the UE, and may be connected to multiple base stations.

Figure 1B:
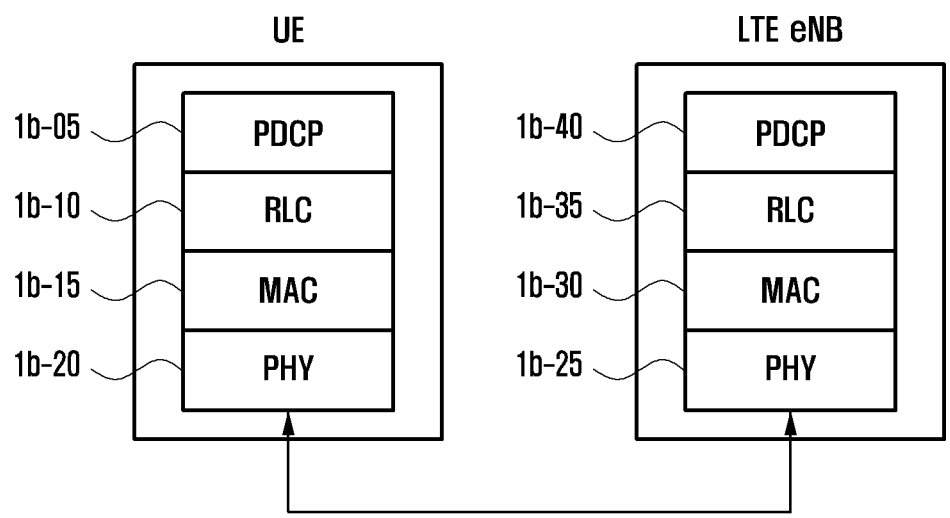
FIG. 1B illustrates a radio protocol structure in an LTE system according to an embodiment of the disclosure.

FIG. 1B illustrates a radio protocol structure in an LTE system according to an embodiment of the disclosure.

Referring to FIG. 1B, the radio protocol of the LTE system includes packet data convergence protocols (PDCPs)

1b-05 and 1b-40, radio link controls (RLCs) 1b-10 and 1b-35, and medium access controls (MACs) 1b-15 and 1b-30, in a UE and an eNB, respectively. The packet data convergence protocols (PDCPs) 1b-05 and 1b-40 are used to perform operations, such as IP header compression/restoration. The main functions of PDCPs are summarized as follows. The PDCP may perform various functions without being limited to the following examples.

- Header compression and decompression: Robust header compression (ROHC) only
- Transfer of user data
- In-sequence delivery of upper layer PDUs at PDCP re-establishment procedure for RLC acknowledge mode (AM)
- Sequence reordering (for split bearers in DC (only support for RLC AM): PDCP PDU routing for transmission and PDCP PDU reordering for reception)
- Duplicate detection of lower layer SDUs at PDCP re-establishment procedure for RLC AM
- Retransmission of PDCP SDUs at handover and, for split bearers in DC, of PDCP PDUs at PDCP data-recovery procedure, for RLC AM)
- Ciphering and deciphering
- Timer-based service data unit (SDU) discard in uplink The radio link control (hereinafter referred to as RLC) 1b-10 and 1b-35 may perform an automatic repeat request (ARQ) operation and the like by reconfiguring a PDCP protocol data unit (PDU) to an appropriate size. The main functions of RLC are summarized below. The RLC may perform various functions without being limited to the following examples.

- Transfer of upper layer PDUs
- ARQ function (Error correction through ARQ (only for AM data transfer))
- Concatenation, segmentation and reassembly of RLC SDUs (only for UM and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MACs 1b-15 and 1b-30 are connected to multiple RLC layer devices configured in one UE, and may perform an operation of multiplexing RLC packet data units (PDUs) to MAC PDUs and de-multiplexing RLC PDUs from MAC PDUs. The main functions of MAC are summarized as follows. The MAC may perform various functions without being limited to the following examples.

- Mapping between logical channels and transport channels
- Multiplexing/de-multiplexing of MAC SDUs belonging to one or different logical channels into/from transport blocks (TB) delivered to/from the physical layer on transport channels
- Scheduling information reporting
- Error correction through HARQ
- Priority handling between logical channels of one UE
- Priority handling between UEs by means of dynamic scheduling
- Multimedia broadcast multicast service (MBMS) identification
- Transport format selection
- Padding Physical layers 1b-20 and 1b-25 may perform operations of channel coding and modulating upper layer data, forming the upper layer data into an OFDM symbol, transmitting the OFDM symbol through a radio channel, or of demodulating an OFDM symbol received through a radio channel, channel-decoding the OFDM symbol, and transmitting the OFDM symbol to an upper layer. The PHY may perform various functions without being limited to the following examples.

Figure 1C:
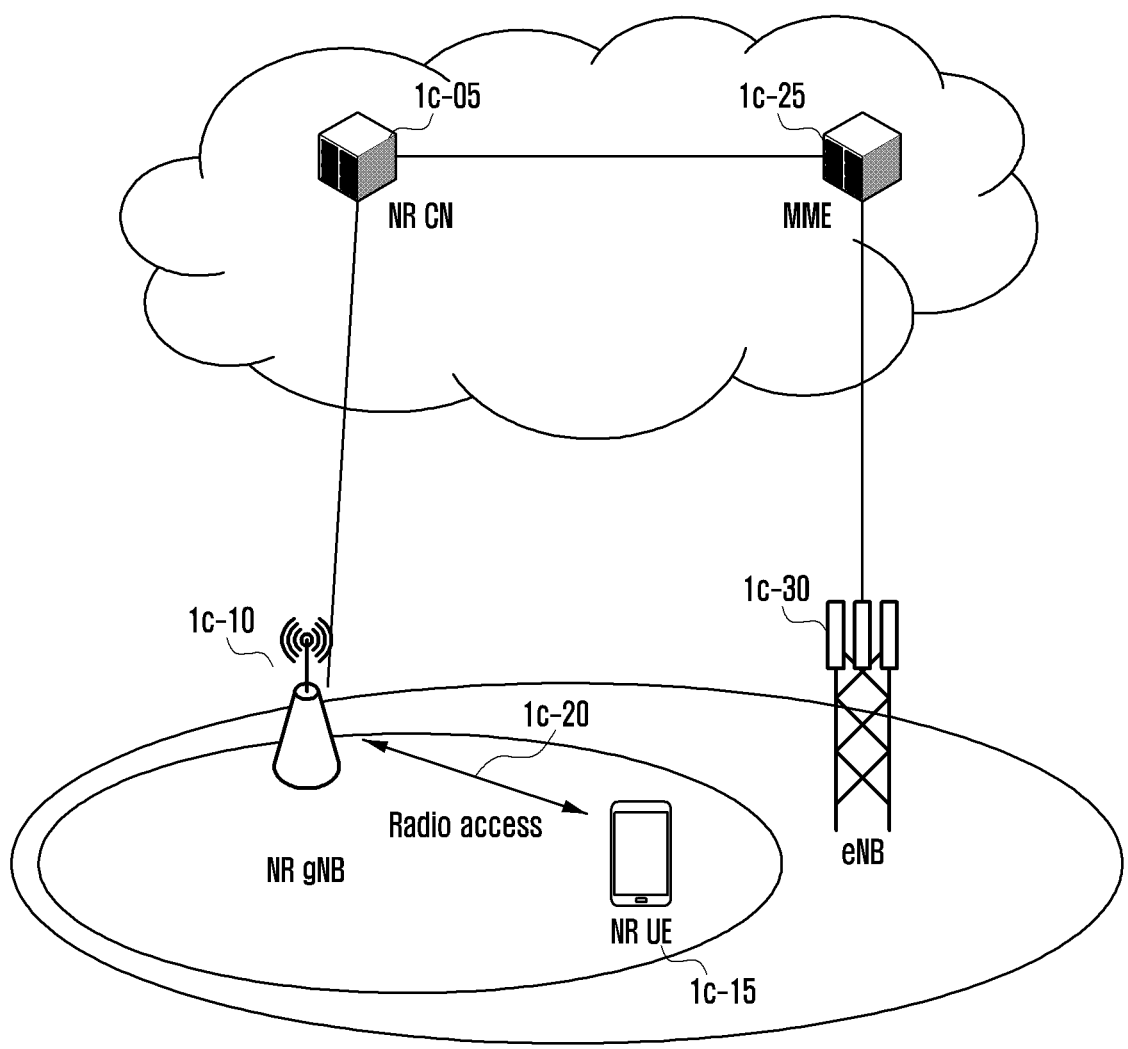
FIG. 1C illustrates the structure of a next-generation mobile communication system according to an embodiment of the disclosure.

FIG. 1C illustrates the structure of a next-generation mobile communication system according to an embodiment of the disclosure.

Referring to FIG. 1C, a radio access network of a next-generation mobile communication system (hereinafter referred to as NR or 5G) may include a new radio node B (hereinafter referred to as an NR gNB, or NR base station) 1c-10 and a new radio core network (NR CN) 1c-05. A user equipment (a new radio user equipment, hereinafter referred to as NR UE or a terminal) 1c-15 may access an external network via an NR gNB 1c-10 and an NR CN 1c-05.

In FIG. 1C, the NR gNB 1c-10 corresponds to an evolved node B (eNB) of the existing LTE system. The NR gNB 1c-10 is connected to the NR UE 1c-15 via a radio channel, and may provide an excellent service as compared to the existing node B. In a next-generation mobile communication system, since all types of user traffic is serviced through a shared channel, there is a need for a device for performing scheduling by collecting state information, such as buffer states, available transmission power states, and channel states of UEs. Further, the NR gNB 1c-10 is in charge of this function of the device. In general, one NR gNB 1c-10 typically controls multiple cells. In order to implement ultra-high speed data transmission as compared to the existing LTE, the NR gNB may have the existing maximum bandwidth or more, and may additionally employ beam-forming technology using orthogonal frequency division multiplexing (hereinafter referred to as OFDM) as a radio access technology. In addition, the NR gNB adopts an adaptive modulation & coding (AMC) scheme that determines a modulation scheme and a channel coding rate based on the channel state of a UE. The NR CN 1c-05 performs functions, such as mobility support, bearer configuration, quality of service (QoS) configuration, and the like. The NR CN 1c-10 is a device that is in charge of various control functions in addition to a mobility management function for a UE, and may be connected to multiple base stations. In addition, the next-generation mobile communication system may also operate in conjunction with the existing LTE system, and the NR CN 1c-10 may be connected to an MME 1c-25 via a network interface. The MME 1c-25 may be connected to an eNB 1c-30, that is, to the existing base station.

Figure 1D:
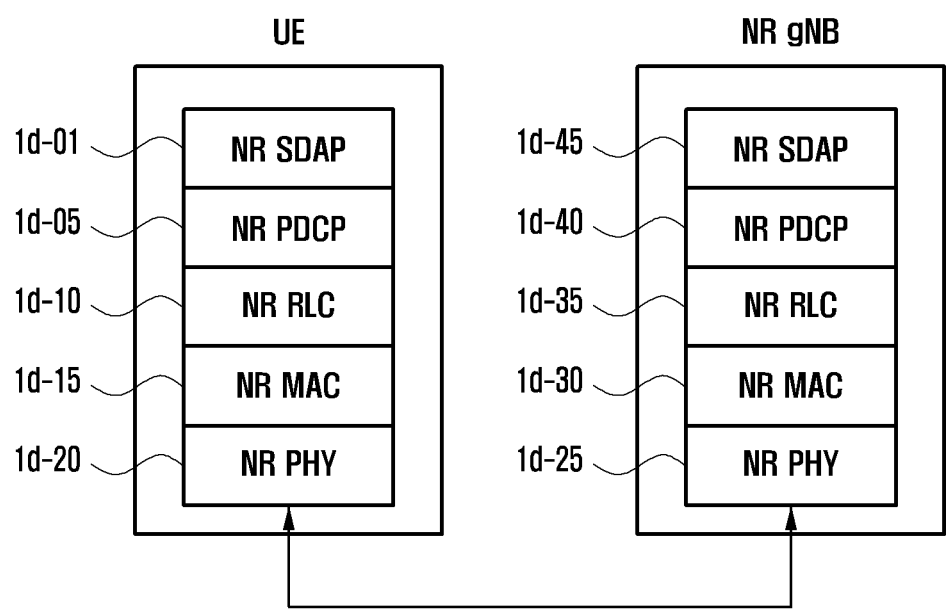
FIG. 1D illustrates a radio protocol structure of a next-generation mobile communication system according to an embodiment of the disclosure.

FIG. 1D illustrates a radio protocol structure of a next-generation mobile communication system according to an embodiment of the disclosure.

Referring to FIG. 1D, the radio protocol of the next-generation mobile communication system includes NR service data adaptation protocol (SDAPs) 1d-01 and 1d-45, NR PDCPs 1d-05 and 1d-40, NR RLCs 1d-10 and 1d-35, and NR MACs 1d-15 and 1d-30, respectively, in a UE and an NR base station.

The main functions of the NR SDAPs 1d-01 and 1d-45 may include some of the following functions. The PDCP may perform various functions without being limited to the following examples.

- Transfer of user plane data
- Mapping between a QoS flow and a data bearer (DRB) for both downlink (DL) and uplink (UL)
- Marking QoS flow ID in both DL and UL packets Mapping reflective QoS flow to data bearer (DRB) for the UL SDAP PDUs With respect to the SDAP layer device, the UE may be configured with whether or not use the header of the SDAP layer device or the function of the SDAP layer device for each PDCP layer device, for each bearer, and for each logical channel through an RRC message. When the SDAP header is configured, a non-access stratum quality of service (NAS reflective QoS) reflective configuration 1-bit indicator (NAS reflective QoS) and an access stratum quality of service (AS QoS) reflective configuration 1-bit indicator (AS reflective QoS) of the SDAP header are used to instruct the UE to enable updating or reconfiguration of the mapping information relating to the QoS flow and data bearer of uplink and downlink. The SDAP header may include QoS flow ID information indicating QoS. The QoS information may be used as data processing priority, scheduling information, etc., in order to support a smooth service.

The main functions of the NR PDCPs 1d-05 and 1d-40 may include some of the following functions. The NR PDCP may perform various functions without being limited to the following examples.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering function of the NR PDCP device may include a function of sequentially reordering PDCP PDUs, received from a lower layer, based on a PDCP sequence number (SN), and a function of transmitting data to an upper layer in the reordered sequence. Alternatively, the reordering function of the NR PDCP device may include a function of directly transmitting data to an upper layer without taking the sequence into consideration, a function of reordering the sequence and recording missing PDCP PDUs, a function of providing a state report on the missing PDCP PDUs to a transmission side, and a function of requesting retransmission of the missing PDCP PDUs.

The main functions of the NR RLCs 1d-10 and 1d-35 may include some of the following functions. The NR RLC may perform various functions without being limited to the following examples.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery (or ID) function of the NR RLC device refers to a function of transmitting RLC SDUs, received from a lower layer, to an upper layer in sequence. The in-sequence delivery function of the NR RLC device may include, when one RLC SDU is originally segmented into multiple RLC SDUs and received, a function of reassembling and transmitting the multiple RLC SDUs, a function of reordering the received RLC PDUs based on an RLC sequence number (SN) or PDCP sequence number (SN), a function of reordering the sequence and recording missing RLC PDUs, a function of providing a state report on the missing RLC PDUs to a transmission side, a function of requesting retransmission of the missing RLC PDUs, a function of sequentially transmitting only RLC SDUs prior to the missing RLC SDU to an upper layer when there is a missing RLC SDU, a function of sequentially transmitting all the RLC SDUs received before a predetermined timer starts to an upper layer when the predetermined timer has expired even when there is a missing RLC SDU, or a function of sequentially transmitting all RLC SDUs received so far to an upper layer when the predetermined timer has expired even when there is a missing RLC SDU.

In addition, according to the out-of-sequence delivery function of the NR RLC device, the RLC PDUs may be processed in a sequence in which the RLC PDUS are received (in a sequence of arrival regardless of the sequence of serial number or sequence number), and may be transmitted to a PDCP device in out-of-sequence delivery (or OOD). The out-of-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer, or may be replaced by a multiplexing function of the NR MAC layer.

The out-of-sequence delivery function of the NR RLC device may include a function of directly transmitting the RLC SDUs, received from the lower layer, to an upper layer regardless of the order thereof. The out-of-sequence delivery function of the RLC device may include, when one RLC SDU has been originally segmented into multiple RLC SDUs and received, a function of reassembling the multiple RLC SDUs and transmitting the same, and a function of storing the RLC SN or PDCP SN of the received RLC PDUs, reordering the sequence, and recording the missing RLC PDUs.

The NR MACs 1d-15 and 1d-30 may be connected to multiple NR RLC layer devices configured in one UE, and the main function of the NR MAC may include some of the following functions. The NR MAC may perform various functions without being limited to the following examples.

Mapping between logical channels and transport channels
Multiplexing/de-multiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 1d-20 and 1d-25 may perform operations of channel-coding and modulating upper layer data, forming the upper layer data into an OFDM symbol, transmitting the OFDM symbols via a radio channel or demodulating and channel decoding of the OFDM symbols received via the radio channel, and transferring the OFDM symbol to an upper layer.

The disclosure proposes a method for compression and decompression of an Ethernet header when using an Ethernet protocol in a next generation mobile communication system.

Figure 1E:
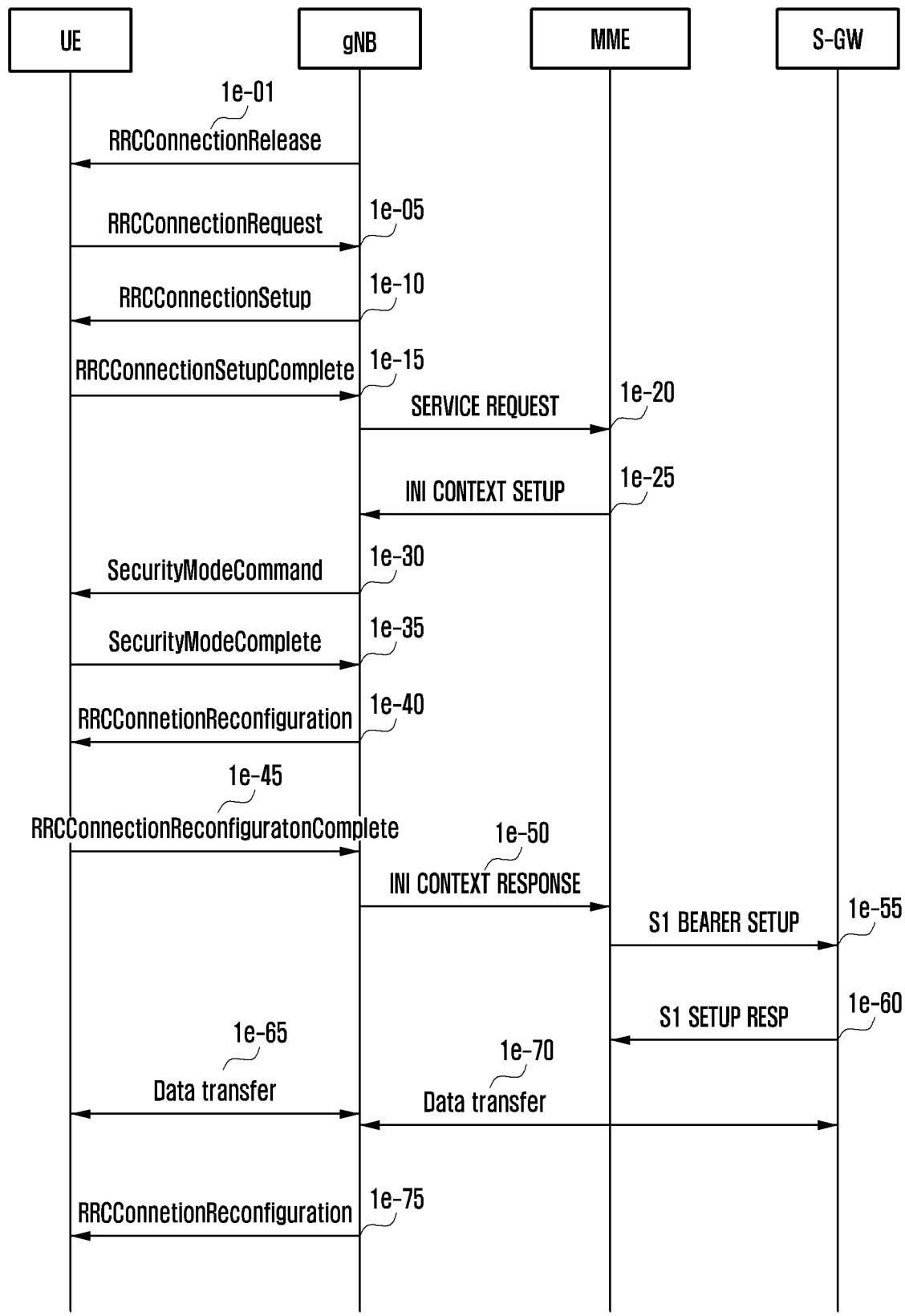
FIG. 1E illustrates a procedure of configuring Ethernet header protocol-related configuration information for a UE, by a base station, when the UE establishes a connection with a network according to an embodiment of the disclosure.

FIG. 1E illustrates a procedure of configuring Ethernet header protocol-related configuration information for a UE, by a base station, when the UE establishes a connection with a network, according to an embodiment of the disclosure.

FIG. 1E illustrates a procedure in which a UE switches from an RRC idle mode or an RRC inactive mode (or lightly-connected mode) to an RRC connected mode and establishes a connection with a network. In addition, FIG. 1E illustrates a procedure of configuring Ethernet header protocol-related configuration information for a UE, by a base station. Specifically, FIG. 1E illustrates a procedure indicating whether the Ethernet header compression or decompression procedure is to be performed in a PDCP layer device, and whether to use the Ethernet header compression or decompression procedure only in a downlink, only in an uplink, or both the uplink and downlink. The Ethernet header protocol-related configuration information may be configured only for a UE having UE capability, which can use the Ethernet protocol or only for a UE having UE capability, which can use the Ethernet header compression and decompression procedure. When the UE reports a UE capability to a base station, the UE may define a new indicator and may report to the base station whether the UE can use the Ethernet protocol or can use the Ethernet header compression and decompression procedure. In addition, the base station may configure which type of Ethernet frame or Ethernet header is to be used for each bearer or logical channel to determine which type of fields are configured in the Ethernet header, how many bytes the Ethernet header size is, how many bits the size of each field of the Ethernet header is, or how the fields of the Ethernet header are configured. In addition, in a case where padding is added to the Ethernet frame, the UE may indicate whether to configure using a function of preventing the padding from being transmitted through the actual wireless link by removing the padding at the transmission terminal and by adding the padding at the reception terminal. In addition, when the base station transmits an RRC message (e.g., a handover command message, RRCReconfiguration message, RRCSetup message, or RRCResume message) to the UE to perform a handover procedure, the base station may define and configure an indicator (drb-ContinueEHC) indicating whether to initialize a context for Ethernet header compression or decompression or whether to continuously use the same, and thus may indicate whether to continuously use the context for the Ethernet header compression or decompression when the UE performs a handover procedure or performs a PDCP re-establishment procedure. In addition, the base station may configure the indicator (drb-ContinueEHC) indicating whether to initialize or continue to use the context for Ethernet header compression or decompression for each bearer, or may configure the same for each PDCP layer device through PDCP layer device configuration information (pdcp-config).

Referring to FIG. 1E, when a UE for performing data transmission or reception in the RRC connected mode does not perform data transmission or reception for a predetermined reason or for a predetermined time, a base station may transmit an RRCConnectionRelease message to the UE to allow the UE to be switched to the RRC idle mode or RRC inactive mode (indicated by reference numeral 1e-01). Subsequently, a UE (hereinafter, idle mode UE or inactive UE), to which a connection is not currently established, may perform an RRC connection establishment process or an RRC connection resume procedure with the base station when data to be transmitted is generated. The UE establishes reverse transmission synchronization with the base station through a random access process and transmits an RRCConnectionRequest message (in a case of a resume procedure, RRCResumeRequest message) to the base station (indicated by reference numeral 1e-05). The RRCConnectionRequest message may include a cause (establishmentCause) for establishing a connection with an identifier of the UE. The base station transmits an RRCConnectionSetup message so that the UE establishes an RRC connection (indicated by reference numeral 1e-10).

The RRCConnectionSetup message (in a case of a resume procedure, RRCResumeRequest message) may include information indicating whether to use Ethernet protocol or whether to use a header compression and decompression procedure for each logical channel (that is, logical channel-config), for each bearer, for each PDCP device (that is, PDCP-config), or for each SDAP layer device. Further, more specifically, the RRCConnectionSetup message (in a case of a resume procedure, RRCResumeRequest message) may indicate whether to use the Ethernet protocol or Ethernet header compression and decompression procedure in each logical channel, bearer, or each PDCP device (or SDAP device), or only for a certain IP flow or a certain QoS flow. As another method, the base station may configure, for the SDAP device, information about IP flow or QoS flow as to whether to apply the Ethernet protocol or whether to use or not the Ethernet header compression method, so that the SDAP device may indicate, to the PDCP device, each QoS flow as to whether to apply the Ethernet protocol or whether to use the Ethernet header compression method. According to another method, the SDAP layer device or PDCP device may identify each QoS flow for itself and determine whether or not to apply the Ethernet protocol or the Ethernet header compression method. In addition, when the RRCConnectionSetup message indicates whether to apply the Ethernet protocol or whether to use the Ethernet header compression method, the SDAP device may indicate a predefined library or dictionary information to be used in whether to apply the Ethernet protocol or the Ethernet header compression method, an identifier for the same, or the buffer size to be used. In addition, the RRCConnectionSetup message may include a command for setup or releasing whether to apply the Ethernet protocol or performing the Ethernet header compression method. In addition, the base station may configure whether to apply the Ethernet protocol or using the Ethernet header compression method via an RLC acknowledged mode (AM) bearer (an ARQ function, a lossless mode having a retransmission function) or via an RLC unacknowledged mode (UM) bearer at all times, or may configure the same together with a header compression protocol (e.g., ROHC). In addition, the RRCConnectionSetup message may indicate whether to use the function of the SDAP layer device or the SDAP header for each logical channel (logicalchannelconfig), for each bearer, or for each PDCP device (PDCP-config), or may configure the same for each uplink or downlink. The RRCConnectionSetup message may indicate whether to apply ROHC (or IP packet header compression) for each logical channel (that is, through logical channelconfig), for each bearer, or for each PDCP device (that is, PDCP-config), and whether to apply the ROHC to uplink and downlink, respectively, may be configured via an indicator.

In addition, whether to use a user data compression method (UDC) for each logical channel, for each bearer, or for each PDCP device may be configured for the uplink and the downlink, respectively. That is, the user data compression method (UDC) may be configured to be used for the uplink and not to be used for the downlink. On the contrary, the UDC may be configured not to be used for the uplink and to be used for the downlink. In addition, the UDC may be configured to be used in both directions. In addition, the base station may simultaneously configure the Ethernet header compression procedure and the ROHC header compression procedure through the RRCConnectionSetup message. In addition, the base station may define an indicator (drbEthHCContinue), through the RRCConnectionSetup message, to indicate continuously using context or Ethernet header compression protocol-related configuration information without initialization thereof in a case of a handover (for example, handover in a base station) or in a case of switching from an RRC inactive mode to an RRC connected mode. A UE having received the indicator may continuously use the Ethernet header compression protocol-related configuration information or the context, without initializing the same, by considering the indicator in a case of reestablishing the SDAP layer device or the PDCP layer device. Accordingly, the overhead due to reconfiguration of the Ethernet header compression protocol can be reduced.

Further, the RRCConnectionSetup message may define a new indicator and indicate to initialize the Ethernet header compression protocol-related configuration information or the context. In addition, the RRCConnectionSetup message may configure whether to configure an SDAP protocol or an SDAP header. In addition, the RRCConnectionSetup message may configure which type of Ethernet frame or Ethernet header is to be used for each bearer or logical channel to determine which type of fields are configured in the Ethernet header, how many bytes the Ethernet header size is, how many bits the size of each field of the Ethernet header is, or a method in which the fields of the Ethernet header are configured. In addition, in a case where padding is added to the Ethernet frame, the base station may indicate whether to configure using a function of preventing the padding from being transmitted through the actual wireless link by removing the padding at the transmission terminal and by adding the padding at the reception terminal. In addition, the base station may configure whether to use feedback when performing the Ethernet header compression or decompression procedure, and when it is configured to use feedback by defining a new indicator (or whether to use feedback may be performed by defining an indicator for each bearer or each PDCP layer device), the transmission PDCP layer device of the transmitting terminal (the UE or base station) may transmit data having a full header (field values of uncompressed full header, a context identifier, or an indicator indicating whether to perform compression) to a reception PDCP layer device of a receiving terminal (the base station or UE). When receiving data having the full header from the transmission PDCP layer device, the reception PDCP layer device may configure a feedback (context identifier or an indicator indicating successful reception) indicating that the full header has been successfully received (e.g., PDCP control data or an indicator of PDCP header) and transmit the same to the transmission PDCP layer device. The transmission PDCP layer device may continue to transmit pieces of data having the full header until receiving feedback from the reception PDCP layer device. Upon receiving the feedback, the transmission PDCP layer device may perform a compression procedure for the Ethernet header of data to be transmitted, and may start transmission of pieces of data having the compressed Ethernet header. In addition, the reception PDCP layer device may transmit feedback whenever the reception PDCP layer device receives data having the full header. Upon receiving data having the full header, the reception PDCP layer device may store, in a buffer, information on the full header (e.g., a header including all field values of the Ethernet header or a header including information for separate Ethernet header compression (a context identifier or whether to perform compression or not), field values, or a context identifier value. In addition, when compressed pieces of data including an indicator indicating that the Ethernet header is compressed are received in a separate header (EHC header) for the Ethernet header compression procedure, the Ethernet header decompression procedure may be performed using the stored full header information. In addition, after configuring the feedback, the reception PDCP layer device does not apply an integrity protection procedure to the feedback (e.g., PDCP control data (PDCP control PDU)) when transmission occurs, or may not apply a ciphering procedure thereto.

As another method, in case that the integrity protection procedure is configured, the integrity protection procedure may be applied to the feedback to enhance security. In addition, when reading the received feedback, the transmission PDCP layer device may allow not to apply a decoding procedure or an integrity verification procedure so that the feedback can be processed quickly. As another method, in case that the integrity protection procedure is configured, the integrity verification procedure may be performed on the feedback to enhance security. When it is configured not to use feedback by defining a new indicator, the transmission PDCP layer device of the transmitting terminal (UE or base station) may transmit data having a full header (field values of the uncompressed full header, a context identifier, or an indicator indicating whether to perform compression) to the reception PDCP layer device of the receiving terminal (base station or terminal) by a predetermined number of times (the number of times of transmission may be configured through the RRC message, or may be determined by implementation). In addition, the transmission PDCP layer device of the transmitting terminal (UE or base station) may transmit data having the full header by a predetermined number of times (once, twice, or more), and may immediately apply the Ethernet header compression procedure to data to be transmitted thereafter and transmit pieces of data having the compressed header. In addition, when receiving data having the full header, the reception PDCP layer device may store, in a buffer, information about the full header (for example, a header including all field values of the Ethernet header or a header including information for compression of a separate Ethernet header (context identifier or whether compression occurs or not)), field values, or a context identifier value. In addition, when compressed pieces of data including an indicator indicating that the Ethernet header is compressed are received in a separate header (EHC header) for the Ethernet header compression procedure, the reception PDCP layer device may perform the Ethernet header decompression procedure by using the stored full header information.

As another method, when the Ethernet header compression or decompression procedure is configured, the RRCConnectionSetup message may configure a timer value for each bearer or for each PDCP layer device and drive the timer in order to prevent a lot of feedback from being generated in the reception PDCP layer device, so as to prevent unnecessary feedback from being generated. For example, when the timer value is configured, when receiving data having the full header, the reception PDCP layer device may generate and transmit feedback and start a timer when the timer is not running. When data having an Ethernet header compression (EHC) header including an indicator indicating that the Ethernet header compression procedure has been performed is received, the reception PDCP layer device may stop the corresponding timer. In addition, when the corresponding timer expires, the reception PDCP layer device may generate feedback and transmit the generated feedback to the transmission PDCP layer device, and may restart the timer again. In the above, the timer may be driven for each context identifier.

In addition, when receiving the RRCConnectionSetup message (in a case of resume procedure, the RRCResume message), the RRCConnectionSetup message may indicate, to the UE, configuration information as follows.

1> Whether to use configuration information for Ethernet header compression or decompression or an Ethernet header compression or decompression function may be indicated for each bearer or in PDCP layer device configuration information (PDCP-config).

When using a dedicated traffic channel (DTCH), a UM bearer (a PDCP layer device connected to an RLC layer device using UM mode) may be configured to use the Ethernet header compression or decompression function.

Only when a dedicated traffic channel (DTCH) is used and/or dedicated control channel (DCCH) is not used, an AM bearer (a PDCP layer device connected to an RLC layer device using an AM mode) may be configured to use the Ethernet header compression or decompression function.

In addition, the RRCConnectionSetup message (in a case of resume procedure, the RRCResume message) may include RRC connection configuration information. The RRC connection is also referred to as a signaling radio bearer (SRB) and is used for transmitting or receiving an RRC message, which is a control message between a UE and a base station. A UE, which has established an RRC connection, may transmit an RRCConnetionSetupComplete message to the base station (indicated by reference numeral 1e-15). When the base station does not know a UE capability of a UE that is currently establishing a connection or when the base station desires to identify a UE capability, the base station may transmit a message asking about the UE capability. Further, the UE may transmit a message reporting its own capability. The message reporting its own capability may indicate whether the UE is capable of using the Ethernet protocol or capable of using the Ethernet header compression or decompression procedure, and may include an indicator indicating the same. The RRCConnetionSetupComplete message may include a control message, which is referred to as SERVICE REQUEST, requesting a bearer setup for a predetermined service from an MME by the UE. The base station may transmit the SERVICE REQURST message stored in the RRCConnetionSetupComplete message to the MME (indicated by reference numeral 1e-20), and the MME may determine whether to provide a service requested by the UE. As a result of the determination, when the UE determines to provide the requested service, the MME may transmit an INITIAL CONTEXT SETUP REQUEST message to the base station (indicated by reference numeral 1e-25). The INITIAL CONTEXT SETUP REQUEST message may include information, such as QoS information to be applied in a case where a data radio bearer (DRB) is configured and security-related information (for example, a security key and a security algorithm) to be applied to the DRB. The base station may exchange a SecurityModeCommand message 1e-30 and a SecurityModeComplete message 1e-35 in order to establish security with the UE. When the security configuration is completed, the base station may transmit an RRCConnectionReconfiguration message to the UE (indicated by reference numeral 1e-40).

The RRCConnectionReconfiguration message may include information indicating whether to use Ethernet protocol or whether to use a header compression and decompression procedure for each logical channel (that is, through logical channelconfig), for each bearer, for each PDCP device (that is, through PDCP-config), or for each SDAP layer device. Further, more specifically, a base station may indicate whether to use the Ethernet protocol or Ethernet header compression and decompression procedure in each logical channel, bearer, or each PDCP device (or SDAP device), or only for a certain IP flow or a certain QoS flow. As another method, the base station may configure, for the SDAP device, information about IP flow or QoS flow as to whether to apply the Ethernet protocol or whether to use or not the Ethernet header compression method, so that the SDAP device may indicate, to the PDCP device, each QoS flow as to whether to apply the Ethernet protocol or whether to use the Ethernet header compression method. As another method, the SDAP layer device or PDCP device may identify each QoS flow for itself and determine whether or not to apply the Ethernet protocol or the Ethernet header compression method. In addition, when the RRCConnectionReconfiguration message indicates whether to apply the Ethernet protocol or whether to use the Ethernet header compression method, the base station may indicate a predefined library or dictionary information to be used in whether to apply the Ethernet protocol or the Ethernet header compression method, an identifier for the same, or the buffer size to be used. In addition, the RRCConnectionReconfiguration message may include a command for setup or releasing whether to apply the Ethernet protocol or performing the Ethernet header compression method. In addition, whether to apply the Ethernet protocol or using the Ethernet header compression method may be configured via an RLC AM bearer or via RLC UM bearer at all times, or may be configured together with a header compression protocol (ROHC). In addition, the RRCConnectionReconfiguration message may indicate whether to use the function of the SDAP layer device or the SDAP header for each logical channel (that is, through logicalchannelconfig), for each bearer, or for each PDCP device (that is, through PDCP-config), or the indication may be configured via uplink and downlink, respectively. The RRCConnectionReconfiguration message may indicate whether to apply ROHC (IP packet header compression) for each logical channel (that is, through logical channelconfig), for each bearer, or for each PDCP device (that is, through PDCP-config), and whether to apply the ROHC to uplink and downlink, respectively, may be configured via an indicator. In addition, the base station may configure whether to use a user data compression method (UDC) for each logical channel, for each bearer, or for each PDCP device via the uplink and the downlink, respectively. That is, the base station may configure the user data compression method (UDC) to be used for the uplink and not to be used for the downlink. On the contrary, the base station may configure the UDC not to be used for the uplink and to be used for the downlink. In addition, the UDC may be configured to be used in both directions. In addition, the RRCConnectionReconfiguration message may simultaneously configure the Ethernet header compression procedure and the ROHC header compression procedure. In addition, the RRCConnectionReconfiguration message may define an indicator (drbEthHCContinue) to indicate continuously using context or Ethernet header compression protocol-related configuration information without initialization thereof in a case of a handover (for example, handover in a base station) or in a case of switching from an RRC inactive mode to an RRC connected mode. A UE having received the indicator may continuously use the Ethernet header compression protocol-related configuration information or the context, without initializing the same, by considering the indicator in a case of reestablishing the SDAP layer device or the PDCP layer device. Accordingly, the overhead due to reconfiguration of the Ethernet header compression protocol can be reduced.

Further, the RRCConnectionReconfiguration message may define a new indicator and indicate to initialize the context or the Ethernet header compression protocol-related configuration information. In addition, the RRCConnectionReconfiguration RRC message may configure whether to configure an SDAP protocol or an SDAP header. In addition, the RRCConnectionReconfiguration message may configure which type of Ethernet frame or Ethernet header is to be used for each bearer or logical channel to configure which type of fields are configured in the Ethernet header, how many bytes the Ethernet header size is, how many bits the size of each field of the Ethernet header is, or a method in which the fields of the Ethernet header are configured. In addition, in case that padding is added to the Ethernet frame, the UE may indicate whether to configure using a function of preventing the padding from being transmitted through the actual wireless link by removing the padding at the transmission terminal and adding the padding at the reception terminal.

When receiving the RRCConnectionReconfiguration message, the RRCConnectionReconfiguration message may indicate, to the UE, configuration information as follows.

1> Whether to use configuration information for Ethernet header compression or decompression or an Ethernet header compression or decompression function may be indicated for each bearer or in PDCP layer device configuration information (PDCP-config).

When using a dedicated traffic channel (DTCH), a UM bearer (a PDCP layer device connected to an RLC layer device using a UM mode) may be configured to use the Ethernet header compression or decompression function.

Only when a dedicated traffic channel (DTCH) is used and/or dedicated control channel (DCCH) is not used, an AM bearer (a PDCP layer device connected to an RLC layer device using an AM mode) may be configured to use the Ethernet header compression or decompression function.

When the Ethernet header compression method (or ROHC header compression method) and uplink data compression (UDC) method are simultaneously configured through an RRC message (for example, an RRCSetup message, RRCResume message, or RRCReconfiguration message), data processing burden and complexity can be increased while the data compression rate is not significantly improved. Therefore, in an embodiment of the disclosure, it may be characterized in that the UDC compression method and the Ethernet header compression method (or the ROHC header compression method) are not configured at the same time. That is, the Ethernet header compression method (or the ROHC header compression method) may be configured for each uplink or downlink of the PDCP layer device, and may be configured when the UDC compression method is not configured. In addition, the UDC compression method may also be configured for each uplink or downlink of the PDCP layer device, and may be configured when the Ethernet header compression method (or the ROHC header compression method) is not configured. However, in the above description, the Ethernet header compression method and the ROHC header compression method can be configured at the same time through the RRC message, so as to allow the header compression procedure to be independently performed for the Ethernet header or transmission control protocol/Internet protocol (TCP/IP) header to greatly improve the compression rate. In addition, since the Ethernet header compression method through the RRC message is a feedback-based method, the Ethernet header compression method cannot be applied via a one directional or unidirectional link (e.g., a bearer an RLC UM layer device is applied and data transmission is possible in only one direction), and thus the Ethernet header compression method cannot be configured through the RRC message with regard to the one directional or unidirectional link, and can be configured only via a bi-directional link. In addition, when the UDC compression method is configured via the downlink or the uplink through the RRC message, it is possible to limit that the out-of-order delivery function cannot be configured in the LTE RLC layer device connected to the LTE or NR PDCP layer device in which the UDC compression method is configured. In addition, the UDC compression method or the UDC decompression method described in the disclosure may be extended to the RLC UM mode and thus may be configured for the uplink or downlink.

In addition, the RRCConnectionReconfigurationmessage includes configuration information of a DRB in which user data is to be processed, and a UE may configure the DRB by applying the information and transmit a RRCConnectionReconfigurationComplete message to a base station (indicated by reference numeral 1e-45). The message may be an RRCConnectionReconfigurationComplete message. A base station, which has completed DRB configuration with a UE, may transmit an INITIAL CONTEXT SETUP COMPLETE message to an MME (indicated by reference numeral 1e-50), and the MME, which has received the INITIAL CONTEXT SETUP COMPLETE message, may exchange an S1 BEARER SETUP message and an S1 BEARER SETUP RESPONSE message in order to establish an S1 bearer with the S-GW (indicated by reference numerals 1e-55 and 1e-60). The S1 bearer may be a connection for data transmission, established between the S-GW and the base station, and may correspond to the DRB in one-to-one relationship. When the above process is completed, the UE transmits or receives data through the S-GW to or from the base station (indicated by reference numerals 1e-65 and 1e-70). As such, the general data transmission process largely may include three operations of RRC connection configuration, security configuration, and DRB configuration. In addition, the base station may transmit an RRCConnectionReconfiguration message to the UE in order to perform updating, adding, or changing of a configuration (indicated by reference numeral 1e-75).

Figure 1F:
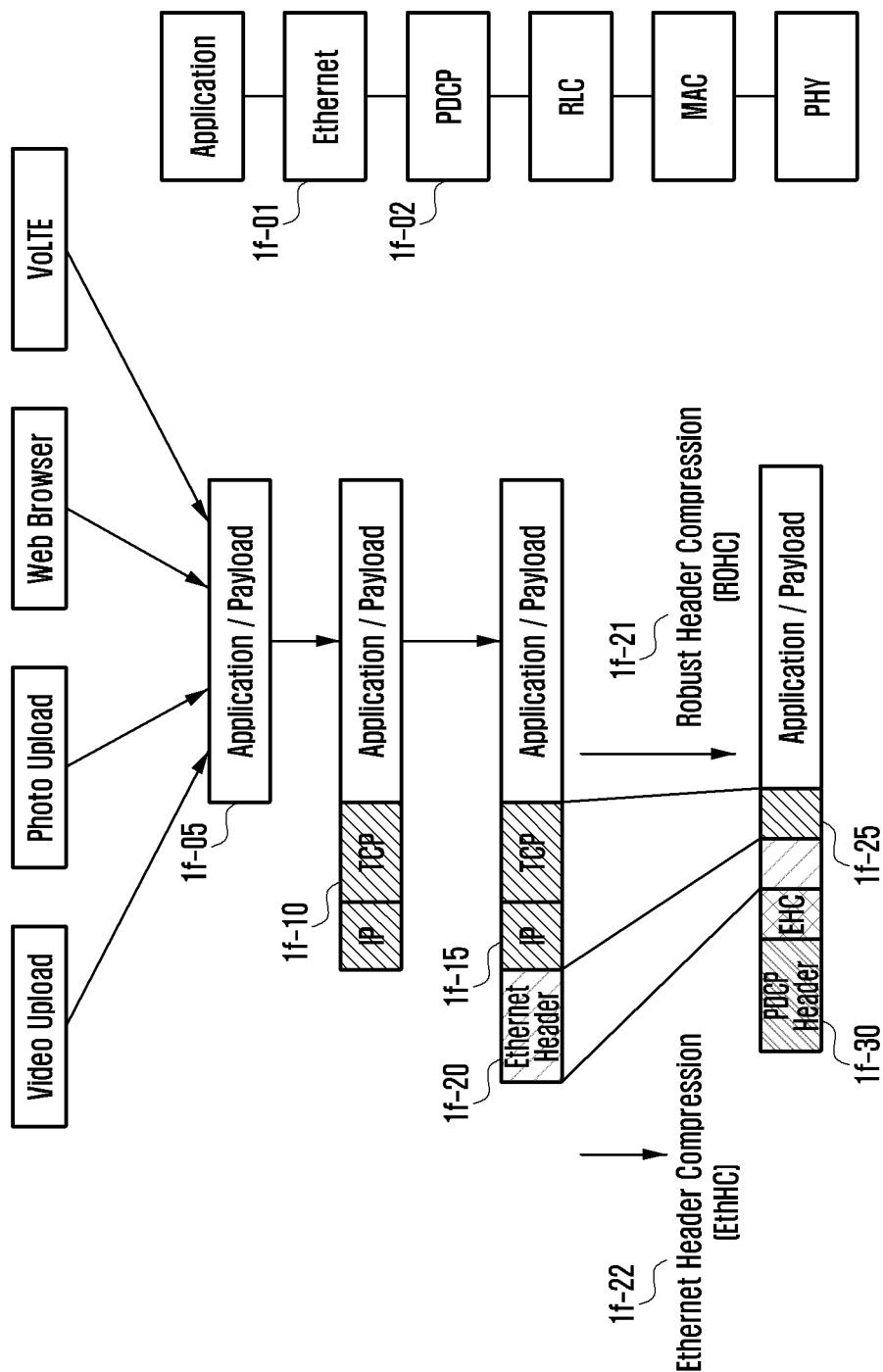
FIG. 1F illustrates an Ethernet header compression method according to an embodiment of the disclosure.

FIG. 1F illustrates an Ethernet header compression (EthHC) method according to an embodiment of the disclosure.

In FIG. 1F, higher layer data 1f-05 may be generated as data corresponding to services, such as video transmission, photo transmission, web search, and voice over LTE (VoLTE). Pieces of data generated by an application layer device may be processed through a TCP/IP or user datagram protocol (UDP) corresponding to a network data transport layer, or may be processed through the Ethernet protocol and configure respective headers 1f-10, 1f-15, and 1f-20 (a higher layer header or an Ethernet header) and may be transferred to the PDCP layer. When the PDCP layer receives data (PDCP SDU) from a higher layer, the PDCP layer may perform the following procedure.

When the header compression (ROHC) or Ethernet header compression procedure is configured to be used in the PDCP layer through RRC messages, such as 1e-10, 1e-40, or 1e-75 in FIG. 1E, a transmission terminal may compress a TCP/IP header via ROHC as shown in reference numeral 1f-21, and may perform the Ethernet header compression procedure for the Ethernet header 1f-20 in the PDCP layer device as shown in reference numeral 1f-22. Further, the transmission terminal may configure a separate Ethernet header compression (EHC) header 1f-40, which includes a field for indicating whether to compress the Ethernet header, a field for indicating which fields of the Ethernet header are compressed (omitted) or not compressed (non-omitted), or a context identifier, and may configure the separate EHC header before the compressed header. When an integrity protection or verification is configured, the transmission terminal may perform integrity protection for the PDCP header, the EHC header, compressed headers, and data. In addition, the transmission terminal may perform a ciphering procedure for the EHC header, compressed headers, and data, and may configure a PDCP PDU by configuring a PDCP header 1f-30. Here, the PDCP layer device may include a header compressor/decompressor, may determine whether to perform header compression for each data as configured through the RRC message, and may use the header compressor/decompressor. The transmission terminal may compress the Ethernet header or a higher layer header (e.g., TCP/IP header) using the header compressor in the transmission PDCP layer device, and when the integrity verification is configured, the transmission terminal may perform integrity protection for the PDCP header, EHC header, compressed headers, and data. In addition, the transmission terminal may perform a ciphering procedure on the EHC header, compressed headers, and data, and may include a PDCP header 1f-30 to configure a PDCP PDU.

A reception terminal may perform a deciphering procedure for the EHC header, compressed headers, and data in a reception PDCP layer device. In addition, when the integrity protection or verification procedure is configured, the reception terminal may perform integrity verification for the PDCP header, EHC header, compressed headers, and data. In addition, the reception terminal may perform header decompression for the Ethernet header or the higher layer header (e.g., TCP/IP header) by using the header decompressor.

The procedure of FIG. 1F may be applied to a case where a UE performs downlink data header compression as well as uplink header compression. In addition, a description of uplink data may be equally applied to downlink data.

The method for performing Ethernet header compression on the Ethernet header according to an embodiment of the disclosure is a method for reducing the header size by omitting fields indicating or having fixed information and indicating only pieces of information changed or to be changed. Therefore, at first, the transmission terminal may transmit information by including the full header information and configuration information for compression (for example, a traffic (or service)-specific identifier (type) for the Ethernet protocol, a traffic (or service)-specific serial number, information related to a compression rate, or an indicator indicating whether compression occurs). In addition, the transmission terminal may omit or may not transmit fields (for example, a transmission address field or a reception address field (MAC address), a preamble field, the start of frame delimiter (SFD), or frame checksum (FCS), or an Ethernet type field, etc.) corresponding to unchanged information in comparison with full information transmitted at first or fixed information, and may configure the header by including only fields corresponding to changed information or information that can be changed so as to reduce the size of the header. As another method, since compressible fields and non-compressible fields are distinguished, and the values of the compressible fields may be assumed to include the same values as the field values of the full header transmitted at first, the transmission terminal may compress (or omit) compressible fields only and transmit, and may always transmit non-compressible fields without being compressed (or omitted). In addition, when even one field among the compressible fields has a value having been changed from a field value of the previously transmitted full header, the transmission terminal may transmit the full header again. In addition, each time the full header is received, the reception PDCP layer device may always transmit feedback indicating that the full header is received well to a transmission PDCP layer device.

Figure 1G:
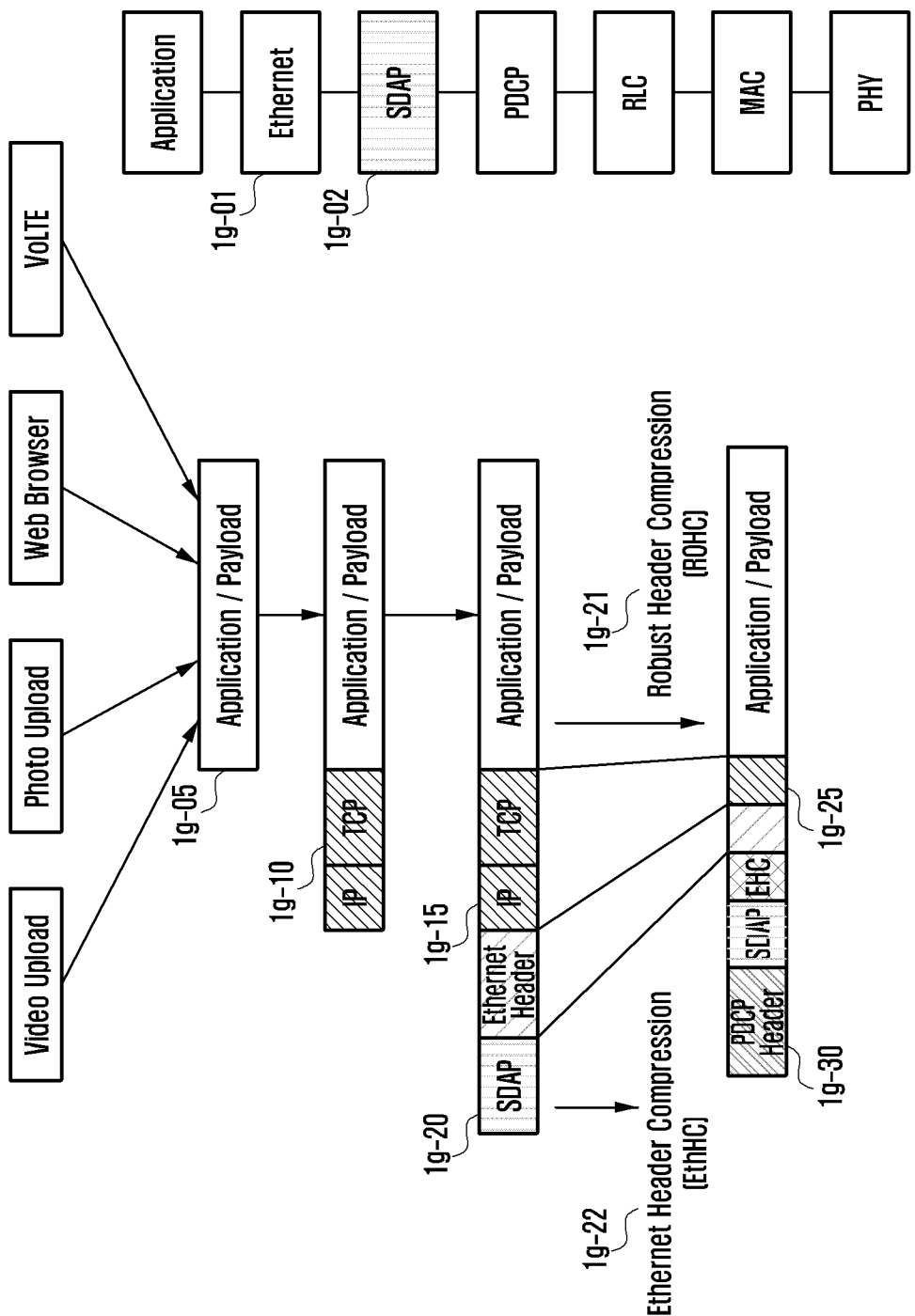
FIG. 1G illustrates an Ethernet header compression method proposed when an SDAP header or a layer device is configured according to an embodiment of the disclosure.

FIG. 1G illustrates an Ethernet header compression (EthHC) method proposed when an SDAP header or a layer device is configured according to an embodiment of the disclosure.

In FIG. 1G, higher layer data 1g-05 may be generated as data corresponding to services, such as video transmission, photo transmission, web search, and VoLTE. Pieces of data generated by an application layer device may be processed through TCP/IP or UDP corresponding to a network data transport layer, or may be processed through the Ethernet protocol and an SDAP layer device, may configure respective headers 1g-10, 1g-15, and 1g-20 (a higher layer header, an Ethernet header, or an SDAP header) and may be transferred to a PDCP layer. When the PDCP layer receives data (PDCP SDU) from a higher layer, the PDCP layer may perform the following procedure.

When the header compression (ROHC) or Ethernet header compression procedure is configured to be used in the PDCP layer through RRC messages, such as 1e-10, 1e-40, or 1e-75 in FIG. 1E, the transmission terminal may compress a TCP/IP header via ROHC as shown in reference numeral 1g-21, and may perform the Ethernet header compression procedure for the Ethernet header, except for the SDAP header, in the PDCP layer device as shown in reference numeral 1g-22. Further, the transmission terminal may configure a separate EHC header, which includes a field for indicating whether to compress the Ethernet header, a field for indicating which fields of the Ethernet header are compressed (omitted) or not compressed (non-omitted), or a context identifier, and may configure the separate EHC header before the compressed header. When the integrity verification is configured, the transmission terminal may perform integrity protection for an SDAP header, a PDCP header, an EHC header, compressed headers, and data. In addition, the transmission terminal may perform a ciphering procedure for compressed headers, data, and the EHC header except for the SDAP header, and may configure a PDCP PDU by configuring a PDCP header 1g-30.

A reception terminal may perform a deciphering procedure for compressed headers, data, and the EHC header except for the SDAP header in a reception PDCP layer device. In addition, when an integrity protection or verification procedure is configured, the reception terminal may perform integrity verification for the PDCP header, EHC header, compressed headers, and data. Here, the PDCP layer device includes a header compressor/decompressor, determines whether to perform header compression on each data as configured through the RRC message, and uses the header compressor/decompressor. The transmission terminal compresses the Ethernet header or higher layer header (e.g., a TCP/IP header) using the header compressor in the transmission PDCP layer device, and the reception terminal performs header decompression for the Ethernet header or higher layer header (e.g., a TCP/IP header) by using the header decompressor in the reception PDCP layer device.

The procedure of FIG. 1G may be applied to a case where a UE performs downlink data header compression as well as uplink header compression. In addition, a description of uplink data may be equally applied to downlink data.

A method for performing Ethernet header compression on the Ethernet header according to an embodiment of the disclosure is a method for reducing the header size by omitting fields indicating or having fixed information and indicating only pieces of information changed or to be changed. Therefore, only pieces of information changed or to be changed. Therefore, at first, the transmission terminal may transmit information by including the full header information and configuration information for compression (for example, a traffic (or service)-specific identifier (type) for the Ethernet protocol, a traffic (or service)-specific serial number, information related to a compression rate, or an indicator indicating whether compression occurs). In addition, the transmission terminal may omit or may not transmit fields (for example, a transmission address field or a reception address field (MAC address), a preamble field, the start of frame delimiter (SFD), or frame checksum (FCS), or an Ethernet type field, etc.) corresponding to unchanged information in comparison with full information transmitted at first or fixed information, and may configure the header by including only fields corresponding to changed information or information that can be changed so as to reduce the size of the header. Alternatively, the transmission terminal may compress header fields when receiving feedback in response to successful reception of data having the full header, or may omit or may not transmit fields (for example, a transmission address field or a reception address field (MAC address), a preamble field, the start of frame delimiter (SFD), or frame checksum (FCS), or an Ethernet type field, etc.) corresponding to unchanged information in comparison with full information transmitted at first or fixed information, and may configure the header by including only fields corresponding to changed information or information that can be changed so as to reduce the size of the header. As another method, since compressible fields and non-compressible fields are distinguished, and the values of the compressible fields may be assumed to include the same values as the field values of the full header transmitted at first, the transmission terminal may compress (or omit) compressible fields only and transmit, and may always transmit non-compressible fields without being compressed (or omitted). In addition, when even one field among the compressible fields has a value having been changed from a field value of the previously transmitted full header, the transmission terminal may transmit the full header again. In addition, each time the full header is received, the reception PDCP layer device may always transmit feedback indicating that the full header is received well to a transmission PDCP layer device.

The Ethernet header compression method according to an embodiment of the disclosure may not be applied to SDAP control data (SDAP control PDU) and SDAP header of a higher layer device. Therefore, in network implementation, uncompressed SDAP control data or QoS information of the SDAP header can be read and transmission resources can be quickly scheduled. Further, in UE implementation, since QoS information can be read from SDAP control data or SDAP header before decompression occurs at the reception terminal, implementation can be simplified. In addition, since the transmitting terminal can perform the generation of SDAP control data or SDAP header in parallel with the header, data compression processing procedure, or ciphering procedure of the PDCP layer device, data processing time can be reduced. In addition, the transmission PDCP layer device or the reception PDCP layer device may identify the 1-bit indicator of the SDAP header of data received from a higher layer device or a lower layer device to distinguish whether it is SDAP control data (SDAP control PDU) or SDAP user data (SDAP data PDU) having an SDAP header, and may perform data processing as described above. In another method, the transmission PDCP layer device or the reception PDCP layer device may identify the size of data received from the higher layer device or the lower layer device (for example, whether the data size exceeds 1 byte, when the data size is 1 byte, it may be determined as SDAP control data, and when the data size exceeds 1 byte, it may be determined as SDAP user data) to distinguish whether it is SDAP control data (SDAP control PDU) or SDAP user data having an SDAP header (SDAP data PDU), and may perform data processing as described above.

Figure 1H:
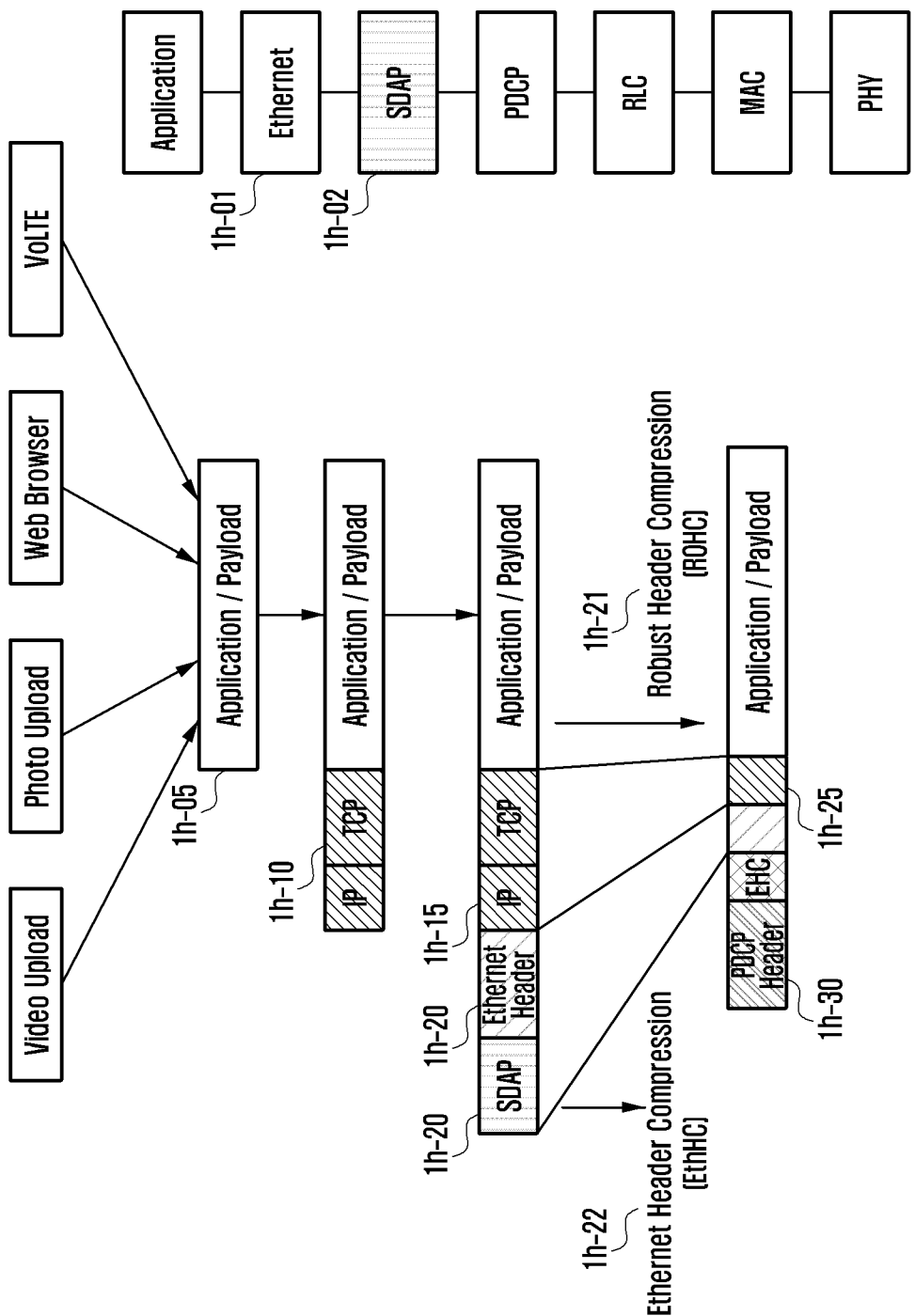
FIG. 1H illustrates another Ethernet header compression method proposed when an SDAP header or a layer device is configured according to an embodiment of the disclosure.

FIG. 1H illustrates still another Ethernet header compression (EthHC) method proposed when an SDAP header or a layer device is configured according to an embodiment of the disclosure.

In FIG. 1H, higher layer data 1h-05 may be generated as data corresponding to services, such as video transmission, photo transmission, web search, and VoLTE. Pieces of data generated by an application layer device may be processed through TCP/IP or UDP corresponding to a network data transport layer, or may be processed through the Ethernet protocol and an SDAP layer device, may configure respective headers 1h-10, 1h-15, and 1h-20 (a higher layer header, an Ethernet header, or an SDAP header) and may be transferred to a PDCP layer. When the PDCP layer receives data (PDCP SDU) from a higher layer, the PDCP layer may perform the following procedure.

When the header compression (ROHC) or Ethernet header compression procedure is configured to be used in the PDCP layer through RRC messages, such as 1e-10, 1e-40, or 1e-75 in FIG. 1E, a transmission terminal may compress a TCP/IP header via ROHC as shown in 1h-21, and may perform the Ethernet header compression procedure for an SDAP header and an Ethernet header 1h-20 in the PDCP layer device, as shown in 1h-22. Further, the transmission terminal may configure a separate EHC header, which includes a field for indicating whether to compress the SDAP header and the Ethernet header or a field for indicating which fields of the SDAP header or the Ethernet header are compressed (omitted) or not compressed (non-omitted), and may configure the separate EHC header before the compressed header. When integrity verification is configured, the transmission terminal may perform integrity protection for the PDCP header, the EHC header, compressed headers (compressed SDAP header, compressed Ethernet header, or compressed TCP/IP header) and data, may perform a ciphering procedure for the EHC header, compressed headers (compressed SDAP header, compressed Ethernet header, or compressed TCP/IP header) and data, or compressed headers except for the EHC header (compressed SDAP header, compressed Ethernet header, or compressed TCP/IP header) and data, and may configure a PDCP PDU by configuring a PDCP header 1h-30. Here, the PDCP layer device may include a header compressor/decompressor, may determine whether to perform header compression for each data as configured through the RRC message, and may use the header compressor/decompressor. The transmission terminal may compress the Ethernet header or a higher layer header (e.g., TCP/IP header) using the header compressor in the transmission PDCP layer device, and the reception terminal may perform header decompression for the Ethernet header or the higher layer header (e.g., TCP/IP header) using the header decompressor in the reception PDCP layer device.

The procedure of FIG. 1H may be applied to a case where a UE performs downlink data header compression as well as uplink header compression. In addition, a description of uplink data may be equally applied to downlink data.

The method for performing Ethernet header compression on the Ethernet header according to an embodiment of the disclosure is a method for reducing the header size by omitting fields indicating fixed information and indicating only changed information. Therefore, at first, the transmission terminal may transmit information by including the full header information and configuration information for compression (for example, a traffic (or service)-specific identifier (type) for the Ethernet protocol, a traffic (or service)-specific serial number, information related to a compression rate, etc.). In addition, the transmission terminal may omit or may not transmit fields (for example, a transmission address field or a reception address field (MAC address), a preamble field, the start of frame delimiter (SFD), or frame checksum (FCS), or an Ethernet type field, etc.) corresponding to unchanged information in comparison with full information transmitted at first, and may configure the header by including only fields corresponding to changed information so as to reduce the size of the header. As another method, the transmission terminal may distinguish compressible fields and non-compressible fields, and when the values of the compressible fields are not changed in comparison with the field values of the full header transmitted at first, the transmission terminal may compress (or omit) compressible fields only and transmit, and may always transmit non-compressible fields without being compressed (or omitted). In addition, when even one field among the compressible fields has a value having been changed from a field value of the previously transmitted full header, the transmission terminal may transmit the full header again. In addition, each time the full header is received, the reception PDCP layer device may always transmit feedback indicating that the full header is received well to a transmission PDCP layer device.

The Ethernet header compression method as described above may be equally applied to the SDAP header as well as the Ethernet header so as to compress the SDAP header. This is because data/control (D/C) field, QoS flow identifier (QFI) field, reflective QoS indicator (RQI) field, and reflective QoS flow to DRB mapping indication (RDI) fields configured in the SDAP header (uplink or downlink) usually have fixed values. In particular, the QFI field has a nearly fixed value, and the RQI field or the RDI field is not used except for a case in which a base station indicates that QoS mapping update is required. Accordingly, the SDAP header is compressed together with the Ethernet header by applying a method for compressing the Ethernet header to the SDAP header. When header compression is applied to the SDAP header as described above, the SDAP header may be ciphered, and the same compression method may be provided to the LTE system and the NR system in which the SDAP header can be configured, so as to provide convenience for implementation.

In addition, the header compression algorithm according to an embodiment of the disclosure may apply only to PDCP user data (PDCP data PDU) received from a higher layer, and may not apply to PDCP control data (PDCP control PDU) generated by the PDCP layer device.

In the Ethernet header compression protocol 1h-22 according to an embodiment of the disclosure, the PDCP layer device may identify the Ethernet header in a case of receiving data from a higher layer device, compress the Ethernet header by using a protocol for compressing the Ethernet header, and define and use a new header 1h-30 before the compressed Ethernet header. Here, ciphering of the new header 1h-30 is performed. This is because the new header is regarded as data generated by the PDCP layer device and data processing is performed together with data, and thus the data processing procedure can be simplified and security can be strengthened.

In a case of applying the header compression method according to an embodiment of the disclosure, in order to decompress the compressed Ethernet header at the reception terminal side, which fields are compressed, are omitted, or are not transmitted need to be known. Therefore, when a transmitter side compresses the Ethernet header, a new header (for example, an EHC header) may be defined and put in a front part of the compressed Ethernet header and then transmitted. The transmission terminal may define a new first field in the new EthHC header to indicate which field among the plurality of fields of the Ethernet header is compressed, is omitted, or is not transmitted (e.g., a context identifier). According to another method, the new field may indicate whether a particular field has been compressed (or omitted or not transmitted) or uncompressed (or included or transmitted) using each bit in a bitmap format. In addition, since the first field may indicate which field in the Ethernet header has been compressed (or omitted) or not (or included), the reception terminal side may calculate the size of the compressed Ethernet header having been received using the first field. That is, the size of the compressed Ethernet header can be known by subtracting the size of the omitted header fields from the size of the original Ethernet header.

In addition, the first field may include a mapping for indicating whether to perform compression (or omit) for all fields of the Ethernet header. However, it is possible to reduce the overhead of the new EthHC header by allowing only the compressible (or omittable) fields among the fields of the Ethernet header to have a mapping indicating whether to compress (or omit). For example, information on the compressible fields may be already known or promised by the transmission PDCP layer device or the reception PDCP layer device, or may be configured through an RRC message, and the first field is a 1-bit indicator, and may indicate whether all the compressible fields are compressed or uncompressed. That is, a 1-bit indicator may be defined in the new EHC header to indicate whether the Ethernet header (or SDAP header) is compressed or no compression is applied. The 1-bit indicator may be defined and used in a PDCP header.

In addition, when the Ethernet header includes multiple size types, or when a plurality of QoS flows are mapped to one PDCP layer device, a second field is defined, and which type of fields, different QoS flows, or different services can be distinguished by an identifier. For example, a context identifier is defined and can be used in the Ethernet header compression or decompression procedures. In addition, the EHC header may indicate the size or length of the Ethernet header compressed into a third field in order to accurately indicate the size of the compressed Ethernet header (for example, for convenience of implementation).

According to another method, an identifier indicating multiple Ethernet header compression methods may be defined and used in the EHC header, respectively. In addition, the identifier may indicate an Ethernet header type or a QoS flow identifier. Because multiple higher layer headers having different header structures (for example, various types of Ethernet headers) are configured by different fields, a method for compressing and not compressing fields needs to be changed according to the field types. Therefore, for example, a first identifier indicating a header type or content may indicate to apply a first Ethernet header compression method, and a second identifier may indicate to apply a second Ethernet header compression method. Therefore, when a plurality of data streams or QoS flows are mapped to one PDCP layer device, different header compression methods can be applied by applying the new identifier, and the reception terminal can distinguish the compression methods and perform different decompression methods.

The Ethernet header compression method according to an embodiment of the disclosure may be applied to not only the Ethernet header but also a general higher layer device header. The header compression method is referred to as an Ethernet header compression method in the disclosure, for convenience.

In addition, the configuration of the Ethernet header fields according to the type of the Ethernet header may be configured for each bearer through the RRC message such that which types of Ethernet header or header fields are configured as described in FIG. 1E. For example, a header compression or decompression method may be employed by configuring information in a type of a higher layer header (for example, an Ethernet header type) that can be configured in a higher layer device of each bearer and configuring identifiers mapped to each header type. That is, an identifier or indicator indicating the type of Ethernet header may be defined and used in the new header. In addition, a reception terminal of the new header may include a checksum field in which whether successful decompression of the Ethernet header is performed. Alternatively, a field indicating to initialize a buffer for compression of a transmission PDCP layer device and a buffer for decompression of the reception PDCP layer device may be defined and used. Fields defined in the new header may be defined and used in a PDCP header or an SDAP header.

In addition, when the reception PDCP layer device successfully receives data, the new EHC header may define and use a field indicating a feedback request. That is, instead of always transmitting feedback each time a reception terminal PDCP layer device receives a full header, feedback transmission may be performed only in a case where the transmission terminal PDCP layer device requests feedback via the indicator, so as to reduce the overhead.

Another Ethernet header compression method may be used based on the new EHC header. For example, when the transmission terminal compresses the Ethernet header, compression is sequentially performed, and during compression, when the values of the header fields are not changed in comparison with those of the fields of the previously transmitted Ethernet header, the Ethernet header is compressed (omitted) and first field (e.g., an indicator indicating whether to perform compression or a context identifier) is configured according thereto, and when the Ethernet header field value is different from the previously transmitted Ethernet header field value, the Ethernet header is uncompressed (included) and the first field may be configured according thereto, and thus the Ethernet header compression can be completed. Here, the Ethernet header compression may be performed in ascending order based on a PDCP serial number or a COUNT value, a preceding Ethernet header may indicate an Ethernet header corresponding to data, which has a value smaller by one than that of a PDCP serial number or COUNT value.

Upon receiving the compressed Ethernet header, the reception terminal may identify the first field, and when the compressed (omitted) fields in the Ethernet header have the same values as those of fields of the previously received Ethernet header or fields of the stored full header, the reception terminal may reconstruct the compressed (omitted) fields in the Ethernet header according thereto, and may newly update the field values stored in a buffer into uncompressed (included) fields. The transmission terminal and reception terminal may have separate buffers for compressing the Ethernet header, may update the buffer each time the Ethernet header is compressed, and may update the buffer each time the Ethernet header is decompressed. When the compressed Ethernet header is reconstructed, the reception terminal may remove the new EthHC header and transmit the reconstructed data to a higher layer. In addition, the transmission terminal may transmit full Ethernet header information when the Ethernet header is transmitted at first. That is, at first, the reception terminal may transmit the Ethernet header without performing the Ethernet header compression so that the reception terminal may identify the full Ethernet header information.

In the following, specific embodiments of the Ethernet header compression method according to an embodiment of the disclosure are proposed.

Figure 1I:
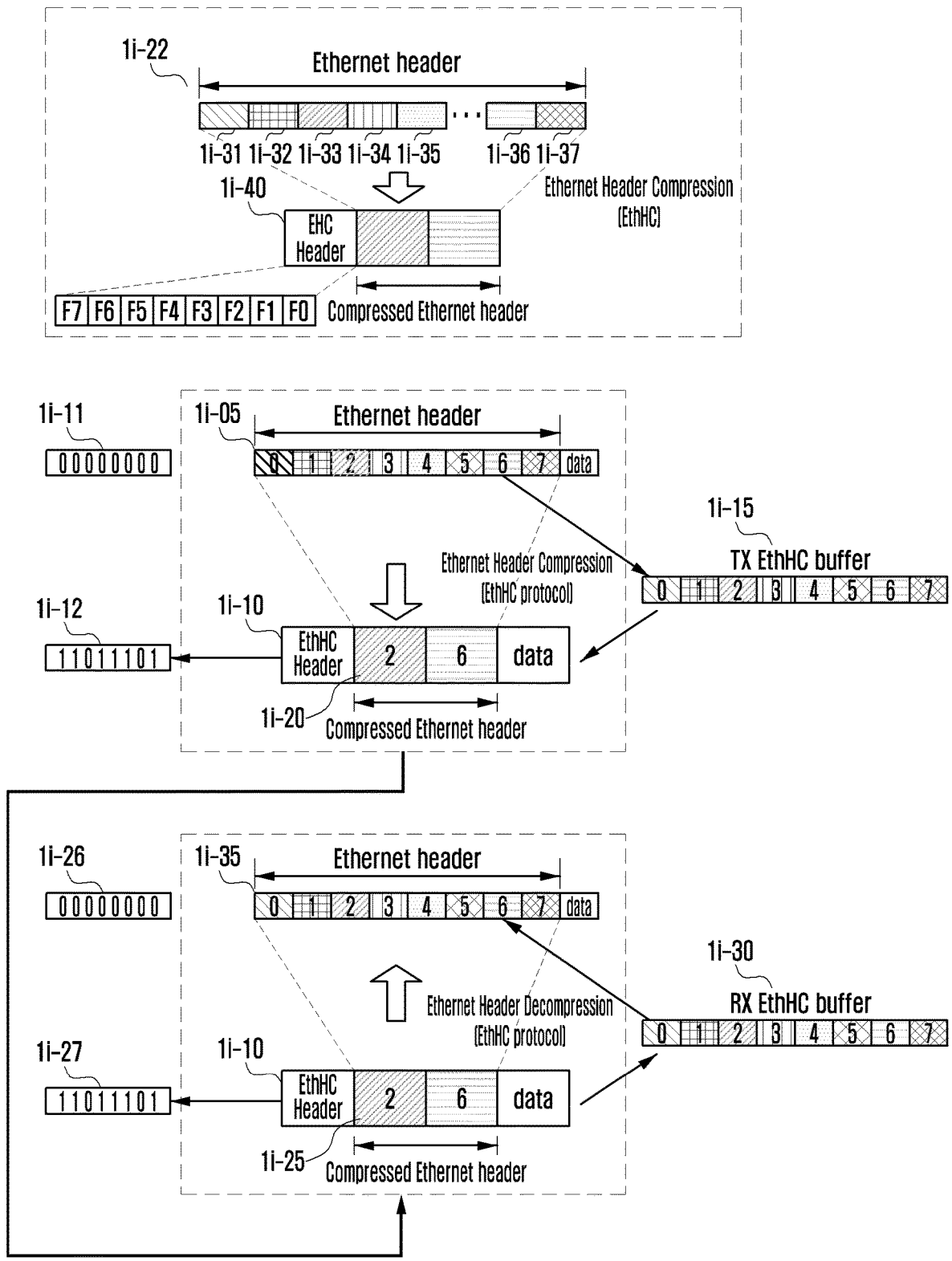
FIG. 1I illustrates a first specific embodiment of an Ethernet header compression method according to an embodiment of the disclosure.

FIG. 1I illustrates a specific first embodiment of the Ethernet header compression method according to an embodiment of the disclosure.

A method for compressing an Ethernet header by a transmission terminal according to the first embodiment of the disclosure is a method for omitting fields, which has unchanged field values, among a plurality of header fields 1$i$-31, 1$i$-32, 1$i$-33, 1$i$-34, 1$i$-35, 1$i$-36, 1$i$-37 in an Ethernet header, fields having unchanged field values in comparison with previously transmitted Ethernet headers, fields having Ethernet header field values that do not need to be transmitted, or fields having the fixed value, and selectively transmitting necessary fields, valid fields, fields having changed field values, or fields having changed values rather than having the fixed value by a transmission terminal. Accordingly, among the plurality of fields included in the Ethernet header, for example, among a first field 1$i$-31, a second field 1$i$-32, a third field 1$i$-33, a fourth field 1$i$-34, a fifth field 1$i$-35, a sixth field 1$i$-36, or a seventh field 1$i$-37, when the first field 1$i$-31, the second field 1$i$-32, the fourth field 1$i$-34, the fifth field 1$i$-35, or the seventh field 1$i$-37 have the fixed value, are omittable, or do not need to be transmitted, or the fields values of which are the same as those of the previously transmitted Ethernet header field values, the method for compressing an Ethernet header is a method for transmitting only the third field 1$i$-33 and the sixth field 1$i$-36 by the transmission terminal Here, information on fields having the fixed value or the compressible fields may be already known or promised by the transmission PDCP layer device or the reception PDCP layer device, or may be configured through an RRC message, and whether the fields are compressed or not may be indicated through a 1-bit indicator by introducing the first field whether all the compressible fields are compressed or not compressed.

In addition, a description will be given for separately configuring a new EHC header to perform compression and decompression at the reception terminal by applying the method according to an embodiment of the disclosure. In the first embodiment of the disclosure, the new EHC header may have bitmap structures 1i-11 and 1i-12. That is, the bitmap structure may include as many bits as the number of fields of the header structure to which compression is applied, and may indicate, as a value of 0 or 1, whether a header field corresponding to each bit is compressed or not compressed. According to another method, the bitmap structure may include as many bits as the number of compressible fields of the header structure to which compression is applied, and may indicate, as a value of 0 or 1, whether a header field corresponding to each bit is compressed or not compressed. According to another embodiment, the bitmap field may be configured by 1 bit, information on the fields having a fixed value or the compressible fields may be already known or promised by the transmission PDCP layer device or the reception PDCP layer device, or may be configured through an RRC message, and the 1-bit indicator may indicate whether the corresponding fields are compressed and may indicate whether all the compressible fields are compressed or uncompressed.

For example, as shown in FIG. 1I, when the PDCP layer device of the transmission terminal receives an Ethernet frame 1i-05 from a higher layer device and when the Ethernet header compression procedure is configured, the PDCP layer device may store respective field values of the Ethernet header of the firstly received Ethernet frame in a buffer 1i-15 for transmission Ethernet compression. The PDCP layer device may transmit the full header of the first Ethernet frame as it is without Ethernet header compression. Upon receiving, from the reception PDCP layer device, feedback indicating that the full header is normally received, application of the Ethernet compression procedure may be started. Here, a plurality of full headers may be transmitted. For example, a plurality of full headers and data (first data, second data, and subsequent data) may be transmitted until feedback indicating normal reception of the full header is received from the reception PDCP layer device.

Here, when the Ethernet compression procedure is started, and when the next Ethernet frame is received, the transmission terminal may compare each field value of the Ethernet header with the field values stored in a transmission buffer for the Ethernet compression. When the Ethernet header has a field having the same value with the field values stored in the transmission buffer, the transmission terminal may omit the corresponding field, may configure a bit corresponding to or mapped to the omitted field to be 1 (or 0), and may indicate that the corresponding field is omitted. When each field value of the Ethernet header of the second Ethernet frame is compared with the field values stored in the transmission buffer for the Ethernet compression, and when the Ethernet header has a field having a different value with the field values stored in the transmission buffer, the transmission terminal may not omit the corresponding field, may configure a bit corresponding to or mapped to the field that is not omitted to be 0 (or 1), and may indicate that the field is not omitted.

In addition, when integrity protection is configured, the transmission terminal may perform integrity protection, may perform a ciphering procedure, may configure the new header 1i-10 and configure a PDCP header to concatenate the new header and the PDCP header, and transfer the same to a lower layer device.

Here, the new header 1i-10 may allow each bit to indicate which field of the Ethernet header is present (uncompressed) or missing (compressed), such as a bitmap. According to another method, the bitmap field may be configured by 1 bit, information on the fields having a fixed value or the compressible fields may be already known or promised by the transmission PDCP layer device or the reception PDCP layer device, or may be configured through an RRC message, and the 1-bit indicator may indicate whether the corresponding fields are compressed and may indicate whether all the compressible fields are compressed or uncompressed.

Here, the transmission terminal may define a new field (for example, a 1-bit indicator) in the new header 1i-10 to indicate whether the Ethernet header compression procedure is performed or not. The transmission terminal may allow the 1-bit indicator to directly indicate a case in which the Ethernet header compression has not been performed, so as to enable the reception terminal not to perform processing of a new header or an uncompressed higher layer header. The 1-bit indicator may be defined to be located at the very front of a new EHC header that is always present when the Ethernet header compression algorithm is configured, so that the reception terminal may directly identify whether or not the compression is performed. In addition, here, the 1-bit indicator indicating whether the Ethernet header compression procedure is performed or not may be defined and used in the SDAP header or PDCP header. When the 1-bit indicator is defined in the SDAP header or PDCP header, and in a case where the Ethernet header compression procedure is not performed, the overhead can be reduced because the transmission terminal can omit the new header 1i-10 for Ethernet header compression. In addition, a case where all bit values are configured to be 0 (or 1) in the bitmap field may be defined and used as a special value indicating an uncompressed full header (indicated by reference numeral 1i-26), or may indicate to initialize a buffer used for compression of a transmission PDCP layer device and a buffer used for decompression of a reception PDCP layer device.

In FIG. 1I, the PDCP layer device or the SDAP layer device of the reception terminal may receive the compressed Ethernet frame 1i-25 from a lower layer device and perform deciphering thereof, when the integrity protection is configured, may perform integrity verification, and when the Ethernet header compression procedure is configured, may identify respective field values of the Ethernet header of the Ethernet frame having the firstly received uncompressed full header and store the field values in a reception buffer 1i-30 for Ethernet decompression in the reception terminal. In addition, when a full header (e.g., SDAP header or Ethernet header) is successfully received, the reception terminal may transmit feedback indicating successful reception of the full header to the transmission PDCP layer device to enable application of Ethernet header compression to be started. In an embodiment, the reception terminal may transmit the first Ethernet frame to a higher layer device without decompression of the Ethernet header. Then, upon receiving the next Ethernet frame, the reception terminal may decipher the next Ethernet frame, identify a new EHC header to see whether the new EHC header is compressed or uncompressed, and when the new EHC header is uncompressed and integrity protection is configured, the reception terminal may perform integrity verification, may remove the EHC header, and may transmit data to a higher layer. When the new EHC header indicates that the Ethernet header (or SDAP header) is compressed, the reception terminal checks the field value of the new header 1*i*-10 for Ethernet compression to determine which fields are omitted (compressed) and which fields are not omitted (uncompressed). Further, the reception terminal may reconstruct values of fields, which are indicated to be omitted (compressed), to field values stored in the reception buffer 1*i*-30 for Ethernet decompression so as to reconstruct (decompress) the Ethernet header before compression thereof. Since values for the fields indicated as non-omitted (uncompressed) is a new or changed value, the reception terminal may store the new or changed values as field values according to the field in the reception buffer for decompression. In addition, the reception terminal may configure an Ethernet frame together with the reconstructed Ethernet header and transmit the same to a higher layer device.

In case that the field values of the Ethernet header are changed while the transmission PDCP layer device applies the Ethernet header compression method, the transmission PDCP layer device indicates to the new EHC header that the Ethernet header is not compressed and transmits a full header to initialize a buffer of the reception terminal and configures the buffer to have values of the full header again. Upon receiving the uncompressed full header, the reception PDCP layer device may transmit feedback indicating successful reception of the uncompressed full header to the transmission PDCP layer device. In the disclosure, each time the reception PDCP layer device receives the uncompressed full header, the reception PDCP layer device may always transmit feedback indicating successful reception of the uncompressed full header to the transmission PDCP layer device. In addition, in the disclosure, upon receiving an uncompressed full higher layer header, the reception PDCP layer device always transmits feedback indicating successful reception of the uncompressed full higher layer header to the transmission PDCP layer device, but does not transmit the feedback in a case of receiving an uncompressed higher layer header. The reception PDCP layer device performs different operations according to whether or not higher layer compression of the received data is performed.

The separate new EHC header may have a fixed size (e.g., 1 byte or 2 bytes).

In addition, in an embodiment, the transmission terminal and the reception terminal may perform compression or decompression of a length field of the Ethernet header by applying the method described above. According to another method, the transmission terminal and the reception terminal may transmit the length field of the Ethernet header always without being compressed.

According to another method, the transmission terminal transmits the length field of the Ethernet header always without being compressed. The reception PDCP layer device may calculate the length of the Ethernet frame by decompressing the remaining fields except the length field and then adding a length of the length field (since the length of the length field is a fixed value) thereto, and then the PDCP layer device may reconstruct the length value and add the reconstructed length value to the length field of the Ethernet frame. Accordingly, an indication of the length field may be omitted in the new EHC header, the transmission PDCP layer device may always omit (compress) the length field even when the length field value is different for each data and perform transmission, and the reception PDCP layer device may calculate and derive the length field value according to the above description, so as to always reconstruct the length field value of the Ethernet header.

In addition, the new EHC header may define and use a field indicating a feedback request when the reception terminal PDCP layer device successfully receives data. That is, instead of always transmitting feedback each time the reception terminal PDCP layer device receives the full header, feedback transmission may occur only when the transmission terminal PDCP layer device requests the feedback via the indicator, so as to reduce overhead.

In addition, a transmission terminal and a reception terminal may define, in a new EHC header, an identifier indicating a plurality of Ethernet header compression methods together with a bitmap field, and may use the same. The identifier may also indicate an Ethernet header type or a QoS flow identifier. This is because multiple higher layer headers having different header structures (for example, various types of Ethernet headers) are configured by different fields, a method for field compression or not needs to be changed according to the field types, and the bitmap fields corresponding to the fields of the higher layer header type needs to be applied accordingly. Therefore, for example, a first identifier indicating a header type or content may indicate to apply a first bitmap field or bitmap mapping, and a second identifier may indicate to apply a second bitmap field or bitmap mapping. Therefore, when a plurality of data streams or QoS flows are mapped to one PDCP layer device, different header compression methods can be applied by applying the new identifier, and the reception terminal can distinguish the compression methods and perform different decompression methods. Here, in order to apply different header compression and decompression methods to data streams having different higher layer header structures, the higher layer header field values are independently stored, for each higher layer header structure, in the buffer of the transmission PDCP layer device or the buffer of the reception PDCP layer device.

Figure 1J:
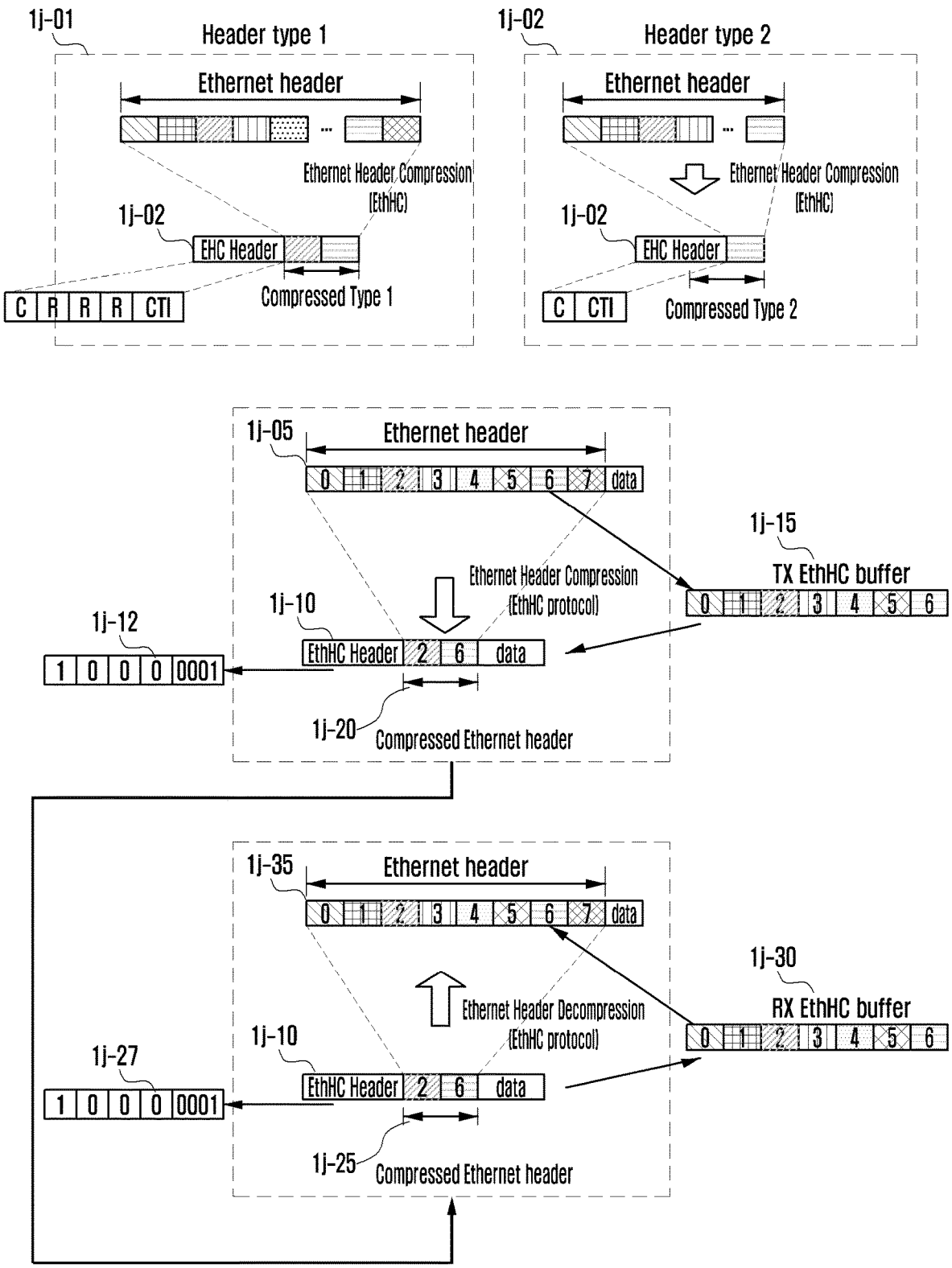
FIG. 1J illustrates a second specific embodiment of an Ethernet header compression method according to an embodiment of the disclosure.

FIG. 1J illustrates a specific second embodiment of an Ethernet header compression method according to an embodiment of the disclosure.

In the second embodiment of the disclosure, when a plurality of data streams or QoS flows are mapped to one bearer or one PDCP layer device, a method for applying different header compression and decompression methods according to data streams having header structures of different higher layer devices or QoS flows is applied.

The second embodiment may be characterized by applying a fixed unique header compression and decompression method for each header structure (for example, an Ethernet header structure or an SDAP header structure) of different higher layer devices. For example, the second embodiment may define fields which are compressible (or is omittable) and fields that cannot be compressed (or is not omittable) in a first higher layer header structure 1*j*-01. Further, the second embodiment may define fields which are compressible (or is omittable) and fields that cannot be compressed (or is not omittable) in a second higher layer header structure 1*j*-02. In addition, the new EHC header may configure an identifier (compressed type identifier (CTI) field) indicating the different higher layer header structures, and may indicate, to the reception PDCP layer device, a method by which a higher layer device header structure is compressed.

For example, the transmission PDCP layer device may store, in a transmission buffer 1*j*-15, the higher layer header field values of data having the first higher layer header structure, received from the higher layer, may transmit data including the full header, compression of which is not performed upon first transmission, and may apply the header compression method when feedback indicating successful reception of the full header information is received from the reception PDCP layer device. That is, when all of the field values of the compressible fields among the higher layer header field values of the next received data are the same as the field values stored in the transmission buffer, the transmission terminal may compress all of the compressible fields and configure uncompressible fields as they are, and may configure an identifier indicating the first higher layer header structure and an indicator (compression field (C field)) indicating that compression has been performed and transmit the same to the new EHC header 1*j*-10.

When the new EHC header of the received data indicates that the higher layer header is not compressed, the reception PDCP layer device considers the new EHC header of the received data as a full higher layer header (when the field values of one or more fields among the compressible fields are changed, the transmission PDCP layer device may transmit the full higher layer header without performing compression on the higher layer header so as to indicate the field values stored in the buffer of the reception PDCP layer device to be updated), and the reception terminal may update the field values stored in a buffer 1*j*-30 with the field values of the received field values of the full higher layer header and transmit feedback indicating successful reception to the transmission PDCP layer device.

When the new EHC header of the received data indicates that the higher layer header is compressed, the reception PDCP layer device may identify an identifier indicating the type of the higher layer header included in the new EHC header, and may reconstruct fields defined to be compressible in the higher layer header structure indicated by the identifier, based on field values stored in the reception buffer. For example, an identifier indicating the type of the higher layer header may indicate a first higher layer header structure (fields which are compressible and decompressed in the first higher layer header structure), and may indicate a second higher layer header structure (fields which are compressible and decompressed in the second higher layer header structure).

In the second embodiment of the disclosure, each time the uncompressed full header is received, the reception PDCP layer device may always transmit feedback indicating successful reception of the full header to the transmission PDCP layer device. Further, in the disclosure, each time the reception PDCP layer device receives the uncompressed full higher layer header, the reception PDCP layer device may always transmit feedback indicating successful reception of the uncompressed full higher layer header to the transmission PDCP layer device. However, upon receiving an uncompressed higher layer header, the reception PDCP layer device may not transmit the feedback. The reception PDCP layer device performs different operations according to whether or not higher layer compression of the received data is performed.

In addition, in the second embodiment, in order to apply different header compression and decompression methods to data streams having different higher layer header structures, the higher layer header field values are independently stored, for each higher layer header structure, in the buffer of the transmission PDCP layer device or the buffer of the reception PDCP layer device.

The transmission terminal and the reception terminal may define, in the new EHC header, an identifier indicating each of a plurality of Ethernet header compression methods and an indicator field indicating whether compression is performed, and may use. The identifier may also indicate an Ethernet header type or a QoS flow identifier. This is because a plurality of higher layer headers (for example, various types of Ethernet headers) having different header structures are configured of different fields, and a method for compressing or not compressing a certain field is differently applied according thereto. Therefore, for example, a first identifier indicating a header type or content may indicate to apply a first Ethernet header compression method, and a second identifier may indicate to apply a second Ethernet header compression method. Therefore, when a plurality of data streams or QoS flows are mapped to one PDCP layer device, different header compression methods may be applied by applying the new identifier, and the reception terminal may distinguish the header compression methods and perform different decompression methods.

Upon receiving, from the reception PDCP layer device, feedback indicating that the full header is normally received, the transmission PDCP device may start to apply the Ethernet compression procedure. Here, a plurality of full headers may be transmitted. For example, a plurality of full headers and data (first data, second data and subsequent data) may be transmitted until feedback indicating successful reception of the full header is received from the reception PDCP layer device.

In an embodiment of the disclosure, in the new header 1*j*-10, a new field (for example, a 1-bit indicator) may be defined to indicate whether the Ethernet header compression procedure is performed or not. The 1-bit indicator may directly indicate a case where the Ethernet header compression has not been performed, so as to enable the reception terminal not to perform processing of a new header and an uncompressed higher layer header. The 1-bit indicator may be defined to be located at the very front of a new EHC header that is always present when the Ethernet header compression algorithm is configured, so that the reception terminal may directly identify whether or not the compression is performed. In addition, the 1-bit indicator indicating whether the Ethernet header compression procedure is performed or not may be defined and used in the SDAP header or PDCP header. When the 1-bit indicator is defined in the SDAP header or PDCP header, in a case where the Ethernet header compression procedure is not performed, the overhead can be reduced because a new header 1*j*-10 for Ethernet header compression can be omitted. In addition, a case where the bitmap field is configured to have all zeros (or one) values may be defined and used as a special value indicating an uncompressed full header, or may also indicate to initialize a buffer for compression of a transmission PDCP layer device and a buffer for decompression of a reception PDCP layer device.

In FIG. 1J, the PDCP layer device or the SDAP layer device in the reception terminal may receive a compressed Ethernet frame from a lower layer device, and when the Ethernet header compression procedure is configured, the PDCP layer device or the SDAP layer device may identify respective field values of the Ethernet header of the Ethernet frame having the first received uncompressed full header and store the field values in a buffer 1*j*-30 for decompression of received Ethernet. Further, when a full header (e.g., SDAP header or Ethernet header) is successfully received, the reception terminal may transmit feedback relating thereto to the transmission PDCP layer device to start application of Ethernet header compression. In an embodiment, the reception terminal may transmit the first Ethernet frame to a higher layer device without decompression of the Ethernet header. Then, upon reception of the next Ethernet frame, the reception terminal may decipher the next Ethernet frame and identify the new EHC header to see whether the header is compressed. When the new EHC header is not compressed, the reception terminal may perform integrity verification thereof, may remove the EHC header, and may transmit data to a higher layer. When the new EHC header indicates that the Ethernet header (or SDAP header) is compressed, the reception terminal may identify the field value of the new header 1j-10 for Ethernet compression to determine which fields are omitted (compressed) and which fields are not omitted (uncompressed). Further, the reception terminal may reconstruct values of fields, which are indicated to be omitted (compressed) in the above description, to field values stored in the reception buffer for decompression so as to reconstruct (decompress) the Ethernet header before compression thereof. Since values for the fields indicated as non-omitted (uncompressed) are new or changed values, the reception terminal may store the new or changed values as field values according to the field in the reception buffer for decompression. In addition, the reception terminal performs deciphering and when integrity protection is configured, the reception terminal performs integrity verification. When there is no error, the reception terminal may configure an Ethernet frame together with the reconstructed Ethernet header and transmit the same to a higher layer device.

When the field values of the Ethernet header are changed while the transmission PDCP layer device applies the Ethernet header compression method, the transmission PDCP layer device indicates to the new EHC header that the field values are not compressed and transmits a full header to initialize a buffer of the reception terminal, and may configure the buffer to have values of the full header again. Then, upon receiving the uncompressed full header, the reception PDCP layer device may transmit feedback indicating successful reception of the uncompressed full header to the transmission PDCP layer device. In the disclosure, each time the reception PDCP layer device receives the uncompressed full header, the reception PDCP layer device may always transmit feedback indicating successful reception of the uncompressed full header to the transmission PDCP layer device. Further, in the disclosure, upon receiving the uncompressed full higher layer header, the reception PDCP layer device may always transmit feedback indicating successful reception of the uncompressed full higher layer header to the transmission PDCP layer device. However, upon receiving an uncompressed higher layer header, the reception PDCP layer device may not transmit the feedback, and may perform different operations according to whether or not the received data is compressed at a higher layer.

The separate new EHC header may have a fixed size (e.g., 1 byte or 2 bytes).

Further, in the embodiment, the transmission terminal and the reception terminal may also compress and decompress the length field of the Ethernet header by applying the method described above. According to another method, the length field of the Ethernet header may be transmitted without always performing compression thereof.

According to another method, the transmission terminal may transmit the length field of the Ethernet header always without being compressed. After decompressing the remaining fields except for the length field by the reception PDCP layer device, the PDCP layer device may calculate the length of the Ethernet frame by adding the length of the length field (because the length of the length field is known as a fixed value) thereto, and then reconstruct the length value and add the reconstructed length value to the length field of the Ethernet header. Therefore, the indication of the length field may be omitted in the new EHC header, the transmission PDCP layer device may always omit (compress) the length field even when the length field value is different for each data and perform transmission, and the reception PDCP layer device may calculate the length field value and derive according to the description in the above, and may always reconstruct the length field value of the Ethernet header.

Further, the new EHC header may define and use a field indicating a feedback request when the reception PDCP layer device successfully receives data. That is, instead of always transmitting feedback each time the reception PDCP layer device receives the full header, feedback transmission may occur only when the transmission PDCP layer device requests the feedback via the indicator, so as to reduce overhead.

Therefore, in the Ethernet header compression method according to an embodiment of the disclosure, as described above, by applying the first embodiment, the transmission PDCP layer device may transmit an indicator indicating a compression method, header type, or data flow type, together with the bitmap field, and data having an uncompressed Ethernet header, and the reception PDCP layer device enables to know a header compression method applied to the Ethernet header type of each data from a bitmap field. In addition, the receiving terminal may store field values of the uncompressed Ethernet header, and may use the same at the time of reconstructing field values of the compressed Ethernet headers later. Here, the bitmap field may be used as a field indicating a header compression method via an identifier indicated together. For example, as a compression method for the indicated identifier, a bitmap field may indicate which fields are to be compressed or which fields are not compressed.

In the disclosure, the full header transmitted by the transmission PDCP layer device may indicate an EHC header including a bitmap field, an identifier indicating a compression method, a header type, or a data flow type, or an indicator indicating whether compression is performed, and an uncompressed Ethernet header. For example, the full header may indicate the initial full header transmitted by the transmission PDCP layer device before applying the Ethernet header compression method in order to indicate the Ethernet header compression method using the bitmap field, the identifier for the corresponding data flow, and the field values of the uncompressed Ethernet header to the reception PDCP layer device. In addition, when the reception PDCP layer device receives the full header, the reception PDCP layer device uses the bitmap field to know the Ethernet header compression method, the identifier for the corresponding data flow, and the field values of the uncompressed Ethernet header, the reception PDCP layer device may perform a decompression procedure for the compressed Ethernet headers to be received later.

The transmission PDCP layer device may transmit data having a plurality of full headers to the reception PDCP layer device, and then may apply an Ethernet header compression procedure to the data immediately and transmit the same. Accordingly, since it is not necessary to identify the feedback from the receiving terminal, the header compression procedure can be started quickly. According to another method, when the transmission PDCP layer device transmits data having one or more full headers and then receives feedback indicating successful reception of the full header from the reception PDCP layer device, the transmission PDCP layer device may apply the Ethernet header compression method to the data thereafter. Accordingly, a decompression error rate at the receiving terminal, which may occur when full headers are lost, can be reduced.

As described above, when the identifier for the data flow and the header compression method are synchronized and applied by the full header between the transmission PDCP layer device and the reception PDCP layer device, as in the second embodiment of the disclosure, a new EHC header including the identifier for a data flow, the identifier indicating a header compression method, or an indicator indicating whether header compression occurs or not, and an Ethernet header to which the Ethernet header compression method is applied and compressed, are transmitted together with data. In addition, the receiving terminal may decompress the compressed Ethernet header by applying the new EHC header information and the Ethernet header decompression method. Therefore, when the method of the second embodiment of the disclosure is applied, even when a plurality of data flows are mapped to one bearer, different header compression or decompression methods can be applied to each data flow, thereby enhancing the ease of implementation.

The embodiments described in the disclosure may be applied together to improve the implementation convenience. For example, as described above, in the initial stage of the header compression method, the first embodiment of the disclosure may be applied in order to identify a data flow or type and define the header compression method, and in order for the PDCP layer device and the reception PDCP layer device to be synchronized with each other, and thereafter, the second embodiment of the disclosure may be applied to apply a header compression procedure. In addition, the first embodiment may be applied again during data transmission/reception so that the transmission PDCP layer device and the reception PDCP layer device are updated using a new identifier or header compression method.

In the first and second embodiments of the disclosure, a method in which a transmission PDCP layer device can dynamically indicate an identifier or a header compression method using user layer data (e.g., a full header) has been described. Below, a method in which an identifier indicating a predefined header compression method is configured together with an identifier for each Ethernet header structure or for each data flow through an RRC message, and different compression methods can be applied to each Ethernet header structure or data flow in the transmission PDCP layer device and the reception PDCP layer device will be described as follows. Specific third embodiment of the Ethernet header compression method described in the disclosure is as follows.

In the third embodiment of the disclosure, the header compression or decompression method described in the second embodiment may be applied in the same manner. However, when a base station maps only one data stream or QoS flow to one bearer or one PDCP layer device through an RRC message, it is not necessary to distinguish data streams or QoS flows having header structures of different higher layer devices. That is, the new EHC header does not need identifiers indicating different higher layer header structures or different higher layer compression methods. This is because one higher layer header structure or header compression method may be configured in one PDCP layer device.

Therefore, in the third embodiment of the disclosure, a transmission terminal may define and configure only a field indicating whether a higher layer header is compressed in the new EHC header or the PDCP header, and may apply the method proposed in the second embodiment as it is, so that the transmission PDCP layer device may perform compression for a higher layer device header and the reception PDCP layer device may perform decompression therefor.

The disclosure proposes a specific structure of feedback that can be used in the embodiments of the compression method for the higher layer header (Ethernet header) described above.

Figure 1K:
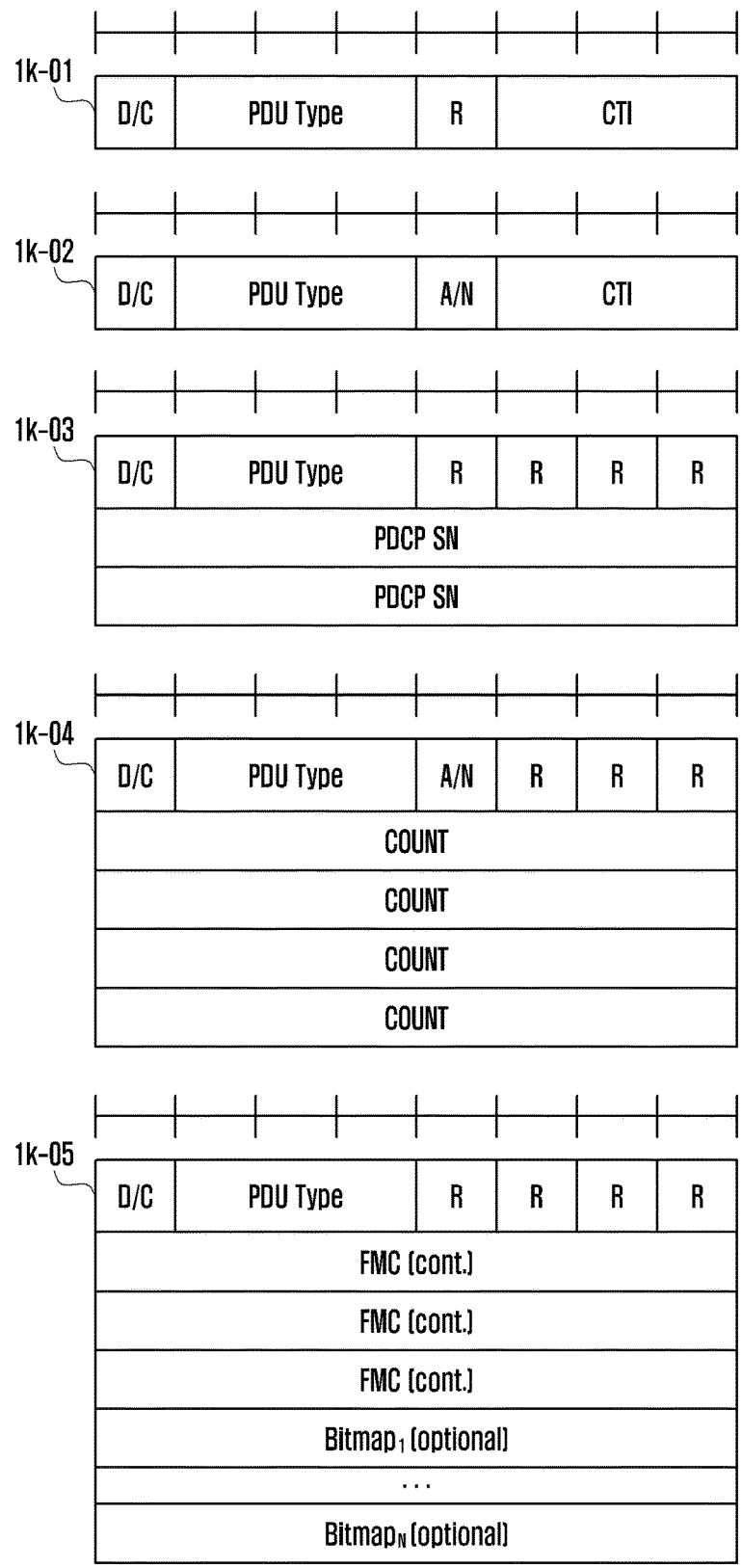
FIG. 1K illustrates embodiments of a feedback structure that can be used in a higher layer header compression method according to an embodiment of the disclosure.

FIG. 1K illustrates embodiments of a feedback structure that can be used in a higher layer header compression method according to an embodiment of the disclosure.

According to an embodiment, in connection with feedback, when transmission occurs from the PDCP layer device of the transmission terminal, the PDCP layer device of the receiving terminal does not apply an integrity protection or ciphering procedure, so as to enable the PDCP layer device of the transmission terminal to quickly read the feedback information.

FIG. 1K illustrates new PDCP control data (PDCP control PDU), which is defined by determining a new PDU type field value via a first feedback structure 1K-01. The new PDCP control data is triggered and configured each time the higher layer header of the received data is not compressed and a full higher layer header is received (or when a transmission PDCP layer device indicates feedback) in a case where a higher layer compression and decompression method (or protocol) is configured in a reception PDCP layer device, and transmitted to the transmission PDCP layer device. The new PDCP control data may define an indicator or a new field (CTI field or context identifier) and indicate, through the indicator, that a full higher layer header transmitted without compression by the transmission PDCP layer device is successfully received or has failed to be received. According to another method, the new PDCP control data itself may indicate that the full higher layer header transmitted without compression by the transmission PDCP layer device has successfully been received. As such, through the feedback, the transmission PDCP layer device may determine a time point of application of the compression method of the higher layer device.

The new PDCP control data may also be used to provide feedback to the transmission terminal Ethernet compression protocol when Ethernet decompression has failed (e.g., when a checksum error occurs). That is, the newly defined PDCP control data may indicate that Ethernet decompression has failed (or the checksum error has occurred), and may indicate that initialization of a transmission buffer for transmission terminal Ethernet header compression needs to be performed.

In FIG. 1K, illustrated is new PDCP control data (PDCP control PDU), which is defined by determining a new PDU type field value via a second feedback structure 1K-02. The new PDCP control data is triggered and configured each time the higher layer header of the received data is not compressed and a full higher layer header is received (or when a transmission PDCP layer device indicates feedback) in a case where a higher layer compression and decompression method (or protocol) is configured in a reception PDCP layer device, and transmitted to the transmission PDCP layer device. The new PDCP control data may define an indicator and indicate, through the indicator, that a full higher layer header transmitted without compression by the transmission PDCP layer device is successfully received or has failed to be received. According to another method, the new PDCP control data itself may indicate that the full higher layer header transmitted without compression by the transmission PDCP layer device has successfully been received.

In addition, by defining and indicating a new field (CTI or context identifier) indicating the type of the higher layer header or the type of the higher layer header compression method, with respect to a higher layer header or a higher layer header compression method, the new PDCP control data may define an indicator and indicate, through the indicator, that a full higher layer header transmitted without compression by the transmission PDCP layer device is successfully received or has failed to be received. According to another method, with respect to the higher layer header or higher layer header compression method indicated by the new CTI field, the new PDCP control data itself may indicate that the full higher layer header transmitted without compression by the transmission PDCP layer device has successfully been received.

Through the above feedback, the transmission PDCP layer device may determine a time point of application of the compression method of the higher layer device.

In addition, the new PDCP control data may also be used to provide feedback to the transmission terminal Ethernet compression protocol when Ethernet decompression has failed (e.g., when a checksum error occurs). That is, the newly defined PDCP control data may indicate that Ethernet decompression has failed (or the checksum error has occurred) with respect to a certain higher layer header or higher layer header compression method, and may indicate that initialization of a transmission buffer for transmission terminal Ethernet header compression needs to be performed.

In FIG. 1K, illustrated is new PDCP control data (PDCP control PDU), which is defined by determining a new PDU type field value via a third feedback structure 1K-03. The new PDCP control data is triggered and configured each time the higher layer header of the received data is not compressed and a full higher layer header is received (or when a transmission PDCP layer device indicates feedback) in a case where a higher layer compression and decompression method (or protocol) is configured in a reception PDCP layer device, and transmitted to the transmission PDCP layer device. The new PDCP control data may define an indicator and indicate, through the indicator, that a full higher layer header transmitted without compression by the transmission PDCP layer device is successfully received or has failed to be received. According to another method, the new PDCP control data itself may indicate that the full higher layer header transmitted without compression by the transmission PDCP layer device has successfully been received.

In addition, a new field (PDCP sequence number (SN)) indicating a PDCP serial number is defined and indicated, and with respect to a certain PDCP serial number, the new PDCP control data may define an indicator and indicate, through the indicator, that a full higher layer header transmitted without compression by the transmission PDCP layer device is successfully received or has failed to be received. According to another method, with respect to data indicated by the new PDCP serial number field, the new PDCP control data itself may indicate that the full higher layer header transmitted without compression by the transmission PDCP layer device has successfully been received.

Through the above feedback, the transmission PDCP layer device may determine a time point of application of the compression method of the higher layer device.

In addition, the new PDCP control data may also be used to provide feedback to the transmission terminal Ethernet compression protocol when Ethernet decompression has failed (e.g., when a checksum error occurs). That is, the newly defined PDCP control data may indicate that Ethernet decompression has failed (or the checksum error has occurred) with respect to a certain PDCP serial number, and may indicate that initialization of a transmission buffer for transmission terminal Ethernet header compression needs to be performed.

In FIG. 1K, the embodiment proposes new PDCP control data (PDCP control PDU), which is defined by determining a new PDU type field value via a fourth feedback structure 1K-04. The new PDCP control data is triggered and configured each time the higher layer header of the received data is not compressed and a full higher layer header is received (or when a transmission PDCP layer device indicates feedback) in a case where a higher layer compression and decompression method (or protocol) is configured in a reception PDCP layer device, and transmitted to the transmission PDCP layer device. The new PDCP control data may define an indicator and indicate, through the indicator, that a full higher layer header transmitted without compression by the transmission PDCP layer device is successfully received or has failed to be received. According to another method, the new PDCP control data itself may indicate that the full higher layer header transmitted without compression by the transmission PDCP layer device has successfully been received.

In addition, a new field (COUNT) indicating a COUNT value is defined and indicated, and with respect to a certain COUNT value, the new PDCP control data may define an indicator and indicate, through the indicator, that a full higher layer header transmitted without compression by the transmission PDCP layer device is successfully received or has failed to be received. According to another method, with respect to data indicated by the new COUNT value field, the new PDCP control data itself may indicate that the full higher layer header transmitted without compression by the transmission PDCP layer device has successfully been received.

Through the above feedback, the transmission PDCP layer device may determine a time point of application of the compression method of the higher layer device.

In addition, the new PDCP control data may also be used to provide feedback to the transmission terminal Ethernet compression protocol when Ethernet decompression has failed (e.g., when a checksum error occurs). That is, the newly defined PDCP control data may indicate that Ethernet decompression has failed (or the checksum error has occurred) with respect to data of a certain COUNT value, and may indicate that initialization of a transmission buffer for transmission terminal Ethernet header compression needs to be performed.

FIG. 1K illustrates an aspect in which a PDCP status report among PDCP control data (PDCP control PDUs) is used as a feedback, via a fifth feedback structure 1K-05. The PDCP status report is triggered and configured each time the higher layer header of the received data is not compressed and a full higher layer header is received (or when a transmission PDCP layer device indicates feedback) in a case where a higher layer compression and decompression method (or protocol) is configured in a reception PDCP layer device, and transmitted to the transmission PDCP layer device. The PDCP status report may define an indicator and indicate, through the indicator, that a full higher layer header transmitted without compression by the transmission PDCP layer device is successfully received or has failed to be received.

In addition, the PDCP status report may indicate that the full higher layer header transmitted without compression by the transmission PDCP layer device, with respect to a certain COUNT value, has successfully been received or has failed to be received. That is, an FMC field may indicate a first COUNT value which is not transmitted yet from the reception PDCP layer device to a higher layer, and subsequent bitmap fields may indicate whether the value of "0" or "1" has been successfully received, by using one bit mapped to each of COUNT values greater than the first COUNT value.

In addition, the PDCP status report may also be used to provide feedback to the transmission terminal Ethernet compression protocol when Ethernet decompression failure occurs (e.g., when a checksum error occurs). That is, the newly defined PDCP control data may indicate that Ethernet decompression has failed (or the checksum error has occurred) with respect to data of a certain COUNT value, and may indicate that initialization of a transmission buffer for transmission terminal Ethernet header compression needs to be performed. That is, the FMC field may indicate the first COUNT value that the reception PDCP layer device has not yet transmitted to the higher layer, and subsequent bitmap fields may indicate COUNT values greater than the first COUNT value, using one bit.

The disclosure illustrates a sixth feedback structure by which a new field is defined in a new EHC header or a PDCP header of data transmitted to a transmission PDCP layer device by a reception PDCP layer device and used as a feedback. The new field of the PDCP header or the EHC header is configured each time the higher layer header of the received data is not compressed and a full higher layer header is received (or when a transmission PDCP layer device indicates feedback) in a case where a higher layer compression and decompression method (or protocol) is configured in a reception PDCP layer device, and transmitted to the transmission PDCP layer device. The new field may indicate that a full higher layer header transmitted without compression by the transmission PDCP layer device is successfully received or has failed to be received.

Hereinafter, the operation of the transmission PDCP layer device and the operation of the reception PDCP layer device, when the higher layer compression or decompression method (the Ethernet header compression method) or ROHC (the higher layer compression or decompression method such as TCP/IP or UDP) described in an embodiment of the disclosure is configured, are described as follows.

The operation of the transmission PDCP layer device of a UE or base station according to an embodiment of the disclosure is as follows.

The transmission PDCP layer device uses a first COUNT variable that maintains a COUNT value to be assigned to the next transmitted data upon processing data, and the first COUNT variable may be referred to as TX_NEXT.

The operation of the transmission PDCP layer device of according to an embodiment of the disclosure is as follows.
- The transmission PDCP layer device activates a PDCP data discard timer upon receiving data (e.g., PDCP SDU) from a higher layer and discards the data when the timer expires.
- In addition, the transmission PDCP layer device allocates a COUNT value corresponding to TX_NEXT, with respect to data received from the higher layer. The TX_NEXT may be configured to be 0 as an initial value, and the TX_NEXT maintains a COUNT value for data to be transmitted next time (PDCP SDU).
- When the header compression protocol (ROHC) is configured for the transmission PDCP layer device, header compression for the data may be performed.
- When a higher layer header compression protocol (Ethernet header compression method, EthHC) is configured for the transmission PDCP layer device,
  When the data received from the higher layer is data received first after the Ethernet header compression method is configured,
  Alternatively, when even one of the field values of the compressible fields among the fields of the Ethernet header of the data received from the higher layer is different from the field values stored in the buffer of the transmission PDCP layer device (or different from the previously transmitted Ethernet header field values),
  Alternatively, when feedback indicating successful reception of data having the previously transmitted uncompressed full higher layer header (Ethernet header) is not received from the reception PDCP layer device,
    The transmission PDCP layer device does not perform the Ethernet header compression until feedback indicating successful reception of the uncompressed full higher layer header (Ethernet header) is received from the reception PDCP layer device. That is, the transmission PDCP layer device transmits data having the full header, and configures through the 1-bit indicator of the EHC header that compression is not performed to process and transmit the data together with the context identifier.
  When feedback indicating successful reception of data having the previously transmitted uncompressed full higher layer header (Ethernet header) is received from the reception PDCP layer device,
    The transmission PDCP layer device may perform compression by applying the Ethernet header compression method to the data received from the higher layer. That is, the transmission PDCP layer device compresses the Ethernet header and transmits the data, and configures through the 1-bit indicator of the EHC header that compression is performed to process and transmit the data together with the context identifier.
- When integrity protection is configured for the transmission PDCP layer device, a PDCP header may be generated, and integrity protection for the PDCP header and the data may be performed using a security key and a COUNT value of TX_NEXT assigned to the data.
- Further, a ciphering procedure for the data may be performed using the security key and the COUNT value of TX_NEXT assigned to the data. In addition, the COUNT value of the TX_NEXT variable configures, as PDCP serial numbers, as many lower LSBs as the length of the PDCP serial number.
- In addition, the COUNT value of the TX_NEXT variable may be increased by 1, and the data processed above may be concatenated with the PDCP header and transmitted to a lower layer.

According to another method of the disclosure, when receiving the full header transmitted by the transmission PDCP layer device, an operation in which the reception PDCP layer device generates and transmits feedback, or a time point or a method in which the transmission PDCP layer device applies the header compression procedure is performed differently depending on a mode of an RLC layer device to which the transmission/reception PDCP layer device is connected. For example, in a case of a transmission/reception PDCP layer device connected to an RLC layer device operating in an RLC AM mode, since there is no data loss, the transmission PDCP layer device transmits one full header, and upon receiving the one full header, the reception PDCP layer device configures feedback corresponding thereto and transmits the feedback to the transmission PDCP layer device. In addition, upon receiving feedback for the first time, the transmission PDCP layer device applies a header compression procedure to subsequent data and transmits the same.

According to another method, in a case of a transmission/reception PDCP layer device connected to an RLC layer device operating in an RLC UM mode, data loss may occur. Therefore, the transmission PDCP layer device transmits multiple full headers, and each time the reception PDCP layer device receives the multiple full headers, the reception PDCP layer device configures feedback corresponding thereto and transmits the feedback to the transmission PDCP layer device. In addition, when receiving feedback for the first time, the transmission PDCP layer device applies a header compression procedure to subsequent data and transmit the same.

According to another method, in a case of a transmission/reception PDCP layer device connected to an RLC layer device operating in an RLC UM mode, data loss may occur. Therefore, the transmission PDCP layer device may continue to transmit the full header until receiving feedback (feedback indicating successful reception of the full header) from the reception PDCP layer device. Further, each time the reception PDCP layer device receives the full header, the reception PDCP layer device configures feedback corresponding thereto and transmit the same to the transmission PDCP layer device. In addition, when receiving feedback for the first time, the transmission PDCP layer device may stop transmission of the full header and apply a header compression procedure to subsequent data and transmit the same.

According to another method, in a case of a transmission/reception PDCP layer device connected to an RLC layer device operating in an RLC AM mode, the transmission PDCP layer device may continue to transmit the full header until receiving feedback (feedback indicating successful reception of the full header) from the reception PDCP layer device. Further, each time the reception PDCP layer device receives the full header, the reception PDCP layer device configures feedback corresponding thereto and transmit the same to the transmission PDCP layer device. In addition, when receiving feedback for the first time, the transmission PDCP layer device may stop transmission of the full header and apply a header compression procedure to subsequent data and transmit the same.

According to another method, in a case of a transmission/reception PDCP layer device connected to an RLC layer device operating in an RLC AM mode, there is no data loss. Therefore, the transmission PDCP layer device may configure and transmit one full header, and may apply a header compression procedure to the immediately following data to process the data and perform transmission thereof. That is, a data compression procedure can be directly applied without receiving feedback (feedback indicating successful reception of full header) from the reception PDCP layer device. In addition, here, the reception PDCP layer device may arrange the received data in ascending order of the PDCP serial number or COUNT value, and since there is no data loss in the RLC AM, the reception PDCP layer device may receive and process the full header first, and may determine an identifier value of a data flow and a header compression method. Thereafter, data processing may be performed by applying a header decompression procedure to data in an ascending order, and the data may be transferred to a higher layer device.

According to another method, in a case of a transmission/reception PDCP layer device connected to an RLC layer device operating in an RLC UM mode, there is no data loss. Therefore, the transmission PDCP layer device may transmit multiple full headers, and may apply a header compression procedure to the immediately following data to process the data and perform transmission thereof. That is, a data compression procedure can be directly applied without receiving feedback (feedback indicating successful reception of full header) from the reception PDCP layer device. Here, the reception PDCP layer device may arrange the received data in ascending order of the PDCP serial number or COUNT value, and even when data loss occurs in the RLC AM, the reception PDCP layer device may assume that at least one full header from among the multiple full headers is received with high probability. Here, the reception PDCP layer device may receive and process the full header first, and may determine an identifier value of a data flow and a header compression method. Thereafter, data processing may be performed by applying a header decompression procedure to data in an ascending order, and the data may be transferred to a higher layer device.

In addition, the reception PDCP layer device connected to an RLC layer device driven in the RLC UM or AM may configure a new timer value through an RRC message and, upon receiving a full header, may transmit feedback and start the timer. Further, even when the full header is received, the reception PDCP layer device may perform an operation of not additionally transmit feedback until the timer expires so as to prevent unnecessary feedback from being generated. In addition, the transmission PDCP layer device connected to the RLC layer device driven by the RLC UM or AM may consider that the reception PDCP layer device has successfully received the full header when feedback is first received, and may apply a header compression procedure to subsequent data and perform transmission thereof. Thereafter, the transmission PDCP layer device may ignore additionally received feedbacks for a predetermined period of time (e.g., a new timer value is configured through the RRC message, a new timer is started when the first feedback is received, and until the timer expires).

The feedback structure described above may be applied with the feedback structures of FIG. 1K described in the disclosure.

As described above, the Ethernet header compression algorithm according to an embodiment of the disclosure may be driven without feedback. That is, the transmission PDCP layer device may transmit multiple pieces of data, which are not compressed with the Ethernet header compression algorithm and include a full header including configuration information or context of the Ethernet header compression algorithm, and then may transmit pieces of data including the Ethernet header, which is compressed by immediately applying the Ethernet header compression algorithm to the next data. Here, the full header may indicate a new EHC header including configuration information of the Ethernet header compression algorithm in an uncompressed higher layer header or PDCP layer device. In addition, when multiple pieces of data having multiple full headers is transmitted, a new EHC header included in the full header may indicate the same information, and each piece of data may include different higher layer data. In addition, the base station may configure, for each bearer, the number of data to be transmitted, which includes a full header transmitted when starting to apply the Ethernet header compression method or trying to change the Ethernet header compression method in the transmission PDCP layer device, through the RRC message (e.g., RRCSetup, RRCResume, or RRCReconfiguaration messages) as shown in FIG. 1E.

Hereinafter, when the Ethernet header compression algorithm is configured in the PDCP layer device, methods for driving the Ethernet header compression algorithm without feedback according to an embodiment of the disclosure will be described.

Method 1: The base station may configure, as the first number of times, the number of pieces of data including a full header to be transmitted when starting to apply the Ethernet header compression method or trying to change the Ethernet header compression method in the transmission PDCP layer device for each bearer. For example, the base station may configure the number of pieces of data to be transmitted, through an RRC message (e.g., an RRCSetup or RRCResume or RRCReconfiguration message) for each bearer as shown in FIG. 1E. That is, in order to configure an Ethernet header compression method when trying to apply the Ethernet header compression method or to change the Ethernet header compression method, the transmission PDCP layer device may transmit pieces of data, which have a full header including configuration information or context of the Ethernet header compression algorithm, by the first number of times configured through the RRC message, and then may transmit pieces of data including the Ethernet header compressed by immediately applying the Ethernet header compression algorithm to subsequent data. According to another method, how many pieces of data including a full header are to be transmitted may be determined according to implementation. According to another method, since multiple QoS flows (or multiple different Ethernet header types) may be mapped to one bearer, the base station may configure, as the second number of times, the number of pieces of data including a full header to be transmitted when starting to apply the Ethernet header compression method or trying to change the Ethernet header compression method in the transmission PDCP layer device for each bearer or for each QoS flow of one bearer, respectively. According to another method, the base station may configure, as the first number of times, the number of pieces of data including a full header to be transmitted when starting to apply the Ethernet header compression method or trying to change the Ethernet header compression method in the transmission PDCP layer device for each bearer. Since multiple QoS flows (or multiple QoS flows mapped to multiple context identifiers (indicating an Ethernet header compression method), respectively) (or multiple different Ethernet header types) may be mapped to one bearer, each transmission PDCP layer device may transmit each piece of data including a full header corresponding to each context identifier (or for each Ethernet header compression method) or each QoS flow the first number of times, and then may start compressing or may compress the Ethernet header by applying the Ethernet header compression method corresponding to each context identifier to subsequent data corresponding to each context identifier or each QoS flow (or each Ethernet header type), and transfer the data to the lower layer to perform transmission. The transmission PDCP layer device may allocate different context identifiers to different QoS flows (or Ethernet header types), and may configure and apply different Ethernet header compression methods. Method 1 may be applied to a bearer corresponding to a PDCP layer device connected to the RLC UM or a bearer corresponding to a PDCP layer device connected to the RLC AM.

Method 2: According to method 2, different methods may be applied to a bearer corresponding to a PDCP layer device connected to the RLC UM and a bearer corresponding to a PDCP layer device connected to the RLC AM. The base station may configure, as the first number of times, the number of pieces of data including a full header to be transmitted when starting to apply the Ethernet header compression method or trying to change the Ethernet header compression method in the transmission PDCP layer device for each bearer. For example, the base station may configure the number of pieces of data to be transmitted, through an RRC message (e.g., an RRCSetup or RRCResume or RRCReconfiguration message) for each bearer as shown in FIG. 1E. That is, in order to configure an Ethernet header compression method when trying to apply the Ethernet header compression method or to change the Ethernet header compression method, the transmission PDCP layer device may transmit pieces of data, which have a full header including configuration information or context of the Ethernet header compression algorithm, by the first number of times configured through the RRC message, and then may transmit pieces of data including the Ethernet header compressed by immediately applying the Ethernet header compression algorithm to subsequent data. According to another method, how many pieces of data including a full header are to be transmitted may be determined according to implementation. According to another method, since multiple QoS flows may be mapped to one bearer, the base station may configure, as the second number of times, the number of pieces of data including a full header to be transmitted when starting to apply the Ethernet header compression method or trying to change the Ethernet header compression method in the transmission PDCP layer device for each bearer or for each QoS flow of one bearer, respectively. According to another method, the base station may configure, as the first number of times, the number of pieces of data including a full header to be transmitted when starting to apply the Ethernet header compression method or trying to change the Ethernet header compression method in the transmission PDCP layer device for each bearer. Since multiple QoS flows (or multiple QoS flows mapped to multiple context identifiers (indicating an Ethernet header compression method), respectively) (or multiple different Ethernet header types) may be mapped to one bearer, each transmission PDCP layer device may transmit each piece of data including a full header corresponding to each context identifier (or for each Ethernet header compression method) or each QoS flow the first number of times, and then may start compressing or may compress the Ethernet header by applying the Ethernet header compression method corresponding to each context identifier to subsequent data corresponding to each context identifier or each QoS flow (or each Ethernet header type), and transfer the data to the lower layer to perform transmission. The transmission PDCP layer device may allocate different context identifiers to different QoS flows, and may configure and apply different Ethernet header compression methods. Method 2 may be applied to a bearer corresponding to a PDCP layer device connected to the RLC UM. However, when method 2 is applied to the bearer corresponding to the PDCP layer device connected to the RLC AM, the first number of times or the second number of times may be always configured to be 1. Since there is no data loss in the RLC AM mode, and the reception PDCP layer device always performs data sequence ordering and then performs header decompression, it is sufficient to transmit only one full header without unnecessarily transmitting multiple full headers. Therefore, the transmission PDCP layer device connected to the RLC AM mode configures and transmits one piece of data including a full header corresponding to each context identifier (or for each Ethernet header compression method) or each QoS flow the first number of times, and then may start compressing the Ethernet header or may compress the Ethernet header by applying the Ethernet header compression method corresponding to each context identifier to subsequent data corresponding to each context identifier or each QoS flow, and transfer the pieces of data to a lower layer to perform transmission.

Method 3: According to method 3, different methods may be applied to a bearer corresponding to a PDCP layer device connected to the RLC UM and a bearer corresponding to a PDCP layer device connected to the RLC AM. The base station may configure, as the first number of times, the number of pieces of data including a full header to be transmitted when starting to apply the Ethernet header compression method or trying to change the Ethernet header compression method, with respect to bearers connected to the RLC UM, in the transmission PDCP layer device for each bearer. For example, the base station may configure the number of pieces of data to be transmitted, with respect to bearers connected to the RLC UM, through an RRC message (e.g., an RRCSetup or RRCResume or RRCReconfiguration message) for each bearer as shown in FIG. 1E. That is, in order to configure an Ethernet header compression method when trying to apply the Ethernet header compression method or to change the Ethernet header compression method, the transmission PDCP layer device connected to the RLC UM may transmit pieces of data, which have a full header including configuration information or context of the Ethernet header compression algorithm, by the first number of times configured through the RRC message, and then may transmit pieces of data including the Ethernet header compressed by immediately applying the Ethernet header compression algorithm to subsequent data. According to another method, how many pieces of data including a full header are to be transmitted may be determined according to implementation. According to another method, since multiple QoS flows (or multiple Ethernet header types) may be mapped to one bearer, the base station may configure, with respect to bearers connected to the RLC UM, as the second number of times, the number of pieces of data including a full header to be transmitted when starting to apply the Ethernet header compression method or trying to change the Ethernet header compression method in the transmission PDCP layer device for each bearer or for each QoS flow of one bearer, respectively. According to another method, the base station may configure, with respect to bearers connected to the RLC UM, as the first number of times, the number of pieces of data including a full header to be transmitted when starting to apply the Ethernet header compression method or trying to change the Ethernet header compression method in the transmission PDCP layer device for each bearer. Since multiple QoS flows (or multiple QoS flows mapped to multiple context identifiers (indicating an Ethernet header compression method), respectively) (or multiple different Ethernet header types) may be mapped to one bearer, each transmission PDCP layer device connected to the RLC UM may transmit each piece of data including a full header corresponding to each context identifier (or for each Ethernet header compression method) or each QoS flow (or each Ethernet header type) the first number of times, and then may start compressing or may compress the Ethernet header by applying the Ethernet header compression method corresponding to each context identifier to subsequent data corresponding to each context identifier or each QoS flow, and transfer the data to the lower layer to perform transmission. The transmission PDCP layer device may allocate different context identifiers to different QoS flows, and may configure and apply different Ethernet header compression methods. However, in method 3, when the Ethernet header compression algorithm is configured the PDCP layer device (or bearer) connected to the RLC AM may configure and transmit one piece of data including a full header corresponding to each context identifier (or for each Ethernet header compression method) or each QoS flow (or each Ethernet header type) at the time of application. Thereafter, the PDCP layer device may start compressing the Ethernet header or may compress the Ethernet header by applying the Ethernet header compression method corresponding to each context identifier to subsequent data corresponding to each context identifier or each QoS flow, and transfer the pieces of data to a lower layer to perform transmission. Since there is no data loss in the RLC AM mode, and the reception PDCP layer device always performs data sequence ordering and then performs header decompression, it is sufficient to transmit only one full header without unnecessarily transmitting multiple full headers. Therefore, with respect to the transmission PDCP layer device or bearers connected to the RLC AM mode, the first number of times or the second number of times is not configured through the RRC message.

In addition, when the transmission PDCP layer device according to an embodiment of the disclosure applies the Ethernet header compression method, the transmission PDCP layer device and the reception PDCP layer device should share configuration information relating to the Ethernet header compression method, such as which fields are compressed or compressible, for each context identifier (or each QoS flow or each Ethernet header type) and synchronization should be done therebetween. In an embodiment, it has been described that when the Ethernet header compression method is configured for each context identifier, the transmission PDCP layer device includes configuration information relating to the Ethernet header compression method (e.g., context identifier or bitmap field, etc.) in a full header at the time of application, and transmits the same when performing data transmission. However, according to another method, in the RRC message of FIG. 1E, configuration information regarding the Ethernet header compression method indicating which fields are compressed or compressible for each context identifier (or for each QoS flow or each Ethernet header type) applicable to each bearer or each PDCP layer device, etc. may be preconfigured through the RRC message, and according to the configuration information, the transmission PDCP layer device may apply an Ethernet header compression procedure for each context. In addition, with regard to data having multiple full headers transmitted when the transmission PDCP layer device starts to apply the Ethernet header compression method or tries to change the Ethernet header compression method, the full header may include a context identifier or an uncompressed Ethernet header without including configuration information regarding an Ethernet header compression method such as a bitmap field. In addition, with regard to how many full headers are to be transmitted, method 1, method 2, or method 3 described above may be applied. Since configuration information about the Ethernet header compression method, such as which fields are compressed or compressible for each context identifier (or each QoS flow or each Ethernet header type) is preconfigured in the RRC message, the transmission PDCP layer device can reduce overhead by not including configuration information regarding the Ethernet header compression method in the full header.

Hereinafter, a procedure for compressing a padding of the Ethernet frame by the transmission terminal and reconstructing the same by the reception terminal will be described in detail.

The Ethernet protocol is designed such that data (e.g., Ethernet frame) smaller than a predetermined first size (e.g., data may be 64 bytes, may be predetermined, and may be configured through the RRC message as shown in FIG. 1E) is to be discarded by the reception terminal, and thus when the size of the Ethernet frame is smaller than a determined first size, the transmission terminal adds a padding thereto to transmit data according to the first size. Therefore, when the transmission PDCP layer device receives data from a higher layer device (e.g., an Ethernet protocol layer device) and transmits the data as it is, when small data is serviced, the padding is included in a transmission resource and continuously transmitted, and thus the transmission resource is wasted. This may result in delay in data transmission. Therefore, in the following, when the Ethernet header compression method is configured for each bearer, the transmission PDCP layer device identifies the size of data received from the higher layer device, and with regard to data (e.g., Ethernet frame), which has the size equal to or smaller than a second size (for example, 64 bytes, which may be predetermined, and may be configured through the RRC message as shown in FIG. 1E), or with regard to data which has the size equal to or greater than a second size, the transmission PDCP layer device identifies a padding thereof, and transmits the data after removing the padding. In addition, the reception PDCP layer device, in which the Ethernet header compression method is configured, may identify the size of data received from the lower layer device (e.g., the RLC layer device), and with regard to data which has the size equal to or smaller than a third size (e.g., 64 bytes, which may be predetermined, and may be configured through the RRC message as shown in FIG. 1E), a padding is added thereto to configure the data size to fit a first size (or a third size), and then the data can be transferred to a higher layer device, thereby reducing the waste of transmission resources.

The PDCP layer device may be configured with one of the Ethernet header compression method and the ROHC header compression method, and both methods may be configured at the same time.

When the data, which is received from a higher layer device by the transmission PDCP layer device in which the Ethernet header compression method is configured, has a fourth size, the data can be reduced to a (5-1)th size by applying the Ethernet header compression method to the data. In addition, when the Ethernet header compression method and the ROHC header compression method are also configured, the ROHC header method may be applied to data having a (5-1)th size to reduce the size to data having a (6-1)th size. According to another method, when the data, which is received from a higher layer device by the transmission PDCP layer device in which the ROHC header compression method is configured, has a fourth size, the data can be reduced to a (5-2)th size by applying the ROHC header compression method to the data. In addition, when the Ethernet header compression method and the ROHC header compression method are also configured, the Ethernet header method may be applied to data having a (5-2)th size to be reduced to data having a (6-2)th size. In addition, the transmission PDCP layer device, in which the Ethernet header compression method is configured, identifies the size of data received from a higher layer device, and with regard to data (e.g., Ethernet frame), which has the size equal to or smaller than a second size (for example, 64 bytes, which may be predetermined, and may be configured through the RRC message as shown in FIG. 1E), or with regard to data which has the size equal to or greater than a second size, the transmission PDCP layer device identifies a padding thereof, and transmits the data after removing the padding. The transmission PDCP layer device may identify the size of data received from a higher layer device or identify field information of the Ethernet header to determine whether or not padding is present and perform a padding removal procedure, and the padding removal procedure may be performed before the Ethernet header compression procedure or the ROHC header compression procedure. Since the data becomes smaller than the original fourth size after the Ethernet header compression procedure or the ROHC header compression procedure is performed, it may be difficult to accurately remove the padding. According to another method, data is received from a higher layer device, the fourth size is stored, and the padding removal procedure may be performed after the Ethernet header compression procedure or the ROHC header compression procedure. That is, implementation thereof may occur regardless of the sequence.

The reception PDCP layer device, in which the Ethernet header compression method is configured, identifies the size of data received from a lower layer device, and with regard to data (e.g., Ethernet frame), which has the size equal to or smaller than a third size (e.g., 64 bytes, which may be predetermined, and may be configured through the RRC message as shown in FIG. 1E), the reception PDCP layer device determines that padding has been removed to prevent wasting of transmission resources, performs a padding recovery procedure by adding or configuring a padding to or in the data according to a third size or a first size, and transfers the same to a higher layer device. However, when identifying the size of data received from a lower layer device, when the Ethernet header compression method or the ROHC header compression method is configured, the reception PDCP layer device identifies the size of data received from the lower layer device after the Ethernet header decompression or ROHC header decompression is completed. Since data to which the Ethernet header compression method or ROHC header compression method is applied has a reduced data size, it is necessary to recover the original data size and then compare the data with the third size data or first size data or to identify the Ethernet header field information, and to apply a padding recovery procedure. That is, the reception PDCP layer device applies a deciphering procedure, integrity protection procedure, Ethernet header decompression, or ROHC header decompression procedure to the received data before identifying the size of data received from the lower layer device, and recover the original data size. Thereafter, the recovered data is compared with the third size data or first size data and, with regard to data (e.g., Ethernet frames) which has the size equal to or smaller than a third size (for example, 64 bytes, which may be predetermined, and may be configured through the RRC message as shown in FIG. 1E) or when padding removal (or compression) is identified as a result of identification of the Ethernet header (or the indicator of the PDCP header or the indicator of the EHC header) field information, it may be determined that padding removal is performed to prevent wasting of transmission resources. Thereafter, padding is added or configured to the data according to the third size or the first size to perform a padding recovery procedure and to be transmitted to a higher layer device. That is, the padding recovery (or decompression) procedure for the Ethernet frame of the reception PDCP layer device in which the Ethernet header compression method or the ROHC header compression method is configured is performed by identifying the data size or header field information after completing the Ethernet header decompression or ROHC header decompression procedure.

In addition, when the Ethernet header compression method and the ROHC header compression method according to an embodiment of the disclosure are configured at the same time, the reception PDCP layer device may perform a deciphering or integrity verification procedure for data received from a lower layer device, and then may first identify the size of the Ethernet header compressed by applying the Ethernet header decompression method and then identify the ROHC-compressed header and apply the ROHC header decompression procedure thereto. Here, the Ethernet header decompression or ROHC header decompression can be performed independently, that is, regardless of sequence, but the reception PDCP layer device may first identify the size of the compressed Ethernet header after the PDCP header and identify the size of the ROHC-compressed header, and then may perform the Ethernet header decompression or ROHC header decompression independently. According to another method, for convenience of implementation, an indicator indicating whether Ethernet header compression or ROHC header compression has been performed is defined in the PDCP header or EHC header, the transmission PDCP layer device performs indication, the reception PDCP layer device may identify the indicator and apply the Ethernet header decompression or ROHC header decompression. Such methods are needed because the reception PDCP layer device cannot know where the compressed ROHC header is located in the received data when both the Ethernet header compression and the ROHC header compression method are configured.

In addition, in FIG. 1E of the disclosure, after the transmission PDCP layer device transmits the full header for each bearer or for each PDCP layer device through the RRC message, feedback indicating that successful reception of the full header may be received from the reception PDCP layer device. Thereafter, whether to start the Ethernet header compression procedure or to immediately start the Ethernet header compression procedure after transmitting multiple pieces of data having the full header may be configured through an indicator. For example, when the Ethernet header compression method is configured for each bearer or for each PDCP layer device configuration information, the RRC message (e.g., RRCSetup, RRCResume, and RRCReconfiguration messages) may indicate whether to use feedback, and when transmission of multiple pieces of data having the full header is configured, the RRC message may configure the number of times of transmission corresponding thereto. In addition, different Ethernet header compression configuration information (e.g., whether feedback occurs or not, whether multiple full headers are transmitted, the number of times of transmissions, etc.) may be configured for the PDCP layer device in which RLC UM or RLC AM is configured.

The operation of the reception PDCP layer device of a UE or a base station according to an embodiment of the disclosure is as follows.

The reception PDCP layer device uses the PDCP serial number length (for example, 12 bits or 18 bits) configured by a base station through RRC, identifies the PDCP serial number of the received data (for example, PDCP PDU), and drives a reception window. Here, the reception window is configured to be the size of half of the PDCP serial number space (for example, $2^{\wedge}$(PDCP SN length−1)), and is used to distinguish valid data. That is, data received outside the reception window may be determined to be invalid data and discarded. The reason the data arrives outside the reception window is that the data arrives very lately due to retransmission of the RLC layer device or HARQ retransmission of the MAC layer device in a lower layer device. In addition, the reception PDCP layer device may drive a PDCP reordering timer (t-Reordering) together with the reception window.

Here, the PDCP reordering timer is triggered when a PDCP serial number gap occurs based on the PDCP serial number in the reception PDCP layer device, and when data corresponding to the PDCP serial number gap does not arrive until the PDCP reordering timer expires, the data is transmitted to the higher layer device in an ascending order of PDCP serial number or COUNT value, and the reception window is moved. Therefore, when data corresponding to the PDCP serial number gap arrives after the PDCP reordering timer expires, the data is not data in the reception window and thus is discarded.

The reception PDCP layer device operation of a UE or a base station according to an embodiment of the disclosure is as follows.

The reception PDCP layer device may maintain and manage three COUNT variables upon processing the received data. The reception PDCP layer device may use a second COUNT variable that maintains a COUNT value of data (e.g., PDCP SDU) expected to be received next, upon processing the received data, and the second COUNT variable may be referred to as RX_NEXT. Further, the reception PDCP layer device uses a third COUNT variable that maintains a COUNT value of first data (for example, PDCP SDU) that is not transmitted to a higher layer, upon processing the received data, and the third COUNT. The variable may be referred to as RX_DELIV. In addition, upon processing the received data, the reception PDCP layer device uses a fourth COUNT variable that maintains a COUNT value of data (e.g., PDCP SDU) by which a PDCP reordering timer (t-Reordering) is triggered, and the fourth COUNT variable may be referred to as RX_REORD. In addition, upon processing the received data, the reception PDCP layer device uses a fifth COUNT variable that maintains a COUNT value of the currently received data (e.g., PDCP SDU) and the fifth COUNT variable is referred to as RCVD_COUNT. The PDCP reordering timer uses a timer value or interval, configured through an RRC message, in the higher layer (RRC layer) as shown in FIG. 1E, the timer is used for detection of the lost PDCP PDU, and only one timer may run at a time.

In addition, a UE may define and use the following variables in the operation of the reception PDCP layer device.

HFN: HFN indicates a hyper frame number (HFN) part of a window state variable.
SN: SN indicates a sequence number (SN) part of the window state variable.
RCVD SN: RCVD SN indicates a PDCP serial number included in the header of the received PDCP PDU
RCVD_HFN: RCVD_HFN indicates HFN value of the received PDCP PDU, calculated by the reception PDCP layer device.

The operation of the reception PDCP layer device of a UE or a base station according to an embodiment of the disclosure is as follows.

When the PDCP PDU is received from the lower layer, the reception PDCP layer device determines the COUNT value of the received PDCP PDU as follows.
When the received RCVD_SN is RCVD_SN<=SN (RX_DELIV)-Window_Size,
Update to RCVD_HFN=HFN (RX_DELIV)+1.
Otherwise, when RCVD_SN is RCVD_SN>SN (RX_DELIV)+Window_Size,
Update to RCVD_HFN=HFN (RX_DELIV)-1.
Otherwise,
Update to RCVD_HFN=HFN (RX_DELIV).
RCVD_COUNT is determined to be RCVD_COUNT= [RCVD_HFN, RCVD_SN].

After determining the COUNT value of the received PDCP PDU, the reception PDCP layer device may update the window state variables and process the PDCP PDU as follows.

Decode the PDCP PDU using the RCVD_COUNT value and perform integrity verification.
When integrity verification fails,
Provide an indication of integrity verification failure to a higher layer and discard the received PDCP Data PDU (data part of PDCP PDU).
When a PDCP PDU, which is in the state where RCVD_COUNT<RX_DELIV or has a value of RCVD_COUNT, has been previously received (a case of expired, out-of-date, out-of-window packets, or a case of duplicate packets)
Discard the received PDCP Data PDU (data part of PDCP PDU).
When the received PDCP PDU is not discarded, the reception PDCP layer device operates as follows.
The PDCP SDU processed above is stored in a reception buffer.
When RCVD_COUNT>=RX_NEXT
Update RX_NEXT to RCVD_COUNT+1.
When an out of order delivery indicator (outOfOrderDelivery) is configured (when out of order delivery operation is indicated),
Deliver the PDCP SDU to a higher layer.
When RCVD_COUNT is equal to RX_DELIV,
When the header decompression procedure has not previously been applied (even when the Ethernet header compression protocol or ROHC is configured) (that is, data processing of the higher layer header has not been performed),
When the Ethernet header compression protocol is configured and the Ethernet header is compressed (when an indicator of a new EHC header is identified and the indicator indicates that the Ethernet header is compressed),
Decompression of the Ethernet header of the data is performed.
Otherwise, when the Ethernet header compression protocol is configured and the Ethernet header is not compressed (when an indicator of a new EHC header is identified and the indicator indicates that the Ethernet header is compressed),
the Ethernet header of the data is regarded as an uncompressed header and decompression thereof is not performed.
Since the uncompressed Ethernet header has been successfully received, feedback is triggered to indicate the successful reception to the transmission PDCP layer device and the feedback is configured to be transmitted to the transmission PDC layer device.
Otherwise, when the Ethernet header compression protocol is not configured and ROHC is configured,
decompression of the higher layer header (TCP/IP or UDP header, etc.) of the data is performed.
The data described above are transmitted to a higher layer in the order of COUNT value.
Beginning with COUNT=RX_DELIV value, all consecutive PDCP SDUs are transmitted to a higher layer.
Update the RX_DELIV value to the COUNT value of the first PDCP SDU, which has a COUNT value equal to or greater than the current RX_DELIV value and is not transmitted to the higher layer.
When the t-Reordering timer is running and the RX_DELIV value is equal to or greater than RX_REORD,
The t-Reordering timer is stopped and reset.
When the t-Reordering timer is not running (including a stopped case under the above conditions) and RX_DELIV is smaller than RX_NEXT,
Update the RX_REORD value to RX_NEXT.
Start the t-Reordering timer.
When the PDCP reordering timer (t-Reordering) has expired, the reception PDCP layer device operates as follows.
When the header decompression procedure has not been applied before (even when Ethernet header compression protocol or ROHC is configured) (i.e., data processing of the higher layer header is not yet performed),
When the Ethernet header compression protocol is configured, and the Ethernet header is compressed (when an indicator of a new EHC header is identified and the indicator indicates that the Ethernet header is compressed),
decompression of the Ethernet header of the data is performed.
Otherwise, when the Ethernet header compression protocol is configured and the Ethernet header is not compressed (when an indicator of a new EHC header is identified and the indicator indicates that the Ethernet header is compressed),
the Ethernet header of the data is regarded as an uncompressed header and decompression thereof is not performed.
Since the uncompressed Ethernet header has been successfully received, feedback is triggered to indicate the successful reception thereof to the transmission PDCP layer device and the feedback is configured to be transmitted to the transmission PDC layer device.

Otherwise, when the Ethernet header compression protocol is not configured and ROHC is configured, decompression of the higher layer header (TCP/IP or UDP header, etc.) of the data is performed.

The data described above is transmitted to the higher layer in the order of COUNT value.

All PDCP SDUs having COUNT values less than the RX_REORD value are transmitted.

Beginning with the RX_REORD value, all PDCP SDUs having consecutive COUNT values are transmitted.

Update the RX_DELIV value to the COUNT value of the first PDCP SDU, which has a COUNT value equal to or greater than the RX_REORD value and is not transmitted to the higher layer.

When the RX_DELIV value is smaller than the value of RX_NEXT,

Update the RX_REORD value to the RX_NEXT value.

Start the t-Reordering timer.

The Ethernet header compression or decompression procedure according to an embodiment of the disclosure may perform detailed operations as follows.

When a UE receives an RRCReconfiguration message or an RRCConnectionSetup message (or RRCResume message in a case of a resume procedure), the RRC message may indicate configuration information to the UE as follows.

1> It is possible to indicate whether to use configuration information for Ethernet header compression or decompression or Ethernet header compression or decompression function for each bearer or in PDCP layer device configuration information (PDCP-config).

2> When a dedicated traffic channel (DTCH) is used, the Ethernet header compression or decompression function may be configured to be used for a UM bearer (a PDCP layer device connected to an RLC layer device that uses a UM mode).

2> Only when using a dedicated traffic channel (DTCH) and/or not using a dedicated control channel (DCCH), the Ethernet header compression or decompression function may be configured to be used for an AM bearer (a PDCP layer device connected to an RLC layer device that uses an AM mode).

1> An indicator indicating whether to continue to use or initialize the context for Ethernet header compression or decompression may be configured for each bearer or in the PDCP layer device configuration information (PDCP-config). According to another method, when performing a re-establishment procedure of the PDCP layer device for each bearer or in the PDCP layer device configuration information (PDCP-config), an indicator indicating whether to continue to use or initialize the context for Ethernet header compression or decompression may be configured. According to another method, the context for Ethernet header compression or decompression may be always initialized when performing the re-establishment procedure of the PDCP layer device for each bearer or in a PDCP layer.

1> When the Ethernet header compression or decompression procedure has been configured, one or more of the following methods can be applied to perform the Ethernet header compression or decompression procedure.

2> First method: With regard to a UM or AM bearer, when data for a certain context identifier is transmitted for the first time, when no feedback is received for the full Ethernet header (or uncompressed Ethernet header) transmitted for a certain context identifier, or when the context for Ethernet header compression or decompression is initialized, the transmission PDCP layer device may generate an EHC header together with the full uncompressed Ethernet header, configure, in the EHC header, a context identifier or an indicator indicating that compression does not occur, perform integrity protection or ciphering of data corresponding thereto and transmit the data. Further, the transmission PDCP layer device may include the uncompressed Ethernet header, the full Ethernet header, or the EHC header in the data and perform transmission of the data until feedback indicating successful reception of the data including the full Ethernet header, the uncompressed Ethernet header, or the EHC header is received. When feedback indicating successful reception of the data including the full Ethernet header, the uncompressed Ethernet header, or the EHC header is received, the transmission PDCP layer device may start Ethernet header compression for data to be transmitted. Specifically, the transmission PDCP layer device may compress or omit fields which are compressible or having a fixed value and include fields which are non-compressible or having no-fixed values among fields of the Ethernet header, may generate an EHC header and include an indicator indicating that the Ethernet header has been compressed or a context identifier corresponding thereto in the EHC header, and may perform integrity protection or ciphering of data having the compressed Ethernet header and transmit the data. Here, when receiving data including the full Ethernet header, the uncompressed Ethernet header, or the EHC header including the indicator indicating that compression does not occur, by performing deciphering or integrity verification thereof, the reception PDCP layer device of the reception terminal may store field values of full Ethernet header fields, store a context identifier corresponding thereto, generate feedback, include a context identifier corresponding to data or an indicator indicating successful reception in the feedback, and transmit the same. Further, the reception PDCP layer device may allow the corresponding feedback to be transmitted without being applied with integrity protection or ciphering procedure, so as to enable fast processing. Here, when the reception PDCP layer device of the reception terminal receives data including a compressed Ethernet header or an EHC header including an indicator indicating that compression is performed, by performing deciphering or integrity verification thereof and, the reception PDCP layer device may, without generating feedback, recover or reconstruct the compressed or omitted header fields or field values in the compressed Ethernet header from a buffer or context for the context identifier corresponding to data and configure the full Ethernet header fields or perform decompression thereof to transmit the same to a higher layer device. Here, when the ROHC header compression procedure is also configured, the ROHC header compression or decompression procedure may be independently performed for a higher layer device header other than the Ethernet header.

2> Second method: With regard to a UM or AM bearer, when data for a certain context identifier is transmitted for the first time, when no feedback is received for the full Ethernet header (or uncompressed Ethernet header) transmitted for a certain context identifier, or when the context for Ethernet header compression or decompression is initialized, the transmission PDCP layer device may generate an EHC header together with the full uncompressed Ethernet header, configure, in the EHC header, a context identifier or an indicator indicating that compression does not occur, perform integrity protection or ciphering of data corresponding thereto and transmit the data. Further, the transmission PDCP layer device may include the uncompressed Ethernet header, the full Ethernet header, or the EHC header in the data and perform transmission of the data until feedback indicating successful reception of the data including the full Ethernet header, the uncompressed Ethernet header, or the EHC header is received. When feedback indicating successful reception of the data including the full Ethernet header, the uncompressed Ethernet header, or the EHC header is received, the transmission PDCP layer device may start Ethernet header compression for data to be transmitted. Specifically, the transmission PDCP layer device may compress or omit fields which are compressible or having a fixed value and include fields which are non-compressible or having no-fixed values among fields of the Ethernet header, may generate an EHC header and include an indicator indicating that the Ethernet header has been compressed or a context identifier corresponding thereto in the EHC header, and may perform integrity protection or ciphering of data having the compressed Ethernet header and transmit the data. Here, the reception PDCP layer device of the reception terminal may introduce a separate timer (through the RRC message, a timer value may be configured for each bearer or for each PDCP layer device, or may be configured together with an Ethernet header compression or decompression function) to perform a procedure of preventing frequent feedback from occurring, as follows.
  3> The timer value configured above may be applied when the reception PDCP layer device drives a timer, and the timer may be driven for each context identifier.
  3> In the above, when the reception PDCP layer device of the reception terminal receives data including the full Ethernet header, the uncompressed Ethernet header, or the EHC header including an indicator indicating that compression does not occur, by performing deciphering or integrity verification thereof
    4> When a timer for a context identifier corresponding to the received data is not running
      5> The reception PDCP layer device may store field values of full Ethernet header fields, store a context identifier corresponding thereto, generate feedback, include a context identifier corresponding to data or an indicator indicating successful reception in the feedback, and transmit the same. Further, the reception PDCP layer device may allow feedback to be transmitted without being applied with integrity protection or ciphering procedure, so as to enable fast processing.
      5> The reception PDCP layer device may start a timer for the context identifier corresponding to the received data.
  3> When the reception PDCP layer device of the reception terminal receives data including a compressed Ethernet header or an EHC header including an indicator indicating that compression has been occurred, by performing deciphering or integrity verification thereof
    4> The reception PDCP layer device may, without generating feedback, recover or reconstruct the compressed or omitted header fields or field values in the compressed Ethernet header from a buffer or context for the context identifier corresponding to data and configure the full Ethernet header fields to perform decompression. Here, when the ROHC header compression procedure is also configured, the ROHC header compression or decompression procedure may be independently performed for a higher layer device header other than the Ethernet header.
    4> When a timer for a context identifier corresponding to the received data is running, the timer may be interrupted.
  3> When the timer for the context identifier has expired
    4> The reception PDCP layer device may generate feedback correspond to a context identifier, include the context identifier or an indicator indicating successful reception in the feedback, and transmit the same. Further, the reception PDCP layer device may allow feedback to be transmitted without being applied with integrity protection or ciphering procedure, so as to enable fast processing.
    4> The timer corresponding to the context identifier may be restarted.
2> Third method: With regard to a UM bearer, when data for a certain context identifier is transmitted for the first time, when no feedback is received for the full Ethernet header (or uncompressed Ethernet header) transmitted for a certain context identifier, or when the context for Ethernet header compression or decompression is initialized, the transmission PDCP layer device may generate an EHC header together with the full uncompressed Ethernet header, configure, in the EHC header, a context identifier or an indicator indicating that compression does not occur, perform integrity protection or ciphering of data corresponding thereto and transmit the data. Further, the transmission PDCP layer device may include the uncompressed Ethernet header, the full Ethernet header, or the EHC header in the data and perform transmission of the data until feedback indicating successful reception of the data including the full Ethernet header, the uncompressed Ethernet header, or the EHC header is received. When feedback indicating successful reception of the data including the full Ethernet header, the uncompressed Ethernet header, or the EHC header is received, the transmission PDCP layer device may start Ethernet header compression for data to be transmitted. Specifically, the transmission PDCP layer device may compress or omit fields which are compressible or having a fixed value and include fields which are non-compressible or having no-fixed values among fields of the Ethernet header, may generate an EHC header and include an indicator indicating that the Ethernet header has been compressed or a context identifier corresponding thereto in the EHC header, and may perform integrity protection or ciphering of data having the compressed Ethernet header and transmit the data. Here, when receiving data including the full Ethernet header, the uncompressed Ethernet header, or the EHC header including the indicator indicating that compression does not occur, by performing deciphering or integrity verification thereof, the reception PDCP layer device of the reception terminal may store field values of full Ethernet header fields, store a context identifier corresponding thereto, generate feedback, include a context identifier corresponding to data or an indicator indicating successful reception in the feedback, and transmit the same. Further, the reception PDCP layer device may allow feedback to be transmitted without being applied with integrity protection or ciphering procedure, so as to enable fast processing. When the reception PDCP layer device of the reception terminal receives data including a compressed Ethernet header or an EHC header including an indicator indicating that compression is performed, by performing deciphering or integrity verification thereof, the reception PDCP layer device may, without generating feedback, recover or reconstruct the compressed or omitted header fields or field values in the compressed Ethernet header from a buffer or context for the context identifier corresponding to data and configure the full Ethernet header fields or perform decompression thereof to transmit the same to a higher layer device. Here, when the ROHC header compression procedure is also configured, the ROHC header compression or decompression procedure may be independently performed for a higher layer device header other than the Ethernet header. With regard to an AM bearer, when data for a certain context identifier is transmitted for the first time, when no feedback is received for the full Ethernet header (or uncompressed Ethernet header) transmitted for a certain context identifier, or when the context for Ethernet header compression or decompression is initialized, the transmission PDCP layer device may generate an EHC header together with the full uncompressed Ethernet header, configure, in the EHC header, a context identifier or an indicator indicating that compression does not occur, perform integrity protection or ciphering of data corresponding thereto and transmit the data once. With regard to subsequent data, the transmission PDCP layer device may start the Ethernet header compression for data to be transmitted. Specifically, the transmission PDCP layer device may compress or omit fields which are compressible or having a fixed value and include fields which are non-compressible or having no-fixed values among fields of the Ethernet header, may generate an EHC header and include an indicator indicating that the Ethernet header has been compressed or a context identifier corresponding thereto in the EHC header, and may perform integrity protection or ciphering of data having the compressed Ethernet header and transmit the data. Here, since there is no data loss for the AM bearer and the reception PDCP layer device performs reordering and data processing in ascending order of the COUNT values, when receiving data including the full Ethernet header, the uncompressed Ethernet header, or the EHC header including the indicator indicating that compression does not occur, by performing deciphering or integrity verification thereof, the reception PDCP layer device of the reception terminal may store field values of full Ethernet header fields and store a context identifier corresponding thereto, and may not generate feedback and may not use the feedback for the AM bearer (according to another method, one feedback is generated and transmitted together with the UM bearer). When the reception PDCP layer device of the reception terminal receives data including a compressed Ethernet header or an EHC header including an indicator indicating that compression is performed, by performing deciphering or integrity verification thereof, the reception PDCP layer device may recover or reconstruct the compressed or omitted header fields or field values in the compressed Ethernet header from a buffer or context for the context identifier corresponding to data and configure the full Ethernet header fields or perform decompression thereof to transmit the same to a higher layer device. Here, when the ROHC header compression procedure is also configured, the ROHC header compression or decompression procedure may be independently performed for a higher layer device header other than the Ethernet header.

2> Fourth method: With regard to an AM bearer, when data for a certain context identifier is transmitted for the first time, when no feedback is received for the full Ethernet header (or uncompressed Ethernet header) transmitted for a certain context identifier, or when the context for Ethernet header compression or decompression is initialized, the transmission PDCP layer device may generate an EHC header together with the full uncompressed Ethernet header, configure, in the EHC header, a context identifier or an indicator indicating that compression does not occur, perform integrity protection or ciphering of data corresponding thereto and transmit the data once. With regard to subsequent data, the transmission PDCP layer device may start the Ethernet header compression for data to be transmitted. Specifically, the transmission PDCP layer device may compress or omit fields which are compressible or having a fixed value and include fields which are non-compressible or having no-fixed values among fields of the Ethernet header, may generate an EHC header and include an indicator indicating that the Ethernet header has been compressed or a context identifier corresponding thereto in the EHC header, and may perform integrity protection or ciphering of data having the compressed Ethernet header and transmit the data. Here, since there is no data loss for the AM bearer and the reception PDCP layer device performs reordering and data processing in ascending order of the COUNT values, when receiving data including the full Ethernet header, the uncompressed Ethernet header, or the EHC header including the indicator indicating that compression does not occur, by performing deciphering or integrity verification thereof, the reception PDCP layer device of the reception terminal may store field values of full Ethernet header fields and store a context identifier corresponding thereto, and may not generate feedback and may not use the feedback for the AM bearer (according to another method, one feedback is generated and transmitted together with the UM bearer). When the reception PDCP layer device of the reception terminal receives data including a compressed Ethernet header or an EHC header including an indicator indicating that compression is performed, by performing deciphering or integrity verification thereof, the reception PDCP layer device may recover or reconstruct the compressed or omitted header fields or field values in the compressed Ethernet header from a buffer or context for the context identifier corresponding to data and configure the full Ethernet header fields or perform decompression thereof to transmit the same to a higher layer device. Here, when the ROHC header compression procedure is also configured, the ROHC header compression or decompression procedure may be independently performed for a higher layer device header other than the Ethernet header. With regard to a UM bearer, when data for a certain context identifier is transmitted for the first time, when no feedback is received for the full Ethernet header (or uncompressed Ethernet header) transmitted for a certain context identifier, or when the context for Ethernet header compression or decompression is initialized, the transmission PDCP layer device may generate an EHC header together with the full uncompressed Ethernet header, configure, in the EHC header, a context identifier or an indicator indicating that compression does not occur, perform integrity protection or ciphering of data corresponding thereto and transmit the data. Further, the transmission PDCP layer device may include the uncompressed Ethernet header, the full Ethernet header, or the EHC header in the data and perform transmission of the data until feedback indicating successful reception of the data including the full Ethernet header, the uncompressed Ethernet header, or the EHC header is received. When feedback indicating successful reception of the data including the full Ethernet header, the uncompressed Ethernet header, or the EHC header is received, the transmission PDCP layer device may start Ethernet header compression for data to be transmitted. Specifically, the transmission PDCP layer device may compress or omit fields which are compressible or having a fixed value and include fields which are non-compressible or having no-fixed values among fields of the Ethernet header, may generate an EHC header and include an indicator indicating that the Ethernet header has been compressed or a context identifier corresponding thereto in the EHC header, and may perform integrity protection or ciphering of data having the compressed Ethernet header and transmit the data. Here, the reception PDCP layer device of the reception terminal may introduce a separate timer (through the RRC message, a timer value may be configured for each bearer or for each PDCP layer device, or may be configured together with an Ethernet header compression or decompression function) to perform a procedure of preventing frequent feedback from occurring, as follows.

3> The timer value configured above may be applied when the reception PDCP layer device drives a timer, and the timer may be driven for each context identifier.
3> In the above, when the reception PDCP layer device of the reception terminal receives data including the full Ethernet header, the uncompressed Ethernet header, or the EHC header including an indicator indicating that compression does not occur, by performing deciphering or integrity verification thereof
    4> When a timer for a context identifier corresponding to the received data is not running
        5> The reception PDCP layer device may store field values of full Ethernet header fields, store a context identifier corresponding thereto, generate feedback, include a context identifier corresponding to data or an indicator indicating successful reception in the feedback, and transmit the same. Further, the reception PDCP layer device may allow feedback to be transmitted without being applied with integrity protection or ciphering procedure, so as to enable fast processing.
        5> The reception PDCP layer device may start a timer for the context identifier corresponding to the received data.
3> When the reception PDCP layer device of the reception terminal receives data including a compressed Ethernet header or an EHC header including an indicator indicating that compression has been occurred, by performing deciphering or integrity verification thereof
    4> The reception PDCP layer device may, without generating feedback, recover or reconstruct the compressed or omitted header fields or field values in the compressed Ethernet header from a buffer or context for the context identifier corresponding to data and configure the full Ethernet header fields to perform decompression. Here, when the ROHC header compression procedure is also configured, the ROHC header compression or decompression procedure may be independently performed for a higher layer device header other than the Ethernet header.
    4> When a timer for a context identifier corresponding to the received data is running, the timer may be interrupted.
3> When the timer for a context identifier has expired
    4> The reception PDCP layer device may generate feedback correspond to a context identifier, include the context identifier or an indicator indicating successful reception in the feedback, and transmit the same. Further, the reception PDCP layer device may allow feedback to be transmitted without being applied with integrity protection or ciphering procedure, so as to enable fast processing.
    4> The timer corresponding to the context identifier may be restarted.
1> In the above, when a UE receives an RRC message (e.g., RRCReconfiguration message) or an RRCReconfiguration message including ReconfigurationWithSync information, when an indicator indicating continuous use of the context for Ethernet header compression or decompression is configured for each bearer or in PDCP layer device configuration information.

2> When a PDCP re-establishment procedure is indicated or performed for the bearer or PDCP layer device 3> With regard to an AM bearer, when the indicator indicating continuous use of the context for Ethernet header compression or decompression is not configured in the PDCP layer device configuration information, an Ethernet header decompression procedure may be performed by applying the context for Ethernet header compression or decompression to data (PDCP SDU or PDCP PDU) stored for the AM bearer or all stored data (PDCP SDU).

3> With regard to the AM bearer or UM bearer, when the indicator indicating continuous use of the context for Ethernet header compression or decompression is not configured in the PDCP layer device configuration information, the context for Ethernet header compression or decompression, with regard to the uplink, may be initialized or released. In addition, the transmission PDCP layer device may transmit data including the uncompressed Ethernet header or the full Ethernet header.

3> With regard to the AM bearer or UM bearer, when the indicator indicating continuous use of the context for Ethernet header compression or decompression is configured in the PDCP layer device configuration information, the transmission PDCP layer device may continue to apply the Ethernet header compression procedure to data to be transmitted and transmit data including the compressed Ethernet header, without initializing or releasing the context for Ethernet header compression or decompression with regard to the uplink.

3> With regard to the AM bearer or UM bearer, when the indicator indicating continuous use of the context for Ethernet header compression or decompression is not configured in the PDCP layer device configuration information, the context for Ethernet header compression or decompression with regard to the downlink may be initialized or released. In addition, the transmission PDCP layer device may transmit data including the uncompressed Ethernet header or the full Ethernet header.

3> With regard to the AM bearer or UM bearer, when the indicator indicating continuous use of the context for Ethernet header compression or decompression is configured in the PDCP layer device configuration information, the transmission PDCP layer device may continue to apply the Ethernet header compression procedure to data to be transmitted and transmit data including the compressed Ethernet header, without initializing or releasing the context for Ethernet header compression or decompression with regard to the downlink.

1> In the above, when the UE receives an RRC message (e.g., RRCReconfiguration message) or an RRCReconfiguration message including ReconfigurationWithSync information (when an indicator indicating continuous use of the context for Ethernet header compression or decompression is configured for each bearer or in PDCP layer device configuration information), 2> When a PDCP re-establishment procedure is indicated or performed for the bearer or PDCP layer device 3> The Ethernet header decompression procedure may be performed by applying the context for Ethernet header compression or decompression to data (PDCP SDU or PDCP PDU) stored for the AM bearer or all stored data (PDCP SDU).

3> With regard to the AM bearer or UM bearer, when the context for Ethernet header compression or decompression with regard to the uplink may be initialized or released. In addition, the transmission PDCP layer device may transmit data including the uncompressed Ethernet header or the full Ethernet header.

3> With regard to the AM bearer or UM bearer, when the context for Ethernet header compression or decompression with regard to the downlink may be initialized or released. In addition, the transmission PDCP layer device may transmit data including the uncompressed Ethernet header or the full Ethernet header.

In the second embodiment of an efficient handover method of FIG. 1O, when a UE 1*o*-20 receives a handover command message from a source base station 1*o*-05 while performing data transmission or reception to or from the source base station in the first stage 1*o*-01, in case that the second embodiment of the efficient handover method described in the disclosure (e.g., the DAPS handover method) is indicated through the received handover command message, or when the same is indicated for each bearer, even when the handover command message is received, data transmission or reception can be continuously performed through the source base station and protocol layer devices 1*o*-22 of a first bearer in order to minimize data interruption time that occurs during handover.

In addition, when the RRC layer device identifies the indication for the second embodiment (e.g., DAPS handover method) of the efficient handover method described in the disclosure through the handover command message or confirms the indicator for the DAPS handover method for each bearer, the RRC layer device transfers the indicator to each bearer or a PDCP layer device corresponding to a bearer for which the DAPS handover method is indicated, and when the PDCP layer device receives this indicator, the PDCP layer device is switched to the structure of the second PDCP layer device from the structure of the first PDCP layer device. Here, the first PDCP layer device structure may indicate a general PDCP layer device structure in which a compression procedure, or a ciphering, a deciphering, an integrity protection, or a verification procedure may be performed, based on one compression context or security key, for data to be transmitted to the base station or data received from the base station. In addition, the second PDCP layer device structure may indicate a structure in which one PDCP layer device may store a header (or data) compression context or security key for a source base station, and may perform a compression procedure, or a ciphering, a deciphering, an integrity protection, or a verification procedure, based on the stored header compression context or security key, of data to be transmitted to the base station or data received from the base station.

In addition, the second PDCP layer device structure may indicate a structure in which a header (or data) compression context or security key for a target base station is separately stored and a compression procedure, or a ciphering, a deciphering, an integrity protection, or a verification procedure may be performed, based on the stored header compression context or security key, of data to be transmitted to the target base station or data received from the target base station. Here, the first stage may include a stage in which the UE receives a handover command message (RRCReconfiguration message) from the base station. In addition, when switching to the second PDCP layer device structure according to the configuration included in the received handover command message, the protocol layer devices (PHY layer device, MAC layer device, RLC layer device, or PDCP layer device, 1o-21) of the second bearer for the target base station may be pre-configured or established. In addition, it is possible to derive and update the security key for the target base station, and a header (or data) compression context for the target base station is configured.

Further, in case that the UE receives the handover command message, the DAPS handover method described in the disclosure is indicated through the handover command message, the DAPS handover method is indicated for specific bearers, or the PDCP reordering timer value is newly configured, the UE may update the variable for reordering to a PDCP serial number or COUNT value expected to receive next, and stop and restart a reordering timer when switching from the first PDCP layer device structure or function thereof to the second PDCP layer device structure or function thereof described in the disclosure for each bearer or for bearers for which the DAPS handover method is indicated. In addition, upon receiving the handover command message (e.g., RRC Reconfiguration message), the RRC layer device of the UE may start a first timer (e.g., T304). In addition, the first timer may be interrupted when a procedure of a random access to the target base station is performed and the random access procedure is successfully completed (e.g., when the first condition described in the disclosure is satisfied). When the first timer expires due to handover failure, in case that a connection to the source base station is valid, a fallback is performed, the handover failure is reported to the source base station, and a connection recovery is attempted. When the connection to the source base station is not valid, the RRC connection re-establishment procedure may be performed.

In an embodiment, the handover command message is configured and established such that the second bearer has the same bearer identifier as that of the first bearer so as to prevent data interruption time from occurring for each bearer. Further, in the second embodiment, the PDCP layer device of the first bearer and the PDCP layer device of the second bearer may logically operate like one PDCP layer device, and a more detailed operation method will be described in FIG. 1I. In addition, in the second embodiment, when the UE enables transmission of the uplink data to both the source base station and the target base station, uplink data transmission in the second embodiment can be performed to only one of the source base station and the target base station in order to prevent a coverage reduction problem due to insufficient transmission power of a UE or a problem (that is, link selection) of requesting a transmission resource from a base station and determining whether to transmit uplink data to a base station when performing uplink data transmission.

Specifically, in the second embodiment, when the UE does not have the capability of simultaneously transmitting uplink data (dual uplink transmission) to different base stations at different frequencies or at the same frequency, the uplink data transmission to only one of the source base station and the target base station, can be performed by the UE in a single time unit. Therefore, the UE may request scheduling from only one of the source base station and the target base station, and may transmit a report of the size of data to be transmitted from the PDCP layer device (e.g., a buffer status report transmission) to only one base station among the source base station and the target base station and receive an uplink transmission resource, thereby transmit the uplink data to only one of the base stations.

In addition, even when the UE receives the handover command message from the source base station, the UE does not initialize the MAC layer device of the first bearer in order to prevent data loss by continuing data transmission or reception due to HARQ retransmission. In addition, the RLC layer device in the AM mode may continue RLC retransmission. According to another method, when the second embodiment (DAPS handover method) of the efficient handover method described in the disclosure is indicated for each bearer through the handover command message, data transmission or reception to or from the source base station can be performed only for a PDCP layer device, an RLC layer device, or an MAC layer device corresponding to a bearer or logical channel identifier for which the second embodiment (DAPS handover method) is indicated through the handover command message, or only for data corresponding to the bearer or logical channel identifier.

In addition, even when the first condition described in the disclosure is satisfied (when uplink data transmission is switched to the target base station), RLC control data (RLC status report), PDCP control data (ROHC feedback, PDCP status report, EHC feedback (feedback of the Ethernet header compression method), or HARQ retransmission may be continuously transmitted or received to the source base station only for a PDCP layer device, an RLC layer device, or an MAC layer device corresponding to a bearer or logical channel identifier for which the second embodiment (DAPS handover method) is indicated through the handover command message. In addition, when the second embodiment (DAPS handover method) of the efficient handover method described in the disclosure is indicated or has been indicated for each bearer through the handover command message, data transmission or reception to or from the source base station can be interrupted with regard to a PDCP layer device, an RLC layer device, or an MAC layer device corresponding to a bearer or logical channel identifier for which the second embodiment (DAPS handover method) is not indicated through the handover command message.

In the second embodiment of the efficient handover method of FIG. 1O, even when the UE 1o-20 performs a procedure of random access to the target base station 1o-10 indicated through the handover command message through protocol layer devices of the second bearer in the second stage 1o-02, the UE may continue to perform data transmission or reception (uplink data transmission or downlink data reception) to or from the source base station through the protocol layer devices of the first bearer. The second stage may include the UE performing a cell selection or reselection procedure, and performing a procedure of random access to a target cell indicated through a handover command message (RRCReconfiguration message) received from the source base station.

According to the second embodiment of the efficient handover method of FIG. 1O, when the UE 1o-20 satisfies the first condition in a third stage 1o-03, the UE 1o-20 may stop transmitting uplink data to the source base station through the protocol layer devices 1o-22 of the first bearer, with regard to a bearer for which the DAPS handover method is configured, and may transmit the uplink data to the target base station through the protocol layer devices 1o-21 of the second bearer. Further, the UE may continue to receive downlink data from the source base station and the target base station through protocol layer devices of the first bearer and the second bearer. Here, the third stage includes the UE switching the uplink transmission from the source base station to the target base station when the first condition is satisfied. Specifically, the third stage includes the UE transmitting uplink data to the source base station until the first condition is satisfied, and when the first condition is satisfied, stopping transmission of uplink data to the source base station through the first bearer and starting transmission of uplink data to the target base station through the second bearer. Specifically, the PDCP layer device in the second PDCP layer device structure of the disclosure, for the bearers for which the DAPS handover method is configured, satisfies the first condition while transmitting uplink data through the first bearer and receives the indicator from a lower layer device (when the random access procedure from the MAC layer device to the target base station is successful) or a higher layer device (when the first timer expires in the RRC layer device), the PDCP layer device may stop and switch transmission of uplink data through the first bearer to thereby start uplink data transmission through the second bearer. In addition, as shown in the structure of the PDCP layer device described in FIG. 1I, the reception PDCP layer device 1o-21 of the second bearer may be driven like one together with the reception PDCP layer device 1o-22 of the first bearer, and may continuously perform data reception from the source base station or the target base station by using stored transmission/reception data, serial number information, or information such as header compression and decompression context. Here, the first condition may be one of the following conditions. The first condition to be described below describes an uplink data transmission switching time at which transmission resources are most efficiently used and data interruption time can be minimized as much as possible.

It may be determined that the first condition is satisfied when the UE successfully completes the procedure of random access to the target base station through the layer devices of the second bearer (e.g., MAC layer device), when the UE successfully completes the procedure of random access to the target base station through the layer devices of the second bearer (e.g., MAC layer device) and receives allocation of the first uplink transmission resource from the target base station, or when the uplink transmission resource is first indicated to the UE.

For example, more specifically, when the UE receives a handover command message from the source base station and receives an indication for random access to the target base station, when the indicated random access is a contention-free random access procedure (CFRA) (e.g., when a pre-designated preamble or UE cell identifier (e.g., C-RNTI) is assigned)

Since the random access procedure may be considered as being successfully completed when the UE transmits a predetermined preamble to a cell of the target base station and receives a random access response (RAR) message, it may be determined that the first condition is satisfied when the first uplink transmission resource, which is assigned, included, or indicated in the random access response message, is received. According to another method, it may be determined that the first condition is satisfied when an uplink transmission resource is received for the first time after RAR reception.

When the UE receives a handover command message from the source base station and receives an indication for random access to the target base station, when the indicated random access is a contention-based random access procedure (CBRA) (for example, when a pre-designated preamble or UE cell identifier (e.g., C-RNTI) is not assigned)

when the UE transmits a preamble (e.g., a random preamble) to the cell of the target base station, receives a random access response (RAR) message, transmits message 3 (e.g., handover completion message) by using the uplink transmission resource allocated, included, or indicated through the random access response message, receives MAC CE indicating that contention has been resolved (contention resolution MAC CE) through message 4 from the target base station, or receives the uplink transmission resource through the PDCCH corresponding to the C-RNTI of the UE, the UE may consider that the procedure of random access to the target base station has been successfully completed, and thereafter the UE may monitor the PDCCH and determine that the first condition is satisfied when the uplink transmission resource is received for the first time or when an indication is received for the first time through the PDCCH corresponding to the C-RNTI of the UE. According to another method, when the size of the uplink transmission resource allocated through the random access response message is sufficient to transmit message 3 and the UE is capable of additionally transmitting uplink data, it may be determined that the uplink transmission resource has been received for the first time and the first condition is satisfied. That is, when the RAR is received, it may be determined that the uplink transmission resource has been received for the first time, and it may be determined that the first condition is satisfied.

When a handover method (RACH-less handover) that does not require a random access procedure is also indicated in the handover command message received by the UE, When the uplink transmission resource for the target base station is included in the handover command message, When the UE transmits message 3 (e.g., a handover completion message or an RRCReconfiguration-Complete message) via the uplink transmission resource of the target base station and receives a UE identity confirmation MAC CE from the base station through message 4, or when the UE receives the uplink transmission resource through the PDCCH corresponding to the C-RNTI of the UE, it may be determined that the random access procedure has been successfully completed and that the first condition is satisfied. According to another method, it may be determined that the first condition is satisfied when the first uplink transmission resource is received through the PDCCH corresponding to the C-RNTI of the UE by monitoring the PDCCH after the random access procedure is successfully completed.

When the uplink transmission resource for the target base station is not included in the handover command message When the UE receives an uplink transmission resource through the PDCCH corresponding to the C-RNTI of the UE by performing PDCCH monitoring for the target base station (or cell), transmits message 3 (e.g., a handover completion message or RRCReconfigurationComplete message) via an uplink transmission resource and receives a UE Identity Confirmation MAC CE from the base station, or receives an uplink transmission resource through the PDCCH corresponding to the C-RNTI of the UE, it may be determined that the random access procedure has been successfully completed and that the first condition is satisfied. According to another method, it may be determined that the first condition is satisfied when the first uplink transmission resource is received through the PDCCH corresponding to the C-RNTI of the UE by monitoring the PDCCH after the random access procedure is successfully completed.

Hereinafter, an efficient method for switching uplink data from a source base station to a target base station in the DAPS handover method described in the disclosure will be described. Whether the first condition is satisfied may confirmed or detected by one of the following methods through an MAC layer device or RRC layer device for a target base station corresponding to a second bearer, and the following methods are combined to be extended to a new method.

First method: For example, when the RRCReconfiguration message received by the UE indicates DAPS handover, the UE may configure a MAC layer device for the target base station corresponding to the second bearer, and the MAC layer device may perform a random access procedure and identify whether the first condition is satisfied. In addition, when the first condition is satisfied, the MAC layer device may transmit, to a higher layer device (e.g., a PDCP layer device) of a bearer for which the DAPS handover method is configured, an indicator indicating switching of uplink data transmission from a source base station through a first bearer to a target base station through a second bearer in the DAPS handover method described in the disclosure.

Second method: According to another method, for example, when the RRCReconfiguration message received by the UE indicates DAPS handover, the UE may configure a MAC layer device for the target base station corresponding to the second bearer, and the MAC layer device may perform a random access procedure and identify whether the first condition is satisfied. In addition, when the first condition is satisfied, the MAC layer device may transmit an indicator indicating that the first condition is satisfied to a higher layer device (e.g., the RRC layer device). Further, the higher layer device (e.g., RRC layer device) may transmit, to a lower layer device (e.g., a PDCP layer device) of a bearer for which the DAPS handover method is configured, an indicator indicating switching of uplink data transmission from a source base station through a first bearer to a target base station through a second bearer in the DAPS handover method described in the disclosure. Here, when the first condition described in the disclosure is satisfied, or when the procedure of random access to the target base station is successfully performed, the higher layer device (for example, the RRC layer device) stops the first timer. Therefore, when the first timer is interrupted, the RRC layer device may transmit, to the PDCP layer device of the bearer for which the DAPS handover method is configured, the indicator indicating to switch uplink data transmission.

Third method: When the RRCReconfiguration message received by the UE indicates DAPS handover, the UE may configure a MAC layer device for the target base station corresponding to the second bearer, and when the RRC layer device of the UE transmits an indicator indicating to perform DAPS handover to a lower layer device (e.g., a MAC layer device), the MAC layer device may perform a random access procedure and identify whether the first condition is satisfied. In addition, when the first condition is satisfied, the MAC layer device may transmit, to a higher layer device (e.g., a PDCP layer device) of a bearer for which the DAPS handover method is configured, an indicator indicating switching of uplink data transmission from a source base station through a first bearer to a target base station through a second bearer in the DAPS handover method described in the disclosure.

Fourth method: According to another method, when the RRCReconfiguration message received by the UE indicates DAPS handover, the UE may configure a MAC layer device for the target base station corresponding to the second bearer, and when the RRC layer device of the UE transmits an indicator indicating that the RRC layer device performs DAPS handover to a lower layer device (e.g., a MAC layer device), the MAC layer device may perform a random access procedure and identify whether the first condition is satisfied. In addition, when the first condition is satisfied, the MAC layer device may indicate to a higher layer device (e.g., the RRC layer device) that the first condition is satisfied. When this indicator is confirmed, since the higher layer device (e.g., the RRC layer device) stops the first timer when the first condition described in the disclosure is satisfied or when the procedure of random access to the target base station is successfully performed, the first timer may be interrupted. In addition, a higher layer device (e.g., an RRC layer device) may transmit, to a lower layer device (e.g., a PDCP layer device) of a bearer for which the DAPS handover method is configured, an indicator indicating switching of uplink data transmission from a source base station through a first bearer to a target base station through a second bearer in the DAPS handover method described in the disclosure.

According to the first method, the second method, the third method, or the fourth method, when the PDCP layer device receives, from the higher layer device (e.g., the RRC layer device) or the lower layer device (e.g., the MAC layer device), an indicator indicating that the first condition is satisfied or an indicator indicating to switch uplink data transmission from the source base station to the target base station (e.g., when the DAPS handover method is indicated), the PDCP layer device may perform the protocol layer device operation described below to effectively perform switching of uplink data transmission, and may perform one or multiple of the following operations to prevent data loss due to uplink data transmission. The following operations may be applied to a PDCP layer device connected to an AM DRB or UM DRB (an RLC layer device operating in the AM mode or an RLC layer device operating in the UM mode). Here, before satisfying the first condition or before receiving the indicator that the first condition is satisfied, when there is data to be transmitted in the buffer, the PDCP layer device may indicate the size or amount of data to be transmitted (e.g., PDCP data volume) to the MAC layer device of the first bearer for the source base station and notify of that there is data to be transmitted, and may perform uplink data transmission to the source base station. Then, the MAC layer device of the first bearer for the source base station may perform a procedure of scheduling request or buffer status report to the source base station in order to receive an allocation of uplink transmission resources. However, when the first condition is satisfied or an indicator indicating that the first condition is satisfied is received, uplink data transmission switching to the target base station, with regard to a bearer for which the DAPS handover method is configured, may be performed as follows.

The uplink or downlink ROHC context for the source base station is not initialized and used as it is, and the uplink or downlink ROHC context for the target base station may be initialized and started in an initial state (e.g., an IR state in U mode).

With regard to the first data (e.g., PDCP SDU), for which successful transmission from lower layers (e.g., the RLC layer device corresponding to the first bearer for the source base station) has not been confirmed, to pieces of data (PDCP SDUs in a buffer) in ascending order of the COUNT values (or PDCP serial numbers) allocated before the first condition is satisfied or before receiving the indicator that the first condition is satisfied, the PDCP layer device, which is connected to the AM DRB (RLC layer device operating in the AM mode) (all the previously stored PDCP PDUs are discarded (for example, PDCP SDUs are not discarded to prevent loss of original data)), performs a new header compression procedure based on the header context for the target base station, performs the integrity procedure or ciphering procedure again by applying the security keys for the target base station and configures a PDCP header, and transmits the same to the lower layer device (the RLC layer device of the second bearer for the target base station) to perform retransmission or transmission. That is, the transmission terminal performs cumulative retransmission from the first data for which successful transmission has not been confirmed.

According to another method, when performing retransmission in the above, retransmission may be performed for only data for which successful transmission from lower layers (e.g., RLC layer devices of the first bearer for the source base station) has not been confirmed. More specifically, with regard to only pieces of data (e.g., PDCP SDU) for which successful transmission from lower layers (e.g., RLC layer devices) which are the first protocol layer device for the source base station has not been confirmed, the PDCP layer device, which is connected to the AM DRB (or the RLC layer device operating in AM mode) (all the previously stored PDCP PDUs for transmission to the source base station through the first protocol layer device connected to the PDCP layer device are discarded (for example, PDCP SDUs are not discarded to prevent loss of original data)) performs a new header or data compression procedure by applying a security key or a header compression (or data compression) protocol context corresponding to the target base station based on the COUNT value (or PDCP serial number) allocated before the first condition is satisfied or before receiving an indicator indicating that the first condition is satisfied, is performed by applying the security key, performs the integrity procedure or ciphering procedure again to configure the PDCP header, and transmits the same to the lower layer device, which is the second protocol layer device for transmission to the target base station, to perform retransmission or transmission. That is, in order to prevent wastage of transmission resources, selective retransmission may be performed only on data for which successful transmission has not been confirmed.

According to another method, the transmission or retransmission operation may be performed after releasing lower layers (e.g., transmission or reception RLC layer device or MAC layer device) which are the first protocol layer devices for transmitting data to the source base station. When the transmission or retransmission procedure is extended to UM DRB, the PDCP layer device, which is connected to the RLC layer device operating in the UM mode may regard, as data received from a higher layer device or newly received data, data that has not yet been transmitted to a lower layer device, data for which a PDCP discard timer has not expired, or data to which the PDCP serial number (or COUNT value) has already been assigned, may not restart the PDCP discard timer for each data, may perform header (or data) compression for the data by using a header (or data) compression context or security key for the target base station or perform the ciphering or integrity protection procedure thereof, and may generate and conjugate the PDCH header to perform transmission or retransmission. Before this procedure is triggered, data can be processed in the ascending order of the COUNT values allocated and transmission or retransmission can be performed. In addition, the window state variable of the PDCP layer device, which is connected to the UM DRB or AM DRB is not initialized, but is maintained and used as it is.

When there is data to be transmitted in the buffer, the PDCP layer device may transmit an indication indicating the size or amount of data to be transmitted (for example, PDCP data volume) to the MAC layer device of the second bearer for the target base station to inform that there is data to be transmitted, and may perform switching uplink data transmission to the target base station. Then, the MAC layer device of the second bearer for the target base station may perform a procedure of scheduling request or buffer status report to the target base station in order to receive an allocation of uplink transmission resources.

In the second embodiment (e.g., DAPS handover method) of the efficient handover method described in the disclosure, even after the UE receives a handover command message (e.g., RRCReconfiguration message), the UE may continue to receive downlink data from the source base station or the target base station through the protocol layer devices of the first bearer for the source base station or the second bearer for the target base station, and the UE can continue to receive downlink data from the source base station (or target base station). Further, the UE may allow, with regard to AM bearers, the RLC status report other than data to be continuously transmitted via uplink transmission to the source base station (or target base station) through the protocol layer devices of the first bearer (or the second bearer), so as to enable the UE to smoothly receive downlink data from the source base station (or target base station) or to enable the source base station (or target base station) to smoothly transmit downlink data. That is, even when the first condition is satisfied and thus the UE switches uplink data transmission to the target base station, when the RLC status report, HARQ ACK or NACK, or PDCP control data (PDCP ROHC feedback, PDCP status report, or EHC feedback (feedback of the Ethernet header compression method)) need to be transmitted to the source base station, data transmission may be allowed to be performed through the first bearer for the source base station. This is because, in a case of AM bearers, after transmitting data to the transmission terminal, when successful transmission is not indicated by the RLC status report (i.e., when the RLC status report is not received), data cannot be continuously transmitted thereafter.

Specifically, in the second embodiment of the efficient handover method of FIG. 1O, even when, in the third stage 1o-03, the first condition is satisfied and thus the UE 1o-20 stops transmission of uplink data to the source base station through the protocol layer devices 1o-22 of the first bearer and switches to start uplink data transmission to the target base station through the protocol layer devices 1o-21 of the second bearer, the UE may continue to transmit HARQ ACK or HARQ NACK information, RLC status report (ACK or NACK information), PDCP control data (e.g., PDCP status report, ROHC feedback information, or EHC feedback (feedback of the Ethernet header compression method) through protocol layer devices of the first bearer (or the second bearer), so as to enable the UE to smoothly receive downlink data from the source base station (or target base station) or to enable the source base station (or target base station) to smoothly transmit downlink data. In addition, in the second embodiment of the efficient handover method of FIG. 1O, even when, in the third stage 1o-03, the first condition is satisfied and thus the UE stops transmission of uplink data to the source base station through the protocol layer devices 1o-22 of the first bearer and switches to start uplink data transmission to the target base station through the protocol layer devices 1o-21 of the second bearer, the UE may continue to perform data transmission due to HARQ retransmission of the MAC layer device or data transmission due to retransmission of the AM mode RLC layer device in order to prevent data loss to the source base station. Here, in the third stage 1o-03, when the first condition is satisfied and thus the UE 1o-20 stops transmission of uplink data to the source base station through the protocol layer devices 1o-22 of the first bearer and switches to start uplink data transmission to the target base station through the protocol layer devices 1o-21 of the second bearer, the source base station or the target base station may divide time and accordingly allocate transmission resources to the UE so that the uplink transmission resource to the target base station and the uplink transmission resource to the source base station do not collide. When the uplink transmission resource to the target base station and the uplink transmission resource to the source base station collide and overlap, the UE may prioritize uplink transmission resources to the source base station and perform data transmission to the source base station in order to maintain or continuously receive downlink data transmission from the source base station without any problem. According to another method, when the uplink transmission resource to the target base station and the uplink transmission resource to the source base station collide and overlap, the UE may prioritize uplink transmission resources to the target base station and perform data transmission to the target base station in order to maintain downlink data transmission from the target base station.

Specifically, when the UE receives the handover command message, when a handover (e.g., DAPS handover) corresponding to the second embodiment of the disclosure is indicated or when the handover is indicated for each bearer, the UE or the bearer for which the DAPS handover is indicated may perform a scheduling request through the first protocol layer device and transmit a buffer status report to the source base station, before the first condition is satisfied, to receive uplink transmission resources, may transmit uplink data, and receive downlink data from the source base station. However, when the first condition is satisfied, the UE no longer transmits data to the source base station and switches the uplink to perform a scheduling request through the second protocol layer device, and may transmit a buffer status report to the target base station to receive the uplink transmission resource and transmit uplink data to the target base station. However, the UE may continue to receive downlink data from the source base station, and even after switching uplink transmission, the UE may continue to transmit the HARQ ACK or HARQ NACK, RLC status report, or PDCP control data (e.g., PDCP status report or ROHC feedback information) corresponding to the downlink data. In addition, the UE may continue to receive downlink data from the source base station or the target base station even when the first condition is satisfied.

In the second embodiment of the efficient handover method of FIG. 1O, in fourth stage 1o-04, when the UE 1o-20 satisfies the second condition, the UE may stop reception of downlink data from the source base station 1o-05 through the protocol layer devices 1o-22 of the first bearer or release a connection to the source base station. The second condition may be one of the following conditions. In addition, the PDCP layer device 1o-21 of the second bearer may continuously perform data transmission or reception to or from the target base station by using transmission or reception data, serial number information, or information such as header compression and decompression context, stored in the PDCP layer device 1o-22 of the first bearer.

It may be determined that the second condition is satisfied when the UE receives a message (e.g., an RRC message (e.g., RRCReconfiguration message) including an indicator to release the connection with the source base station, or MAC CE, RLC control PDU, or PDCP control PDU from the target base station.

When the UE performs the second embodiment (for example, the DAPS handover method) of the efficient handover method described in the disclosure, when it is identified that the RRC layer device, the MAC layer device, or the RLC layer device of the first bearer for the source base station of the UE, or the RRC layer device, the MAC layer device, or the RLC layer device of the second bearer for the target base station satisfy a second condition described in the disclosure, an indicator indicating that the second condition is satisfied may be transmitted to the PDCP layer device of the UE or bearer for performing the DAPS handover method. When the PDCP layer device of the UE receives an indicator indicating that the second condition is satisfied from a lower layer device or a higher layer device, or when the second condition is satisfied, one or more of the procedures, which will be described in the following, may be performed for the bearer or the UE for which the DAPS handover method is configured, to successfully complete the second embodiment of the efficient handover method of the disclosure.

The UE may release the first bearer for the source base station and release the connection with the source base station.

When the UE disconnects from the source base station, the UE may trigger a PDCP status reporting procedure and configure a PDCP status report to transmit the PDCP status report to the target base station, in order to report the reception status of downlink data, received from the source base station, to the target base station.

When the second condition is satisfied, the UE may switch the structure or function of the second PDCP layer device (indicated by reference numeral 1i-20) to the structure or function of the first PDCP layer device (indicated by reference numeral 1i-11 or 1i-12) described in the disclosure for each bearer or for a bearer for which the DAPS handover method is indicated, may initialize variables for reordering, and may interrupt and initialize a reordering timer. Further, the UE may perform a deciphering procedure or header (or data) decompression for pieces of data stored in a buffer for realignment (e.g., for pieces of data received from the source base station), by applying a security key or header decompression context for the source base station, and then may discard the security key or header decompression (e.g., ROCH, EHC, or UDC) context (e.g., ROCH context, EHC context, or UDC context) for the source base station. In addition, the UE may transmit the processed data to the higher layer in ascending order. That is, in the above case, when the second condition is satisfied, the UE may perform a deciphering procedure or header (or data) decompression for pieces of data stored in a buffer for realignment (e.g., for pieces of data received from the source base station), by applying a security key or header decompression context for the source base station, and then may discard the security key or header decompression context (e.g., ROCH context, EHC context, or UDC context) for the source base station (or the buffer for the UDC method may be initialized). In another method, when the second condition is satisfied, the UE may switch the structure or function of the second PDCP layer device (indicated by reference numeral 1$i$-20) to the structure or function of the third PDCP layer device (indicated by reference numeral 1$i$-30) described in the disclosure for each bearer or for a bearer for which the DAPS handover method is indicated, and may use variables for realignment and a reordering timer as they are without stopping and initializing. However, the UE may perform a deciphering procedure or header (or data) decompression for pieces of data stored in a buffer for realignment (e.g., for pieces of data received from the source base station), by applying a security key or header decompression context (e.g., ROCH context, EHC context, or UDC context) for the source base station, and then may discard the security key or header decompression context (e.g., ROCH context, EHC context, or UDC context) for the source base station. In addition, the UE may transmit the processed data to the higher layer in ascending order. That is, in the above case, when the second condition is satisfied, in case that a security key or header decompression context (e.g., ROCH method, EHC method, or UDC method) for the source base station is configured, the UE may perform a deciphering procedure or header (or data) decompression for pieces of data stored in a buffer for realignment (e.g., for pieces of data received from the source base station) by applying ROCH context, EHC context, or UDC context, and then may discard the security key or header decompression context for the source base station. The UE may release QoS mapping information of the SDAP layer device for the source base station, the security key information for the source base station of the PDCP layer device, the header (or data) compression context information for the source base station, or the RLC layer device or MAC layer device for the source base station.

When the MAC layer device for the source base station is initialized and the second PDCP layer device structure of the bearer for which the DAPS handover method is configured is switched to the first PDCP layer device structure, an RLC layer device re-establishment procedure or a release procedure may be performed with regard to the RLC layer device for the source base station in the second PDCP layer device structure.

The reception PDCP layer device may process the data received due to the re-establishment procedure of the lower layer device, and with regard to UM DRBs, may perform a header decompression procedure on the stored data (received from the source base station) or all stored data, based on header compression context (ROHC, Ethernet header compression (EHC), or UDC) (for the source base station).

The reception PDCP layer device may process the data received due to the re-establishment procedure of the lower layer device, and with regard to AM DRBs, may perform a header decompression procedure on the stored data (received from the source base station) or all stored data, based on header compression context (ROHC, Ethernet header compression (EHC), or UDC) (for the source base station).

As another method, the reception PDCP layer device may process the data received due to the re-establishment procedure of the lower layer device, and with regard to UM DRBs or AM DRBs, when an indicator (drb-Continue ROHC or drb-Continue Ethernet header compression (EHC)) indicating that continued use of the header compression context is not configured, may perform a header decompression procedure on the stored data (received from the source base station) or all stored data, based on header compression context (ROHC or Ethernet header compression (EHC)).

After performing the above procedure, the transmission or reception PDCP layer device may discard or release the security key or header compression contexts for the source base station.

The Ethernet header compression or decompression procedure described above may perform and apply detailed operation as follows, with regard to the Ethernet header compression or decompression method for the target base station, when the DAPS handover method is indicated through an RRC message (e.g., RRCReconfiguration message) or when the DAPS handover method is indicated and the first condition is satisfied.

When a UE receives an RRCReconfiguration message or an RRCConnectionSetup message (or RRCResume message in a case of a resume procedure), the RRC message may indicate configuration information to the UE as follows.

1> It is possible to indicate whether to use configuration information for Ethernet header compression or decompression or Ethernet header compression or decompression function for each bearer or in PDCP layer device configuration information (PDCP-config).

2> When a dedicated traffic channel (DTCH) is used, the Ethernet header compression or decompression function may be configured to be used for a UM bearer (a PDCP layer device connected to an RLC layer device that uses a UM mode).

2> Only when using a dedicated traffic channel (DTCH) and/or not using a dedicated control channel (DCCH), the Ethernet header compression or decompression function may be configured to be used for an AM bearer (a PDCP layer device connected to an RLC layer device that uses an AM mode).

1> An indicator indicating whether to continue to use or initialize the context for Ethernet header compression or decompression may be configured for each bearer or in the PDCP layer device configuration information (PDCP-config). According to another method, when performing a re-establishment procedure of the PDCP layer device for each bearer or in the PDCP layer device configuration information (PDCP-config), an indicator indicating whether to continue to use or initialize the context for Ethernet header compression or decompression may be configured. According to another method, the context for Ethernet header compression or decompression may be always initialized when performing the re-establishment procedure of the PDCP layer device for each bearer or in a PDCP layer.

1> When the Ethernet header compression or decompression procedure has been configured, one or more of the following methods can be applied to perform the Ethernet header compression or decompression procedure.

2> First method: With regard to a UM or AM bearer, when data for a certain context identifier is transmitted for the first time, when no feedback is received for the full Ethernet header (or uncompressed Ethernet header) transmitted for a certain context identifier, or when the context for Ethernet header compression or decompression is initialized, the transmission PDCP layer device may generate an EHC header together with the full uncompressed Ethernet header, configure, in the EHC header, a context identifier or an indicator indicating that compression does not occur, perform integrity protection or ciphering of data corresponding thereto and transmit the data. Further, the transmission PDCP layer device may include the uncompressed Ethernet header, the full Ethernet header, or the EHC header in the data and perform transmission of the data until feedback indicating successful reception of the data including the full Ethernet header, the uncompressed Ethernet header, or the EHC header is received. When feedback indicating successful reception of the data including the full Ethernet header, the uncompressed Ethernet header, or the EHC header is received, the transmission PDCP layer device may start Ethernet header compression for data to be transmitted. Specifically, the transmission PDCP layer device may compress or omit fields which are compressible or having a fixed value and include fields which are non-compressible or having no-fixed values among fields of the Ethernet header, may generate an EHC header and include an indicator indicating that the Ethernet header has been compressed or a context identifier corresponding thereto in the EHC header, and may perform integrity protection or ciphering of data having the compressed Ethernet header and transmit the data. Here, when receiving data including the full Ethernet header, the uncompressed Ethernet header, or the EHC header including the indicator indicating that compression does not occur, by performing deciphering or integrity verification thereof, the reception PDCP layer device of the reception terminal may store field values of full Ethernet header fields, store a context identifier corresponding thereto, generate feedback, include a context identifier corresponding to data or an indicator indicating successful reception in the feedback, and transmit the same. Further, the reception PDCP layer device may allow the corresponding feedback to be transmitted without being applied with integrity protection or ciphering procedure, so as to enable fast processing. When the reception PDCP layer device of the reception terminal receives data including a compressed Ethernet header or an EHC header including an indicator indicating that compression is performed, by performing deciphering or integrity verification, the reception PDCP layer device may, without generating feedback, recover or reconstruct the compressed or omitted header fields or field values in the compressed Ethernet header from a buffer or context for the context identifier corresponding to data and configure the full Ethernet header fields or perform decompression thereof to transmit the same to a higher layer device. Here, when the ROHC header compression procedure is also configured, the ROHC header compression or decompression procedure may be independently performed for a higher layer device header other than the Ethernet header.

2> Second method: With regard to a UM or AM bearer, when data for a certain context identifier is transmitted for the first time, when no feedback is received for the full Ethernet header (or uncompressed Ethernet header) transmitted for a certain context identifier, or when the context for Ethernet header compression or decompression is initialized, the transmission PDCP layer device may generate an EHC header together with the full uncompressed Ethernet header, configure, in the EHC header, a context identifier or an indicator indicating that compression does not occur, perform integrity protection or ciphering of data corresponding thereto and transmit the data. Further, the transmission PDCP layer device may include the uncompressed Ethernet header, the full Ethernet header, or the EHC header in the data and perform transmission of the data until feedback indicating successful reception of the data including the full Ethernet header, the uncompressed Ethernet header, or the EHC header is received. When feedback indicating successful reception of the data including the full Ethernet header, the uncompressed Ethernet header, or the EHC header is received, the transmission PDCP layer device may start Ethernet header compression for data to be transmitted. Specifically, the transmission PDCP layer device may compress or omit fields which are compressible or having a fixed value and include fields which are non-compressible or having no-fixed values among fields of the Ethernet header, may generate an EHC header and include an indicator indicating that the Ethernet header has been compressed or a context identifier corresponding thereto in the EHC header, and may perform integrity protection or ciphering of data having the compressed Ethernet header and transmit the data. The reception PDCP layer device of the reception terminal may introduce a separate timer (through the RRC message, a timer value may be configured for each bearer or for each PDCP layer device, or may be configured together with an Ethernet header compression or decompression function) to perform a procedure of preventing frequent feedback from occurring, as follows.

3> The configured timer value may be applied when the reception PDCP layer device drives a timer, and the timer may be driven for each context identifier.

3> When the reception PDCP layer device of the reception terminal receives data including the full Ethernet header, the uncompressed Ethernet header, or the EHC header including an indicator indicating that compression does not occur, by performing deciphering or integrity verification thereof
    4> When a timer for a context identifier corresponding to the received data is not running
        5> The reception PDCP layer device may store field values of full Ethernet header fields, store a context identifier corresponding thereto, generate feedback, include a context identifier corresponding to data or an indicator indicating successful reception in the feedback, and transmit the same. Further, the reception PDCP layer device may allow feedback to be transmitted without being applied with the integrity protection or ciphering procedure, so as to enable fast processing.
        5> The reception PDCP layer device may start a timer for the context identifier corresponding to the received data.
    3> When the reception PDCP layer device of the reception terminal receives data including a compressed Ethernet header or an EHC header including an indicator indicating that compression has been occurred, by performing deciphering or integrity verification
        4> The reception PDCP layer device may, without generating feedback, recover or reconstruct the compressed or omitted header fields or field values in the compressed Ethernet header from a buffer or context for the context identifier corresponding to data and configure the full Ethernet header fields to perform decompression. When the ROHC header compression procedure is also configured, the ROHC header compression or decompression procedure may be independently performed for a higher layer device header other than the Ethernet header.
        4> When a timer for a context identifier corresponding to the received data is running, the timer may be interrupted.
    3> When the timer for a context identifier has expired
        4> The reception PDCP layer device may generate feedback correspond to a context identifier, include the context identifier or an indicator indicating successful reception in the feedback, and transmit the same. Further, the reception PDCP layer device may allow feedback to be transmitted without being applied with integrity protection or ciphering procedure, so as to enable fast processing.
        4> The timer corresponding to the context identifier may be restarted.
2> Third method: With regard to a UM bearer, when data for a certain context identifier is transmitted for the first time, when no feedback is received for the full Ethernet header (or uncompressed Ethernet header) transmitted for a certain context identifier, or when the context for Ethernet header compression or decompression is initialized, the transmission PDCP layer device may generate an EHC header together with the full uncompressed Ethernet header, configure, in the EHC header, a context identifier or an indicator indicating that compression does not occur, perform integrity protection or ciphering of data corresponding thereto and transmit the data. Further, the transmission PDCP layer device may include the uncompressed Ethernet header, the full Ethernet header, or the EHC header in the data and perform transmission of the data until feedback indicating successful reception of the data including the full Ethernet header, the uncompressed Ethernet header, or the EHC header is received. When feedback indicating successful reception of the data including the full Ethernet header, the uncompressed Ethernet header, or the EHC header is received, the transmission PDCP layer device may start Ethernet header compression for data to be transmitted. Specifically, the transmission PDCP layer device may compress or omit fields which are compressible or having a fixed value and include fields which are non-compressible or having no-fixed values among fields of the Ethernet header, may generate an EHC header and include an indicator indicating that the Ethernet header has been compressed or a context identifier corresponding thereto in the EHC header, and may perform integrity protection or ciphering of data having the compressed Ethernet header and transmit the data. Here, when receiving data including the full Ethernet header, the uncompressed Ethernet header, or the EHC header including the indicator indicating that compression does not occur, by performing deciphering or integrity verification thereof, the reception PDCP layer device of the reception terminal may store field values of full Ethernet header fields, store a context identifier corresponding thereto, generate feedback, include a context identifier corresponding to data or an indicator indicating successful reception in the feedback, and transmit the same. Further, the reception PDCP layer device may allow feedback to be transmitted without being applied with integrity protection or ciphering procedure, so as to enable fast processing. When the reception PDCP layer device of the reception terminal receives data including a compressed Ethernet header or an EHC header including an indicator indicating that compression is performed, by performing deciphering or integrity verification thereof, the reception PDCP layer device may, without generating feedback, recover or reconstruct the compressed or omitted header fields or field values in the compressed Ethernet header from a buffer or context for the context identifier corresponding to data and configure the full Ethernet header fields or perform decompression thereof to transmit the same to a higher layer device. Here, when the ROHC header compression procedure is also configured, the ROHC header compression or decompression procedure may be independently performed for a higher layer device header other than the Ethernet header. With regard to an AM bearer, when data for a certain context identifier is transmitted for the first time, when no feedback is received for the full Ethernet header (or uncompressed Ethernet header) transmitted for a certain context identifier, or when the context for Ethernet header compression or decompression is initialized, the transmission PDCP layer device may generate an EHC header together with the full uncompressed Ethernet header, configure, in the EHC header, a context identifier or an indicator indicating that compression does not occur, perform integrity protection or ciphering of data corresponding thereto and transmit the data once. With regard to subsequent data, the transmission PDCP layer device may start the Ethernet header compression for data to be transmitted. Specifically, the transmission PDCP layer device may compress or omit fields which are compressible or having a fixed value and include fields which are non-compressible or having no-fixed values among fields of the Ethernet header, may generate an EHC header and include an indicator indicating that the Ethernet header has been compressed or a context identifier corresponding thereto in the EHC header, and may perform integrity protection or ciphering of data having the compressed Ethernet header and transmit the data. Since there is no data loss for the AM bearer and the reception PDCP layer device performs reordering and data processing in ascending order of the COUNT values, when receiving data including the full Ethernet header, the uncompressed Ethernet header, or the EHC header including the indicator indicating that compression does not occur, by performing deciphering or integrity verification thereof, the reception PDCP layer device of the reception terminal may store field values of full Ethernet header fields and store a context identifier corresponding thereto, and may not generate feedback and may not use the feedback for the AM bearer (according to another method, one feedback is generated and transmitted together with the UM bearer). When the reception PDCP layer device of the reception terminal receives data including a compressed Ethernet header or an EHC header including an indicator indicating that compression is performed, by performing deciphering or integrity verification thereof, the reception PDCP layer device may recover or reconstruct the compressed or omitted header fields or field values in the compressed Ethernet header from a buffer or context for the context identifier corresponding to data and configure the full Ethernet header fields or perform decompression thereof to transmit the same to a higher layer device. When the ROHC header compression procedure is also configured, the ROHC header compression or decompression procedure may be independently performed for a higher layer device header other than the Ethernet header.

2> Fourth method: With regard to an AM bearer, when data for a certain context identifier is transmitted for the first time, when no feedback is received for the full Ethernet header (or uncompressed Ethernet header) transmitted for a certain context identifier, or when the context for Ethernet header compression or decompression is initialized, the transmission PDCP layer device may generate an EHC header together with the full uncompressed Ethernet header, configure, in the EHC header, a context identifier or an indicator indicating that compression does not occur, perform integrity protection or ciphering of data corresponding thereto and transmit the data once. With regard to subsequent data, the transmission PDCP layer device may start the Ethernet header compression for data to be transmitted. Specifically, the transmission PDCP layer device may compress or omit fields which are compressible or having a fixed value and include fields which are non-compressible or having no-fixed values among fields of the Ethernet header, may generate an EHC header and include an indicator indicating that the Ethernet header has been compressed or a context identifier corresponding thereto in the EHC header, and may perform integrity protection or ciphering of data having the compressed Ethernet header and transmit the data. Since there is no data loss for the AM bearer and the reception PDCP layer device performs reordering and data processing in ascending order of the COUNT values, when receiving data including the full Ethernet header, the uncompressed Ethernet header, or the EHC header including the indicator indicating that compression does not occur, by performing deciphering or integrity verification thereof, the reception PDCP layer device of the reception terminal may store field values of full Ethernet header fields and store a context identifier corresponding thereto, and may not generate feedback and may not use the feedback for the AM bearer (according to another method, one feedback is generated and transmitted together with the UM bearer). When the reception PDCP layer device of the reception terminal receives data including a compressed Ethernet header or an EHC header including an indicator indicating that compression is performed, by performing deciphering or integrity verification thereof, the reception PDCP layer device may recover or reconstruct the compressed or omitted header fields or field values in the compressed Ethernet header from a buffer or context for the context identifier corresponding to data and configure the full Ethernet header fields or perform decompression thereof to transmit the same to a higher layer device. When the ROHC header compression procedure is also configured, the ROHC header compression or decompression procedure may be independently performed for a higher layer device header other than the Ethernet header. With regard to a UM bearer, when data for a certain context identifier is transmitted for the first time, when no feedback is received for the full Ethernet header (or uncompressed Ethernet header) transmitted for a certain context identifier, or when the context for Ethernet header compression or decompression is initialized, the transmission PDCP layer device may generate an EHC header together with the full uncompressed Ethernet header, configure, in the EHC header, a context identifier or an indicator indicating that compression does not occur, perform integrity protection or ciphering of data corresponding thereto and transmit the data. Further, the transmission PDCP layer device may include the uncompressed Ethernet header, the full Ethernet header, or the EHC header in the data and perform transmission of the data until feedback indicating successful reception of the data including the full Ethernet header, the uncompressed Ethernet header, or the EHC header is received. When feedback indicating successful reception of the data including the full Ethernet header, the uncompressed Ethernet header, or the EHC header is received, the transmission PDCP layer device may start Ethernet header compression for data to be transmitted. Specifically, the transmission PDCP layer device may compress or omit fields which are compressible or having a fixed value and include fields which are non-compressible or having no-fixed values among fields of the Ethernet header, may generate an EHC header and include an indicator indicating that the Ethernet header has been compressed or a context identifier corresponding thereto in the EHC header, and may perform integrity protection or ciphering of data having the compressed Ethernet header and transmit the data. Here, the reception PDCP layer device of the reception terminal may introduce a separate timer (through the RRC message, a timer value may be configured for each bearer or for each PDCP layer device, or may be configured together with an Ethernet header compression or decompression function) to perform a procedure of preventing frequent feedback from occurring, as follows.

3> The configured timer value may be applied when the reception PDCP layer device drives a timer, and the timer may be driven for each context identifier.

3> When the reception PDCP layer device of the reception terminal receives data including the full Ethernet header, the uncompressed Ethernet header, or the EHC header including an indicator indicating that compression does not occur, by performing deciphering or integrity verification thereof 4> When a timer for a context identifier corresponding to the received data is not running 5> The reception PDCP layer device may store field values of full Ethernet header fields, store a context identifier corresponding thereto, generate feedback, include a context identifier corresponding to data or an indicator indicating successful reception in the feedback, and transmit the same. Further, the reception PDCP layer device may allow feedback to be transmitted without being applied with integrity protection or ciphering procedure, so as to enable fast processing.

5> The reception PDCP layer device may start a timer for the context identifier corresponding to the received data.

3> When the reception PDCP layer device of the reception terminal receives data including a compressed Ethernet header or an EHC header including an indicator indicating that compression has been occurred, by performing deciphering or integrity verification thereof, 4> The reception PDCP layer device may, without generating feedback, recover or reconstruct the compressed or omitted header fields or field values in the compressed Ethernet header from a buffer or context for the context identifier corresponding to data and configure the full Ethernet header fields to perform decompression. When the ROHC header compression procedure is also configured, the ROHC header compression or decompression procedure may be independently performed for a higher layer device header other than the Ethernet header.

4> When a timer for a context identifier corresponding to the received data is running, the timer may be interrupted.

3> When the timer for the context identifier has expired

4> The reception PDCP layer device may generate feedback correspond to a context identifier, include the context identifier or an indicator indicating successful reception in the feedback, and transmit the same. Further, the reception PDCP layer device may allow feedback to be transmitted without being applied with integrity protection or ciphering procedure, so as to enable fast processing.

4> The timer corresponding to the context identifier may be restarted.

1> When a UE receives an RRC message (e.g., RRCReconfiguration message) or an RRCReconfiguration message including ReconfigurationWithSync information, when an indicator indicating continuous use of the context for Ethernet header compression or decompression is configured for each bearer or in PDCP layer device configuration information.

2> When a PDCP re-establishment procedure is indicated or performed for the bearer or PDCP layer device 3> With regard to an AM bearer, when the indicator indicating continuous use of the context for Ethernet header compression or decompression is not configured in the PDCP layer device configuration information, an Ethernet header decompression procedure may be performed by applying the context for Ethernet header compression or decompression to data (PDCP SDU or PDCP PDU) stored for the AM bearer or all stored data (PDCP SDU).

3> With regard to the AM bearer or UM bearer, when the indicator indicating continuous use of the context for Ethernet header compression or decompression is not configured in the PDCP layer device configuration information, the context for Ethernet header compression or decompression, with regard to the uplink, may be initialized or released. In addition, the transmission PDCP layer device may transmit data including the uncompressed Ethernet header or the full Ethernet header.

3> With regard to the AM bearer or UM bearer, when the indicator indicating continuous use of the context for Ethernet header compression or decompression is configured in the PDCP layer device configuration information, the transmission PDCP layer device may continue to apply the Ethernet header compression procedure to data to be transmitted and transmit data including the compressed Ethernet header, without initializing or releasing the context for Ethernet header compression or decompression with regard to the uplink.

3> With regard to the AM bearer or UM bearer, when the indicator indicating continuous use of the context for Ethernet header compression or decompression is not configured in the PDCP layer device configuration information, the context for Ethernet header compression or decompression with regard to the downlink may be initialized or released. In addition, the transmission PDCP layer device may transmit data including the uncompressed Ethernet header or the full Ethernet header.

3> With regard to the AM bearer or UM bearer, when the indicator indicating continuous use of the context for Ethernet header compression or decompression is configured in the PDCP layer device configuration information, the transmission PDCP layer device may continue to apply the Ethernet header compression procedure to data to be transmitted and transmit data including the compressed Ethernet header, without initializing or releasing the context for Ethernet header compression or decompression with regard to the downlink.
1> When the UE receives an RRC message (e.g., RRCReconfiguration message) or an RRCReconfiguration message including ReconfigurationWithSync information (when an indicator indicating continuous use of the context for Ethernet header compression or decompression is configured for each bearer or in PDCP layer device configuration information),
  2> When a PDCP re-establishment procedure is indicated or performed for the bearer or PDCP layer device
    3> The Ethernet header decompression procedure may be performed by applying the context for Ethernet header compression or decompression to data (PDCP SDU or PDCP PDU) stored for the AM bearer or all stored data (PDCP SDU).
    3> With regard to the AM bearer or UM bearer, when the context for Ethernet header compression or decompression with regard to the uplink may be initialized or released. In addition, the transmission PDCP layer device may transmit data including the uncompressed Ethernet header or the full Ethernet header.
    3> With regard to the AM bearer or UM bearer, when the context for Ethernet header compression or decompression with regard to the downlink may be initialized or released. In addition, the transmission PDCP layer device may transmit data including the uncompressed Ethernet header or the full Ethernet header.

Hereinafter, the operation of the PDCP layer device of the UE specifically performing the techniques described so far is proposed.

In an embodiment, when performing the DAPS handover method described in the disclosure, the PDCP layer device of the UE may process data according to the following procedure and transfer the processed data to the lower layer device or may transmit an indication indicating the size of the data to a lower layer device.

When transmitting data (PDCP PDU) to a lower layer device, the transmission PDCP layer device may perform the following procedure.
1> When the transmission PDCP layer device is connected to one RLC layer device,
  2> The transmission PDCP layer device transfers data (PDCP PDU) to the connected RLC layer device.
1> Otherwise, when the transmission PDCP layer device is connected to two RLC layer devices,
  2> When the PDCP duplication function (packet duplication technology or PDCP packet duplication) is active,
    3> When the data (PDCP PDU) to be transferred to the lower layer is PDCP user data (PDCP Data PDU)
      4> The transmission PDCP layer device performs duplicate processing of data (PDCP data PDU) and transfers data (PDCP Data PDU) to connected RLC layer devices.
    3> Otherwise (that is, when data to be delivered to the lower layer (PDCP PDU) is PDCP control data (PDCP control PDU, for example, ROHC feedback when ROHC is configured in the PDCP layer device or bearer and ROHC feedback is generated, or EHC feedback when EHC is configured in the PDCP layer device or bearer and EHC feedback is generated),
      4> The transmission PDCP layer device transfers data (PDCP control PDU, for example, ROHC feedback when ROHC is configured in the PDCP layer device or bearer and ROHC feedback is generated, or EHC feedback when EHC is configured in the PDCP layer device or bearer and EHC feedback is generated) to a connected primary RLC layer device (primary RLC entity). The primary RLC entity or the secondary RLC entity may be configured through the RRC message received from the base station as shown in FIG. 1E, the primary RLC entity is not going inactive, and when the packet duplication technique is configured, PDCP control data (PDCP control PDU) may be transmitted to the primary RLC entity without performing duplicate processing thereof
  2> Otherwise (that is, when the PDCP duplication function (packet duplication technology or PDCP packet duplication) is not activated),
    3> When the total amount of data of the size of PDCP data and the size of RLC data waiting for initial transmission in the RLC layer devices connected to the PDCP layer device is equal to or greater than the threshold value for uplink data transmission (here, the threshold value may be configured through the RRC message received from the base station as shown in FIG. 1E), and (or)
    3> and (or) when the transmission PDCP layer device is not connected with a bearer for which the DAPS handover method is configured (or when the DAPS handover method is not configured) and (or)
    3> and (or) when the RLC layer devices (or two RLC layer devices) connected to the transmission PDCP layer device belong to different cell groups (or base stations), respectively
      4> Data (PDCP PDU, PDCP data PDU, or PDCP control PDU, for example, ROHC feedback when ROHC is configured in the PDCP layer device or bearer and ROHC feedback is generated, EHC feedback when EHC is configured in the PDCP layer device or bearer and EHC feedback is generated) may be transmitted to the primary RLC entity or the secondary RLC entity. The primary RLC entity or the secondary RLC entity may be configured through an RRC message received from the base station as shown in FIG. 1E.
    3> Otherwise when the transmission PDCP layer device is connected with a bearer for which the DAPS handover method is configured (or when the DAPS handover method is configured),
      4> When an indicator indicating that the first condition is satisfied is not received from a higher layer device or a lower layer device, or an indicator indicating switching uplink data transmission is not received,
        5> Data (PDCP PDU, PDCP data PDU, or PDCP control PDU, for example, ROHC feedback when ROHC is established in the PDCP layer device or bearer and ROHC feedback is generated, EHC feedback when EHC is established in the PDCP layer device or bearer and EHC feedback is generated) may be delivered to a source base station or the RLC layer device for the source base station to perform transmission.
4> Otherwise (that is, when an indicator indicating that the first condition is satisfied is received from a higher layer device or a lower layer device, or an indicator indicating switching uplink data transmission is received),
5> When the data is PDCP user data (PDCP data PDU),
6> PDCP user data may be delivered to a target base station or the RLC layer device for the target base station to perform transmission.
5> Otherwise (that is, when data is PDCP control data (PDCP control PDU, for example, ROHC feedback when ROHC is established in the PDCP layer device or bearer and ROHC feedback is generated, EHC feedback when EHC is established in the PDCP layer device or bearer and EHC feedback is generated),
6> When PDCP control data (for example, ROHC feedback when ROHC is established in the PDCP layer device or bearer and ROHC feedback is generated, EHC feedback when EHC is established in the PDCP layer device or bearer and EHC feedback is generated) is data for a source base station or is related to the source base station,
7> PDCP control data (for example, ROHC feedback when ROHC is established in the PDCP layer device or bearer and ROHC feedback is generated, EHC feedback when EHC is established in the PDCP layer device or bearer and EHC feedback is generated) may be delivered to a source base station or the RLC layer device for the source base station to perform transmission.
6> Otherwise (that is, when the PDCP control data (for example, ROHC feedback when ROHC is established in the PDCP layer device or bearer and ROHC feedback is generated, EHC feedback when EHC is established in the PDCP layer device or bearer and EHC feedback is generated) is data for a target base station or is related to the target base station),
7> PDCP control data (for example, ROHC feedback when ROHC is established in the PDCP layer device or bearer and ROHC feedback is generated, EHC feedback when EHC is established in the PDCP layer device or bearer and EHC feedback is generated) may be delivered to a target base station or the RLC layer device for the target base station to perform transmission.
3> Otherwise (that is, when the total amount of data of the size of PDCP data and the size of RLC data waiting for initial transmission in the RLC layer devices connected to the PDCP layer device is equal to or greater than the threshold value for uplink data transmission, or when the transmission PDCP layer device is not connected with a bearer for which the DAPS handover method is configured (or when the DAPS handover method is configured), or when the RLC layer devices (or two RLC layer devices) connected to the transmission PDCP layer device do not belong to different cell groups (or base stations), respectively,
4> Data (PDCP PDU, PDCP data PDU, or PDCP control PDU, for example, ROHC feedback when ROHC is established in the PDCP layer device or bearer and ROHC feedback is generated, EHC feedback when EHC is established in the PDCP layer device or bearer and EHC feedback is generated) may be delivered to the primary RLC entity to perform transmission.

When the transmission PDCP layer device is connected to multiple RLC layer devices (or two RLC layer devices), and indicates the size of PDCP data to the MAC layer device for the source base station or the target base station in order to trigger a buffer status report or to calculate the buffer size, the transmission PDCP layer device may perform the following procedure.
1> When the PDCP duplication function (packet duplication technology or PDCP packet duplication) is activated,
2> The transmission PDCP layer device may indicate, to the MAC layer device connected to the first RLC entity, the size of PDCP data (PDCP data PDU, PDCP control PDU, for example, ROHC feedback when ROHC is established in the PDCP layer device or bearer and ROHC feedback is generated, EHC feedback when EHC is established in the PDCP layer device or bearer and EHC feedback is generated).
2> The transmission PDCP layer device may indicate, to the MAC layer device connected to the secondary RLC entity, the size of PDCP data (PDCP data PDU) except for the size of PDCP control PDU (PDCP control PDU, for example, ROHC feedback when ROHC is established in the PDCP layer device or bearer and ROHC feedback is generated, EHC feedback when EHC is established in the PDCP layer device or bearer and EHC feedback is generated).
1> Otherwise (that is, when the PDCP duplication function (packet duplication technology or PDCP packet duplication) is not activated,
2> When the total amount of data of the size of PDCP data and the size of RLC data waiting for initial transmission in the RLC layer devices connected to the PDCP layer device is equal to or greater than the threshold value for uplink data transmission face (here, the threshold value may be configured through the RRC message received from the base station as shown in FIG. 1E), and (or)
2> and (or) when the transmission PDCP layer device is not connected with a bearer for which the DAPS handover method is configured (or when the DAPS handover method is not configured) and/or)
2> and (or) when the RLC layer devices (or two RLC layer devices) connected to the transmission PDCP layer device belong to different cell groups (or base stations), respectively
3> The size of the PDCP data may be indicated to the MAC layer device connected to the primary RLC entity and the MAC layer device connected to the secondary RLC entity.
2> Otherwise when the transmission PDCP layer device is connected to a bearer for which the DAPS handover method is configured (or when the DAPS handover method is configured),
3> When an indicator indicating that the first condition is satisfied is not received from a higher layer device or a lower layer device, or an indicator indicating switching uplink data transmission is not received,
> 4> The size of PDCP data (PDCP user data or PDCP control data) may be indicated to the source base station or the MAC layer device for the source base station.
> 3> Otherwise (that is, when an indicator indicating that the first condition is satisfied is received from a higher layer device or a lower layer device, or an indicator indicating switching uplink data transmission is received),
>> 4> The transmission PDCP layer device may indicate, to the target base station or the MAC layer device for the target base station, PDCP control data (PDCP status report, which is for the source base station or is related to the source base station or feedback, for example, ROHC feedback when ROHC is established in the PDCP layer device or bearer and ROHC feedback is generated, EHC feedback when EHC is established in the PDCP layer device or bearer and EHC feedback is generated) or the size of PDCP data except for the size of PDCP control data.
> 2> Otherwise (that is, when the total amount of data of the size of PDCP data and the size of RLC data waiting for initial transmission in the RLC layer devices connected to the PDCP layer device is equal to or greater than the threshold value for uplink data transmission, when the transmission PDCP layer device is not connected to a bearer for which the DAPS handover method is configured (or when the DAPS handover method is configured), or when the RLC layer devices (or two RLC layer devices) connected to the transmission PDCP layer device do not belong to different cell groups (or base stations), respectively,
>> 3> The transmission PDCP layer device may indicate the size of PDCP data (PDCP PDU, PDCP data PDU, or PDCP control PDU to the MAC layer device connected to the primary RLC entity.
>> 3> The transmission PDCP layer device may indicate to the MAC layer device connected to the secondary RLC entity that the size of the PDCP data (PDCP PDU, PDCP data PDU, or PDCP control PDU) is 0.

FIG. 1L illustrates an operation of a transmission PDCP layer device or a reception PDCP layer device of a UE or a base station according to an embodiment of the disclosure.

In the disclosure, in a case where a higher layer header compression protocol (Ethernet header compression method, EthHC) is configured for the transmission PDCP layer device, data $1l$-05 received from the higher layer may be configured with the Ethernet header compression method. In addition, when the data is received at first, or when even one of the field values of the compressible fields among the fields of the Ethernet header of the data received from the higher layer is different from the field values stored in the buffer of the transmission PDCP layer device (or different from the previously transmitted Ethernet header field values), or when feedback indicating successful reception of data having the previously transmitted uncompressed full higher layer header (Ethernet header) is not received from the reception PDCP layer device (indicated by reference numeral $1l$-10), the transmission PDCP layer device does not perform the Ethernet header compression until feedback indicating successful reception of the uncompressed full higher layer header (Ethernet header) is received from the reception PDCP layer device (indicated by reference numeral $1l$-20). When feedback indicating successful reception of data having the previously transmitted uncompressed full higher layer header (Ethernet header) is received from the reception PDCP layer device (indicated by reference numeral $1l$-10), the transmission PDCP layer device may perform compression by applying the Ethernet header compression method to the data received from the higher layer (indicated by reference numeral $1l$-15).

In the disclosure, when the Ethernet header compression protocol for the reception PDCP layer device is configured and data is received from a lower layer (indicated by reference numeral $1l$-25), and when the Ethernet header is compressed (when an indicator of a new EHC header is checked and the indicator indicates that the Ethernet header is compressed) (indicated by reference numeral $1l$-35), the Ethernet header of the data may be decompressed (indicated by reference numeral $1l$-40). Otherwise, when the Ethernet header compression protocol is configured and the Ethernet header is not compressed (when an indicator of a new EHC header is checked and the indicator indicates that the Ethernet header is compressed) (indicated by reference numeral $1l$-35), the Ethernet header of the data is regarded as an uncompressed header and decompression thereof is not performed. Since the uncompressed Ethernet header has been successfully received, feedback is triggered to indicate the successful reception thereof to the transmission PDCP layer device and the feedback may be transmitted to the transmission PDC layer device (indicated by reference numeral $1l$-45).

Figure 1M:
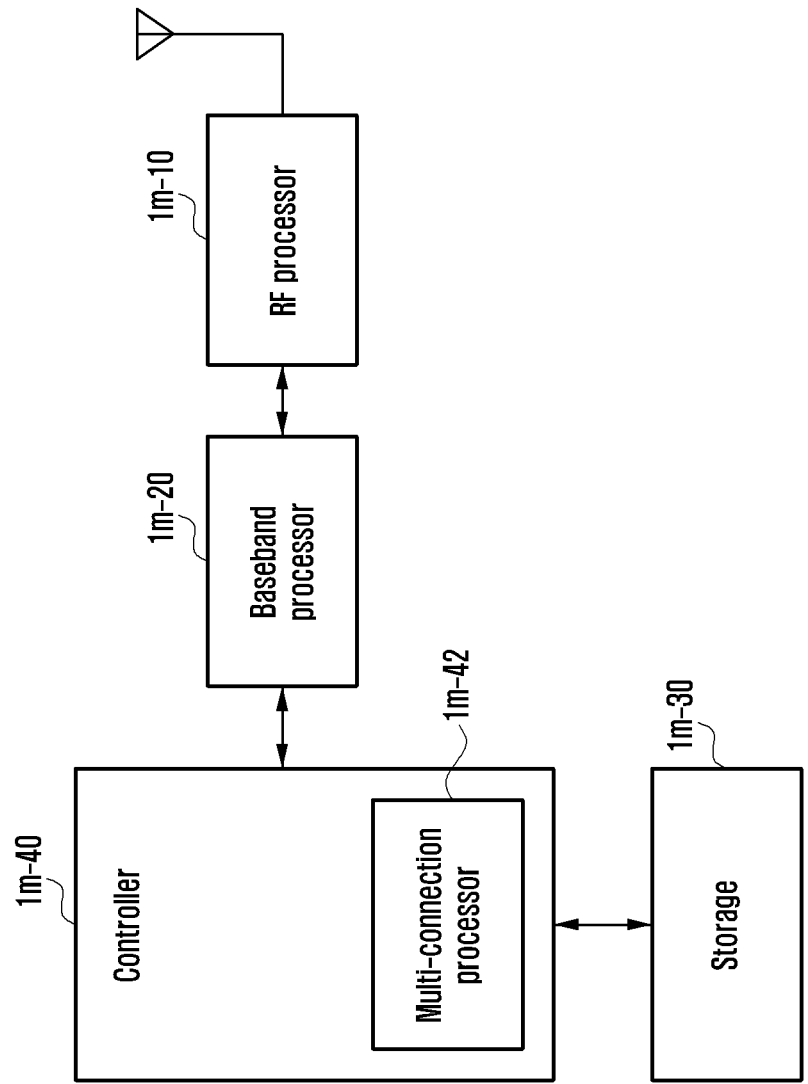
FIG. 1M illustrates a structure of a UE to according to an embodiment of the disclosure.

FIG. 1M illustrates the structure of a UE according to an embodiment of the disclosure.

Referring to FIG. 1M, the UE may include a radio frequency (RF) processor $1m$-10, a baseband processor $1m$-20, a storage $1m$-30, and a controller $1m$-40.

The RF processor $1m$-10 may perform a function for transmitting and receiving a signal through a wireless channel such as band conversion, amplification, and the like of a signal. That is, the RF processor $1m$-10 may up-convert a baseband signal provided from the baseband processor $1m$-20 into an RF band signal and may transmit the RF band signal through an antenna, and may down-convert the RF band signal received through the antenna into a baseband signal. For example, the RF processor $1m$-10 may include a transmission filter, a reception filter, an amplifier, a mixer, an oscillator, a digital to analog convertor (DAC), an analog to digital convertor (ADC), and the like. In FIG. 1M, only one antenna is shown, but the UE may include multiple antennas. In addition, the RF processor $1m$-10 may include multiple RF chains. In addition, the RF processor $1m$-10 may perform beamforming. For the beamforming, the RF processor $1m$-10 may adjust the phase and magnitude of each of signals transmitted and received through multiple antennas or antenna elements. In addition, the RF processor may perform MIMO and may receive multiple layers when performing the MIMO operation. The RF processor $1m$-10 may perform reception beam sweeping by appropriately configuring multiple antennas or antenna elements under the control of the controller, or may adjust the direction and beam width of the reception beam so that the reception beam is coordinated with transmission beam.

The baseband processor $1m$-20 may perform a conversion function between a baseband signal and a bit string according to a physical layer standard of the system. For example, during data transmission, the baseband processor $1m$-20 generates complex symbols by encoding and modulating a transmission bit string. In addition, during data reception, the baseband processor 1m-20 may restore the received bit string by demodulating and decoding a baseband signal provided from the RF processor 1m-10. For example, according to an orthogonal frequency division multiplexing (OFDM) scheme, during data transmission, the baseband processor 1m-20 may generate complex symbols by encoding and modulating a transmission bit string, may map the complex symbols to subcarriers, and may then configure OFDM symbols through an inverse fast Fourier transform (IFFT) operation and cyclic prefix (CP) insertion. In addition, during data reception, the baseband processor 1m-20 may divide the baseband signal provided from the RF processor 1m-10 into units of OFDM symbols, may restore the signals mapped to the subcarriers through a fast Fourier transform (FFT) operation, and may then restore the received bit string through demodulation and decoding.

The baseband processor 1m-20 or the RF processor 1m-10 may transmit or receive signals as described above. Accordingly, the baseband processor 1m-20 or the RF processor 1m-10 may be referred to as a transmitter, a receiver, a transceiver, or a communicator. Further, at least one of the baseband processor 1m-20 and the RF processor 1m-10 may include multiple communication modules to support multiple different radio access technologies. In addition, at least one of the baseband processor 1m-20 and the RF processor 1m-10 may include different communication modules to process signals of different frequency bands. For example, the different radio access technologies may include an LTE network, an NR network, and the like. In addition, the different frequency bands may include a super high frequency (SHF) (e.g., 2.5 GHz or 5 GHz) band and a millimeter wave (e.g., 60 GHz) band. The UE may transmit or receive signals to and from the base station by using the baseband processor 1m-20 and the RF processor 1m-10. Here, the signal may include control information and data.

The storage 1m-30 may store data such as a basic program, an application program, and configuration information for the operation of the UE. The storage 1m-30 may provide stored data according to a request from the controller 1m-40. The storage 1m-30 may include a storage medium, such as a ROM, a RAM, a hard disk, a CD-ROM, and a DVD, or a combination of storage media. In addition, the storage 1m-30 may include multiple memories.

The controller 1m-40 may control overall operations of the UE. For example, the controller 1m-40 may transmit or receive signals through the baseband processor 1m-20 or the RF processor 1m-10. In addition, the controller 1m-40 may record and read data in the storage 1m-40. To this end, the controller 1m-40 may include at least one processor. For example, the controller 1m-40 may include a communication processor (CP) for performing control for communication and an application processor (AP) for controlling a higher layer such as an application program. The controller 1m-40 may further include a multi-connection processor 1m-42 supporting multiple connections.

Figure 1N:
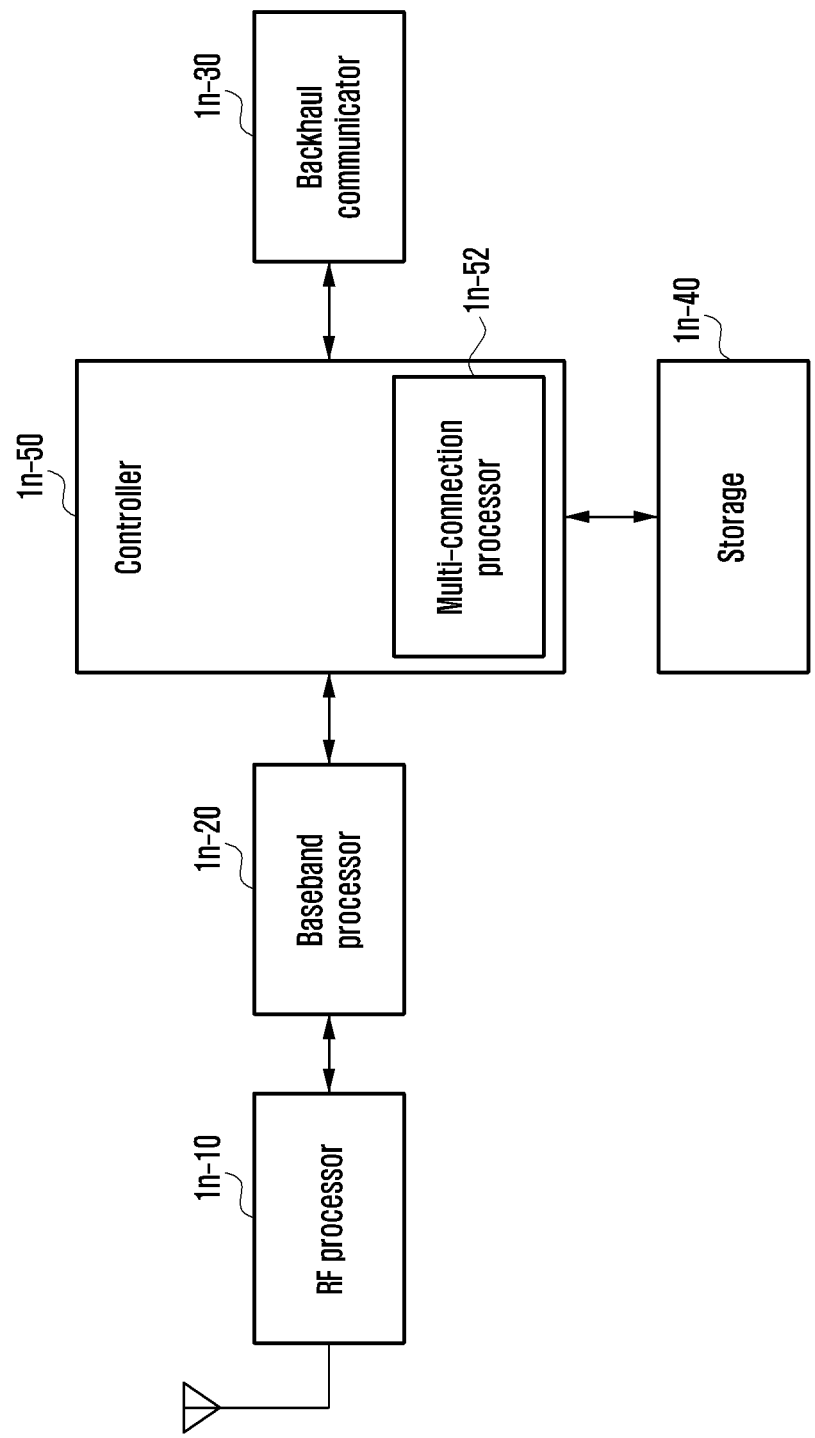
FIG. 1N illustrates a block configuration of a transmission reception point (TRP) in a wireless communication system according to an embodiment of the disclosure.
Figure 10:
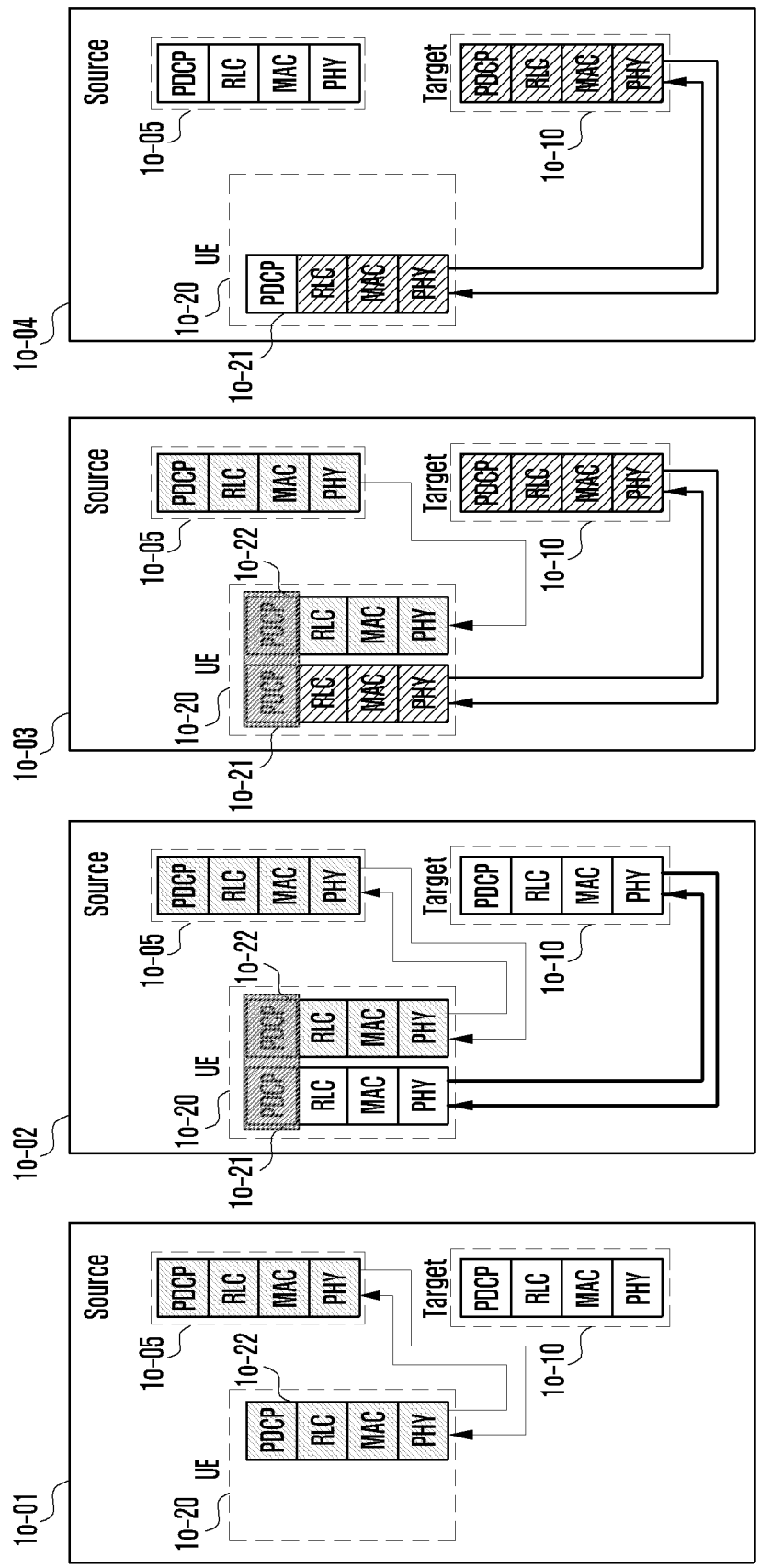

FIG. 1N is a block diagram illustrating a transmission reception point (TRP) in a wireless communication system according to an embodiment of the disclosure.

According to an embodiment of the disclosure, transmission and reception point (TRP) may be a base station. The TRP is not limited to the above example, and may be an entity in a network capable of performing transmission and reception. Referring to FIG. 1N, the base station may include an RF processor 1n-10, a baseband processor 1n-20, a backhaul communicator 1n-30, a storage 1n-40, and a controller 1n-50.

The RF processor 1n-10 may perform a function for transmitting or receiving a signal through a wireless channel such as band conversion, amplification, and the like of a signal. That is, the RF processor 1n-10 may up-convert a baseband signal provided from the baseband processor 1n-20 into an RF band signal to transmit the RF band signal through an antenna, and may down-convert the RF band signal received through the antenna into a baseband signal. For example, the RF processor 1n-10 may include a transmission filter, a reception filter, an amplifier, a mixer, an oscillator, a DAC, an ADC, and the like. In FIG. 1N, only one antenna is shown, but the base station may have multiple antennas. In addition, the RF processor 1n-10 may include multiple RF chains. In addition, the RF processor 1n-10 may perform beamforming. For the beamforming, the RF processor 1n-10 may adjust the phase and magnitude of each of signals transmitted and received through multiple antennas or antenna elements. The RF processor 1n-10 may perform a downlink multi input multi output (MIMO) operation by transmitting one or more layers.

The baseband processor 1n-20 may perform a conversion function between a baseband signal and a bit string according to a physical layer standard of a first radio access technology. For example, during data transmission, the baseband processor 1n-20 may generate complex symbols by encoding and modulating a transmission bit string. In addition, during data reception, the baseband processor 1n-20 may restore a received bit string by demodulating and decoding the baseband signal provided from the RF processor 1n-10. For example, according to an OFDM scheme, during data transmission, the baseband processor 1n-20 may generate complex symbols by encoding and modulating a transmission bit string, may map the complex symbols to subcarriers, and may then configure OFDM symbols through IFFT operation and CP insertion. In addition, during data reception, the baseband processor 1n-20 may divide the baseband signal provided from the RF processor 1n-10 in units of OFDM symbols, may restore signals mapped to the subcarriers through the FFT operation, and may then restore the received bit string through demodulation and decoding. The baseband processor 1n-20 or the RF processor 1n-10 may transmit or receive signals as described above. Accordingly, the baseband processor 1n-20 or the RF processor 1n-10 may be referred to as a transmitter, a receiver, a transceiver, a communicator, or a wireless communicator.

The communicator 1n-30 may provide an interface for communicating with other nodes in a network. The base station may transmit or receive signals to and from the base station by using the baseband processor 1n-20 and the RF processor 1n-10. Here, the signal may include control information and data. In addition, according to an embodiment of the disclosure, the communicator 1n-30 may be a backhaul communicator.

The storage 1n-40 may store data such as a basic program, an application program, and configuration information for the operation of a base station. In particular, the storage 1n-40 may store information on a bearer assigned to a connected UE, a measurement result reported from the connected UE, and the like. In addition, the storage 1n-40 may store information that is a criterion for determining whether to provide or terminate multiple connections to the UE. The storage 1n-40 may provide stored data according to a request from the controller 1n-50. The storage 1n-40 may include a storage medium, such as a ROM, a RAM, a hard disk, a CD-ROM, and a DVD, or a combination of storage media. In addition, the storage 1n-40 may include multiple memories.

The controller 1n-50 may control overall operations of the main base station. For example, the controller 1n-50 may transmit or receive signals through the baseband processor 1n-20 or the RF processor 1n-10 or through the backhaul communicator 1n-30. In addition, the controller 1n-50 may record and read data in the storage 1n-40. To this end, the controller 1n-50 may include at least one processor. The controller 1n-50 may further include a multi-connection processor 1n-52 supporting multiple connections.

In the above-described specific embodiments of the disclosure, elements included in the invention are expressed singular or plural in accordance with the proposed specific embodiments. It should be understood, however, that the singular or plural representations are to be chosen as appropriate to the situation presented for the purpose of description and that the above-described embodiments are not limited to the singular or plural elements. The elements expressed in plural may be configured by a single number, and constituent elements expressed in singular form may be configured by a plurality of elements.

On the other hand, the embodiments of the disclosure described in the specification and drawings are only presented as specific examples to easily explain the technical content of the disclosure and help the understanding of the disclosure, and are not intended to limit the scope of the disclosure. That is, it will be apparent to a person skill in the art to which the disclosure pertains that other modifications may be implemented based on the technical spirit of the disclosure. In addition, each of the above embodiments may be operated in combination with each other as needed. For example, the base station and the terminal may be operated by combining parts of one embodiment and another embodiment of the disclosure. In addition, other modifications based on the technical idea of the above embodiments may be implemented in various systems such as an FDD LTE system, a TDD LTE system, a 5G, or an NR system.

Embodiment 2

The disclosure proposes a method for configuring an out-of-order delivery (OOD) in a protocol layer device (e.g., an RLC layer device or a PDCP layer device) and driving thereof, as a method for reducing transmission delay in a wireless communication system.

The out-of-order delivery function proposed in the disclosure may be configured in a protocol layer device (e.g., an RLC layer device or a PDCP layer device) according to one of the following configuration methods. In the disclosure, a protocol layer device for applying a method of configuring or driving the out-of-order delivery function is considered as an RLC layer device and described, and can be easily extended to a PDCP layer device or other higher layer device.

First configuration method: When a base station transmits an RRC message (e.g., RRCReconfiguration message, RRCSetup message, or RRCResume message) to a UE, the base station may configure an indicator (e.g., rlc-OutOfOrderDelivery) for configuration of an out-of-order delivery function in RLC layer device configuration information (e.g., rlf-config) of transmission resource configuration information (e.g., radio resource config dedicated) included in the RRC message, so as to configure the out-of-order delivery function in the RLC layer device for each bearer of the UE (e.g., the indicator is configured and the value thereof is configured to be "TRUE") or not (e.g., there is no indicator, or the indicator is configured and the value thereof is configured to be "FALSE"). In the above, when transmitting the received data to a higher layer device (e.g., a PDCP layer device) by an RLC layer device corresponding to the RLC layer device configuration information configured with the indicator, the indicator (e.g., rlc-OutOfOrderDelivery) for configuring the out-of-order delivery function may indicate that the data should be delivered regardless of the order or in an out-of-order delivery method. When the indicator for configuring the out-of-order delivery function is configured in the RLC layer device configuration information for the RLC layer device or the value thereof is configured to be a TRUE value, the RLC layer device may drive the out-of-order delivery function, and the PDCP layer device connected to the RLC layer device may configure or drive a reordering function. In the above, the reordering function of the PDCP layer device may arrange pieces of data received from a lower layer device (e.g., the RLC layer device) in the order of the PDCP serial number, and deliver the pieces of data to a higher layer device in ascending order without any gap or difference in the PDCP serial number (or COUNT value). When a PDCP serial number (or COUNT value) gap or difference occurs, the reordering function of the PDCP layer device may start a reordering timer and wait for pieces of data having a PDCP serial number (or COUNT value) value corresponding to the PDCP serial number (or COUNT value) gap or difference until the reordering timer expires. When the pieces of data having the PDCP serial number (or COUNT value) value corresponding to the PDCP serial number (or COUNT value) gap or difference are received before the reordering timer expires, the reordering timer is interrupted, and when the pieces of data are not received until the timer expires or when the reordering timer expires, the stored pieces of data are delivered to a higher layer device up to a predetermined PDCP serial number (or COUNT value) in ascending order of the PDCP serial number (or COUNT value).

Second configuration method: When a base station transmits an RRC message (e.g., RRCReconfiguration message, RRCSetup message, or RRCResume message) to a UE, the base station may configure an indicator (e.g., rlc-OutOfOrderDelivery) for configuration of an out-of-order delivery function in RLC layer device configuration information (e.g., rlf-config) of transmission resource configuration information (e.g., radio resource config dedicated) included in the RRC message, so as to configure the out-of-order delivery function in the RLC layer device for each bearer of the UE (e.g., the indicator is configured and the value thereof is configured to be "TRUE") or not (e.g., there is no indicator, or the indicator is configured and the value thereof is configured to be "FALSE"). In the above, when transmitting the received data to a higher layer device (e.g., a PDCP layer device) by an RLC layer device corresponding to the RLC layer device configuration information configured with the indicator, the indicator (e.g., rlc-OutOfOrderDelivery) for configuring the out-of-order delivery function may indicate that the data should be delivered regardless of the order or in an out-of-order delivery method. In addition, the indicator for configuring the out-of-order delivery function for the RLC layer device may be configured only when two (or a plurality of) RLC layer devices are configured in a bearer (or PDCP layer device) for which packet duplication is established, a split radio bearer (SRB or DRB), a LWA bearer, or one PDCP layer device, or the indicator may be configured to be a TRUE value. Alternatively, when the indicator for configuring the out-of-order delivery function is configured in the RLC layer device configuration information or the value thereof is configured to be a TRUE value, the RLC layer device may drive the out-of-order delivery function, and the PDCP layer device connected to the RLC layer device may configure or drive a reordering function. In the above, the reordering function of the PDCP layer device may arrange pieces of data received from a lower layer device (e.g., the RLC layer device) in the order of the PDCP serial number, and deliver the pieces of data to a higher layer device in ascending order without any gap or difference in the PDCP serial number (or COUNT value). When a PDCP serial number (or COUNT value) gap or difference occurs, the reordering function of the PDCP layer device may start a reordering timer and wait for pieces of data having a PDCP serial number (or COUNT value) value corresponding to the PDCP serial number (or COUNT value) gap or difference until the reordering timer expires. When the pieces of data having the PDCP serial number (or COUNT value) value corresponding to the PDCP serial number (or COUNT value) gap or difference are received before the reordering timer expires, the reordering timer is interrupted, and when the pieces of data are not received until the timer expires or when the reordering timer expires, the stored pieces of data are delivered to a higher layer device up to a predetermined PDCP serial number (or COUNT value) in ascending order of the PDCP serial number (or COUNT value). According to another method, when the indicator for configuring the out-of-order delivery function is configured in the RLC layer device configuration information or the value thereof is configured to be a TRUE value, the RLC layer device may drive the out-of-order delivery function, and the PDCP layer device connected to the RLC layer device may be connected to an NR PDCP layer device that always performs the reordering function and driven.

Third configuration method: When a base station transmits an RRC message (e.g., RRCReconfiguration message, RRCSetup message, or RRCResume message) to a UE, the base station may configure an indicator (e.g., rlc-OutOfOrderDelivery) for configuration of an out-of-order delivery function in RLC layer device configuration information (e.g., rlf-config) of transmission resource configuration information (e.g., radio resource config dedicated) included in the RRC message, so as to configure the out-of-order delivery function in the RLC layer device for each bearer of the UE (e.g., the indicator is configured and the value thereof is configured to be "TRUE") or not (e.g., there is no indicator, or the indicator is configured and the value thereof is configured to be "FALSE"). In the above, when transmitting the received data to a higher layer device (e.g., a PDCP layer device) by an RLC layer device corresponding to the RLC layer device configuration information configured with the indicator, the indicator (e.g., rlc-OutOfOrderDelivery) for configuring the out-of-order delivery function may indicate that the data should be delivered regardless of the order or in an out-of-order delivery method. In addition, the indicator for configuring the out-of-order delivery function for the RLC layer device may be configured only when two (or a plurality of) RLC layer devices are configured in a bearer (or PDCP layer device) for which packet duplication is established, a split radio bearer (SRB or DRB), a LWA bearer, an RLC layer device connected to an NR PDCP layer device having a reordering function, or one PDCP layer device, or the indicator may be configured to be a TRUE value. In the above, the out-of-order delivery function may also be configured in an NR PDCP layer device through the indicator for configuring the out-of-order delivery function, and the out-of-order delivery function may be configured in the LTE (E-UTRA) RLC layer device, or the out-of-order delivery function may be configured in the NR PDCP layer device connected to the LTE (E-UTRA) RLC layer device, so as to minimize transmission delay due to reordering. Alternatively, when the indicator for configuring the out-of-order delivery function is configured in the RLC layer device configuration information or the value thereof is configured to be a TRUE value, the RLC layer device may drive the out-of-order delivery function, and the PDCP layer device connected to the RLC layer device may configure or drive a reordering function. In the above, the reordering function of the PDCP layer device may arrange pieces of data received from a lower layer device (e.g., the RLC layer device) in the order of the PDCP serial number, and deliver the pieces of data to a higher layer device in ascending order without any gap or difference in the PDCP serial number (or COUNT value). When a PDCP serial number (or COUNT value) gap or difference occurs, the reordering function of the PDCP layer device may start a reordering timer and wait for pieces of data having a PDCP serial number (or COUNT value) value corresponding to the PDCP serial number (or COUNT value) gap or difference until the reordering timer expires. When the pieces of data having the PDCP serial number (or COUNT value) value corresponding to the PDCP serial number (or COUNT value) gap or difference are received before the reordering timer expires, the reordering timer is interrupted, and when the pieces of data are not received until the timer expires or when the reordering timer expires, the stored pieces of data are delivered to a higher layer device up to a predetermined PDCP serial number (or COUNT value) in ascending order of the PDCP serial number (or COUNT value). According to another method, when the indicator for configuring the out-of-order delivery function is configured in the RLC layer device configuration information or the value thereof is configured to be a TRUE value, the RLC layer device may drive the out-of-order delivery function, and the PDCP layer device connected to the RLC layer device may be connected to an NR PDCP layer device that always performs the reordering function and driven.

When the out-of-order delivery function proposed in the disclosure has been configured in the RLC layer device or is configured to be driven after configuration in the RLC layer device (when the out-of-order delivery function configuration indicator is configured to be a TRUE value), in order to prevent data loss or to prevent the PDCP layer device from delivering the received data to a higher layer device (e.g., SDAP layer device or application layer device) regardless of the order, the PDCP layer device driving the reordering function may be configured or driven as follows.

According to the driving method of the PDCP layer device proposed in the disclosure, data received by the PDCP layer device can be processed by the (1-3)th PDCP layer device or the second PDCP layer device having a reordering function for the following cases. Specifically, with regard to data radio bearers (DRBs) connected to RLC AM mode or RLC UM mode, with regard to LWA bearers, or when packet duplication technology is used, the PDCP layer device may use or apply a reordering function for the following cases, and may perform the procedure of the (1-3)th PDCP layer device or the second PDCP layer device performing the reordering function.

When the PDCP layer device is connected with two RLC layer devices,
or when the PDCP layer device is configured for an LTE-wireless LAN aggregation bearer (LWA bearer),
or when the PDCP layer device has been connected to two RLC AM mode RLC layer devices, or has been established for the LWA bearer, and thereafter when the PDCP layer device is connected to one RLC layer device of the RLC AM mode without the PDCP re-establishment procedure due to the most recent reconfiguration,
or when the PDCP layer device is configured with packet duplication technology,
or when the PDCP layer device is connected to one RLC layer device or two (or a plurality of) RLC layer devices for which the out-of-order delivery function is configured (or the out-of-order delivery function configuration indicator of the RLC layer device is configured to be a TRUE value),
or when the PDCP layer device is connected to one RLC layer device in the RLC AM mode or RLC UM mode or two (or a plurality of) RLC layer devices in the RLC AM mode or RLC UM mode for which the out-of-order delivery function is configured (or the out-of-order delivery function configuration indicator of the RLC layer device is configured to be a TRUE value),
or when a DAPS handover method is indicated or a PDCP layer device reconfiguration indicator is indicated from a higher layer device (e.g., RRC layer device),
or when the DAPS handover is successfully completed (or when the random access procedure is successfully completed), when the PDCP layer device reconfiguration indicator is indicated from the higher layer device (e.g., the RRC layer device),
or when a radio link failure is detected in a source base station during the DAPS handover, or when the PDCP layer device reconfiguration indicator is indicated from the higher layer device (e.g., RRC layer device),
or when the DAPS handover fails and the radio connection with the source base station is valid to perform falling back to the source base station, or when the PDCP layer device reconfiguration indicator is indicated from the higher layer device (e.g., RRC layer device),
the RLC layer device described in this disclosure may indicate the E-UTRA RLC layer device, the LTE RLC layer device, or the NR RLC layer device, and the PDCP layer device may indicate the E-UTRA PDCP layer device, the LTE PDCP layer device, or the NR PDCP layer device.

Figure 2A:
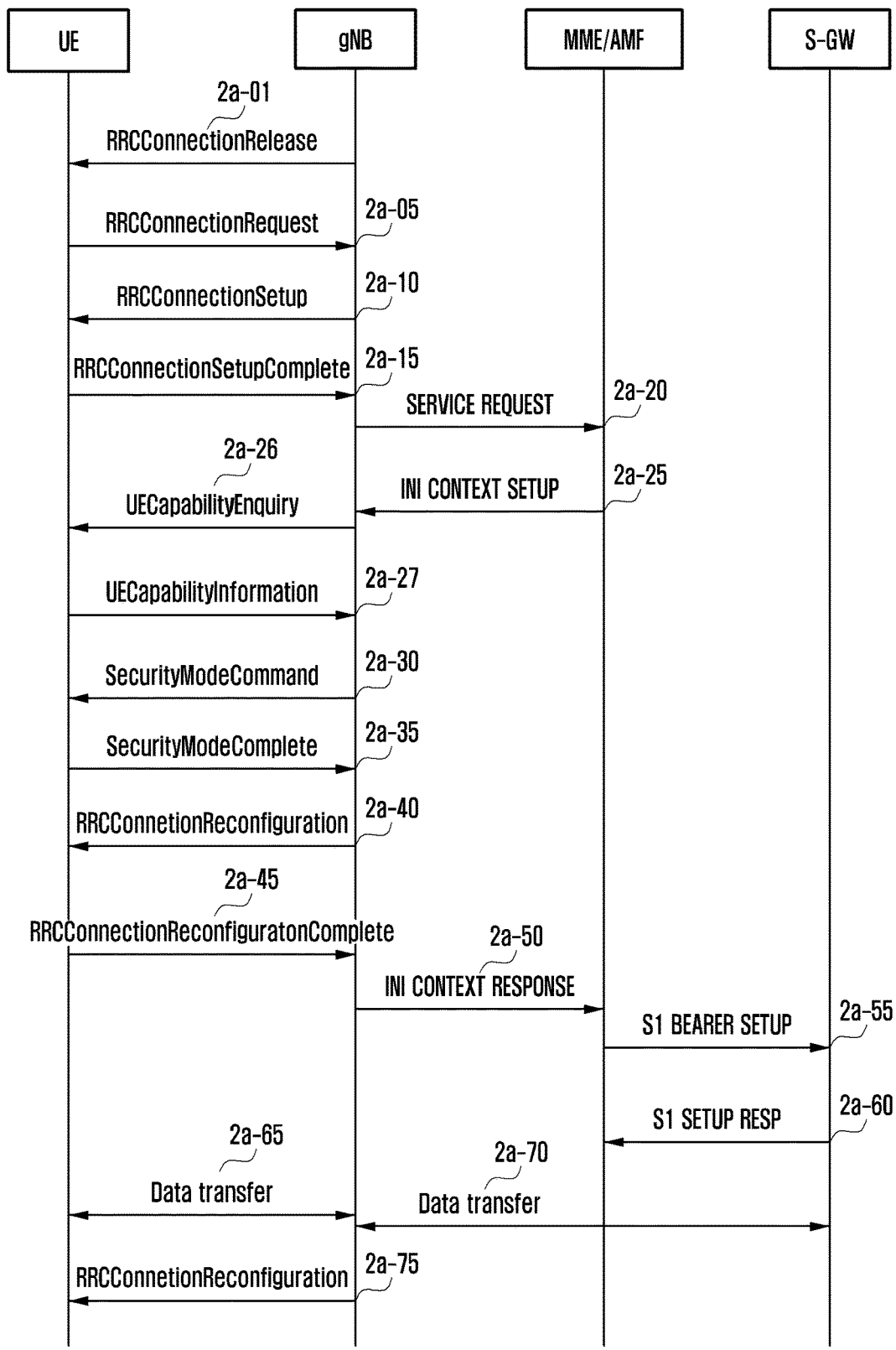
FIG. 2A illustrates a procedure in which a UE switches from a radio resource control (RRC) idle mode to an RRC connected mode to establish a connection with a network in the disclosure.

FIG. 2A illustrates a procedure in which a UE switches from a radio resource control (RRC) idle mode to an RRC connected mode to establish a connection with a network in the disclosure.

Referring to FIG. 2A, a base station may transmit an RRCConnectionRelease message to the UE, when the UE transmitting or receiving data in the RRC connected mode does not transmit or receive data for a predetermined reason or for a predetermined period of time, to switch the UE to be in the RRC idle mode (indicated by reference numeral 2a-01). In the future, a UE for which a connection is not currently established (hereinafter, an idle mode UE) performs an RRC connection establishment process with the base station when data to be transmitted is generated. The UE establishes backward transmission synchronization with the base station through a random access process and transmits an RRCConnectionRequest message to the base station (indicated by reference numeral 2a-05). The message includes the reason (establishmentCause) for establishing a connection with the identifier of the UE. The base station transmits an RRCConnectionSetup message so that the UE establishes an RRC connection (indicated by reference numeral 2a-10).

The message includes configuration information for each service/bearer/each RLC device, or for each logical channel or each bearer, information indicating whether to use ROHC for each bearer/logical channel, ROHC configuration information (e.g., ROHC version, initial information, etc.), statusReportRequired information (information by which the base station instructs the UE to perform PDCP Status report), and drb-ContinueROHC information (configuration information which indicates maintaining and using ROHC configuration information as it is and the configuration information may be included in PDCP layer device configuration information (pdcp-config) and transmitted). In addition, the message includes RRC connection configuration information and the like. The bearer for RRC connection is also called signaling radio bearer (SRB), and is used for transmission or reception of an RRC message, which is a control message between the UE and the base station.

The UE that has established the RRC connection transmits an RRCConnetionSetupComplete message to the base station (indicated by reference numeral 2a-15). The message includes a control message called SERVICE REQUEST, through which the UE requests the MME to set up a bearer for a predetermined service. The base station transmits the SERVICE REQUEST message included in the RRCConnetionSetupComplete message to the MME or AMF (indicated by reference numeral 2a-20), and the MME or AMF determines whether to provide the service requested by the UE. As a result of the determination, when the MME or AMF determines to provide the service requested by the UE, the MME or AMF transmits a message called INITIAL CONTEXT SETUP REQUEST to the base station (indicated by reference numeral 2a-25). The message includes information such as QoS information to be applied when setting up a data radio bearer (DRB), and security-related information (e.g., security key and security algorithm) to be applied to the DRB.

In addition, when the base station does not receive the capability information of the UE from the MME or AMF, the base station may transmit a UE capability information enquiry message to the UE in order to identify capability information of the UE (indicated by reference numeral 2a-26). Upon receiving the UE capability information enquiry message, the UE may configure and generate a UE capability information message and report the UE capability information message to the base station (indicated by reference numeral 2a-27). The UE capability information message may include types of handover methods the UE supports. For example, the UE capability can be reported to the base station through an indicator as to whether or not the UE supports the efficient handover method (dual active protocol stack, and DAPS) of the disclosure. When the base station identifies the UE capability information, the base station may instruct the UE to perform handover through the handover command message, by defining an indicator according to each handover method in the handover command message, and transmit the indicator to the UE. For example, the base station may instruct the UE to perform the efficient handover method (DAPS handover method) proposed in the disclosure, and may configure the DAPS handover method for each bearer (DRB or SRB) of the UE by using another method. When the base station configures the DAPS handover method for the UE, together with other handover methods (e.g., a conditional handover method (a method in which the UE performs a procedure of handover to one target cell when multiple target cells and multiple conditions are configured for the UE and the UE satisfies the above conditions in the cell selection or reselection procedure) or a handover method without having a random access procedure), data loss or transmission delay that may occur during handover can be prevented. The UE may perform a procedure of handover to the target base station according to the handover method indicated through the handover command message.

The base station exchanges a SecurityModeCommand message 2a-30 and a SecurityModeComplete message 2a-35 in order to configure security with the UE. When the security configuration is completed, the base station transmits an RRCConnectionReconfiguration message to the UE (indicated by reference numeral 2a-40).

The message includes configuration information for each service/bearer/each RLC device, or for each logical channel or bearer, information indicating whether to use ROHC for each bearer/logical channel, ROHC configuration information (e.g., ROHC version, initial information, etc.), statusReportRequired information (information by which the base station instructs the UE to perform PDCP Status report), and drb-ContinueROHC information (configuration information which indicates maintaining and using ROHC configuration information as it is and the configuration information may be included in PDCP layer device configuration information (pdcp-config) and transmitted). In addition, the message includes RRC connection configuration information and the like. The bearer for RRC connection is also called signaling radio bearer (SRB), and is used for transmission or reception of an RRC message, which is a control message between the UE and the base station.

In addition, the message includes configuration information of the DRB in which user data is to be processed, and the UE configures the DRB by applying the information and transmits an RRCConnectionReconfigurationComplete message to the base station (indicated by reference numeral 2a-45). The base station, which has completed the DRB setup with the UE, transmits an INITIAL CONTEXT SETUP COMPLETE message to the MME or AMF (indicated by reference numeral 2a-50), and the MME or AMF, which has received the INITIAL CONTEXT SETUP COMPLETE message, exchanges the S1 bearer setup message with the S1 bearer setup response messages in order to set up S1 bearer for the S-GW (indicated by reference numerals 2a-55 and 2a-60). The S1 bearer is a data transmission connection established between the S-GW and the base station, and corresponds to DRB on a one to one basis. When all of the above processes are completed, the UE transmits or receives data through the base station through the S-GW (indicated by reference numerals 2a-65 and 2a-70). This general data transmission process is largely configured by three stages of RRC connection setup, security setup, and DRB setup. In addition, the base station may transmit an RRC connection reconfiguration message in order to newly perform, add, or change the configuration for the UE for a predetermined reason (indicated by reference numeral 2a-75).

The out-of-order delivery function of the RLC layer device in the RRC message of FIG. 2A may be configured by one of the following methods.

First configuration method: When a base station transmits an RRC message (e.g., RRCReconfiguration message, RRCSetup message, or RRCResume message) to a UE, the base station may configure an indicator (e.g., rlc-OutOfOrderDelivery) for configuration of an out-of-order delivery function in RLC layer device configuration information (e.g., rlf-config) of transmission resource configuration information (e.g., radio resource config dedicated) included in the RRC message, so as to configure the out-of-order delivery function in the RLC layer device for each bearer of the UE (e.g., the indicator is configured and the value thereof is configured to be "TRUE") or not (e.g., there is no indicator, or the indicator is configured and the value thereof is configured to be "FALSE"). In the above, when transmitting the received data to a higher layer device (e.g., a PDCP layer device) by an RLC layer device corresponding to the RLC layer device configuration information configured with the indicator, the indicator (e.g., rlc-OutOfOrderDelivery) for configuring the out-of-order delivery function may indicate that the data should be delivered regardless of the order or in an out-of-order delivery method. When the indicator for configuring the out-of-order delivery function is configured in the RLC layer device configuration information for the RLC layer device or the value thereof is configured to be a TRUE value, the RLC layer device may drive the out-of-order delivery function, and the PDCP layer device connected to the RLC layer device may configure or drive a reordering function. In the above, the reordering function of the PDCP layer device may arrange pieces of data received from a lower layer device (e.g., the RLC layer device) in the order of the PDCP serial number, and deliver the pieces of data to a higher layer device in ascending order without any gap or difference in the PDCP serial number (or COUNT value). When a PDCP serial number (or COUNT value) gap or difference occurs, the reordering function of the PDCP layer device may start a reordering timer and wait for pieces of data having a PDCP serial number (or COUNT value) value corresponding to the PDCP serial number (or COUNT value) gap or difference until the reordering timer expires. When the pieces of data having the PDCP serial number (or COUNT value) value corresponding to the PDCP serial number (or COUNT value) gap or difference are received before the reordering timer expires, the reordering timer is interrupted, and when the pieces of data are not received until the timer expires or when the reordering timer expires, the stored pieces of data are delivered to a higher layer device up to a predetermined PDCP serial number (or COUNT value) in ascending order of the PDCP serial number (or COUNT value).

Second configuration method: When a base station transmits an RRC message (e.g., RRCReconfiguration message, RRCSetup message, or RRCResume message) to a UE, the base station may configure an indicator (e.g., rlc-OutOfOrderDelivery) for configuration of an out-of-order delivery function in RLC layer device configuration information (e.g., rlf-config) of transmission resource configuration information (e.g., radio resource config dedicated) included in the RRC message, so as to configure the out-of-order delivery function in the RLC layer device for each bearer of the UE (e.g., the indicator is configured and the value thereof is configured to be "TRUE") or not (e.g., there is no indicator, or the indicator is configured and the value thereof is configured to be "FALSE"). In the above, when transmitting the received data to a higher layer device (e.g., a PDCP layer device) by an RLC layer device corresponding to the RLC layer device configuration information configured with the indicator, the indicator (e.g., rlc-OutOfOrderDelivery) for configuring the out-of-order delivery function may indicate that the data should be delivered regardless of the order or in an out-of-order delivery method. In addition, the indicator for configuring the out-of-order delivery function for the RLC layer device may be configured only when two (or a plurality of) RLC layer devices are configured in a bearer (or PDCP layer device) for which packet duplication is established, a split radio bearer (SRB or DRB), an LTE wireless local area network (WLAN) aggregation (LWA) bearer, or one PDCP layer device, or the indicator may be configured to be a TRUE value. Alternatively, when the indicator for configuring the out-of-order delivery function is configured in the RLC layer device configuration information or the value thereof is configured to be a TRUE value, the RLC layer device may drive the out-of-order delivery function, and the PDCP layer device connected to the RLC layer device may configure or drive a reordering function. In the above, the reordering function of the PDCP layer device may arrange pieces of data received from a lower layer device (e.g., the RLC layer device) in the order of the PDCP serial number, and deliver the pieces of data to a higher layer device in ascending order without any gap or difference in the PDCP serial number (or COUNT value). When a PDCP serial number (or COUNT value) gap or difference occurs, the reordering function of the PDCP layer device may start a reordering timer and wait for pieces of data having a PDCP serial number (or COUNT value) value corresponding to the PDCP serial number (or COUNT value) gap or difference until the reordering timer expires. When the pieces of data having the PDCP serial number (or COUNT value) value corresponding to the PDCP serial number (or COUNT value) gap or difference are received before the reordering timer expires, the reordering timer is interrupted, and when the pieces of data are not received until the timer expires or when the reordering timer expires, the stored pieces of data are delivered to a higher layer device up to a predetermined PDCP serial number (or COUNT value) in ascending order of the PDCP serial number (or COUNT value). According to another method, when the indicator for configuring the out-of-order delivery function is configured in the RLC layer device configuration information or the value thereof is configured to be a TRUE value, the RLC layer device may drive the out-of-order delivery function, and the PDCP layer device connected to the RLC layer device may be connected to an NR PDCP layer device that always performs the reordering function and driven.

Third configuration method: When a base station transmits an RRC message (e.g., RRCReconfiguration message, RRCSetup message, or RRCResume message) to a UE, the base station may configure an indicator (e.g., rlc-OutOfOrderDelivery) for configuration of an out-of-order delivery function in RLC layer device configuration information (e.g., rlf-config) of transmission resource configuration information (e.g., radio resource config dedicated) included in the RRC message, so as to configure the out-of-order delivery function in the RLC layer device for each bearer of the UE (e.g., the indicator is configured and the value thereof is configured to be "TRUE") or not (e.g., there is no indicator, or the indicator is configured and the value thereof is configured to be "FALSE"). In the above, when transmitting the received data to a higher layer device (e.g., a PDCP layer device) by an RLC layer device corresponding to the RLC layer device configuration information configured with the indicator, the indicator (e.g., rlc-OutOfOrderDelivery) for configuring the out-of-order delivery function may indicate that the data should be delivered regardless of the order or in an out-of-order delivery method. In addition, the indicator for configuring the out-of-order delivery function for the RLC layer device may be configured only when two (or a plurality of) RLC layer devices are configured in a bearer (or PDCP layer device) for which packet duplication is established, a split radio bearer (SRB or DRB), a LWA bearer, an RLC layer device connected to an NR PDCP layer device having a reordering function, or one PDCP layer device, or the indicator may be configured to be a TRUE value. In the above, the out-of-order delivery function may also be configured in an NR PDCP layer device through the indicator for configuring the out-of-order delivery function, and the out-of-order delivery function may be configured in the LTE (E-UTRA) RLC layer device, or the out-of-order delivery function may be configured in the NR PDCP layer device connected to the LTE (E-UTRA) RLC layer device, so as to minimize transmission delay due to reordering. Alternatively, when the indicator for configuring the out-of-order delivery function is configured in the RLC layer device configuration information or the value thereof is configured to be a TRUE value, the RLC layer device may drive the out-of-order delivery function, and the PDCP layer device connected to the RLC layer device may configure or drive a reordering function. In the above, the reordering function of the PDCP layer device may arrange pieces of data received from a lower layer device (e.g., the RLC layer device) in the order of the PDCP serial number, and deliver the pieces of data to a higher layer device in ascending order without any gap or difference in the PDCP serial number (or COUNT value). When a PDCP serial number (or COUNT value) gap or difference occurs, the reordering function of the PDCP layer device may start a reordering timer and wait for pieces of data having a PDCP serial number (or COUNT value) value corresponding to the PDCP serial number (or COUNT value) gap or difference until the reordering timer expires. When the pieces of data having the PDCP serial number (or COUNT value) value corresponding to the PDCP serial number (or COUNT value) gap or difference are received before the reordering timer expires, the reordering timer is interrupted, and when the pieces of data are not received until the timer expires or when the reordering timer expires, the reception terminal may deliver the stored pieces of data to a higher layer device up to a predetermined PDCP serial number (or COUNT value) in ascending order of the PDCP serial number (or COUNT value). According to another method, when the indicator for configuring the out-of-order delivery function is configured in the RLC layer device configuration information or the value thereof is configured to be a TRUE value, the RLC layer device may drive the out-of-order delivery function, and the PDCP layer device connected to the RLC layer device may be connected to an NR PDCP layer device that always performs the reordering function and driven.

In addition, when the user data compression (UDC) method is configured for downlink or uplink in the PDCP layer device configuration information for each bearer, it is possible to provide limitation such that the out-of-order delivery function cannot be configured in an LTE RLC layer device, which is connected to the LTE or NR PDCP layer device for which the uplink data compression method is configured, through the RRC message. When the PDCP layer device performs the decompression procedure on data to which the user data compression (UDC) method is applied, the decompression procedure should be applied in the ascending order of the PDCP serial number or COUNT value. Therefore, when the PDCP layer device that does not have the ordering function performs the decompression procedure for data, which is delivered out of order from the RLC layer device, out of order as it is, decompression failure occurs.

The RRC message (e.g., RRCSetup message, RRCResume message, or RRCReconfiguration) of the disclosure may configure configuration information of a protocol layer device (e.g., SDAP layer device, PDCP layer device, RLC layer device, MAC layer device, or PHY layer device) for each bearer. For example, the configuration information of the PDCP layer device may configure an indicator (drb-ContinueROHC) indicating whether or not to continue using of the context of the header compression protocol (robust header compression (ROHC)) when performing the PDCP layer device re-establishment procedure. Alternatively, the configuration information may configure an indicator (drb-ContinueEHC-DL or drb-ContinueEHC-UL) indicating whether or not to continue using of the context of the header compression protocol (EHC) when performing the PDCP layer device re-establishment procedure, for downlink or uplink, respectively, or the configuration information may include an indicator indicating whether or not to perform a PDCP layer device re-establishment procedure, or may configure the timer value when a reordering timer (t-Reordering) is driven by the PDCP layer device. In the above, a reordering timer value may be configured to be included when establishing or reconfiguring a split bearer or an LWA bearer, or when establishing or reconfiguring a bearer connected to at least one RLC layer device for which an out-of-order delivery indicator (rlc-OutOfOrderDelivery) of the RLC layer device is configured. In addition, when configuring the header compression protocol (e.g., EHC) in the above, whether to use the EHC in the uplink or downlink may be configured via an indicator, respectively, the size of a context identifier (e.g., EHC) used in the header compression protocol (e.g., EHC) may be configured to be one of two sizes, and the size of the EHC header (header generated by the header compression protocol of the PDCP layer device) used in the header compression protocol may be determined as 1 byte or 2 bytes according to the size of the context identifier. In addition, the RRC message may allow the out-of-order delivery indicator of the RLC layer device to be configured in the configuration information of the RLC layer device so as to enable the RLC layer device to perform the out-of-order delivery procedure. When the indicator is not configured, the RLC layer device may perform an order delivery procedure.

In the disclosure, the header compression protocol may indicate ROHC or EHC.

In the disclosure, a bearer may include SRB and DRB, the SRB denotes a signaling radio bearer, and the DRB denotes a data radio bearer. The SRB is mainly used to transmit or receive RRC messages of the RRC layer device, and the DRB is mainly used to transmit or receive user layer data. In addition, an UM DRB denotes a DRB which uses an RLC layer device operating in an UM mode, and an AM DRB denotes a DRB which uses an RLC layer device operating in an AM mode.

In the following of the disclosure, an efficient data processing method by RLC layer devices proposed in the disclosure will be described.

A first embodiment of a method for processing received data by the RLC layer device proposed in the disclosure is a reception data processing method applicable to an RLC AM mode (e.g., RLC AM mode of E-UTRA or LTE RLC layer device), and may define and use the following window variables.

- (1-1)th RLC state variable (e.g., VR(R)): This state variable is a variable that stores, has, or indicates the next RLC serial number of the last data (e.g., AMD PDU) having completely received in sequence. This state variable serves as the lower boundary part of the window, and the initial value is configured to be 0, and whenever data having the same RLC serial number as the value stored by the (1-1)th RLC state variable is received, the (1-1)th RLC state variable value is updated.
- (1-2)th RLC state variable (e.g., VR(X)): This state variable is variable that stores, has, or indicates the next RLC serial number of the RLC serial number of data that has triggered the reordering timer (e.g., AMD PDU or RLC data PDU).
- (1-3)th RLC state variable (e.g., VR(H)): This state variable is a variable that stores, has, or indicates the next RLC serial number of the RLC serial number of the data (e.g., UMD PDU) having the highest RLC sequence number among the received data (e.g., AMD PDU or RLC data PDU).
- (1-4)th RLC status variable (e.g., VR(MS)): This status variable is a variable that stores, has, or indicates the highest possible RLC serial number value, which can be indicated by the value of ACK_SN when an RLC status report (RLC Status PDU) needs to be configured.
- (1-5)th RLC state variable (e.g., VR(MR)): This state variable is a variable that stores or indicates a value obtained by the calculation of the (1-1)th RLC state variable value+the window size value, or is a variable that stores, has, or indicates the RLC serial number value of the first data outside the window beyond the window. Further, the state variable serves as the upper edge of the window.

In the first embodiment of the reception data processing method of the RLC layer device of the disclosure, the reception window may be defined as RLC serial numbers which are greater than or equal to the value of the (1-1)th RLC state variable and smaller than the value of the (1-5)th RLC state variable, may regard, as data within the reception window, data having an RLC serial number belonging to the above range, and may regard, as data outside the reception window, data belonging to an RLC serial number that does not falling within the range. In the above, the window size may be determined as the value of 2^(the length of RLC serial number−1).

A detailed operation of the first embodiment of the method for processing received data by an RLC layer device (e.g., an LTE RLC layer device or an E-UTRA RLC layer device) of the disclosure is as follows. When data (e.g., RLC data PDU) received from the lower layer device is received, with regard to data from y byte to z byte of data (e.g., AMD PDU) corresponding to the received RLC serial number x, the reception RLC layer device in the RLC AM mode processes the data as follows.

1> When RLC serial number x is outside the window,
1> or when data from y byte to z byte of data having RLC serial number x has been received before,
  2> the received data (e.g., RLC data PDU) is discarded.
1> Otherwise,
  2> the received data (e.g., RLC data PDU) is stored in the receive buffer.
  2> When a part of the received data (partial data (segment) corresponding to some bytes) has been received before,
    3> The duplicate (duplicately received) data of the received data is discarded.

In a case where data corresponding to the RLC serial number x is stored in a reception buffer, the reception RLC layer device of the RLC AM mode processes the data as follows.

1> When the out-of-order delivery function indicator of the RLC layer device is configured,
  2> when all byte data (byte segments) of the data (e.g., AMD PDU) corresponding to the RLC serial number x are received,
    3> reassemble all of the received partial data (byte segments) for the RLC serial number x to configure an RLC SDU, and remove the RLC header, and when the reassembled data (RLC SDU) has never been delivered to the higher layer device, it may be delivered to the higher layer device.
1> When the RLC serial number x is greater than or equal to the (1-3)th RLC state variable,
  2> the (1-3)th RLC state variable is updated to the value of (x+1).
1> When all byte data (byte segments) of data (e.g., AMD PDU) corresponding to the RLC serial number equal to the (1-4)th RLC status variable value are received,
  2> the (1-4)th RLC state variable value is updated using the RLC serial number, which is greater than the current (1-4)th RLC state variable value and corresponding to the first data (e.g., AMD PDU) for which all partial data (byte segments) are not received.
1> When the value of the RLC serial number x is the same as the (1-1)th RLC state variable value,
  2> when all byte data (byte segments) of data (e.g., AMD PDU) having the same RLC serial number as the value of the (1-1)th RLC state variable are received,
    3> the (1-1)th RLC state variable value is updated using the RLC serial number, which is greater than the current (1-1)th RLC state variable value and corresponding to the first data (e.g., AMD PDU) for which all partial data (byte segments) are not received.
    3> The current value of the (1-5)th RLC state variable is updated to the value obtained by calculation of the updated value of the (1-1)th RLC state variable+the value of the window size.
  2> With regard to data outside the reception window or partial data that fits the order of the data (e.g., AMD PDU) having an RLC serial number corresponding to the (1-1)th RLC state variable value, reassemble all of partial data (byte segments) to configure an RLC SDU, and remove the RLC header, and when the reassembled data (RLC SDU) has never been delivered to the higher layer device, it may be delivered to the higher layer device.
1> When the reordering timer is running,
  2> when the value of the (1-2)th RLC state variable is the same as the value of the (1-1)th RLC state variable,
  2> or when the value of the (1-2)th RLC state variable is outside the reception window, and the value of the (1-2)th RLC state variable is different from the value of the (1-5)th RLC state variable,
    3> the reordering timer is stopped and initialized.
1> When the reordering timer is not running (including a case in which the timer is interrupted by the above procedure),
  2> when the value of the (1-3)th RLC state variable is greater than the value of the (1-1)th RLC state variable,
    3> the reordering timer is started.
    3> the (1-2)th RLC state variable value is configured or updated to the (1-3)th RLC state variable value.

When the reordering timer expires in the above, the reception RLC layer device operating in the RLC AM mode operates as follows.

1> The (1-4)th RLC state variable value is updated using the RLC serial number corresponding to the first data (e.g., AMD PDU) having a value greater than or equal to the current value of the (1-2)th RLC state variable and for which all byte segments are not received.
1> When the value of the (1-3)th RLC state variable is greater than the value of the (1-4)th RLC state variable,
  2> the reordering timer is started.
  2> the (1-2)th RLC state variable value is configured or updated to the (1-3)th RLC state variable value.

A second embodiment of a method for processing received data by the RLC layer device proposed in the disclosure is a reception data processing method that can be applied to the RLC UM mode (e.g., the RLC UM mode of E-UTRA or the LTE RLC layer device), the following window variables can be defined and used.

(2-1)th RLC state variable (e.g., VR(UR)): this state variable is a variable that stores, has, or indicates the RLC serial number of the earliest data still considered for reordering (e.g., UMD PDU). Alternatively, this variable is a variable that stores or has the RLC serial number of the lowest RLC serial number data (UMD PDU) still considered for reordering.

(2-2)th RLC state variable (e.g., VR(UX)): This state variable is a variable that stores, has, or indicates the next RLC serial number of the RLC serial number of the data (e.g., UMD PDU) that has triggered the reordering timer.

(2-3)th RLC status variable (e.g., VR(UH)): This status variable is a variable that stores, has, or indicates the next RLC serial number of the RLC serial number of data (e.g., UMD PDU) having the highest RLC serial number among the received data (e.g., UMD PDU).

In the second embodiment of the method for processing received data by the RLC layer device of the disclosure, the reception window may be defined by "the (2-3)th RLC state variable value—RLC serial numbers greater than or equal to the size of the reception window and smaller than the value of the (2-3)th RLC state variable", pieces of data having an RLC serial number belonging to the above range is regarded as data within the reception window, and pieces of data belonging to an RLC serial number not falling within the range are regarded as data outside the reception window. In the above, the window size may be determined as the value of 2^(the length of RLC serial number−1).

A detailed operation of the second embodiment of the method for processing received data by an RLC layer device (e.g., an LTE RLC layer device or an E-UTRA RLC layer device) of the disclosure is as follows.

When data (e.g., UMD PDU) having an RLC serial number x is received from a lower layer device, the reception RLC layer device in the RLC UM mode processes the data as follows.
1> When the RLC serial number x is greater than the (2-1)th RLC state variable value and less than the (2-3)th RLC state variable value, and has been previously received,
1> or when RLC serial number x is greater than or equal to (the (2-3)th RLC state variable value−window size) value and less than the (2-1)th RLC state variable value,
2> the received data (e.g., UMD PDU) is discarded.
1> Otherwise,
2> the received data (e.g., RLC data PDU) is stored in the receive buffer.

In a case where data corresponding to the RLC serial number x is stored in a reception buffer, the reception RLC layer device in the RLC UM mode processes the data as follows.
1> When the out-of-order delivery function indicator of the RLC layer device is configured,
2> when all byte data (byte segments) of the data corresponding to the RLC serial number x (e.g., AMD PDU) have been received,
3> all of the received partial data (byte segments) for the RLC serial number x are reassembled to configure an RLC SDU and the RLC header is removed, and when the reassembled data (RLC SDU) has never been delivered to a higher layer device, it may be delivered to a higher layer device.
1> When the RLC serial number x is outside the window,
2> the (2-3)th RLC state variable is updated to a value of (x+1).
2> With regard to data outside the reception window, all partial data (byte segments) are reassembled to configure an RLC SDU and the RLC header is removed, and when the reassembled data (RLC SDU) has never been delivered to a higher layer device, it may be delivered to a higher layer device in ascending order of the RLC serial number.
2> When the value of the (2-1)th RLC state variable is outside the window,
3> the value of the (2-1)th RLC state variable is configured or updated to the value obtained by (the (2-3)th RLC state variable value−window size) value.
1> When data (e.g., UMD PDU) corresponding to the (2-)th RLC status variable value has already been received,
2> the value of the (2-1)th RLC state variable is updated to the RLC serial number corresponding to the first data (e.g., UMD PDU) that is greater than the current value of the (2-1)th RLC state variable and is not received.
2> With regard to data (e.g., UMD PDU) having an RLC serial number smaller than the updated (2-1)th RLC state variable value, all partial data (byte segments) are reassembled to configure an RLC SDU and the RLC header is removed, and when the reassembled data (RLC SDU) has never been delivered to a higher layer device, it may be delivered to a higher layer device in ascending order of the RLC serial number.
1> When the reordering timer is running,
2> when the value of the (2-2)th RLC state variable is less than or equal to the value of the (2-1)th RLC state variable,
2> or when the value of the (2-2)th RLC state variable is outside the reception window, and the value of the (2-2)th RLC state variable is different from the value of the (2-3)th RLC state variable,
3> the reordering timer is stopped and initialized.
1> When the reordering timer is not running (including a case where the timer is interrupted by the above procedure),
2> when the value of the (2-3)th RLC state variable is greater than the value of the (2-1)th RLC state variable,
3> the reordering timer is started.
3> the (2-2)th RLC state variable value is configured or updated to the (2-3)th RLC state variable value.

When the reordering timer expires in the above, the reception RLC layer device operating in the RLC UM mode operates as follows.
1> The value of the (2-1)th RLC state variable is updated to the RLC serial number corresponding to the first data (e.g., UMD PDU) that is greater than or equal to the current (2-2)th RLC status variable value and is not received.
1> With regard to data (e.g., UMD PDU) having an RLC serial number smaller than the updated (2-1)th RLC state variable value, all partial data (byte segments) are reassembled to configure an RLC SDU and the RLC header is removed, and when the reassembled data (RLC SDU) has never been delivered to a higher layer device, it may be delivered to a higher layer device in ascending order of the RLC serial number.
1> When the value of the (2-3)th RLC state variable is greater than the value of the (2-1)th RLC state variable,
2> the reordering timer is started.
2> the value of the (2-2)th RLC state variable is configured or updated to the value of the (2-3)th RLC state variable.

FIG. 2B illustrates an efficient data processing method of PDCP layer devices proposed in the disclosure.

FIG. 2B proposes specific structures and functions of an efficient PDCP layer device in the disclosure, and may connect and apply different PDCP layer structures to different RLC layer devices according to different bearers.

For example, when the structure and function of the first PDCP layer device (e.g., the structure or function of the LTE (E-UTRA) PDCP layer device which is connected to the RLC UM or RLC AM and does not include a reordering function) 2b-11, or the structure and function of the second PDCP layer device (a split bearer, an LWA bearer, or a bearer for which packet duplication is established (or PDCP layer device), proposed in the disclosure is configured for each bearer, or when two (or a plurality of) RLC layer devices are configured in one PDCP layer device, a UE may perform data processing and perform data transmission or reception by applying E-UTRA PDCP layer devices or NR PDCP layer devices 2b-12, in which the corresponding ordering function is driven, to a PDCP layer device connected to an RLC layer device for which the out-of-order delivery function is configured.

The reception operation of the reception PDCP layer device in the structure of the first PDCP layer device or the structure of the second PDCP layer device proposed in the disclosure may be specified using the following window variables or constants.

- (1-1)th window variable (Next_PDCP_TX_SN): is a window variable used in the LTE (E-UTRA) PDCP layer device, and indicates the PDCP serial number value of next data (PDCP SDU), data to be processed next (PDCP SDU), or data to be transmitted next (PDCP SDU) in a transmission PDCP layer device. When establishing the PDCP layer device, the initial value of the window variable is configured to be 0.
- (1-2)th window variable (Next_PDCP_RX_SN): is a window variable used in the LTE PDCP (E-UTRA) layer device, and indicates the PDCP serial number value expected to be received next by the reception PDCP layer device. When establishing the PDCP layer device, the initial value of the window variable is configured to be 0.
- (1-3)th window variable (Last_Submitted_PDCP_RX_SN): is a window variable used in the LTE PDCP (E-UTRA) layer device, and indicates the PDCP serial number value corresponding to the last data (PDCP SDU) transmitted to a higher layer device by a reception PDCP layer device. When establishing the PDCP layer device, the window variable is configured to be a first constant value (Maximum_PDCP_SN).
- (1-4)th window variable (Reordering_PDCP_RX_COUNT): is a window variable used in the LTE PDCP (E-UTRA) layer device and may be used when the reception PDCP layer device performs a reordering function, and the window variable indicates, stores, or has the next COUNT value of the COUNT value corresponding to the data (PDCP PDU) that has triggered the reordering timer.

The first constant value (Maximum_PDCP_SN): is a constant value used in the LTE (E-UTRA) PDCP layer device, and stores the value of $2^{\wedge}$(the length of the PDCP serial number)$-1$ as a constant value.

Second constant value (Reordering_Window_or_Window_Size): is a constant value used in the LTE (E-UTRA) PDCP layer device or NR PDCP layer device, and stores the value of $2^{\wedge}$(the length of the PDCP serial number$-1$) as a constant value.

- (2-1)th window variable (TX_NEXT): is a window variable used in the NR PDCP layer device, and indicates a COUNT value of the next data (PDCP SDU), data to be processed next (PDCP SDU), or data to be transmitted next (PDCP SDU) in the transmission PDCP layer device. When establishing the PDCP layer device, the initial value of the window variable is configured to be 0.
- (2-2)th window variable (RX_NEXT): is a window variable used in the NR PDCP layer device, and indicates a COUNT value expected to be received next by the reception PDCP layer device. When establishing the PDCP layer device, the initial value of the window variable is configured to be 0.
- (2-3)th window variable (RX_DELIV): is a window variable used in the NR PDCP layer device, and indicates a COUNT value corresponding to the first data (PDCP SDU) that is not delivered to a higher layer device by the reception PDCP layer device. When establishing the PDCP layer device, the initial value of the window variable is configured to be 0.
- (2-4)th window variable (RX_REORD): is a window variable used in the NR PDCP layer device and may be used when the reception PDCP layer device performs a reordering function, and the window variable indicates, stores, or has the next COUNT value of the COUNT value corresponding to the data (PDCP PDU) that has triggered the reordering timer.

The structure 2b-11 or 2b-12 of the first PDCP layer device proposed in FIG. 2B may include the following (1-1)th PDCP layer device structure, (1-2)th PDCP layer device structure, or (1-3)th PDCP layer device structure proposed in the disclosure, and may include the following characteristics.

1> (In a case of the (1-1)th PDCP layer device structure) for example, when a UE applies the structure and function 2b-11 of the first PDCP layer device to a PDCP layer device (e.g., E-UTRA PDCP layer device or LTE PDCP layer device) connected to the AM RLC layer device (e.g., E-UTRA AM RLC layer device), the following procedures can be performed based on the (1-2)th window variable, the (1-3)th window variable, or the second constant value 2> The reception PDCP layer device may perform first detection of data outside the window or detection of duplicate data, based on the (1-2)th window variable, the (1-3)th window variable, or the second constant value for the received data. (Retransmission occurs in the RLC AM and the size of LTE RLC SN and PDCP SN may be different, and thus duplicate data or data outside the window may be received. In the above, the window indicates the area of the PDCP serial number or COUNT value in which valid data is received.)

3> The UE performs a deciphering procedure and a header decompression procedure based on the (1-2)th window variable, the (1-3)th window variable, or the second constant value before discarding the data outside the window or duplicate data and then discards the same (Because useful information for the header decompression procedure (such as IR packet or header compression information) may be included, it can be checked and discarded.)

2> The PUSH window is driven based on the (1-2)th window variable, the (1-3)th window variable, or the second constant value, and pieces of data which are received without being discarded in the above are deciphered without ordering and header decompression procedure thereof may be performed. This is because the E-UTRA AM RLC layer device arranges the pieces of data in order and delivers the data to the PDCP layer device.

2> Further, when delivering the data to a higher layer, the data is delivered in ascending order of COUNT values.

1> (In a case of the (1-2)th PDCP layer device structure) for example, when a UE applies the structure and function 2b-11 of the first PDCP layer device to a PDCP layer device (e.g., E-UTRA PDCP layer device or LTE PDCP layer device) connected to the UM RLC layer device (e.g., E-UTRA AM RLC layer device), the following procedures can be performed based on the (1-2)th window variable or the second constant value.

2> A procedure of detecting data outside the window or a duplicate data may not be performed. This is because the UM E-UTRA RLC layer device does not have a retransmission procedure.

2> The HFN value or COUNT value may be determined based on the (1-2)th window variable or the second constant value, the PULL window procedure may be driven, and a deciphering procedure may be directly performed on the pieces of received data in the above and then the header decompression procedure thereof may be performed.

2> Further, the data may be delivered directly to a higher layer (e.g., in ascending order) without performing a reordering procedure.

In the above, in the (1-1)th PDCP layer device structure or the (1-2)th PDCP layer device structure, reception data processing operation is performed without performing the reordering function based on the (1-2)th window variable, the (1-3)th window variable, or the second constant value. However, in the second PDCP layer device structure, reception data processing operation is performed after performing the reordering function based on the (1-4)th window variable, the (2-1)th window variable, the (2-2)th window variable, the (2-3)th window variable, or the (2-4) window variable for the reordering function as well as the (1-2)th window variable, the (1-3)th window variable, or the second constant value When the out-of-order delivery function proposed in the disclosure has been configured in the RLC layer device or when the out-of-order delivery function is configured to be driven after configuration in the RLC layer device (when the out-of-order delivery function configuration indicator is configured to be a TRUE value), in order to prevent data loss described in FIG. 2C or prevent the PDCP layer device from delivering the pieces of data received via a higher layer device (e.g., SDAP layer device or application layer device) regardless of the order, the PDCP layer device that drives the reordering function may be configured or driven as follows.

In a method for driving a PDCP layer device proposed in the disclosure, pieces of data received by the PDCP layer device may be processed in the (1-3)th PDCP layer device structure or the second PDCP layer device structure having a reordering function for the following cases. Specifically, with regard to data radio bearers (DRBs) connected to RLC AM mode or RLC UM mode, with regard to LWA bearers, or when packet duplication technology is used, the PDCP layer device may use or apply a reordering function for the following cases, and may perform a procedure of the (1-3)th PDCP layer device structure or the second PDCP layer device structure performing the reordering function.

When the PDCP layer device is connected to two RLC layer devices, or when the PDCP layer device is configured for an LTE-wireless LAN aggregation bearer (LWA bearer), or when the PDCP layer device has been connected to two RLC AM mode RLC layer devices, or has been established for the LWA bearer, and thereafter when the PDCP layer device is connected to one RLC layer device in the RLC AM mode without a PDCP re-establishment procedure due to the most recent reconfiguration, or when the PDCP layer device is configured with packet duplication technology, or when the PDCP layer device is connected to one RLC layer device or two (or a plurality of) RLC layer devices for which the out-of-order delivery function is configured (or the out-of-order delivery function configuration indicator of the RLC layer device is configured to be a TRUE value), or when the PDCP layer device is connected to one RLC AM mode- or RLC UM mode-RLC layer device or two (or a plurality of) RLC AM mode- or RLC UM mode-RLC layer devices for which the out-of-order delivery function is configured (or the out-of-order delivery function configuration indicator of the RLC layer device is configured to be a TRUE value), or when a dual active protocol stack (DAPS) handover method is indicated or a PDCP layer device reconfiguration indicator is indicated from a higher layer device (e.g., RRC layer device), or when the DAPS handover is successfully completed (or the random access procedure is successfully completed) or when the PDCP layer device reconfiguration indicator is indicated from a higher layer device (e.g., RRC layer device), or when a radio link failure is detected in the source base station during DAPS handover, or when the PDCP layer device reconfiguration indicator is indicated from the higher layer device (e.g., RRC layer device), or when the DAPS handover fails and the radio connection with the source base station is valid and falls back to the source base station, or when the PDCP layer device reconfiguration indicator is indicated from the higher layer device (e.g., RRC layer device), a procedure for processing data received in the (1-3)th PDCP layer device structure having a reordering function proposed in the disclosure is as follows.

1> (In a case of the (1-3)th PDCP layer device structure) the reordering procedure and reordering timer are always applied, and the following procedure can be performed based on the (1-2)th window variable, (1-3)th window variable, (1-4)th window variable, or a first constant value.

2> With regard to pieces of data received based on the (1-2)th window variable, the (1-3)th window variable, the (1-4)th window variable, or the first constant value, detection of data outside the window or detection of duplicate data is performed first. (This is because data may be received at different times due to RLC AM retransmission or from different RLC layer devices, and data outside the window or duplicate data may be received because the size of the LTE RLC SN and the PDCP SN may be different.)

3> A deciphering procedure is performed. However, the header decompression procedure may not be performed. (Because E-UTRA PDCP cannot be configured with header compression protocol for a split bearer or LWQ bearer)
   3> When the integrity protection or verification procedure has been performed, the data may be discarded after performing the integrity protection or verification procedure. When the integrity verification procedure fails, the data may be discarded and reported to a higher layer device.
   3> Data outside the window or duplicate data may be discarded.
2> The PUSH window operation may be performed based on the (1-2)th window variable, the (1-3)th window variable, the (1-4)th window variable, or the first constant value, and when the data is not discarded in the above, a deciphering procedure may be directly performed on received data without ordering. In addition, when the integrity protection or verification is configured, the integrity verification may be performed. When the integrity protection or verification procedure has been performed, the data may be discarded after performing the integrity protection or verification procedure. When the integrity verification procedure fails, the data may be discarded and reported to a higher layer device.
2> In addition, ordering of the pieces of received data is performed, and when the pieces of data are sorted consecutively in ascending order without a gap of the PDCP serial numbers or COUNT values, the header compression procedure thereof may be performed (when the header compression procedure or decompression procedure is configured) and the pieces of data may be delivered to a higher layer in ascending order.
2> When the reordering timer is running,
   3> when data corresponding to a COUNT value having the same value as the value obtained by subtracting 1 from the value maintained by the variable for reordering is delivered to a higher layer device, or when all data are delivered to a higher layer without a gap in the PDCP serial number (or COUNT value),
      4> the reordering timer is stopped and reset.
2> When the reordering timer is not running,
   3> when there is data stored in a buffer without being delivered to a higher layer device, or when there is a gap in the PDCP serial number (or COUNT value),
      4> the reordering timer is started.
      4> In addition, the variable for reordering is updated to the PDCP serial number or COUNT value which will be expected to be received next.
2> When the reordering timer has expired,
   3> when the header decompression procedure is configured in the ascending order of the PDCP serial number or COUNT value for a value smaller than the reordering variable value, the header decompression procedure is performed for the pieces of stored data and then the pieces of stored data are delivered to the higher layer device.
   3> When the header decompression procedure is configured in the ascending order of the PDCP serial number or COUNT value continuously for values equal to or greater than the reordering variable value, the header decompression procedure is performed for the pieces of stored data and the pieces of stored data are delivered to the higher layer device.
   3> In addition, the variable value for the data last delivered to the higher layer is updated to the PDCP serial number or COUNT value of the last delivered data.
   3> When there is data stored in the buffer without being delivered to the higher layer device, or when there is a gap in the PDCP serial number (or COUNT value),
      4> the reordering timer is started.
      4> In addition, the variable for reordering is updated to the PDCP serial number or COUNT value which will be expected to be received next.

A procedure for processing data received in the second PDCP layer device structure having a reordering function proposed in the disclosure is as follows.
1> (In a case of the second PDCP layer device structure) for example, the order reordering procedure and the reordering timer are always applied to the NR PDCP layer device, and the following procedure may be performed based on the (2-2)th window variable, the (2-3)th window variable, the (2-4)th window variable, or the first constant value.
2> A deciphering procedure may be first performed on the pieces of received data.
2> When the integrity protection or verification procedure is configured, the integrity protection or verification procedure is performed on the received data, and when the integrity verification procedure fails, the data may be discarded and reported to a higher layer device.
2> Detection of data outside the window or duplicate data detection is performed for the received data, based on the (2-2)th second window variable, the (2-3)th window variable, the (2-4)th window variable, or the first constant value (After performing the deciphering procedure in the above, detection of data outside the window or duplicate detection may be performed. According to another method, only when the integrity protection or verification procedure is configured, the deciphering procedure is performed and then data detection outside the window or duplicate detection is performed, and when the integrity protection or verification procedure is not configured, data detection outside the window or duplicate detection may be performed, and then the deciphering procedure may be performed only on pieces of data that have not been discarded.)
   3> Data outside the window or duplicate data may be discarded.
2> The PUSH window is driven based on the (2-2)th window variable, the (2-3)th window variable, the (2-4)th window variable, or the first constant value. When the data has not been discarded in the above, ordering of pieces of received data are performed, and when the pieces of received data are sequentially arranged in ascending order without gaps in PDCP serial numbers or COUNT values, a header compression procedure is performed (when the header compression procedure or decompression procedure is configured) and the pieces of received data can be delivered to a higher layer in ascending order.

2> Further, when delivering to the higher layer, the pieces of data may be delivered in ascending order of COUNT values.
2> When the reordering timer is running,
   3> when data corresponding to a COUNT value having the same value as the value obtained by subtracting 1 from the value maintained by the variable for reordering is delivered to a higher layer device, when all data are delivered to a higher layer without a gap in the PDCP serial number (or COUNT value), or when the value of the variable storing the PDCP serial number or COUNT value of the data to be delivered to the higher layer is greater than or equal to the value of the variable for reordering,
      4> the reordering timer is stopped and reset.
2> When the reordering timer is not running,
   3> when there is data stored in a buffer without being delivered to a higher layer device, when there is a gap in the PDCP serial number (or COUNT value), or when the value of the variable that stores the COUNT value of the first data that is not delivered to the higher layer is smaller than the value of the variable for reordering,
      4> the variable for reordering is updated to the PDCP serial number or COUNT value which will be expected to be received next.
      4> the reordering timer is started.
2> When the reordering timer has expired,
   3> in case that the header decompression procedure is configured in the ascending order of the PDCP serial number or COUNT value for a value smaller than the reordering variable value, the header decompression procedure is performed for the pieces of stored data and then the pieces of stored data are delivered to the higher layer device.
   3> in case that the header decompression procedure is configured in the ascending order of the PDCP serial number or COUNT value continuously for values equal to or greater than the reordering variable value, the header decompression procedure is performed for the pieces of stored data and the pieces of stored data are delivered to the higher layer device.
   3> In addition, the variable value for the first data not delivered to the higher layer is updated to the PDCP serial number or COUNT value of the first data not delivered to the higher layer.
   3> When there is data stored in the buffer without being delivered to the higher layer device, when there is a gap in the PDCP serial number (or COUNT value), or when the value of the variable storing the COUNT value of the first data not delivered to the higher layer is smaller than the value of the variable for reordering,
      4> the variable for reordering is updated to the PDCP serial number or COUNT value which will be expected to be received next.
      4> the reordering timer is started.

Figure 2C:
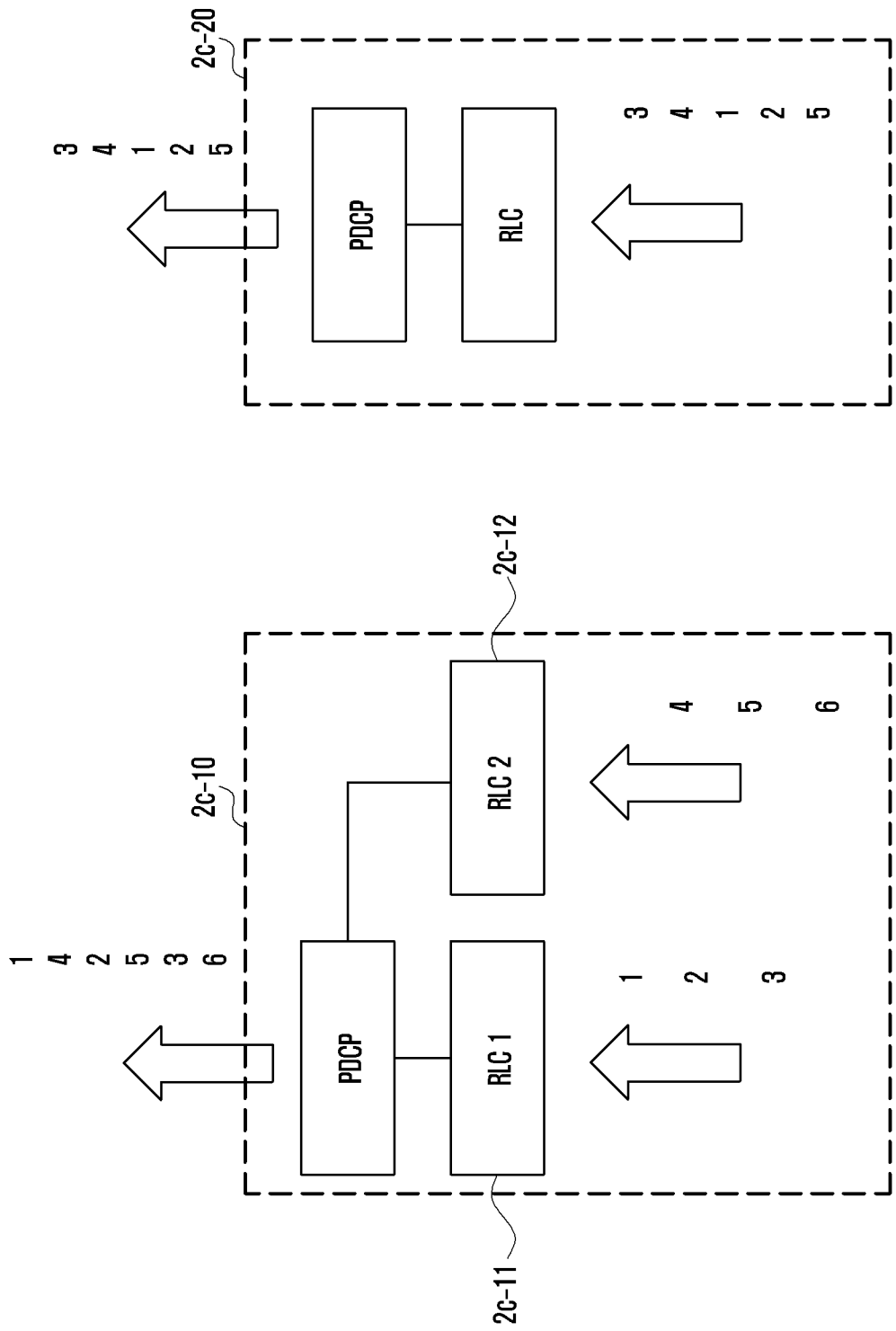
FIG. 2C illustrates an operation that may occur when an out-of-order delivery function is configured in an RLC layer device proposed by the disclosure.

FIG. 2C is a diagram illustrating a problem when the out-of-order delivery function proposed in the disclosure is configured in an RLC layer device (e.g., E-UTRA RLC layer device) that processes data according to the first embodiment or the second embodiment, when the out-of-order delivery function is configured and configured to be driven in the RLC layer device (when the out-of-order delivery function configuration indicator is configured to be TRUE value), or when a plurality of RLC layer devices are connected to the PDCP layer device and configured, when reception data is processed by connecting and configuring the (1-1)th PDCP layer device structure or the (1-2)th PDCP layer device structure to the RLC layer device.

The serial number shown in reference numeral 2c-10 of FIG. 2C is described based on the PDCP serial number, and as shown in Table 1 below, the PDCP serial number may have a mapping relationship with the RLC serial number of each RLC layer device.

TABLE 1

| Mapping relationship | Data 1 | Data 2 | data 3 | data 4 | data 5 | data 6 |
|---|---|---|---|---|---|---|
| PDCP serial number | 1 | 2 | 3 | 4 | 5 | 6 |
| RLC serial number (2c-11) | 1 | 2 | 3 | | | |
| RLC serial number (2c-12) | | | | 1 | 2 | 3 |

As shown in reference numeral 2c-10 of FIG. 2C, when two (or a plurality of) RLC layer devices 2c-11 and 2c-12 are connected to one PDCP layer device, are configured via a split bearer or LWA bearer, or when packet duplication technology is configured, each RLC layer device may receive different data or duplicate data at different time points, and even when the out-of-order delivery function is not configured, that is, each RLC layer device sequentially delivers data to the PDCP layer device based on the RLC serial number, time points at which the PDCP layer device receives data from the primary RLC entity 2c-11 and the secondary RLC entity 2c-12 may differ. Therefore, in reference numeral 2c-10, when the PDCP layer device is configured as the (1-1)th PDCP layer device structure or the (1-2)th PDCP layer device structure that does not perform the reordering function, the PDCP layer device does not perform ordering and delivers data received from lower layer devices (RLC layer devices) to a higher layer device regardless of the order, not the ascending order of the PDCP serial number, as shown in reference numeral 2c-10.

In general, since it is assumed that a higher layer device (e.g., an application layer device (TCP/IP layer device)) of a PDCP layer device receives data sequentially from a lower layer device (PDCP layer device), when data is received out of order, it may be considered as data loss and a retransmission request is made, or it may determine that there is a problem with the wireless connection to reduce the data transmission rate. Therefore, a problem of unnecessary retransmission or a reduction in the transmission rate occurs. In addition, since the (1-1)th PDCP layer device structure or the (1-2)th PDCP layer device structure does not perform ordering under an assumption that data is received from the RLC layer device in order, and when the RLC layer device is configured as the out-of-order delivery function, the PDCP reception window moves too quickly, and thus late-received data is regarded as data outside the window and is discarded, resulting in a possibility of data loss.

Even when, in reference numeral 2c-20 of FIG. 2C, one RLC layer device is connected to one PDCP layer device and an out-of-order delivery function is configured in the RLC layer device, when the PDCP layer device is configured as the (1-1)th PDCP layer device structure or the (1-2)th PDCP layer device structure, the PDCP layer device does not perform ordering, and may deliver data received from lower layer devices (RLC layer) to the higher layer device regardless of the order, not the ascending order of the PDCP serial number, as shown in reference numeral 2c-20. In general, since it is assumed that a higher layer device (e.g., an application layer device (TCP/IP layer device)) of a PDCP layer device receives data sequentially from a lower layer device (PDCP layer device), when data is received out of order, it may be considered as data loss and a retransmission request is made, or it may determine that there is a problem with the wireless connection to reduce the data transmission rate. Therefore, a problem of unnecessary retransmission or a reduction in the transmission rate occurs. In addition, since the (1-1)th PDCP layer device structure or the (1-2)th PDCP layer device structure does not perform ordering under an assumption that data is received from the RLC layer device in order, and when the RLC layer device is configured as the out-of-order delivery function, the PDCP reception window moves too quickly, and thus late-received data is regarded as data outside the window and is discarded, resulting in a possibility of data loss.

Therefore, as shown in 2c-10 or 2c-20, when two (or a plurality of) RLC layer devices 2c-11 and 2c-12 are connected to one PDCP layer device, a split bearer or LWA bearer is configured therefor, or packet duplication technology is configured therefor, when the out-of-order delivery function is configured in the RLC layer device, or when one RLC layer device is connected to one PDCP layer device and an out-of-order delivery function is configured in the RLC layer device, the PDCP layer device should configure and apply the (1-3)th PDCP layer device (E-UTRA PDCP layer device in which the reordering function is performed) or the second PDCP layer device structure (an NR PDCP layer device in which the reordering function is performed or an NR PDCP layer device in which a base station determines that an application layer has a function of performing the ordering and configures the out-of-order delivery function) in order to prevent unnecessary retransmission or data loss as described above.

Figure 2D:
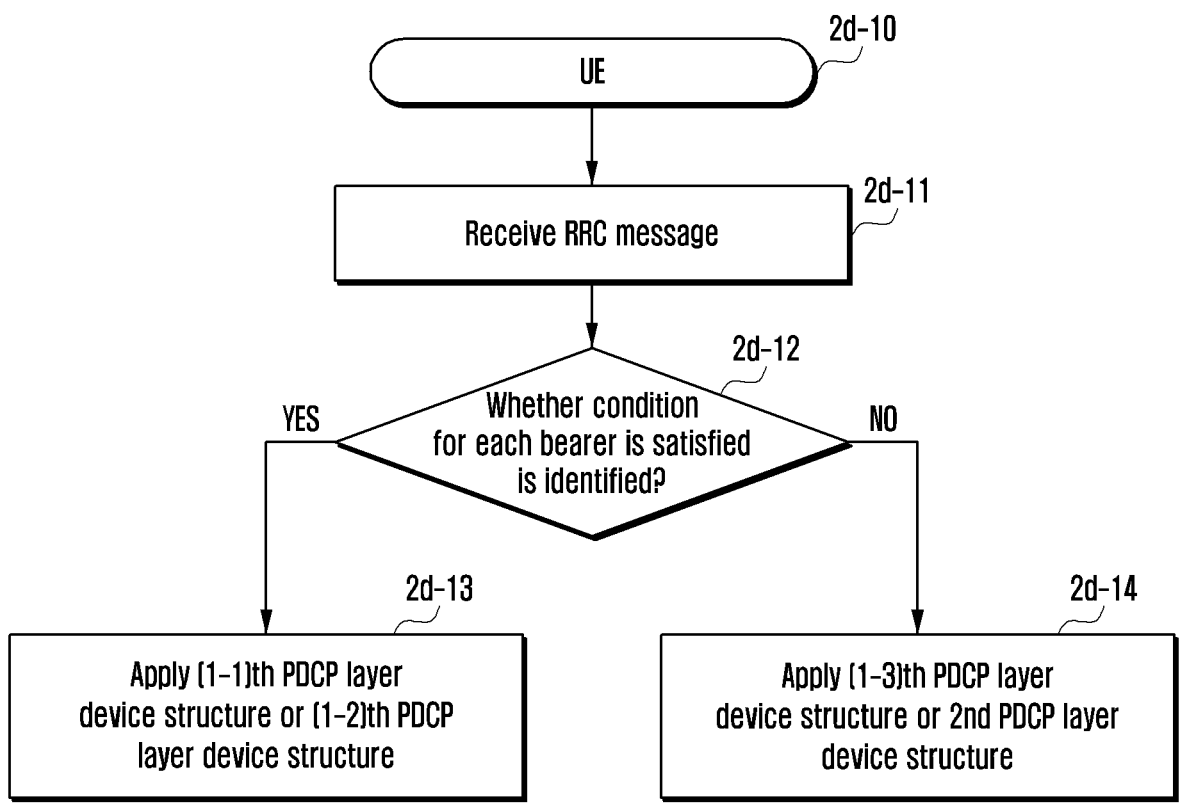
FIG. 2D illustrates an operation of a UE proposed by the disclosure.

FIG. 2D illustrates an operation of a UE proposed in the disclosure.

In the disclosure, when receiving an RRC message from a base station (indicated by reference numeral 2d-11), the UE 2d-10 may identify configuration information of an RLC layer device, configuration information of a PDCP layer device, or configuration information of a bearer, and may identify that one of the following conditions is satisfied (indicated by reference numeral 2d-12). In addition, in the following cases, the UE may apply the (1-3)th PDCP layer device structure or the second PDCP layer device structure having a reordering function to the PDCP layer device, and may process received data. Specifically, with regard to data radio bearers (DRBs) connected to the RLC AM mode or RLC UM mode, with regard to LWA bearers, when packet duplication technology is used, or when connected with an RLC layer device for which the out-of-order delivery function is configured, the PDCP layer device may use or apply a reordering function for the following cases, and may perform the procedure of the (1-3)th PDCP layer device structure or the second PDCP layer device structure performing the reordering function (indicated by reference numeral 2d-14).

when the PDCP layer device is connected with two RLC layer devices,
   or when the PDCP layer device is configured for an LTE-wireless LAN aggregation bearer (LWA bearer),
   or when the PDCP layer device has been connected to two RLC AM mode RLC layer devices, or has been established for the LWA bearer, and thereafter when the PDCP layer device is connected to one RLC layer device of the RLC AM mode without the PDCP re-establishment procedure due to the most recent reconfiguration,
   or when the PDCP layer device is configured with packet duplication technology,
   or when the PDCP layer device is connected to one RLC layer device or two (or a plurality of) RLC layer devices for which the out-of-order delivery function is configured (or the out-of-order delivery function configuration indicator of the RLC layer device is configured to be a TRUE value),
   or when the PDCP layer device is connected to one RLC layer device in the RLC AM mode or RLC UM mode or two (or a plurality of) RLC layer devices in the RLC AM mode or RLC UM mode for which the out-of-order delivery function is configured (or the out-of-order delivery function configuration indicator of the RLC layer device is configured to be a TRUE value),
   or when a dual active protocol stack (DAPS) handover method is indicated or a PDCP layer device reconfiguration indicator is indicated from a higher layer device (e.g., RRC layer device),
   or when the DAPS handover is successfully completed (or when the random access procedure is successfully completed), when the PDCP layer device reconfiguration indicator is indicated from the higher layer device (e.g., the RRC layer device),
   or when a radio link failure is detected in a source base station during the DAPS handover, or when the PDCP layer device reconfiguration indicator is indicated from a higher layer device (e.g., RRC layer device),
   or when the DAPS handover fails and the radio connection with the source base station is valid to perform falling back to the source base station, or when the PDCP layer device reconfiguration indicator is indicated from the higher layer device (e.g., RRC layer device), When none of the above cases are applicable, and when the RLC AM mode in which the first embodiment is performed or the RLC UM mode in which the second embodiment is performed is configured through the received RRC message, the (1-1)th PDCP layer device structure corresponding to the RLC AM mode or the (1-2)th PDCP layer device structure corresponding to the RLC UM mode proposed in the disclosure may be applied to the PDCP layer device and process received data.

Figure 2E:
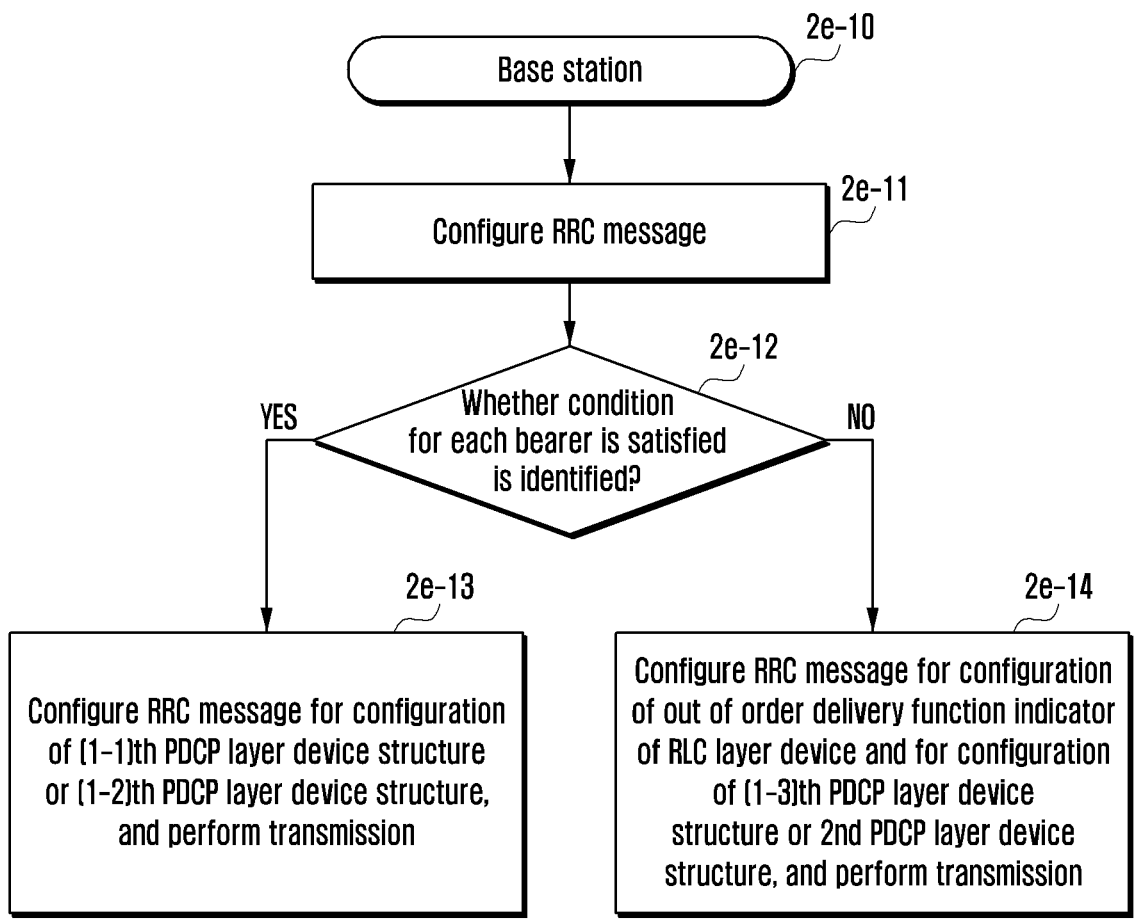
FIG. 2E illustrates an operation of a base station proposed by the disclosure.

FIG. 2E illustrates an operation of a base station proposed in the disclosure.

In FIG. 2E, the base station 2e-10 may identify or determine bearer configuration information as follows when configuring an RRC message to establish a bearer to a UE (indicated by reference numeral 2e-11), and may configure and set the RLC layer device configuration information, the out-of-order delivery function of the RLC layer device, or the configuration information of the PDCP layer device.

When transmitting an RRC message (e.g., an RRCReconfiguration message, an RRCSetup message, or an RRCResume message) to the UE, the base station may configure an indicator (e.g., rlc-OutOfOrderDelivery) for configuring an out-of-order delivery function in the RLC layer device configuration information (e.g., rlc-config) of the transmission resource configuration information (e.g., Radio Resource Config Dedicated) included in the RRC message, to configure the out-of-order delivery function in the RLC layer device for each bearer of the UE (e.g., the indicator is configured and the value thereof is configured to be TRUE)

or not (e.g., there is no indicator, or the indicator is configured and the value is configured to be FALSE). In the above, the indicator (e.g., rlc-OutOfOrderDelivery) for configuring the out-of-order delivery function may indicate that, when transmitting received data to a higher layer device (e.g., a PDCP layer device), by the RLC layer device corresponding to the RLC layer device configuration information in which the indicator is configured, the data should be delivered regardless of the order or in an out-of-order delivery method. In addition, the indicator for configuring the out-of-order delivery function for the RLC layer device may be configured for an RLC layer device connected to a bearer (or PDCP layer device) for which packet duplication is configured, a split radio bearer (SRB or DRB), an LWA bearer, or an NR PDCP layer device having a reordering function, or only when two (or a plurality of) RLC layer devices are configured in one PDCP layer device, or may be configured to be a TRUE value (indicated by reference numeral 2e-11). Therefore, the base station may determine or identify whether packet duplication is to be configured for each bearer, whether the packet duplication is to be configured for a split bearer, whether the packet duplication is to be configured for an LWA bearer, whether to configure an NR PDCP layer device, or whether to configure two (or plurality of) RLC layer devices for one PDCP layer device, and the base station may configure, only with regard to an RLC layer device connected to a bearer (or PDCP layer device) for which packet duplication is configured in the RLC layer device configuration information, a split radio bearer (SRB or DRB), or an LWA bearer, or an NR PDCP layer device having a reordering function, or only when two (or a plurality of) RLC layer devices are configured in one PDCP layer device, the out-of-order delivery function in the LTE (E-UTRA) RLC layer device and configure and transmit the RRC message (indicated by reference numeral 2e-14). When none of the above cases are applicable, the base station may configure an RLC AM mode in which the first embodiment is performed or an RLC UM mode in which the second embodiment is performed without configuring the out-of-order delivery function indicator of the RLC layer device in the RRC message above, and may configure the RRC message to apply and configure, for the PDCP layer device, the (1-1)th PDCP layer device structure corresponding to the RLC AM mode or the (1-2)th PDCP layer device structure corresponding to the RLC UM mode proposed in the disclosure and transmit the RRC message (indicated by reference numeral 2e-13).

Figure 2F:
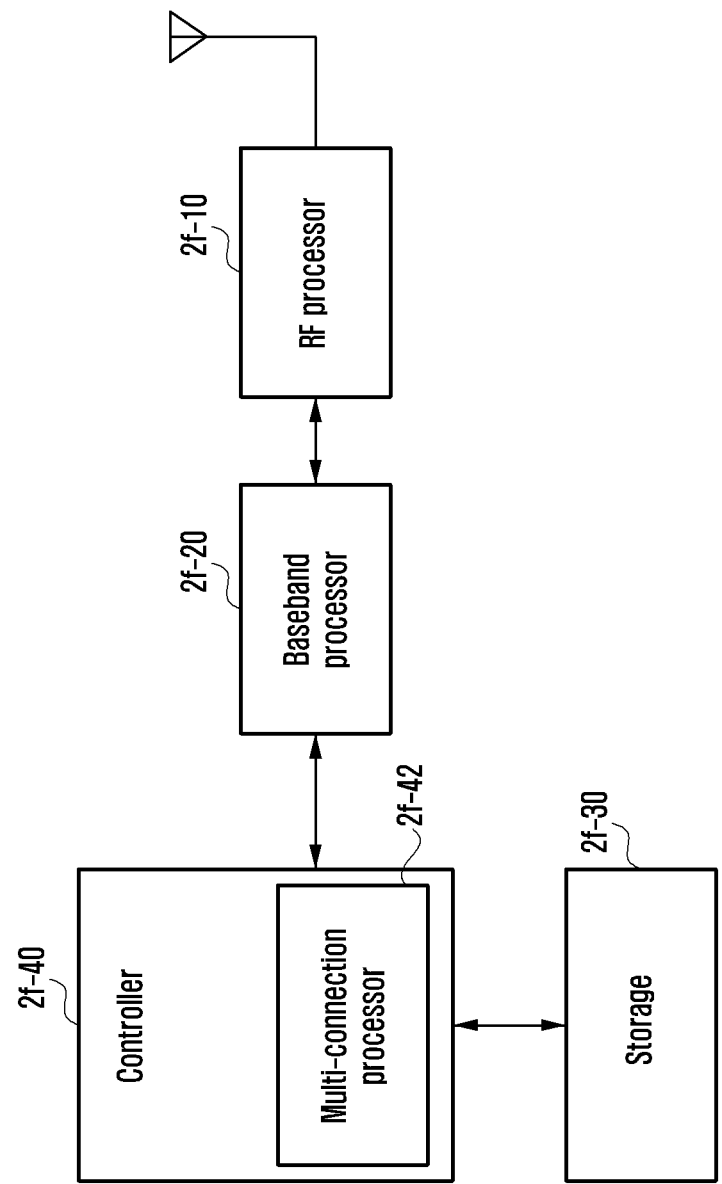
FIG. 2F illustrates the structure of a UE to which an embodiment of the disclosure can be applied.
Figure 2G:
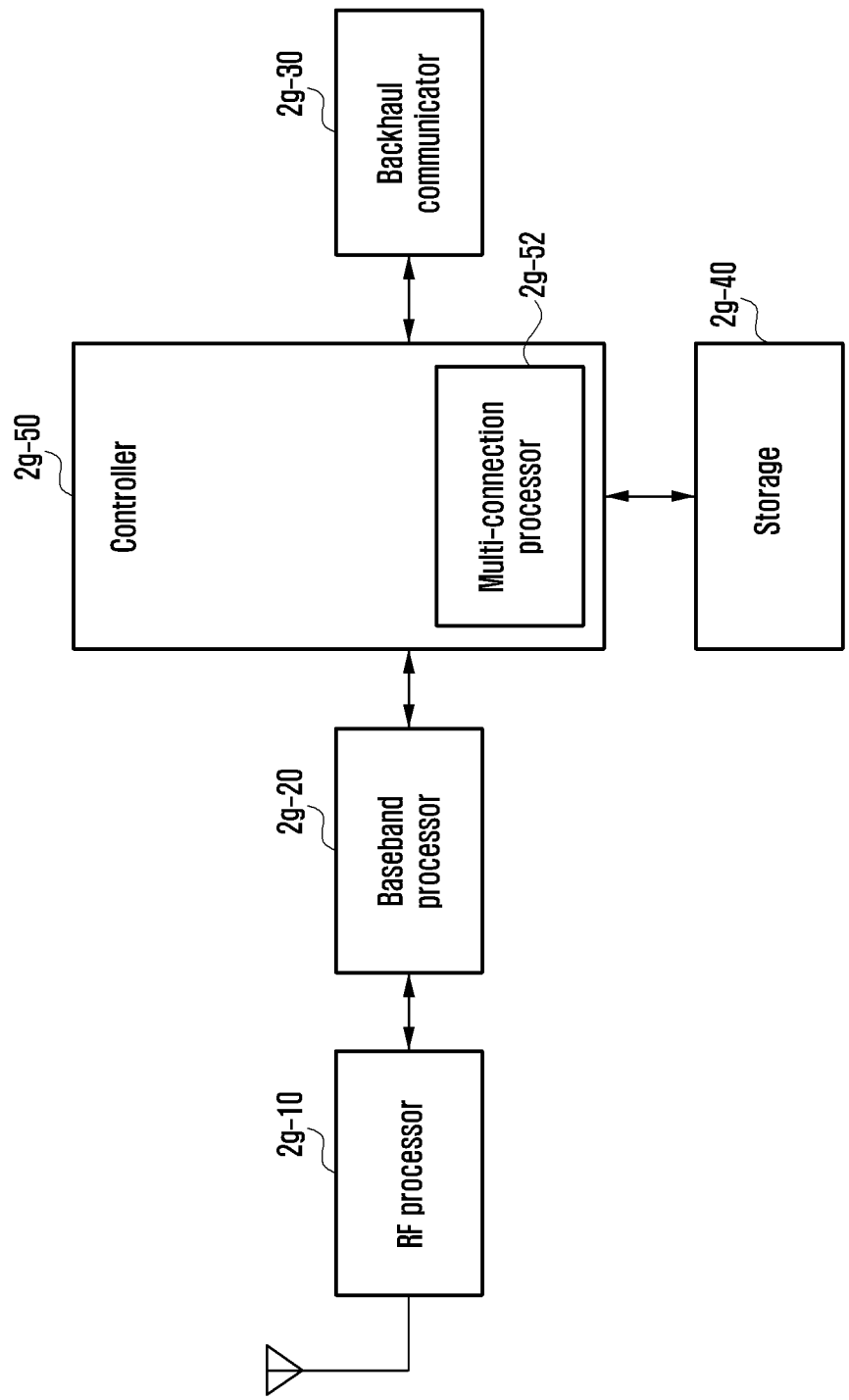
FIG. 2G shows a block configuration of a TRP in a wireless communication system to which an embodiment of the disclosure can be applied.
Figure 2H:
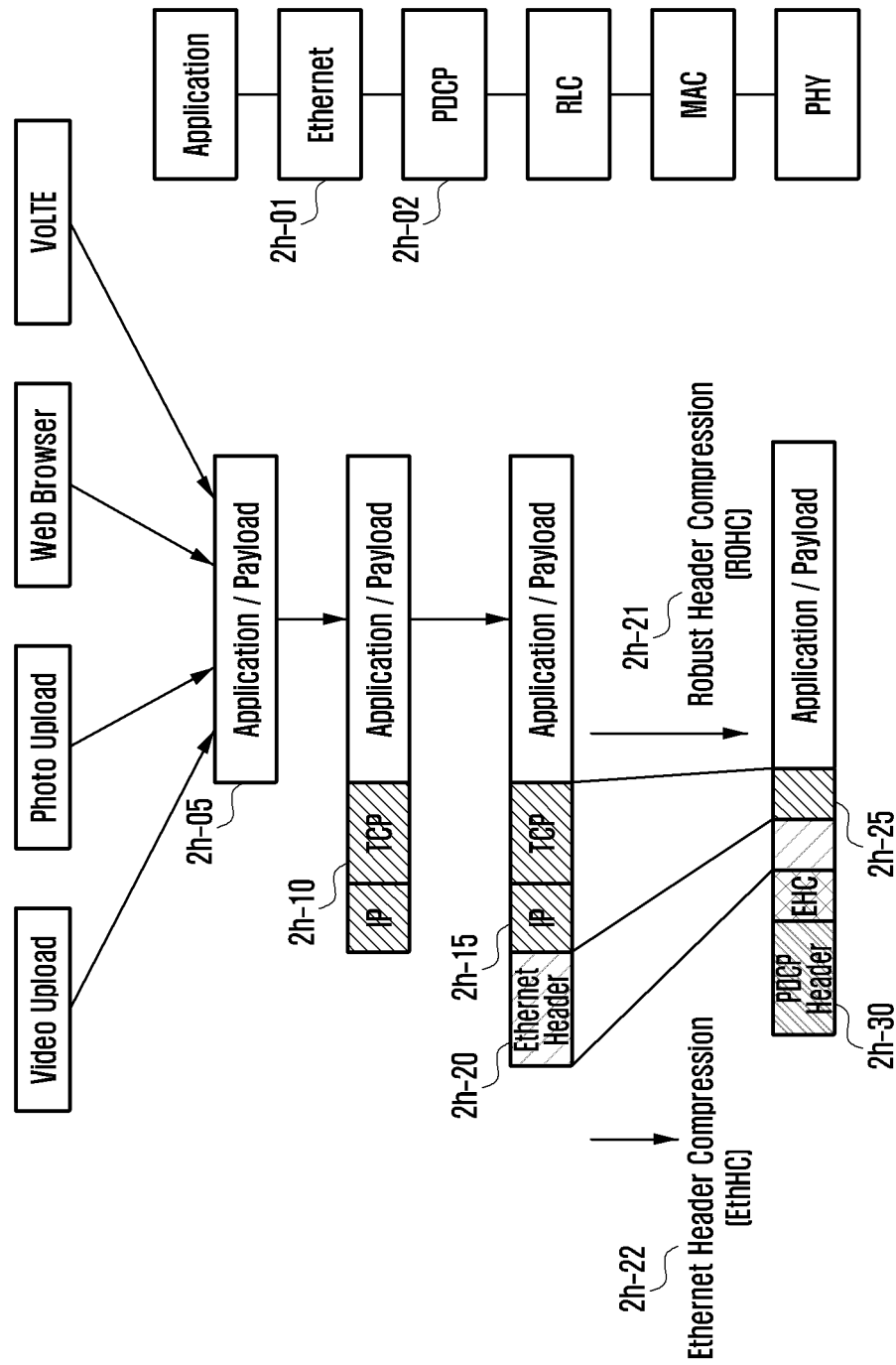
FIG. 2H illustrates an Ethernet header compression method proposed by the disclosure.

FIG. 2H illustrates an Ethernet header compression (EthHC) method proposed by the disclosure.

In FIG. 2H, higher layer data 2h-05 may be generated as data corresponding to services such as video transmission, photo transmission, web search, and VoLTE. Data generated in the application layer device may be processed through TCP/IP or UDP corresponding to a network data transport layer, or may be processed through the Ethernet protocol, configure respective headers (2h-10, 2h-15, and 2h-20) (higher layer header or Ethernet header), and deliver the same to the PDCP layer. The PDCP layer may perform the following procedure upon receiving data (PDCP SDU) from a higher layer.

When it is configured to use a header compression (ROHC) or Ethernet header compression procedure in the PDCP layer through RRC messages such as reference numerals 2a-10, 2a-40, or 2a-75 in FIG. 2A, the TCP/IP header is compressed via ROHC as shown in reference numeral 2h-21 and the Ethernet header compression procedure may be performed for the Ethernet header 2h-20 in the PDCP layer device as shown in reference numeral 2h-22. In addition, a field for indicating whether the Ethernet header is compressed, a field for indicating which fields of the Ethernet header are compressed (omitted) or uncompressed (not omitted), or a separate Ethernet header compression (EHC) header having a context identifier may be configured and the same may be configured before the compressed header. When the integrity protection or verification procedure is configured, integrity protection may be performed on the PDCP header, EHC header, compressed headers, and data. In addition, a PDCP PDU may be configured by performing a ciphering procedure on the EHC header, compressed headers, and data, and configuring the PDCP header 2h-30. In the above, the PDCP layer device includes a header compression or decompression device, determines whether to perform header compression for each data or not, as configured through the RRC message, and uses the header compression or decompression device. The transmission terminal may compress the Ethernet header or higher layer header (e.g., TCP/IP header) by using a header compression device in the transmission PDCP layer device. When integrity verification is configured, integrity protection may be performed on the PDCP header, EHC header, compressed headers, and data. In addition, a PDCP PDU may be configured by performing a ciphering procedure on the EHC header, compressed headers, and data, and configuring the PDCP header 2h-30. The reception terminal may perform a deciphering procedure on the EHC header, the compressed headers, and data in the reception PDCP layer device. Further, when the integrity protection or verification procedure is configured, integrity verification may be performed on the PDCP header, EHC header, compressed headers, and data. In addition, header decompression is performed on an Ethernet header or a higher layer header (e.g., a TCP/IP header) by using a header decompression device.

The procedure of FIG. 2H described above may be applied to a case where a UE performs downlink data header compression as well as uplink header compression. In addition, a description of uplink data may be equally applied to downlink data.

A method for performing Ethernet header compression on the Ethernet header according to an embodiment of the disclosure is a method for reducing the header size by omitting fields indicating or having fixed information and indicating only pieces of information changed or to be changed. Therefore, at first, information including the full header information and configuration information for compression (for example, a traffic (or service)-specific identifier (type) for the Ethernet protocol, a traffic (or service)-specific serial number, information related to a compression rate, or an indicator indicating whether compression occurs) may be transmitted. In addition, fields (for example, a transmission address field or a reception address field (MAC address), a preamble field, the start of frame delimiter (SFD), frame checksum (FCS), or an Ethernet type field, etc.) corresponding to unchanged information in comparison with full information transmitted at first or fixed information may be omitted or may not be transmitted, and the header may be configured by including only fields corresponding to changed information or information that can be changed so as to reduce the size of the header. As another method, since compressible fields and non-compressible fields are distinguished, and the values of the compressible fields may be assumed to include the same values as the field values of the full header transmitted at first, compressible fields only may be compressed (or omitted) and transmitted, and non-compressible fields may always be transmitted without being compressed (or omitted). In addition, when even one field among the compressible fields has a value having been changed from a field value of the previously transmitted full header, the full header may be transmitted again. In addition, each time the full header is received, the reception PDCP layer device may always transmit feedback indicating that the full header is received well to a transmission PDCP layer device.

In the disclosure, in order to reduce transmission delay due to the reordering delay, a method for enabling configuration of an out-of-order delivery function (rlc-OutOfOrderDelivery) in an RLC layer device is proposed with regard to a split bearer (e.g., a PDCP layer device connected to at least two or more RLC layer devices), an LWA bearer, a bearer for which packet duplication is configured, or a bearer connected to at least one RLC layer device (e.g., AM RLC or UM RLC layer device). In addition, when at least one RLC layer device in which the out-of-order delivery function (rlc-OutOfOrderDelivery) is configured as described above is connected to the PDCP layer device, the disclosure proposes always driving the reordering function in the PDCP layer device.

In the above, in order to reduce the possibility of a decompression error occurring due to data received from different RLC layer devices in the wireless communication system, a header compression protocol (ROHC or EHC) or uplink data compression protocol (UDC) may not be configured for the split bearer or the LWA bearer, or the header compression protocol or the uplink data compression protocol may be configured to not be used for the split bearer or the LWA bearer (DRB).

According to another method, since the header compression protocol (EHC) is a method of compressing fixed header fields, the probability of decompression errors occurring due to data received from different RLC layer devices is low, and thus EHC may enable configuration for a split bearer, an LWA bearer, or other bearers (e.g., configuration restrictions is removable). However, the header compression protocol (ROHC) or uplink data compression protocol (UDC) cannot be configured for the split bearer or LWA bearer, or the header compression protocol or the uplink data compression protocol may be configured not to be used for the split bearer or LWA bearer (DRB).

As suggested in the disclosure, when at least one RLC layer device configured with an out-of-order delivery function (rlc-OutOfOrderDelivery) is connected to the PDCP layer device, the PDCP layer device may drive the reordering function. However, when a header compression protocol (EHC or ROHC) is configured in the PDCP layer device, a header decompression error may occur during handover.

For example, a reordering function may be used as shown in the (1-3)th PDCP layer device or the second PDCP layer device structure, an out-of-order delivery function may be used in the RLC layer device, and the header compression procedure (ROHC or EHC) is configured and the reception PDCP layer device may perform a header decompression procedure based on a first header compression context (ROHC context or EHC context) or protocol. In the above, the PDCP layer device may receive data 1, data 2, data 4, and data 5 out of order from the lower RLC layer device. That is, even when data 3 has not yet been received by the lower layer device, the data may be received by the PDCP layer device. When the reordering procedure is performed in the (1-3)th PDCP layer device structure or the second PDCP layer device structure, the header decompression procedure is applied only to the data in the order and delivered to the higher layer device. However, data out of order is stored in a buffer and the header decompression procedure is not applied thereto, and the header decompression procedure is performed on the data only when all data is received according to the order.

However, in the above, when the UE receives an RRCReconfiguration message indicating handover (e.g., using a mobilityControlInfo or ReconfiguratioWithSync indicator) and an indicator for triggering a PDCP layer device re-establishment procedure is included in the RRC message, or when the PDCP layer device re-establishment procedure is performed with the reception of the RRC message, when the indicator (drb-ContinueROHC, drb-ContinueEHC-DL, or drb-ContinueEHC-UL) indicating continuous use of the header compression protocol is not configured in the RRC message, the UE may initialize the first header compression protocol or context (EHC context, ROHC context, EHC protocol, or ROHC protocol) while performing the PDCP layer device re-establishment procedure in the PDCP layer device. Then, the handover procedure may be completed.

Since the first header compression protocol (or context) has been initialized in the above, a second header compression protocol (or context) may be newly configured, and after completing the handover, data 3 may be received from the target base station. Then, since data 3, data 4, and data 5 are in order, the reception PDCP layer device performs a header decompression procedure on the data 3, data 4, and data 5 using the second header compression protocol or context. However, since data 4 and data 5 have been compressed using the first header compression protocol, when decompression using the second header compression protocol is performed, a decompression failure error occurs.

Therefore, in the disclosure, as described above, when a reordering function (t-reordering) is used in the (1-3)th PDCP layer device structure or the second PDCP layer device structure, when an out-of-order delivery function is configured in the RLC layer device, or when the indicator indicating continuous use of the header compression protocol (drb-ContinueROHC, drb-ContinueEHC-DL, or drb-ContinueEHC-UL) is not configured, if the PDCP layer device re-establishment procedure is performed, the reception PDCP layer device may first perform a header decompression procedure for data stored for the AM DRB. Then, when the indicator indicating continuous use of the header compression protocol is not configured, the header compression protocol may be initialized. When the procedure proposed above is performed, header decompression is performed before the header compression protocol (or context) is initialized, and thus even when data according to the order arrives later, the header decompression error can be prevented from occurring because the header decompression procedure has already been performed.

In the following of the disclosure, a re-establishment procedure of the first PDCP layer device that performs the procedure above in more detail is proposed as follows.

1> In the above, when the UE has received an RRC message (e.g., an RRCReconfiguration message) or an RRCReconfiguration message including a ReconfigurationWithSync indicator or a mobilityContorlInfo indicator,
2> In a downlink data transmission procedure, when a higher layer device (e.g., an RRC layer device) indicates or requests a PDCP reestablishment procedure for a bearer or a PDCP layer device, when a PDCP layer device performs a PDCP reestablishment procedure, when the PDCP layer device uses a reordering function like the (1-3)th PDCP layer device or the second PDCP layer device, or when the bearer (DRB) is mapped to the RLC AM mode (or when the bearer is connected to the RLC layer device operating in the RLC AM mode (acknowledge mode in which ARQ operation is performed)

3> The UE may process data (e.g., PDCP PDU) received from a lower layer device (e.g., RLC layer device) due to the re-establishment procedure of the lower layer device.

3> When the PDCP layer device is connected to at least one RLC layer device in which the out-of-order delivery indicator of the RLC layer device is configured 4> When the indicator (drb-ContinueROHC) indicating continuous use of a header compression protocol (ROHC) is not configured, a header compression procedure for stored data (e.g., PDCP SDU) may be performed using a header compression protocol (ROHC).

4> When the indicator (drb-ContinueEHC-DL) indicating continuous use of a header compression protocol (EHC) for downlink is not configured, the header compression procedure for stored data (e.g., PDCP SDU) may be performed using a header compression protocol (EHC).

4> Except for a case in which a higher layer device indicates to use a stored UE context (UE AS context) and an indicator (drb-ContinueROHC) to continue using the header compression protocol (ROHC) is configured (for example, when resuming the RRC connection), the header compression protocol (ROHC protocol) for the downlink may be initialized and may be started in no context state (NC state) of a unidirectional mode (U mode).

4> When the indicator (drb-ContinueEHC-DL) indicating continuous use of the header compression protocol (EHC) for downlink is not configured, the header compression protocol (EHC protocol) for downlink may be initialized.

3> When the PDCP layer device is to be connected to one AM RLC layer device after the PDCP re-establishment procedure 4> The reordering timer is stopped and initialized (reset).

3> The ciphering algorithm or security key provided from the higher layer device may be applied while performing the re-establishment procedure.

In the following of the disclosure, a re-establishment procedure of a second PDCP layer device that performs the procedure above in more detail is proposed as follows.

1> In the above, when the UE has received an RRC message (e.g., an RRCReconfiguration message) or an RRCReconfiguration message including a ReconfigurationWithSync indicator or a mobilityContorlInfo indicator, 2> In a downlink data transmission procedure, when a higher layer device (e.g., an RRC layer device) indicates or requests a PDCP reestablishment procedure for a bearer or a PDCP layer device, when a PDCP layer device performs a PDCP reestablishment procedure, when the PDCP layer device uses a reordering function like the (1-3)th PDCP layer device or the second PDCP layer device, or when the bearer (DRB) is mapped to the RLC AM mode (or when the bearer is connected to the RLC layer device operating in the RLC AM mode (acknowledge mode in which ARQ operation is performed), 3> The UE may process data (e.g., PDCP PDU) received from a lower layer device (e.g., RLC layer device) due to the re-establishment procedure of the lower layer device.

3> When an indicator (drb-ContinueROHC) indicating continuous use of a header compression protocol (ROHC) is not configured, or when the PDCP layer device is connected to at least one RLC layer device in which the out-of-order delivery indicator of the RLC layer device is configured, a header compression procedure for stored data (e.g., PDCP SDU) may be performed using a header compression protocol (ROHC).

3> When an indicator (drb-ContinueROHC) indicating continuous use of a header compression protocol (EHC) for downlink is not configured, or when the PDCP layer device is connected to at least one RLC layer device in which the out-of-order delivery indicator of the RLC layer device is configured, a header compression procedure for stored data (e.g., PDCP SDU) may be performed using the header compression protocol (EHC).

3> Except for a case in which a higher layer device indicates to use a stored UE context (UE AS context) and the indicator (drb-ContinueROHC) indicating continuous use of the header compression protocol (ROHC) is configured (for example, when resuming the RRC connection), when the PDCP layer device is connected to at least one RLC layer device in which the out-of-order delivery indicator of the RLC layer device is configured, the header compression protocol (ROHC protocol) for the downlink may be initialized and may be started in no context state (NC state) of a unidirectional mode (U mode).

3> When the indicator (drb-ContinueEHC-DL) indicating continuous use of the header compression protocol (EHC) for downlink is not configured, or when the PDCP layer device is connected to at least one RLC layer device in which the out-of-order delivery indicator of the RLC layer device is configured, the header compression protocol (EHC protocol) for downlink may be initialized.

3> When the PDCP layer device is to be connected to one AM RLC layer device after the PDCP re-establishment procedure, 4> The reordering timer is stopped and initialized (reset).

3> The ciphering algorithm or security key provided from the higher layer device may be applied while performing the re-establishment procedure.

In the following of the disclosure, a re-establishment procedure of a third PDCP layer device that performs the above-mentioned procedure in more detail is proposed as follows.

1> In the above, when the UE has received an RRC message (e.g., an RRCReconfiguration message) or an RRCReconfiguration message including a ReconfigurationWithSync indicator or a mobilityContorlInfo indicator, 2> In a downlink data transmission procedure, when a higher layer device (e.g., an RRC layer device) indicates or requests a PDCP reestablishment procedure for a bearer or a PDCP layer device, when a PDCP layer device performs a PDCP reestablishment procedure, when the PDCP layer device uses a reordering function like the (1-3)th PDCP layer device or the second PDCP layer device, or when the bearer (DRB) is mapped to the RLC AM mode (or when the bearer is connected to the RLC layer device operating in the RLC AM mode (acknowledge mode in which ARQ operation is performed)), 3> The UE may process data (e.g., PDCP PDU) received from a lower layer device (e.g., RLC layer device) due to the re-establishment procedure of the lower layer device.

3> When an indicator (drb-ContinueROHC) indicating continuous use of a header compression protocol (ROHC) is not configured, a header compression procedure for stored data (e.g., PDCP SDU) may be performed using a header compression protocol (ROHC).

3> When an indicator (drb-ContinueEHC-DL) indicating continuous use of a header compression protocol (EHC) for downlink is not configured, a header compression procedure for stored data (e.g., PDCP SDU) may be performed using the header compression protocol (EHC).

3> Except for a case in which a higher layer device indicates to use a stored UE context (UE AS context) and the indicator (drb-ContinueROHC) indicating continuous use of the header compression protocol (ROHC) is configured (for example, when resuming the RRC connection), the header compression protocol (ROHC protocol) for the downlink may be initialized and may be started in no context state (NC state) of a unidirectional mode (U mode).

3> When the indicator (drb-ContinueEHC-DL) indicating continuous use of the header compression protocol (EHC) for downlink is not configured, the header compression protocol (EHC protocol) for downlink may be initialized.

3> When the PDCP layer device is to be connected to one AM RLC layer device after the PDCP re-establishment procedure, 4> The reordering timer is stopped and initialized (reset).

3> The ciphering algorithm or security key provided from the higher layer device may be applied while performing the re-establishment procedure.

In the following of the disclosure, as described above, when a reordering function (t-reordering) is used in the (1-3)th PDCP layer device structure or the second PDCP layer device structure, when an out-of-order delivery function is configured in the RLC layer device, when the indicator indicating continuous use of the header compression protocol (drb-ContinueROHC, drb-ContinueEHC-DL, or drb-ContinueEHC-UL) is not configured, if the PDCP layer device re-establishment procedure is performed, the reception PDCP layer device may first perform a header decompression procedure for stored data for AM DRB, and then may initialize the header compression protocol. In addition, with regard to the UM DRB in the reception PDCP layer device, in a case of using the reordering function (t-reordering) in the (1-3)th PDCP layer device structure or the second PDCP layer device structure as described above, when the out-of-order delivery function is configured in the RLC layer device, or when an indicator indicating continuous use of the header compression protocol (drb-ContinueROHC, drb-ContinueEHC-DL, or drb-ContinueEHC-UL) is not configured, the reception PDCP layer device may initialize the header compression protocol.

As described above, it is proposed to perform different procedures for AM DRB or UM DRB, respectively. This is because, in a case of AM DRB, window variables are not initialized to support loss-free data transmission or reception and retransmission in the PDCP re-establishment procedure, but with regard to UM DRB, loss-free data transmission or reception and retransmission are not supported in the PDCP re-establishment procedure, and thus the window variable is initialized.

In the following of the disclosure, a fourth PDCP layer device re-establishment procedure for performing the above procedure in more detail is proposed as follows (the first PDCP layer device re-establishment procedure may be applied to AM DRB in the following).

1> In the above, when the UE has received an RRC message (e.g., an RRCReconfiguration message) or an RRCReconfiguration message including a ReconfigurationWithSync indicator or a mobilityContorlInfo indicator, 2> In a downlink data transmission procedure, when a higher layer device (e.g., an RRC layer device) indicates or requests a PDCP reestablishment procedure for a bearer or a PDCP layer device, when a PDCP layer device performs a PDCP reestablishment procedure, when the PDCP layer device uses a reordering function like the (1-3)th PDCP layer device or the second PDCP layer device, or when the bearer (DRB) is mapped to the RLC AM mode (or when the bearer is connected to the RLC layer device operating in the RLC AM mode (acknowledge mode in which ARQ operation is performed))

3> The UE may process data (e.g., PDCP PDU) received from a lower layer device (e.g., RLC layer device) due to the re-establishment procedure of the lower layer device.

3> When the PDCP layer device is to be connected to one AM RLC layer device after the PDCP re-establishment procedure, 4> The reordering timer is stopped and initialized (reset).

3> (In the above, the next procedure may be performed after stopping or initializing the reordering timer. This is because when the timer expires during header compression protocol initialization, the header decompression procedure is performed, and thus a header decompression error may occur, or when the timer expires during header compression protocol decompression, the header decompression procedure may be repeatedly performed.) When the PDCP layer device is connected to at least one RLC layer device in which the out-of-order delivery indicator of the RLC layer device is configured, 4> When an indicator (drb-ContinueROHC) indicating continuous use of a header compression protocol (ROHC) is not configured, a header compression procedure for stored data (e.g., PDCP SDU) may be performed using a header compression protocol (ROHC).

4> When an indicator (drb-ContinueEHC-DL) indicating continuous use of a header compression protocol (EHC) for downlink is not configured, a header compression procedure for stored data (e.g., PDCP SDU) may be performed using the header compression protocol (EHC).

4> Except for a case in which a higher layer device indicates to use a stored UE context (UE AS context) and an indicator (drb-ContinueROHC) indicating continuous use of the header compression protocol (ROHC) is configured (for example, when resuming the RRC connection), the header compression protocol (ROHC protocol) for the downlink may be initialized and may be started in no context state (NC state) of a unidirectional mode (U mode).

4> When the indicator (drb-ContinueEHC-DL) indicating continuous use of the header compression protocol (EHC) for downlink is not configured, the header compression protocol (EHC protocol) for downlink may be initialized.

3> The ciphering algorithm or security key provided from the higher layer device may be applied while performing the re-establishment procedure.

2> In a downlink data transmission procedure, when a higher layer device (e.g., an RRC layer device) indicates or requests a PDCP reestablishment procedure for a bearer or a PDCP layer device, when a PDCP layer device performs a PDCP reestablishment procedure, when the PDCP layer device uses a reordering function like the (1-3)th PDCP layer device or the second PDCP layer device, or when the bearer (DRB) is mapped to the RLC UM mode (or when the bearer is connected to the RLC layer device operating in the RLC UM mode (unacknowledged mode)), 3> The UE may process data (e.g., PDCP PDU) received from a lower layer device (e.g., RLC layer device) due to the re-establishment procedure of the lower layer device.

3> When the reordering timer is running, the reordering timer is stopped and may be initialized (reset).

3> When there is stored data, all stored data may be delivered to the higher layer device in ascending order of the assigned COUNT value.

3> (In the above, the next procedure may be performed after stopping or initializing the reordering timer. This is because when the timer expires during header compression protocol initialization, the header decompression procedure is performed, and thus a header decompression error may occur.) When the PDCP layer device is connected to at least one RLC layer device in which the out-of-order delivery indicator of the RLC layer device is configured, 4> When the ROHC protocol is configured for the bearer and an indicator (drb-ContinueROHC) indicating continuous use of a header compression protocol (ROHC) is not configured, the header compression protocol (ROHC protocol) for the downlink may be initialized and may be started in no context state (NC state) of a unidirectional mode (U mode).

4> When an indicator (drb-ContinueEHC-DL) indicating continuous use of a header compression protocol (EHC) for downlink is not configured, the header compression protocol (EHC protocol) for the downlink may be initialized.

3> The reception window variable may be initialized. For example, the Next_PDCP_RX_SN variable (a window variable for storing the PDCP serial number value expected to be received next) and the RX_HFN variable (a variable for determining the HFN value) may be initialized to be 0, and Last_submitted_PDCP_RX_SN (a window variable for storing the PDCP serial number value of data last delivered to the higher layer device) may be initialized to the Maximum_PDCP_SN value (the maximum value of the PDCP serial number).

3> The ciphering algorithm or security key provided from the higher layer device may be applied while performing the re-establishment procedure.

In the following of the disclosure, a fifth PDCP layer device re-establishment procedure for performing the above procedure in more detail is proposed as follows (the second PDCP layer device re-establishment procedure may be applied to AM DRB in the following).

1> In the above, when the UE has received an RRC message (e.g., an RRCReconfiguration message) or an RRCReconfiguration message including a ReconfigurationWithSync indicator or a mobilityContorlInfo indicator, 2> In a downlink data transmission procedure, when a higher layer device (e.g., an RRC layer device) indicates or requests a PDCP reestablishment procedure for a bearer or a PDCP layer device, when a PDCP layer device performs a PDCP reestablishment procedure, when the PDCP layer device uses a reordering function like the (1-3)th PDCP layer device or the second PDCP layer device, or when the bearer (DRB) is mapped to the RLC AM mode (or when the bearer is connected to the RLC layer device operating in the RLC AM mode (acknowledge mode in which ARQ operation is performed)), 3> The UE may process data (e.g., PDCP PDU) received from a lower layer device (e.g., RLC layer device) due to the re-establishment procedure of the lower layer device.

3> When the PDCP layer device is to be connected to one AM RLC layer device after the PDCP re-establishment procedure, 4> The reordering timer is stopped and initialized (reset).

3> (In the above, the next procedure may be performed after stopping or initializing the reordering timer. This is because when the timer expires during header compression protocol decompression, the header decompression procedure can be duplicated performed). When the indicator (drb-ContinueROHC) indicating continuous use of the header compression protocol (ROHC) is not configured, or when the PDCP layer device is connected to at least one RLC layer device in which the out-of-order delivery indicator of the RLC layer device is configured, a header compression procedure for stored data (e.g., PDCP SDU) may be performed using a header compression protocol (ROHC).

3> (In the above, the next procedure may be performed after stopping or initializing the reordering timer. This is because when the timer expires during header compression protocol decompression, the header decompression procedure may be duplicated performed.) When the indicator (drb- ContinueEHC-DL) indicating continuous use of the header compression protocol (ECH) for downlink is not configured, or when the PDCP layer device is connected to at least one RLC layer device in which the out-of-order delivery indicator of the RLC layer device is configured, a header compression procedure for stored data (e.g., PDCP SDU) may be performed using a header compression protocol (EHC).

3> (In the above, the next procedure may be performed after stopping or initializing the reordering timer. This is because when the timer expires during header compression protocol initialization, the header decompression procedure is performed, and thus a header decompression error may occur.) Except for a case in which a higher layer device indicates to use a stored UE context (UE AS context) and the indicator (drb-ContinueROHC) indicating continuous use of the header compression protocol (ROHC) is configured (for example, when resuming the RRC connection), when the PDCP layer device is connected to at least one RLC layer device in which the out-of-order delivery indicator of the RLC layer device is configured, the header compression protocol (ROHC protocol) for the downlink may be initialized and may be started in no context state (NC state) of a unidirectional mode (U mode).

3> (In the above, the next procedure may be performed after stopping or initializing the reordering timer. This is because when the timer expires during header compression protocol initialization, the header decompression procedure is performed, and thus a header decompression error may occur.) When the indicator (drb-ContinueEHC-DL) indicating continuous use of the header compression protocol (EHC) for downlink is not configured, or when the PDCP layer device is connected to at least one RLC layer device in which the out-of-order delivery indicator of the RLC layer device is configured, the header compression protocol (EHC protocol) for the downlink may be initialized.

3> The ciphering algorithm or security key provided from the higher layer device may be applied while performing the re-establishment procedure.

2> In a downlink data transmission procedure, when a higher layer device (e.g., an RRC layer device) indicates or requests a PDCP reestablishment procedure for a bearer or a PDCP layer device, when a PDCP layer device performs a PDCP reestablishment procedure, when the PDCP layer device uses a reordering function like the (1-3)th PDCP layer device or the second PDCP layer device, or when the bearer (DRB) is mapped to the RLC UM mode (or when the bearer is connected to the RLC layer device operating in the RLC UM mode (unacknowledged mode)), 3> The UE may process data (e.g., PDCP PDU) received from a lower layer device (e.g., RLC layer device) due to the re-establishment procedure of the lower layer device.

3> When the reordering timer is running, the reordering timer is stopped and may be initialized (reset).

3> When there is stored data, all stored data may be delivered to the higher layer device in ascending order of the assigned COUNT value.

3> (In the above, the next procedure may be performed after stopping or initializing the reordering timer. This is because when the timer expires during header compression protocol initialization, the header decompression procedure is performed, and thus a header decompression error may occur.) When the ROHC protocol is configured for the bearer and an indicator (drb-ContinueROHC) indicating continuous use of a header compression protocol (ROHC) is not configured, or when the PDCP layer device is connected to at least one RLC layer device in which the out-of-order delivery indicator of the RLC layer device is configured, the header compression protocol (ROHC protocol) for the downlink may be initialized and may be started in no context state (NC state) of a unidirectional mode (U mode).

3> (In the above, the next procedure may be performed after stopping or initializing the reordering timer. This is because when the timer expires during header compression protocol initialization, the header decompression procedure is performed, and thus a header decompression error may occur.) When the indicator (drb-ContinueEHC-DL) indicating continuous use of the header compression protocol (EHC) for downlink is not configured, or when the PDCP layer device is connected to at least one RLC layer device in which the out-of-order delivery indicator of the RLC layer device is configured, the header compression protocol (EHC protocol) for downlink may be initialized.

3> The reception window variable may be initialized. For example, the Next_PDCP_RX_SN variable (a window variable for storing the PDCP serial number value expected to be received next) and the RX_HFN variable (a variable for determining the HFN value) may be initialized to be 0, and Last_submitted_PDCP_RX_SN (a window variable for storing the PDCP serial number value of data last delivered to the higher layer device) may be initialized to the Maximum_PDCP_SN value (the maximum value of the PDCP serial number).

3> The ciphering algorithm or security key provided from the higher layer device may be applied while performing the re-establishment procedure.

In the following of the disclosure, a sixth PDCP layer device re-establishment procedure for performing the above procedure in more detail is proposed as follows (the third PDCP layer device re-establishment procedure may be applied to AM DRB in the following).

1> In the above, when the UE has received an RRC message (e.g., an RRCReconfiguration message) or an RRCReconfiguration message including a ReconfigurationWithSync indicator or a mobilityContorlInfo indicator, 2> In a downlink data transmission procedure, when a higher layer device (e.g., an RRC layer device) indicates or requests a PDCP reestablishment procedure for a bearer or a PDCP layer device, when a PDCP layer device performs a PDCP reestablishment procedure, when the PDCP layer device uses a reordering function like the (1-3)th PDCP layer device or the second PDCP layer device, or when the bearer (DRB) is mapped to the RLC AM mode (or when the bearer is connected to the RLC layer device operating in the RLC AM mode (acknowledge mode in which ARQ operation is performed)),
- 3> The UE may process data (e.g., PDCP PDU) received from a lower layer device (e.g., RLC layer device) due to the re-establishment procedure of the lower layer device.
- 3> When the PDCP layer device is to be connected to one AM RLC layer device after the PDCP re-establishment procedure,
  - 4> The reordering timer is stopped and initialized (reset).
- 3> (In the above, the next procedure may be performed after stopping or initializing the reordering timer. This is because when the timer expires during header compression protocol decompression, the header decompression procedure can be duplicated performed). When the indicator (drb-ContinueROHC) indicating continuous use of the header compression protocol (ROHC) is not configured, or when the PDCP layer device is connected to at least one RLC layer device in which the out-of-order delivery indicator of the RLC layer device is configured, a header compression procedure for stored data (e.g., PDCP SDU) may be performed using a header compression protocol (ROHC).
- 3> (In the above, the next procedure may be performed after stopping or initializing the reordering timer. This is because when the timer expires during header compression protocol decompression, the header decompression procedure may be duplicated performed.) When the indicator (drb-ContinueEHC-DL) indicating continuous use of the header compression protocol (ECH) for downlink is not configured, a header compression procedure for stored data (e.g., PDCP SDU) may be performed using a header compression protocol (EHC).
- 3> (In the above, the next procedure may be performed after stopping or initializing the reordering timer. This is because when the timer expires during header compression protocol initialization, the header decompression procedure is performed, and thus a header decompression error may occur.) Except for a case in which a higher layer device indicates to use a stored UE context (UE AS context) and the indicator (drb-ContinueROHC) indicating continuous use of the header compression protocol (ROHC) is configured (for example, when resuming the RRC connection), the header compression protocol (ROHC protocol) for the downlink may be initialized and may be started in no context state (NC state) of a unidirectional mode (U mode).
- 3> (In the above, the next procedure may be performed after stopping or initializing the reordering timer. This is because when the timer expires during header compression protocol initialization, the header decompression procedure is performed, and thus a header decompression error may occur.) When the indicator (drb-ContinueEHC-DL) indicating continuous use of the header compression protocol (EHC) for downlink is not configured, the header compression protocol (EHC protocol) for the downlink may be initialized.
- 3> The ciphering algorithm or security key provided from the higher layer device may be applied while performing the re-establishment procedure.
- 2> In a downlink data transmission procedure, when a higher layer device (e.g., an RRC layer device) indicates or requests a PDCP reestablishment procedure for a bearer or a PDCP layer device, when a PDCP layer device performs a PDCP reestablishment procedure, when the PDCP layer device uses a reordering function like the (1-3)th PDCP layer device or the second PDCP layer device, or when the bearer (DRB) is mapped to the RLC UM mode (or when the bearer is connected to the RLC layer device operating in the RLC UM mode (unacknowledged mode)).
  - 3> The UE may process data (e.g., PDCP PDU) received from a lower layer device (e.g., RLC layer device) due to the re-establishment procedure of the lower layer device.
  - 3> When the reordering timer is running, the reordering timer is stopped and may be initialized (reset).
  - 3> When there is stored data, all stored data may be delivered to the higher layer device in ascending order of the assigned COUNT value.
  - 3> (In the above, the next procedure may be performed after stopping or initializing the reordering timer. This is because when the timer expires during header compression protocol initialization, the header decompression procedure is performed, and thus a header decompression error may occur.) When the ROHC protocol is configured for the bearer and an indicator (drb-ContinueROHC) indicating continuous use of a header compression protocol (ROHC) is not configured, the header compression protocol (ROHC protocol) for the downlink may be initialized and may be started in no context state (NC state) of a unidirectional mode (U mode).
  - 3> (In the above, the next procedure may be performed after stopping or initializing the reordering timer. This is because when the timer expires during header compression protocol initialization, the header decompression procedure is performed, and thus a header decompression error may occur.) When the indicator (drb-ContinueEHC-DL) indicating continuous use of the header compression protocol (EHC) for downlink is not configured, the header compression protocol (EHC protocol) for downlink may be initialized.
  - 3> The reception window variable may be initialized. For example, the Next_PDCP_RX_SN variable (a window variable for storing the PDCP serial number value expected to be received next) and the RX_HFN variable (a variable for determining the HFN value) may be initialized to be 0, and Last_submitted_PDCP_RX_SN (a window variable for storing the PDCP serial number value of data last delivered to the higher layer device) may be initialized to the Maximum_PDCP_SN value (the maximum value of the PDCP serial number).
  - 3> The ciphering algorithm or security key provided from the higher layer device may be applied while performing the re-establishment procedure.

In addition, in the disclosure, when an out-of-order delivery function (pdcp out-of-order delivery) is configured for the PDCP layer device as an indicator through the RRC message, a header compression procedure (ROHC) or an Ethernet header compression procedure (EHC) can be restricted not to be configured in the PDCP layer device. For example, an indicator indicating not used or False or indicating a header compression procedure (or Ethernet header compression procedure) may not be configured. This is because, when the out-of-order delivery function is performed, when data (IR packet or full header packet) including configuration information for initializing the header compression protocol or Ethernet compression protocol is received later (e.g., when the lower layer device (RLC) performs the out-of-delivery function), a header decompression failure error for previously received data may occur.

FIG. 2F illustrates the structure of a UE to which an embodiment of the disclosure is applicable.

Referring to FIG. 2F, the UE includes a radio frequency (RF) processor 2f-10, a baseband processor 2f-20, a storage 2f-30, and a controller 2f-40.

The RF processor 2f-10 performs a function for transmitting or receiving a signal through a wireless channel such as band conversion, amplification, and the like of a signal. That is, the RF processor 2f-10 up-converts a baseband signal provided from the baseband processor 2f-20 into an RF band signal and then transmits the RF band signal through an antenna, and down-converts the RF band signal received through the antenna into a baseband signal. For example, the RF processor 2f-10 may include a transmission filter, a reception filter, an amplifier, a mixer, an oscillator, a digital to analog convertor (DAC), an analog to digital convertor (ADC), and the like. In FIG. 2F, only one antenna is shown, but the UE may include multiple antennas. In addition, the RF processor 2f-10 may include multiple RF chains. In addition, the RF processor 2f-10 may perform beamforming. For the beamforming, the RF processor 2f-10 may adjust the phase and magnitude of each of signals transmitted and received through multiple antennas or antenna elements. In addition, the RF processor performs MIMO and may receive multiple layers when performing the MIMO operation. The RF processor 2f-10 performs reception beam sweeping by appropriately configuring multiple antennas or antenna elements under the control of the controller, or may adjust the direction and beam width of the reception beam so that the reception beam is coordinated with transmission beam.

The baseband processor 2f-20 performs a conversion function between a baseband signal and a bit string according to a physical layer standard of the system. For example, during data transmission, the baseband processor 2f-20 generates complex symbols by encoding and modulating a transmission bit string. In addition, during data reception, the baseband processor 2f-20 restores the received bit string by demodulating and decoding a baseband signal provided from the RF processor 2f-10. For example, according to an orthogonal frequency division multiplexing (OFDM) scheme, during data transmission, the baseband processor 2f-20 generates complex symbols by encoding and modulating a transmission bit string, maps the complex symbols to subcarriers, and then configures OFDM symbols through an inverse fast Fourier transform (IFFT) operation and cyclic prefix (CP) insertion. In addition, during data reception, the baseband processor 2f-20 divides the baseband signal provided from the RF processor 2f-10 into units of OFDM symbols, restores the signals mapped to the subcarriers through a fast Fourier transform (FFT) operation, and then restores the received bit string through demodulation and decoding.

The baseband processor 2f-20 and the RF processor 2f-10 transmits or receives signals as described above. Accordingly, the baseband processor 2f-20 and the RF processor 2f-10 may be referred to as a transmitter, a receiver, a transceiver, or a communicator. Further, at least one of the baseband processor 2f-20 and the RF processor 2f-10 may include multiple communication modules to support multiple different radio access technologies. In addition, at least one of the baseband processor 2f-20 and the RF processor 2f-10 may include different communication modules to process signals of different frequency bands. For example, the different radio access technologies may include an LTE network, an NR network, and the like. In addition, the different frequency bands may include a super high frequency (SHF) (e.g., 2.5 GHz or 5 GHz) band and a millimeter wave (e.g., 60 GHz) band.

The storage 2f-30 stores data such as a basic program, an application program, and configuration information for the operation of the UE. The storage 2f-30 provides stored data according to a request from the controller 2f-40.

The controller 2f-40 controls overall operations of the UE. For example, the controller 2f-40 transmits or receive signals through the baseband processor 2f-20 or the RF processor 2f-10. In addition, the controller 2f-40 records and reads data in the storage 2f-40. To this end, the controller 2f-40 may include at least one processor. For example, the controller 2f-40 may include a communication processor (CP) for performing control for communication and an application processor (AP) for controlling a higher layer such as an application program. The controller 2f-40 may further include a multi-connection processor 2f-42 supporting multiple connections.

FIG. 2G is a block diagram illustrating a transmission and reception point (TRP) in a wireless communication system to which an embodiment of the disclosure is applicable.

As shown in FIG. 2G, the base station includes an RF processor 2g-10, a baseband processor 2g-20, a backhaul communicator 2g-30, a storage 2g-40, and a controller 2g-50.

The RF processor 2g-10 performs a function for transmitting or receiving a signal through a wireless channel such as band conversion, amplification, and the like of a signal. That is, the RF processor 2g-10 up-converts a baseband signal provided from the baseband processor 2g-20 into an RF band signal and then transmits the RF band signal through an antenna, and down-converts the RF band signal received through the antenna into a baseband signal. For example, the RF processor 2g-10 may include a transmission filter, a reception filter, an amplifier, a mixer, an oscillator, a DAC, an ADC, and the like. In FIG. 2G, only one antenna is shown, but the first access node may include multiple antennas. In addition, the RF processor 2g-10 may include multiple RF chains. In addition, the RF processor 2g-10 may perform beamforming. For the beamforming, the RF processor 2g-10 may adjust the phase and magnitude of each of signals transmitted or received through multiple antennas or antenna elements. The RF processor may perform a downlink MIMO operation by transmitting one or more layers.

The baseband processor 2g-20 performs a conversion function between a baseband signal and a bit string according to a physical layer standard of a first radio access technology. For example, during data transmission, the baseband processor 2g-20 generates complex symbols by encoding and modulating a transmission bit string. In addition, during data reception, the baseband processor 2g-20 restores a received bit string by demodulating and decoding the baseband signal provided from the RF processor 2g-10. For example, according to an OFDM scheme, during data transmission, the baseband processor 2g-20 generates complex symbols by encoding and modulating a transmission bit string, maps the complex symbols to subcarriers, and then configures OFDM symbols through IFFT operation and CP insertion. In addition, during data reception, the baseband processor 2g-20 divides the baseband signal provided from the RF processor 2g-10 in units of OFDM symbols, restores signals mapped to the subcarriers through the FFT operation, and then restores the received bit string through demodulation and decoding. The baseband processor 2g-20 or the RF processor 2g-10 transmits or receives signals as described above. Accordingly, the baseband processor 2g-20 and the RF processor 2g-10 may be referred to as a transmitter, a receiver, a transceiver, a communicator, or a wireless communicator.

The communicator 2g-30 provides an interface for communicating with other nodes in a network.

The storage 2g-40 stores data such as a basic program, an application program, and configuration information for the operation of a base station. In particular, the storage 2g-40 may store information on a bearer assigned to a connected UE, a measurement result reported from the connected UE, and the like. In addition, the storage 2g-40 may store information that is a criterion for determining whether to provide or terminate multiple connections to the UE. The storage 2g-40 provides stored data according to a request from the controller 2g-50.

The controller 2g-50 may control overall operations of the main base station. For example, the controller 2g-50 may transmit or receive signals through the baseband processor 2g-20 and the RF processor 2g-10 or through the backhaul communicator 2g-30. In addition, the controller 2g-50 records and reads data in the storage 2g-40. To this end, the controller 2g-50 may include at least one processor. The controller 2g-50 may further include a multi-connection processor 2g-52 supporting multiple connections.

The embodiments of the disclosure described above and shown in the specification and the drawings are merely specific examples that have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. Further, other variants based on the technical idea of the embodiments may also be implemented in other systems such as FDD LTE, TDD LTE, 5G, or NR systems.

The invention claimed is:

1. A method performed by a terminal in a wireless communication system, the method comprising:
   receiving, from a base station, a radio resource control (RRC) message including first information on a radio link control (RLC) out of order delivery (rlc-OutOfOrderDelivery) and second information on a reordering timer, the first information indicating that out of order delivery from an RLC to a packet data convergence protocol (PDCP) is configured for an RLC entity, and the second information indicating a value of the reordering timer, wherein the second information is included in the RRC message based on reconfiguration to a bearer associated with the RLC entity configured with the rlc-OutOfOrderDelivery;
   delivering data from the RLC entity to the PDCP entity based on the rlc-OutOfOrderDelivery; and
   performing, at the PDCP entity, a reordering function for the data, based on the reordering timer.

2. The method of claim 1,
   wherein the RLC entity and the PDCP entity are related to the DRB, and
   wherein the bearer is a data radio bearer (DRB) connected to an acknowledged mode (AM) mode RLC entity or a DRB connected to an unacknowledged mode (UM) mode RLC entity.

3. The method of claim 2, wherein the RLC entity related to the DRB is one entity.

4. A method performed by a base station in a wireless communication system, the method comprising:
   transmitting, to a terminal, a radio resource control (RRC) message including first information on a radio link control (RLC) out of order delivery (rlc-OutOfOrderDelivery) and second information on a reordering timer. the first information indicating that out of order delivery from an RLC to a packet data convergence protocol (PDCP) is configured for an RLC entity, and the second information indicating a value of the reordering timer, wherein the second information is included in the RRC message based on reconfiguration to a bearer associated with the RLC entity configured with the rlc-OutOfOrderDelivery,
   wherein data is delivered from the RLC entity to the PDCP entity, based on the rlc-OutOfOrderDelivery, and
   wherein a reordering function for the data is performed at the PDCP entity, based on the reordering timer.

5. The method of claim 4,
   wherein the RLC entity and the PDCP entity are related to the DRB, and
   wherein the bearer is a data radio bearer (DRB) connected to an acknowledged mode (AM) mode RLC entity or a DRB connected to an unacknowledged mode (UM) mode RLC entity.

6. A terminal in a wireless communication system, the terminal comprising:
   a transceiver configured to transmit or receive a signal; and a controller coupled with the transceiver and configured to:
  receive, from a base station, a radio resource control (RRC) message including first information on a radio link control (RLC) out of order delivery (rlc-OutOfOrderDelivery) and second information on a reordering timer, the first information indicating that out of order delivery from an RLC to a packet data convergence protocol (PDCP) is configured for an RLC entity, and the second information indicating a value of the reordering timer, wherein the second information is included in the RRC message in case of reconfiguration to a bearer associated with the RLC entity configured with the rlc-OutOfOrderDelivery,
  deliver data from the RLC entity to the PDCP entity, based on the out of order delivery configured by the first information rlc-OutOfOrderDelivery, and
  perform, at the PDCP entity, a reordering function for the data, based on the reordering timer.

7. The terminal of claim 6,
  wherein the RLC entity and the PDCP entity are related to the DRB, and
  wherein the bearer is a data radio bearer (DRB) connected to an acknowledged mode (AM) mode RLC entity or a DRB connected to an unacknowledged mode (UM) mode RLC entity.

8. The terminal of claim 7, wherein the RLC entity related to the DRB is one entity.

9. A base station in a wireless communication system, the base station comprising:
  a transceiver configured to transmit or receive a signal; and
  a controller coupled with the transceiver and configured to:
    transmit, to a terminal, a radio resource control (RRC) message including first information on a radio link control (RLC) out of order delivery (rlc-OutOfOrderDelivery) and second information on a reordering timer, the first information indicating that out of order delivery from an RLC to a packet data convergence protocol (PDCP) is configured for an RLC entity, and the second information indicating a value of the reordering timer, wherein the second information is included in the RRC message in case of reconfiguration to a bearer associated with the RLC entity configured with the rlc-OutOfOrderDelivery,
  wherein data is delivered from the RLC entity to the PDCP entity, based on the rlc-OutOfOrderDelivery, and
  wherein a reordering function for the data is performed at the PDCP entity, based on the reordering timer.

10. The base station of claim 9,
  wherein the RLC entity and the PDCP entity are related to the DRB, and
  wherein the bearer is a data radio bearer (DRB) connected to an acknowledged mode (AM) mode RLC entity or a DRB connected to an unacknowledged mode (UM) mode RLC entity.

11. The base station of claim 10, wherein the RLC entity related to the DRB is one entity.

* * * * *